US007780512B2

(12) United States Patent
Sines et al.

(10) Patent No.: US 7,780,512 B2

(45) Date of Patent: *Aug. 24, 2010

(54) MULTIPLE PLAYER SLOT MACHINE GAME SYSTEM

(75) Inventors: Randy D. Sines, Worley, ID (US); Michael J. Kuhn, Spokane, WA (US); Randy A. Gregory, Spokane, WA (US)

(73) Assignee: Digideal Corporation, Spokane, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/077,074

(22) Filed: Mar. 14, 2008

(65) Prior Publication Data

US 2008/0268939 A1 Oct. 30, 2008

Related U.S. Application Data

(63) Continuation of application No. 11/396,055, filed on Mar. 31, 2006, which is a continuation of application No. 10/140,212, filed on May 6, 2002, now Pat. No. 7,048,629, which is a continuation of application No. 09/301,267, filed on Apr. 27, 1999, now abandoned, which is a continuation of application No. 09/159,813, filed on Sep. 23, 1998, now abandoned, which is a continuation-in-part of application No. 09/041,373, filed on Mar. 11, 1998, now Pat. No. 6,165,069.

(51) Int. Cl.
*A63F 13/00* (2006.01)

(52) U.S. Cl. ............................ 463/13; 463/16; 463/17; 463/18; 463/19; 463/20; 463/25

(58) Field of Classification Search .................. 463/25, 463/13, 16–20
See application file for complete search history.

(56) References Cited

U.S. PATENT DOCUMENTS

| | | | | |
|---|---|---|---|---|
| 3,796,433 A | | 3/1974 | Fraley et al. | |
| 4,072,310 A | | 2/1978 | Beam | |
| 4,294,451 A | | 10/1981 | Wollner | |
| 4,380,334 A | | 4/1983 | Minkoff et al. | |
| 4,531,187 A | | 7/1985 | Uhland | |
| 4,614,342 A | | 9/1986 | Takashima | |
| 4,636,951 A | | 1/1987 | Harlick | |
| 4,760,527 A | | 7/1988 | Sidley | |
| 4,805,907 A | * | 2/1989 | Hagiwara | 463/20 |
| 4,813,675 A | | 3/1989 | Greenwood | |
| 4,837,728 A | * | 6/1989 | Barrie et al. | 463/27 |
| 4,926,327 A | | 5/1990 | Sidley | |
| 5,022,653 A | | 6/1991 | Suttle et al. | |
| 5,033,744 A | | 7/1991 | Bridgeman et al. | |

(Continued)

FOREIGN PATENT DOCUMENTS

GB 2117546 A 10/1983

*Primary Examiner*—Peter DungBa Vo
*Assistant Examiner*—David Duffy
(74) *Attorney, Agent, or Firm*—Mark Farrell Patent Law PC

(57) ABSTRACT

Systems and methods for playing live casino games. The systems have changeable displays which portray virtual symbols to live participants. Assignment of symbols are accomplished using data processing functions within an electronic game processor or processors which enable these functions to be performed. The invention allows casinos to speed play and reduce the risk of cheating while allowing multiple participants to play a multiple participant capable slot machine.

20 Claims, 70 Drawing Sheets

U.S. PATENT DOCUMENTS

| | | | |
|---|---|---|---|
| 5,046,736 A | | 9/1991 | Bridgeman et al. |
| 5,098,107 A | | 3/1992 | Boylan et al. |
| 5,141,234 A | | 8/1992 | Boylan et al. |
| 5,159,549 A | | 10/1992 | Hallman et al. |
| 5,224,706 A | | 7/1993 | Bridgeman et al. |
| 5,242,163 A | | 9/1993 | Fulton |
| 5,255,915 A | | 10/1993 | Miller |
| 5,332,219 A | | 7/1994 | Marnell, II et al. |
| 5,377,973 A | | 1/1995 | Jones et al. |
| 5,377,993 A | | 1/1995 | Josephs |
| 5,393,057 A | | 2/1995 | Marnell, II |
| 5,407,199 A | | 4/1995 | Gumina |
| 5,423,551 A | | 6/1995 | Stavinsky |
| 5,496,032 A | | 3/1996 | Okada |
| 5,511,781 A | | 4/1996 | Wood et al. |
| 5,531,440 A | | 7/1996 | Dabrowski et al. |
| 5,531,448 A | | 7/1996 | Moody |
| 5,586,936 A | | 12/1996 | Bennett et al. |
| 5,613,912 A | | 3/1997 | Slater |
| 5,630,586 A | | 5/1997 | Lowden |
| 5,636,843 A | | 6/1997 | Roberts |
| 5,651,548 A | | 7/1997 | French et al. |
| 5,655,966 A | | 8/1997 | Werdin |
| 5,669,817 A | | 9/1997 | Tarantino |
| 5,674,128 A | | 10/1997 | Holch et al. |
| 5,687,968 A | | 11/1997 | Tarantino |
| 5,735,742 A | | 4/1998 | French |
| 5,743,800 A | | 4/1998 | Huard et al. |
| 5,766,076 A | | 6/1998 | Pease et al. |
| 5,770,533 A | | 6/1998 | Franchi |
| 5,779,546 A | | 7/1998 | Meissner et al. |
| 5,788,574 A | | 8/1998 | Omstein et al. |
| 5,803,808 A | | 9/1998 | Strisower |
| 5,831,527 A | | 11/1998 | Jones, II et al. |
| 5,839,960 A | | 11/1998 | Parra et al. |
| 5,845,907 A | | 12/1998 | Wells |
| 5,868,392 A | | 2/1999 | Kraft |
| 5,879,233 A | | 3/1999 | Stupero |
| 5,909,876 A | | 6/1999 | Brown |
| 5,919,090 A | | 7/1999 | Mothwurf |
| 5,944,315 A | | 8/1999 | Mostashari |
| 5,944,316 A | | 8/1999 | Hernandez |
| 5,951,397 A | | 9/1999 | Dickinson |
| 5,975,529 A | | 11/1999 | DeKeller |
| 6,010,404 A | | 1/2000 | Walker et al. |
| 6,068,553 A | * | 5/2000 | Parker ......................... 463/20 |
| 6,093,101 A | | 7/2000 | Mourad |
| 6,099,408 A | | 8/2000 | Schneier et al. |
| 6,186,895 B1 | | 2/2001 | Oliver |
| 6,200,218 B1 | | 3/2001 | Lindsay |
| 6,217,447 B1 | | 4/2001 | Lofink et al. |
| 6,315,666 B1 | * | 11/2001 | Mastera et al. ................ 463/20 |
| 2001/0016515 A1 | | 8/2001 | Oliver |

* cited by examiner

INSURANCE SEQUENCE

DEAL CARD SEQUENCE

PLAY OUT SEQUENCE

FINISH SEQUENCE

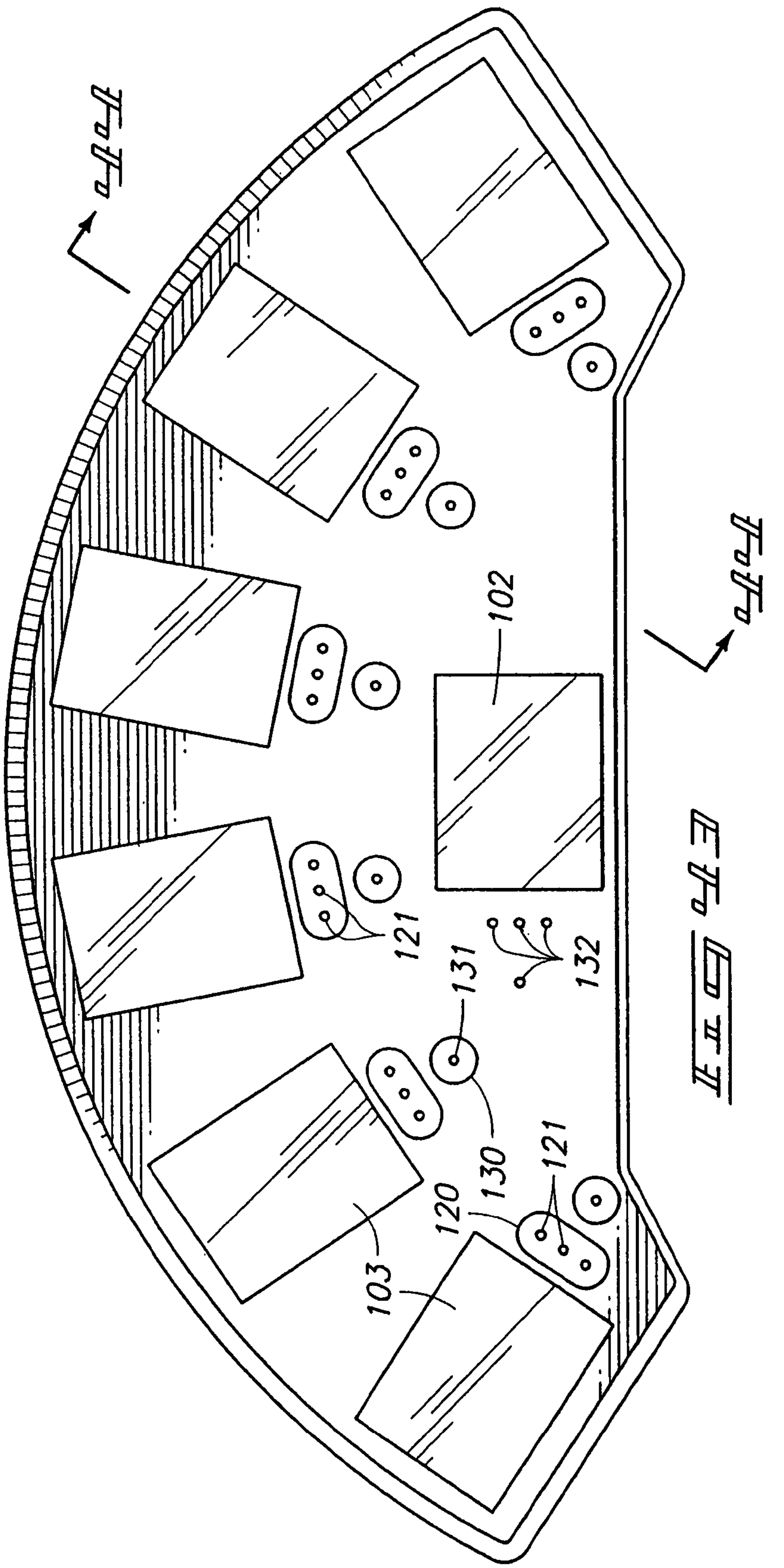
102
121
131
132
130
121
120
103

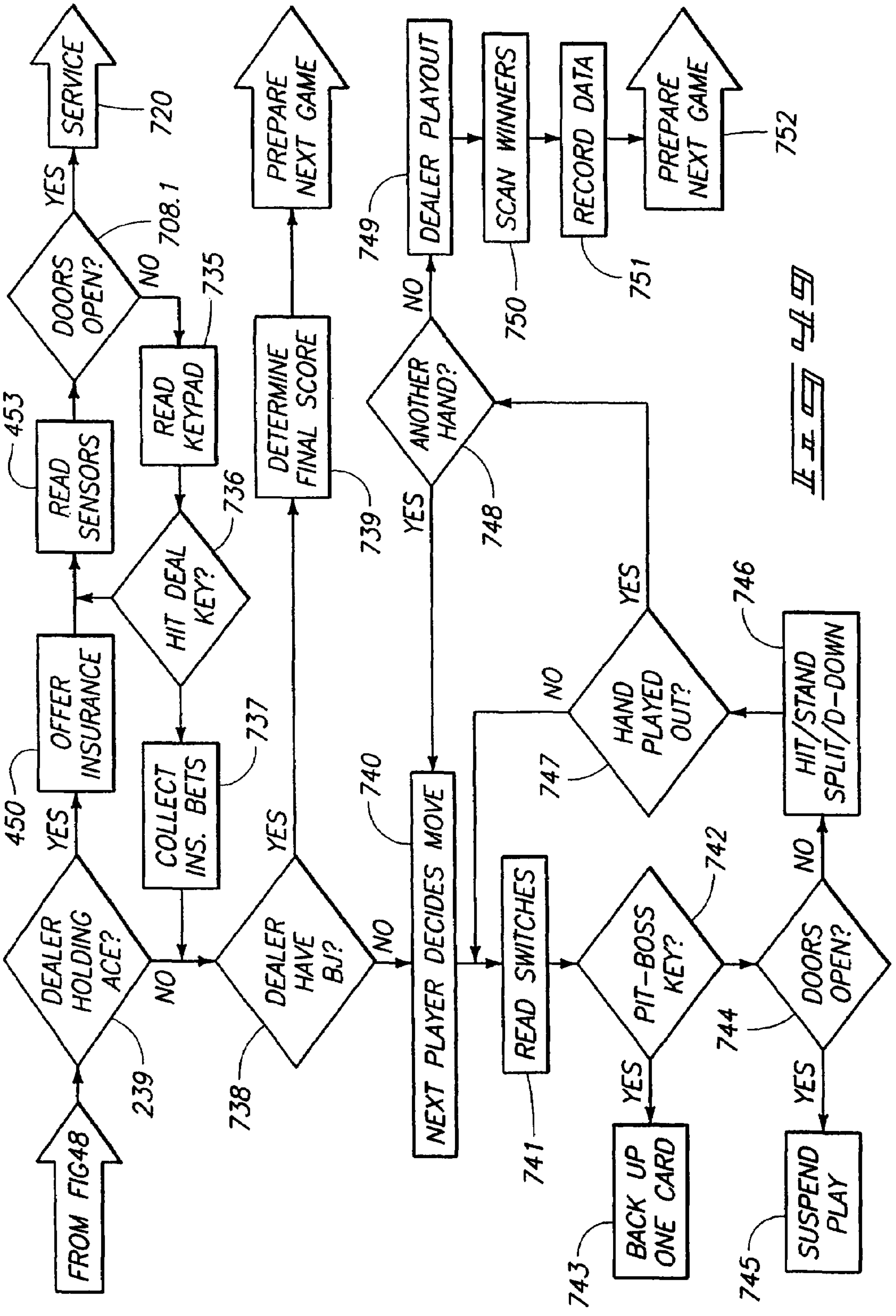
FROM FIG48
DEALER HOLDING ACE?
239
YES
NO
OFFER INSURANCE
450
HIT DEAL KEY?
736
READ SENSORS
453
DOORS OPEN?
708.1
YES
NO
SERVICE
720
READ KEYPAD
735
COLLECT INS. BETS
737
DEALER HAVE BJ?
738
YES
NO
DETERMINE FINAL SCORE
739
PREPARE NEXT GAME
NEXT PLAYER DECIDES MOVE
740
ANOTHER HAND?
748
YES
NO
DEALER PLAYOUT
749
SCAN WINNERS
750
RECORD DATA
751
PREPARE NEXT GAME
752
READ SWITCHES
741
PIT-BOSS KEY?
742
YES
BACK UP ONE CARD
743
HAND PLAYED OUT?
747
NO
YES
DOORS OPEN?
744
YES
NO
SUSPEND PLAY
745
HIT/STAND SPLIT/D-DOWN
746

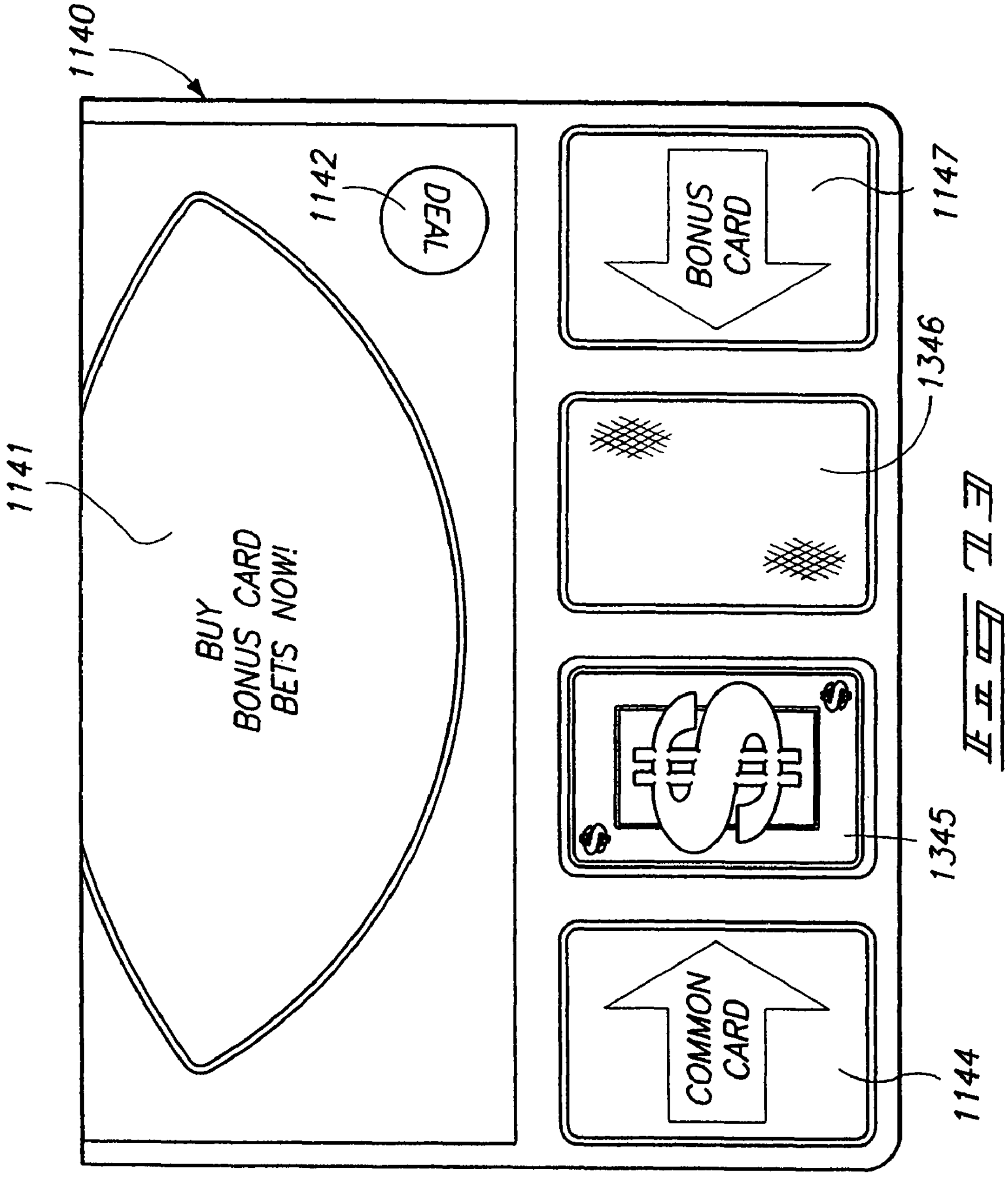
1140
1141
BUY
BONUS CARD
BETS NOW!
1142
DEAL
BONUS
CARD
1147
1346
1345
COMMON
CARD
1144

MULTIPLE PLAYER SLOT MACHINE GAME SYSTEM

CROSS-REFERENCE TO RELATED APPLICATIONS

This document is a continuation application of U.S. patent application Ser. No. 11/396,055, filed Mar. 31, 2006; which was a continuation of U.S. patent application Ser. No. 10/140,212, filed May 6, 2002, (now U.S. Pat. No. 7,048,629 issued May 23, 2006), which was a continuation of U.S. patent application Ser. No. 09/301,267, filed Apr. 27, 1999 (now abandoned) which is a continuation of U.S. patent application Ser. No. 09/159,813, filed Sep. 23, 1998 (now abandoned), which was a continuation-in-part of U.S. patent application Ser. No. 09/041,373, filed Mar. 11, 1998, (now U.S. Pat. No. 6,165,069 issued Dec. 26, 2000). This document claims priority to the aforementioned priority applications under U.S.C. §120, and the foregoing priority applications are hereby incorporated by reference herein in their entirety.

TECHNICAL FIELD

The field of this invention is apparatus and methods for playing live table playing card games; namely, games which use playing cards and are played at a casino, cardroom, residential or other gaming table with live human participants.

BACKGROUND OF THE INVENTION

In the gaming industry there is a significant volume of gambling which occurs at live table games which use playing cards. Exemplary live table games include blackjack, poker, baccarat, and others. There is also a number of proprietary or specialty live table card games which have developed, such as pai-gow poker, Let-It-Ride™, Caribbean Stud™ and others. These and many other games all involve play using playing cards. The use of playing cards has a number of associated limitations and disadvantages which have long plagued the casino industry. Some of these are of general concern to all or most playing card games. Others are problems associated with the use of playing cards in particular games. Some of the principal concerns and problems are discussed below.

The use of playing cards at live table games typically involves several operational requirements which are time-consuming. These operations are conveniently described as collecting, shuffling and dealing of the cards. In many card games there is also a step of cutting the deck after it has been shuffled.

In the collecting operation, a dealer typically collects the cards just played at the end of a hand of play. This is done in preparation for playing the next hand of cards. The cards are best collected so all are in a face-down or face-up condition. The cards also are typically straightened into a stack with the long sides and short sides aligned. These manipulations take time and are not typically appreciated by either the dealer or players as enhancing the play and entertainment value of the game.

In many games the cards collected at the end of the hand are deposited in a discard rack which collects the played cards until the time a new stack is obtained or the stack is shuffled. In some games the cards are immediately shuffled into the stack either manually or using a shuffling machine. More typically, the cards are collected and then shuffling is performed later by the dealer.

When shuffling is needed, it involves a break in the action of the table game and consumes a significant amount of time.

Shuffling is also the most time consuming operation in preparing for the next hand. Thus, shuffling is of substantial financial significance to the casino industry because it requires significant time and reduces the number of hands which can be played per hour or other period of time. The earnings of casinos is primarily dependent upon the total number of hands played. This is true because the casino on average wins a certain percent of the amounts wagered, and many or most casinos are open on a 24-hour basis. Thus, earnings are limited by the number of hands that can be played per hour. In light of this there has been a significant and keen interest by casino owners to develop practices which allow more games to be played in a given amount of time. Accomplishing this without detracting from the players enjoyment and desire to play the game is a challenging and longstanding issue with casino owners and consultants in the gaming industry.

An additional consideration in the casino industry is the costs associated with shuffling machines. Shuffling machines currently available have costs in the thousands of dollars. Such machines save time in performing the shuffling process, but still require time to load, operate and unload. These factors reduce the savings associated with reduced shuffling time and effort. Further reductions in the costs and time associated with shuffling of cards is still desired.

The amount of time consumed by collecting, shuffling and dealing is also of significance in private card games because it also delays action and requires some special effort to perform. In private games there is also some added complexity due to card players remembering or figuring out who previously dealt and who should now shuffle and re-deal the cards as needed.

In addition to the time delay and added activity needed to collect, shuffle and deal cards, there is typically some time devoted to cutting the deck of cards which have been shuffled and which are soon to be dealt. This traditional maneuver helps to reduce the risk that the dealer who has shuffled the cards may have done so in a way that stacks the deck in an ordered fashion which may favor the dealer or someone else playing the game. Although cutting the deck does not require a large amount of time, it does take some time. The amount of time spent on cutting reduces the frequency at which hands of the card game can be played.

The above and related considerations clearly demonstrate that a substantial amount of time is consumed by collecting, shuffling, cutting and dealing playing cards. The casino industry has long felt the desire to reduce the time spent and increase play of live table games.

In the gaming industry there is also a very significant amount of time and effort devoted to security issues which relate to play of the casino games. Part of the security concerns stem from frequent attempts to cheat during play of the games. Attempts to cheat are made by players, dealers, or more significantly by dealers and players in collusion. This cheating seeks to affect the outcome of the game in a way which favors the dealer or players who are working together. The amount of cheating in card games is significant to the casino industry and constitutes a major security problem which has large associated losses. The costs of efforts to deter or prevent cheating are very large and made on a daily basis.

Many of the attempts to cheat in the play of live table card games involve some aspect of dealer manipulation of cards during collection, shuffling, cutting or dealing of cards. Thus, there is a need for methods and apparatuses which can be used in the play of live table card games which reduces the ability of the dealer and/or players to cheat by manipulation of playing cards. Of greatest concern are schemes whereby the deck is stacked and the stacked deck is used to the collusive player's advantage. Stacked decks represent huge potential losses since the player is aware of the cards which will be played before play occurs and can optimize winnings by increasing bets for winning hands and decreasing bets for losing hands.

Casinos have recognized that their efforts to reduce cheating would be improved if the casino had comprehensive information on the cards which have been played, the amounts bet, the players and dealers involved and other information about actions which have taken place at the card tables. This is of particular importance in assessing the use of stacked decks. It is also important where card tracking is occurring. Additional explanation about card tracking is discussed below. The information desired by the casinos includes knowing the sequence and exact cards being dealt.

Some attempts have been made to record card game action. The best current technology involves cameras which are mounted above the tables to record the action of the card games. This approach is disadvantaged by the fact that not all cards dealt are easily known from a camera position above the table because some or all of the cards are not dealt face-up, or are hidden by overlying cards. Although many blackjack games are sufficiently revealing to later determine the order of dealt cards, others are not. Other card games, such as poker, have hands which are not revealed. The covered cards of the players do not allow the order of dealt cards to be ascertained from an above-table camera.

Even where above-table cameras are used, their use may not be effective. Such cameras may require time-consuming and tedious human analysis to go over the video tapes or other recordings of table action. This human study may be needed just to ascertain the sequence of cards dealt or to determine the amount of betting. Such human analysis is costly and cannot economically be used to routinely monitor all action in a casino cardroom. It is also required because there is no current way for easily ascertaining whether the dealer or player won the hand, such as in a blackjack game. It is typically not possible to discern the indicia number or letter presented in the corner of the playing card when viewed in a recorded video tape. Counting the individual pips in the center field of the playing cards can be done; however, it cannot be done in all situations with the desired reliability. This is true because cards may be partly or totally covered by another overlying card contained in the some hand, leading to missing information or mistaken interpretations.

For the above reasons, the video camera monitoring techniques have only found very limited effectiveness as a routine approach for identifying cheating. There has also been relatively limited use as a serious analytical tool because of the difficulty of analysis. Such camera surveillance techniques are also of only limited effectiveness as a deterrent because many of the people involved with cheating have a working knowledge of their limitations and utilize approaches which are not easily detectible by such systems.

Another use of video camera monitoring and recording has been made in the context of analyzing card table action after someone has become a suspect. The tape recordings serve as evidence to prove the cheating scheme. However, in the past, this has generally required other evidence to initially reveal the cheating so that careful analysis can be performed. More routine and general screening to detect cheating has remained a difficult and continuing problem for casinos.

Another approach to reducing security problems utilizes card shoes having card detection capability. Card shoes hold a stack of cards containing typically from one to six decks of cards. The cards are held in the card shoe in preparation for dealing and to secure the deck within a device which restricts access to the cards and helps prevent card manipulations. Card shoes can be fit with optical or magnetic sensors which detect the cards as they are being dealt. Some of the problems of security analysis using above-table cameras is reduced when the sequence of cards dealt can be directly determined at the card shoe using optical or magnetic sensors.

One advantage of such card shoes is that the card sequence information can be collected in a machine readable format by sensing the specific nature (suit and count) of each card as they are dealt out of the card shoe. However, most such card shoes have special requirements for the cards being used. Such cards must carry magnetic coding or are specifically adapted for optical reading. This increases the cost of the cards and may not fully resolve the problems and difficulties in obtaining accurate information concerning sequence information.

The automated data collecting card shoes also do not have an inherent means for collecting data on the assignment of the card to a particular player or the dealer. They further do not collect data on the amounts bet. These factors thus require some other manual or partially automated data collection system to be used, or require that time-consuming human analysis be performed using video tapes as explained above.

An additional issue which has continued to be a concern in the casino industry relates to the use of automated shuffling machines. Prior automated shuffling machines have not demonstrated a sufficient ability to thwart highly skilled gamblers. Such gamblers have demonstrated an ability either by human intellect and training, or with the aid of computers, to determine information about the decks being dealt. This information is typically derived from information collected concerning the preceding hand or hands of play. Armed with such information, the skilled gamblers track a specific sequence or multiple sequences or groupings of cards within a deck or large stack. Tracking is often done for a group of cards forming part of a stack rather than an entire stack. These techniques in card tracking can significantly shift the advantage from the casino to a skilled gambler. Prior card shuffling machines all show a weakness in that skilled gamblers can observe operation of the machines and in many situations make predictions which serve as a means for card tracking.

The use in blackjack of numerous card decks, such as six decks, has been one strategy directed at minimizing the risk of card tracking. Such tracking should be contrasted with card counting strategies which are typically less accurate and do not pose as substantial a risk of loss to the casino. Use of numerous card decks in a stack along with proper cut card placement can also reduce the risk of effective card counting. However, it has been found that multiple decks are not sufficient to overcome the skilled gambler's ability to track cards and turn the advantage against the house.

Card tracking can be thought of as being of two types. Sequential card tracking involves determination of the specific ordering of the card deck or decks being dealt. This can be determined or closely estimated for runs of cards, sequences of cards forming a portion or portions of a stack. Sequential card tracking can be devastating to a casino since a player taking advantage of such information can bet large in a winning situation and change the odds in favor of the player and against the casino.

Slug tracking involves determining runs of the deck or stack which show a higher frequency of certain important cards. For example, in the play of blackjack there are a relatively large number of 10-count cards. These 10-count cards are significant in producing winning blackjack hands or 20-count hands which are also frequently winning hands. Gamblers who are proficient in tracking slugs containing large numbers of 10-count cards can gain an advantage over the house and win in blackjack.

There is also a long-standing problem in the play of blackjack which concerns the situation when the dealer receives a blackjack hand in the initial two cards dealt. If the dealer has a 10-count card or ace as the upcard, then it is possible for the dealer to have a blackjack. If the dealer does have a blackjack, then there is no reason to play the hand out since the outcome of the hand is already determined without further dealing. If the hand is fully played out, and the dealer then reveals that the dealer has received a blackjack hand, then a significant amount of time has been wasted. It also causes players to often be upset when a hand is played out to no avail.

In many casinos the waste of time associated with playing out hands with a winning dealer blackjack has lead to various approaches which attempt to end the hand after the initial deal. Some of these allow the dealer to look at the down card to make a determination whether a blackjack hand has been dealt to the dealer. This looking is commonly called "peeking" and is an operation which has been the source of numerous cheating schemes involving dealers and players who work in collusion.

In such cheating associated with peeking at the down card, the dealer cheats in collaboration with an accomplice-player. This cheating is frequently accomplished when the dealer signals the accomplice using eye movements, hand movements or other signals. If a dealer does not peek, then he does not know the value of his hand until after the players have completed their play. If the dealer does peek, then he can use such eye movements, hand movements or other techniques to convey instructions to his accomplice-player. These signals tell the accomplice what hand the dealer has been dealt. With this knowledge of the dealer's hand, the accomplice has improved odds of winning and this can be sufficient to turn the long-term odds in favor of the accomplice-player and against the casino.

Because of this potential for cheating, peeking as a normal procedure in the play of blackjack has been viewed with disfavor by many casinos. Some casinos which have experienced losses due to such cheating have eliminated the peeking procedure and decided to instead incur the waste of time and problems associated with playing out the hand of cards.

There has also been a substantial number of apparatuses devised to facilitate the peeking procedure or render it less subject to abuse. Such peeking devices are intended to allow determination of whether the dealer has received a blackjack hand; however, this is done without revealing to the dealer what the down card is unless it makes a blackjack. Some of these devices require a special table with a peeking device installed in the table. Others allow the down card to be reviewed using a table top device in which the card is inserted. These systems and others involve the use of special playing cards. These devices and methods generally add greater costs and slow the play of the game. The slowed play often occurs to such a degree that it offsets the original purpose of saving the time associated with playing out possible dealer blackjack hands. The prior attempts have often ended up unacceptable and are removed. This problem has nagged the casino industry for many years and a fully acceptable solution has never been found.

Another notable problem suffered by live table games is the intimidation which many novice or less experienced players feel when playing such games. Surveys have indicated that many new or less experienced people who come to a casino are inclined to play slot machines and video card games. These people feel intimidation at a live table game because such games require quick thinking and decision making while other people are watching and waiting. This intimidation factor reduces participation in table games.

The intimidation factor experienced by many in connection with live table games has had a very significant effect on casinos and the games offered in the casinos. About 20 years ago, live table games constituted approximately two-thirds of the casino business, with slot machines being the remaining one-third. Now it is just the opposite, with two-thirds of the business being in slot machines and similar single person gaming machines while live table games constitute only one-third of the business. Since betting at live table games is generally larger, this development is something of a disadvantage to the casinos as compared to the some persons participating in a live table game. Efforts to stem or reverse this trend using specialty table games with different play and larger jackpots have not been effective or of only temporary beneficial effect. Some of the efforts have produced fads or other temporary increases in interest levels but the overall effect has not had a long-term benefit. Thus, there is a need for improved live table games which reduce the intimidation factor and enhance the ease with which a player adopts play of such games. There is also need for live table games which provide satisfaction to those who play, such that repeat participation is improved.

A further issue which has developed in the casino business is the public's increasing interest in participating in games which have a very large potential payoff. This may be in part be a result of the large amount of publicity surrounding the state operated lotteries. News of huge payoffs is read with keen interest and creates expectations that gaming establishments should provide games with large jackpots. One approach has been the networked or progressive slot machines that use a centralized pool of funds contributed by numerous players. These slot machine systems are relatively more costly to purchase and operate. For many gamblers, this approach is not particularly attractive. This lack of attractiveness may be due to the impersonal and solitary nature of playing slot machines. It may alternatively be for other reasons. Whatever the reason, the public is clearly interested in participating in games which can offer potential jackpots which are very large. Table card games have not been able to satisfactorily address this interest. The continued diminishment in the percent of people who play live table games indicates the need for more attractive games and game systems which address to public's interests.

A further problem associated with live table card games are the costs associated with purchasing, handling and disposal of paper and plastic playing cards. Casinos pay relatively favorable prices for card decks, but the decks roughly cost about $1 per deck at this time. Each casino uses decks for a very limited period of time, typically only one shift, and almost always less than one day. After this relatively brief life in the limelight, the decks are disposed of in a suitable manner. In some cases they can be sold as souvenirs. This is done after the cards are specially marked or portions are punched out to show they have been decommissioned from a casino. This special marking allows the cards to be sold as souvenirs while reducing the risk that they will later be used at the card tables in a cheating scheme which involves slipping a winning card into play at an appropriate point. In other cases the playing cards are simply destroyed or recycled to eliminate this last risk. In any case, the cost of playing cards for a casino is significant and can easily run in the hundreds of thousands of dollars per year.

In addition to the above problems, there are also a significant cost associated with handling and storing the new and worn playing cards. Sizable rooms contained in the casino complexes are needed just to store the cards as they are coming and going. Thus, the high costs of casino facilities further exacerbates the costs associated with paper and plastic playing cards.

These and other considerations have been partially or fully addressed by the current invention which is described more fully below. Additional benefits and advantages of the current invention will be given in the following description, or will be apparent from the nature of the invention.

BRIEF DESCRIPTION OF THE DRAWINGS

Preferred embodiments of the invention are described below with reference to the accompanying drawings, which are briefly described below.

FIG. 4 is a top view showing the presentation unit of FIG. 1 shown in isolation.

FIG. 42 is a top view of the base plate portion of FIG. 41 with additional components mounted thereon which form additional parts of the system of FIG. 40.

FIG. 43 is a top view of the presentation unit shown in FIG. 40 in isolation.

FIG. 44 is a sectional view taken along line 44-44 of FIG. 40.

FIG. 49 is a third flow diagram showing another portion of the main operational flow scheme which is employed in the gaming system of FIG. 40.

FIG. 57 shows a display image which indicates a player has started play by placing a betting chip.

FIG. 73 is an enlarged top view showing the dealer display of FIG. 72 displaying a second dealer display image subsequent in game play to the first dealer display image.

FIG. 74 is an enlarged top view showing the dealer display of FIG. 73 displaying a third dealer display image subsequent in game play to the second dealer display image.

SUMMARY OF SOME ASPECTS AND FEATURES OF THE INVENTION

The invention inventions described herein include a number of aspects or features which are in part summarized below. The novelty of the invention is believed to reside in having one or more of the aspects or features either alone or in combination with additional aspects or features. The novel and inventive aspects of the invention may further reside in combinations of the summarized features along with additional details thereof presented in additional description given in this document, such as in the detailed description of the preferred embodiment or in the claims.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Gaming Table and System General Layout

Figure 1:
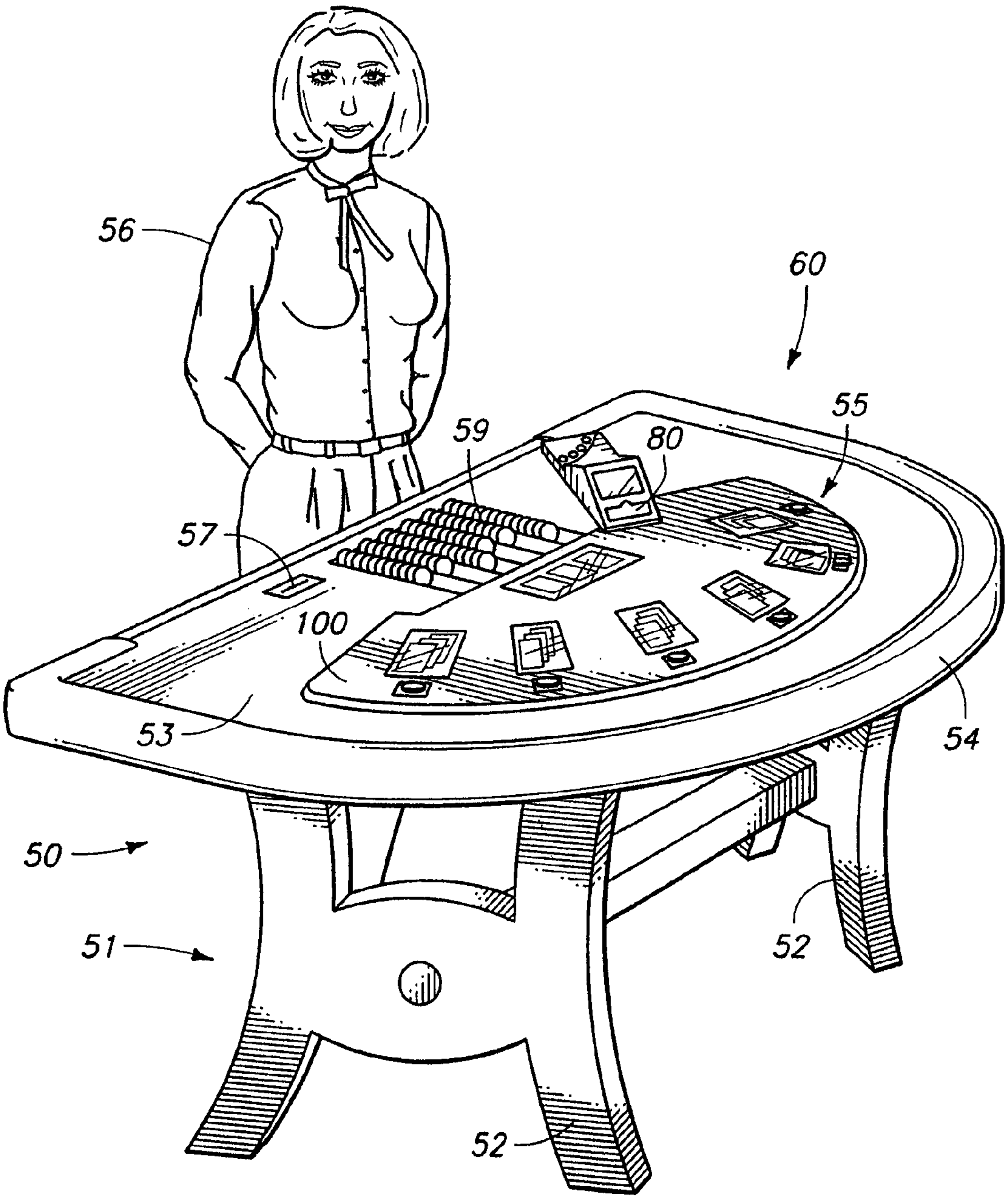
FIG. 1 is a perspective view showing a gaming table fitted with a preferred system according to the current invention.

FIG. 1 shows a gaming table 50 which is shown adapted and provided with a preferred system for playing live card games built in accordance with the invention. Gaming table 50 can be of a variety of common constructions. As shown, table 50 includes a table support trestle 51 having legs 52 which contact an underlying floor to support the gaming table thereon. The gaming table has a table top 53 and perimeter pad 54 which extends fully about a semicircular portion of the table periphery. The straight, back portion of the periphery is used by the dealer 56 and can be partly or wholly padded as may vary with the particular table chosen.

A playing surface 55 is provided upon the upwardly facing surface of table top 53 upon which participants of the card game play. A plurality of players (not shown) sit or stand along the semicircular portion and play a desired card game, such as the popular casino cord game of blackjack. Other card games are alternatively possible, although the system described herein is specifically adapted for playing casino blackjack.

The gaming table 50 also advantageously includes a betting chip rack 59 which allows the dealer to conveniently store betting chips used by the dealer in playing the game. A money drop slot 57 is further included to allow the dealer to easily deposit paper money bills thereinto when players purchase betting chips.

Table 50 can support a system, or form a part of a system for playing live card games which is constructed according to the present invention. The card game system 60 described herein is a retrofit system which has been added to table 50. Such retrofit system includes a presentation unit 100 which displays images which depict the cards and card hands being played along with additional information used in the play of the card game. The presentation unit will be explained more fully below.

The system also preferably includes a dealer control which is preferably provided in the form of a simulated dealing shoe 80 upon which live dealer 56 can rest his hand and use control keys to provide control commands as will be detailed below. Dealing shoe 80 also advantageously includes a dealer control or dealing shoe display. In the preferred form of the invention the shoe display is subdivided into two different sections, one forms a first shoe display or stack display which is a video display which simulates the stack of cards from which the dealer is dealing cards. The other section of the shoe display forms a second shoe display used to simulate cards moving from the shoe. This second display section can also show the back of a traditional card, the name of the casino, or other desired information.

Figure 3:
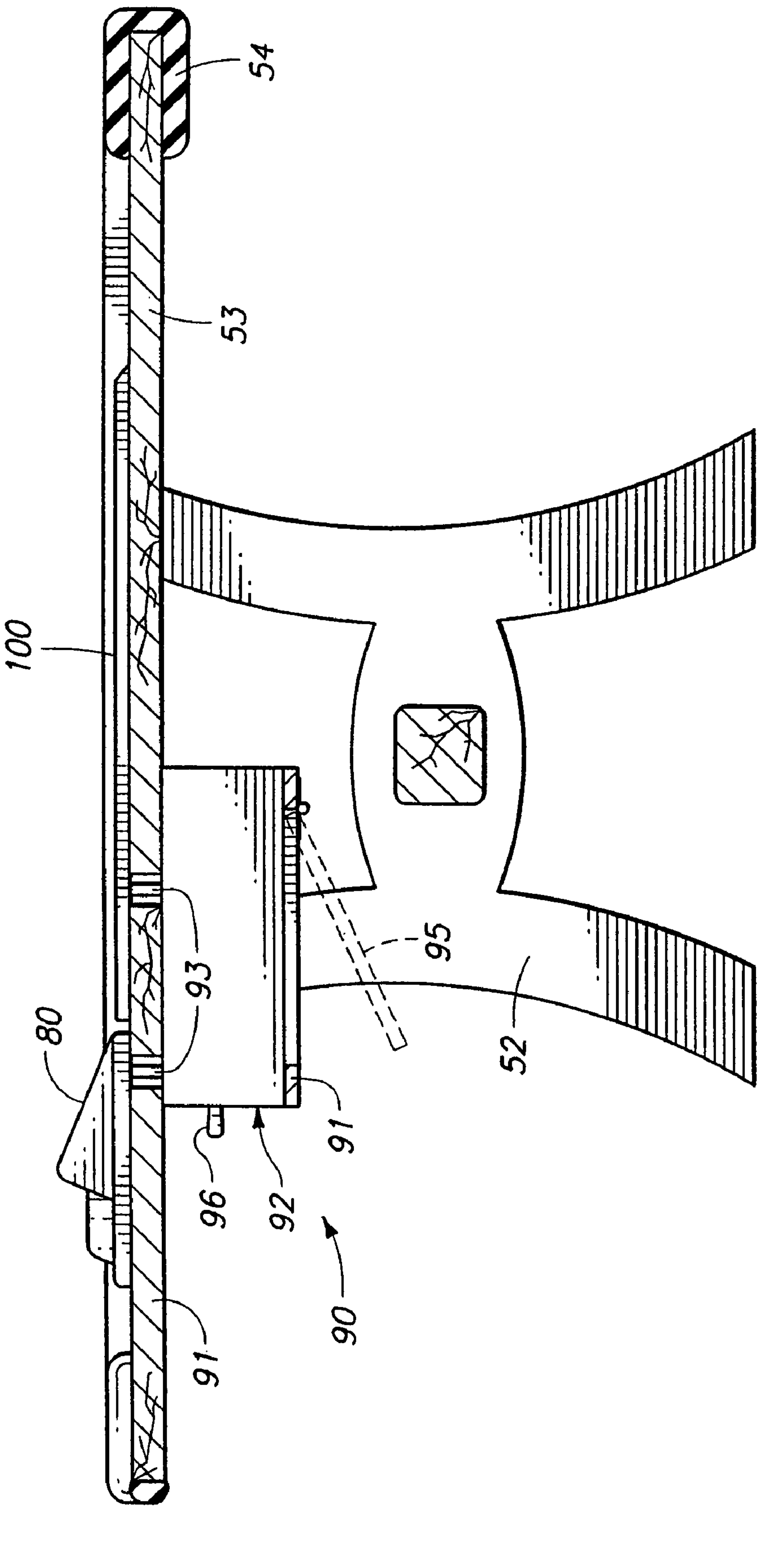
FIG. 3 is a sectional view showing portions of the gaming table and system of FIG. 1.
Figure 1:
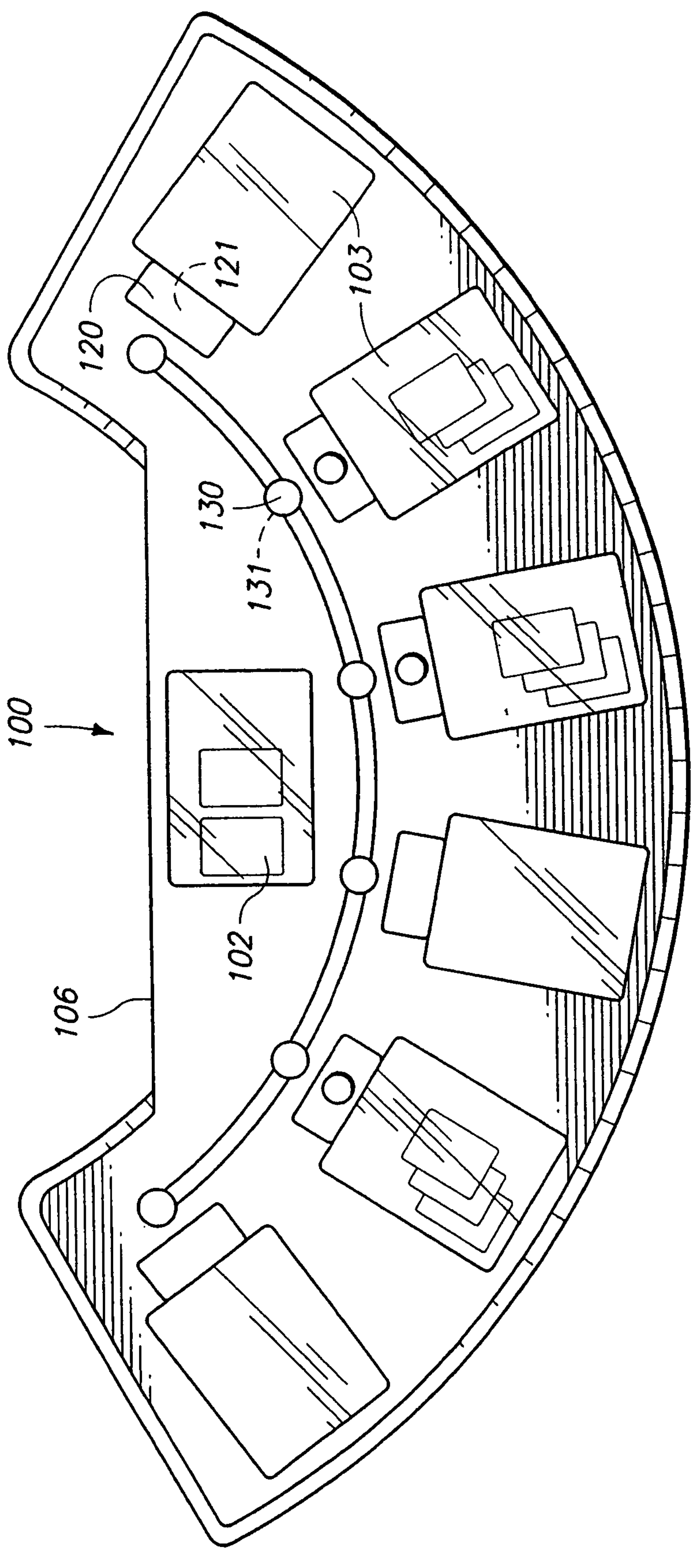

FIG. 3 shows that system 60 further includes at least one game processor, such as game processor 90. Game processor 90 includes a main module 92 which can advantageously be mounted beneath table top 53, such as by using a game processor support casing or housing 91. The housing can be directly connected to the underside of the table top using fasteners (not shown). The bottom panel of housing 91 is advantageously provided with a bottom access door 95 which is hinged and locked with a key lock (not shown) for security purposes. The controller main module 92 also is advantageously provided with a main power switch 96 which controls supply of power to an internal power supply. Electrical power is supplied to the module using a typical power cord. The main controller module 92 can further be provided with a second access door (not shown) which is also secured by a key lock to control access to a serial port and auxiliary keyboard port described below with regard to the electronics.

The game processor or processors 90 are connected with the dealing shoe 80 and presentation unit 100 using suitable connection cables 93. In the preferred construction there are fourteen data cables running between the module 92 and the presentation unit 100 to control operation of the seven displays used in the presentation unit. There are also two data cables running between the dealing shoe module 80 and main controller module 92.

Presentation Unit—Generally

Gaming table 50 has been fitted with a presentation unit 100 which is supported thereon. The presentation unit or units are preferably supported upon the upper or playing surface 55 of the gaming table. This allows the system to be easily installed upon a variety of differing gaming tables without extensive modifications being performed. Alternatively, the presentation unit can otherwise be mounted upon the gaming table in a manner which allows participants to view one or more of the displays which form a part of the presentation unit.

Figure 2:
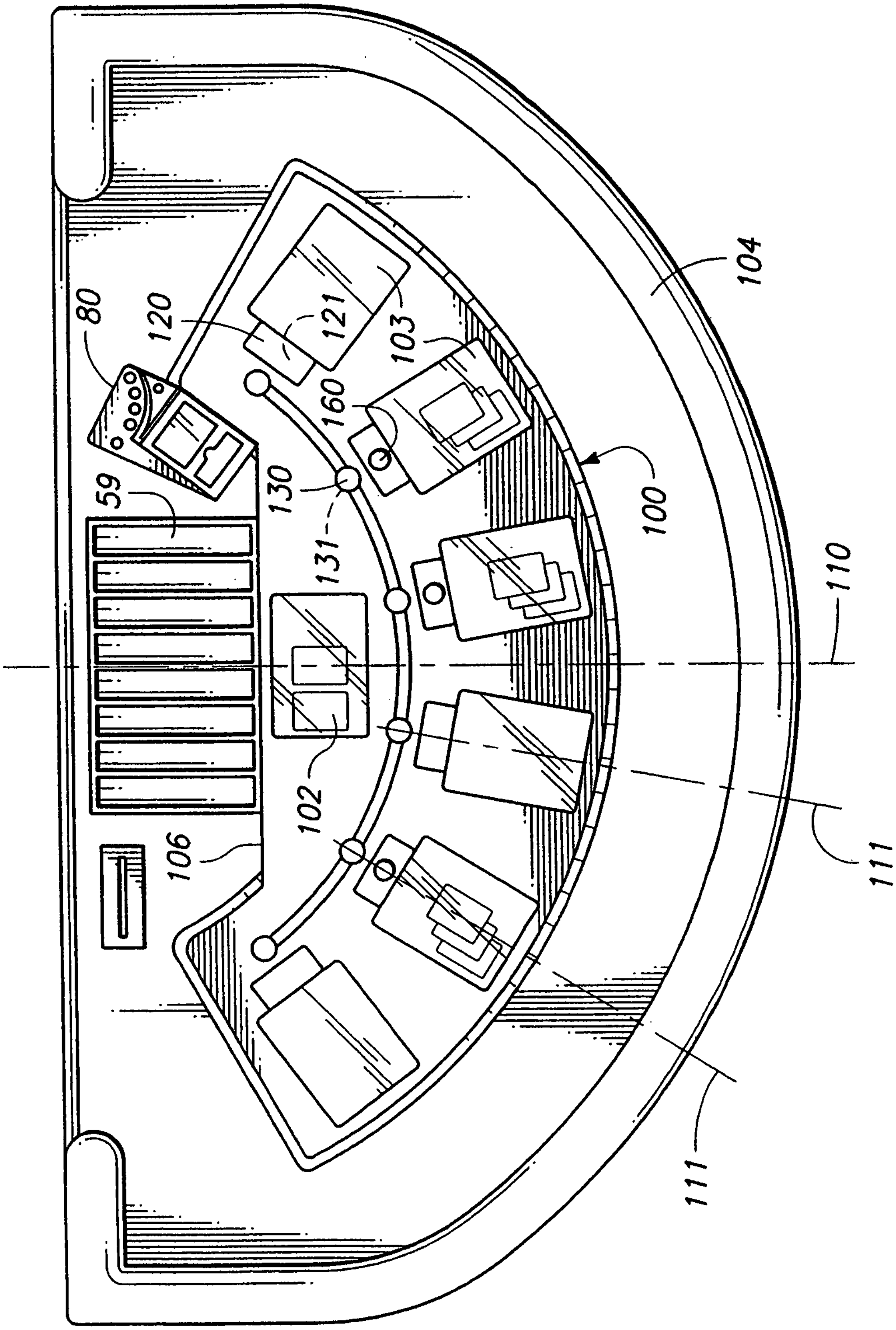
FIG. 2 is a top view of the gaming table and system shown in FIG. 1.

In the preferred construction shown, there is one presentation unit 100 which is adapted for use by a single live dealer 56 and six live players (not shown) who are in live attendance and positioned about the gaming table. FIGS. 2-4 show in greater detail the preferred form of the presentation unit. The unit includes an outer shell or housing 101 which can be advantageously be made from a transparent polycarbonate plastic so that the displays 102 and 103 can be viewed through the upper housing part without including special windows.

The perimeter of the upper housing semicircular section which has a semicircular periphery segment 104. The semicircular periphery and associated player section of the presentation unit are along a player side of the unit. The opposing dealer side of the presentation unit can be of various shapes. As shown, it includes a back periphery segment 106 which has a central portion which is relatively straight and is designed to allow placement of the presentation unit near to the betting chip rack 59.

Presentation Unit Participant Displays

Presentation unit 100 includes a number of visual displays, herein termed participant video displays, which are capable of displaying changeable display images. The participant display images are intended to display virtual playing cards and other information used in the play of the card game. FIGS. 2 and 4 show presentation unit 100 with a single dealer display 102 and six player displays 103. Displays 102 and 103 are advantageously liquid crystal matrix displays having color capability and integrated backlights for added viewing ease and clarity. Such displays are used in recent notebook computers and are commercially available in a variety of types and sizes from several manufacturers. The exact nature and size of the display can vary and alternative types of displays and future display technologies will likely serve the intended purposes for participant video displays 102 and 103.

The dealer display 102 is advantageously centered along a central centerline 110 to allow easy viewing by both the dealer and players. The area of the presentation unit including and adjacent to dealer display 102 is the dealer section of the presentation unit.

Player displays 103 are preferably arranged in an arcuate array forming a segment of an annular band across the upper face of the presentation unit. Each display is centered upon a radial display centerline 111. This arrangement complements the semicircular player side of the presentation unit and the adjacent semicircular player side of the gaming table. In this arrangement the player displays are adjacent and opposite to each player seating position. In the preferred construction shown having six player positions, the displays are centered upon the player display centerlines at angularly spaced positions of about 20-30° of angular arc, more preferably about 25° of arc. Varying the number of player positions and table configuration will allow or require varying angular spacings to be used. This angular spacing arrangement facilitates easy viewing by the player who is viewing the virtual cards from his or her display. It also allows the dealer to have easy view from across the gaming table.

The player displays 103 are also advantageously presented in an upwardly facing orientation and contained in a single plane or approximately a single plane, to facilitate easy viewing by other players from around the table. Although this arrangement and capability are not essential, they increase viewing and interest of the nonparticipating players as a particular player's hand is being played out between the active player and dealer. This helps to maintain the ambiance of a live table game, enables skilled players to keep track of cards played, and overcomes some of the deficiencies of most video card games. Such games in particular lack significant interest to other people as the hand is being played out between a computer and a single player.

Presentation Unit Betting Chip Detectors

FIGS. 2 and 4 show that each player station also advantageously includes a betting chip detection zone 120. Betting chip detection zones 120 are zones into which a player must position a betting chip 160 to be considered a participant in the game being played.

The preferred presentation unit includes betting chip sensors 121 which are immediately below or otherwise adjacent to zones 120. Sensors 121 can be selected from several different types of sensors. One suitable type is a weigh cell which senses the presence of a betting chip thereon so that the game processor knows at the start of a hand, that a player is participating in the next hand being played. A variety of weigh cells can be used.

Another suitable type of sensor 121 includes optical sensors. Such optical sensors can be photosensitive detectors which use changes in the sensed level of light striking the detectors. In a preferred system according to this invention, sensor 121 uses ambient light which beams from area lighting of the casino or other room in which it is placed. When a typical betting chip 160 is placed in detection zone 120, the amount of light striking the detector 121 located beneath the zone is measurably diminished by the opaque betting chip. The detector conveys a suitable electrical signal which indicates that a betting chip has been placed within the detection zone 120. A variety of other alternative detectors can also be used.

A further type of preferred betting chip sensor is one which can detect coding included on or in the betting chips to ascertain the value of the betting chip or chips being placed by the players into detection zones 120. A preferred form of this type of sensor or detector 121 is used to detect an integrated circuit based radio frequency identification unit which is included in or on the betting chips. The most preferred sensors are sometimes referred to as radio frequency identification detection or read-write stations.

Figure 38:
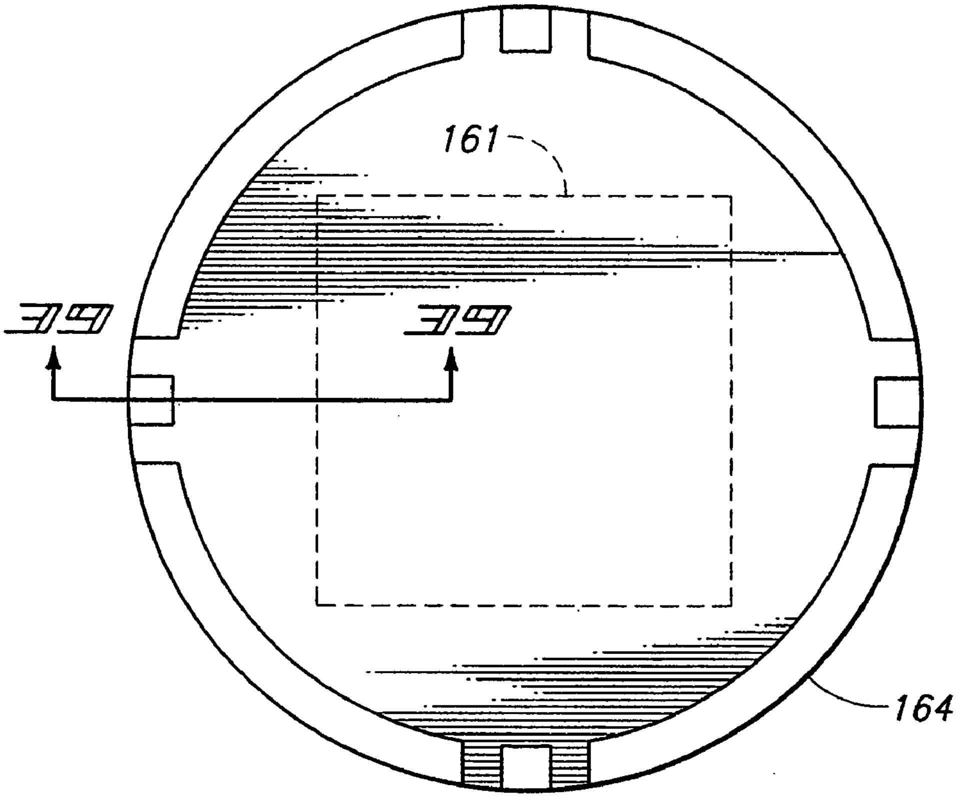
FIG. 38 is a top view of an alternative betting chip used with a system similar to the system of FIG. 1.
Figure 39:
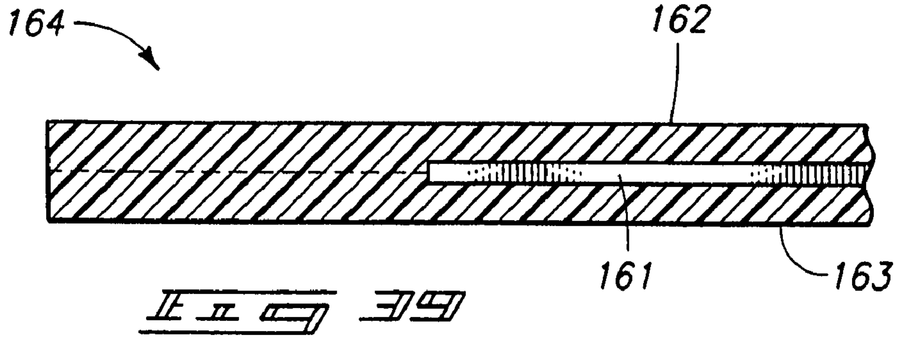
FIG. 39 is an enlarged sectional view of the betting chip shown in FIG. 38 as taken along line 39-39.

FIGS. 38 and 39 show an alternative betting chip 164 which can be used with an alternative card game system similar to system 60. The betting chips 164 are used in lieu of normal betting chips 160. Each betting chip 164 includes a radio frequency identification transponder 161 which is connected to the betting chip 160. In the preferred construction shown, the transponder 161 is sandwiched between a first betting chip part 162 and a second betting chip part 163. The parts 162 and 163 can advantageously be made from a formed paper or plastic material and then adhered or otherwise secured together to enclose the transponder and provide protection for the transponder during use. Alternatively, the transponder can be molded within the betting chip, or otherwise connected thereto, such as by using adhesives to an outer surface of the betting chip.

One type of integrated circuit radio frequency identification transponder is available from Texas Instruments and is sold under the trademarks TIRIS TAG-IT. This transponder is available in a very thin wafer shape, and can be laminated between paper and plastic to form the transponding betting chip 164.

When betting chips 164 are used, the betting chip detection sensor 121 will be a radio frequency interrogator detection unit which sends out a query signal and receives a detectable response from the betting chip transponder 161. The transponder can be either powered or unpowered, depending upon the specific vendor chosen and the associated sensor technology and detection device used with that type of sensor. In the case of one suitable type of transponder, explained above from Texas Instruments, this same vendor has associated detection systems which can read data from the transponders. Also available are detection systems which can both read data from the transponder and write data onto the transponders. This vendor or other vendors may provide suitable detection and sensing subsystems which can be employed to not only read and write data thereto, but also provide confirmatory identification codes which deter counterfeiting of the gaming chips or provide additional data processing capabilities.

It is still further possible for other alternative sensors to be used instead of the sensors 121 described above. Such alternative sensors may work with typical betting chips or other types of betting chips. Such sensor can provide identification circuits or other identification or value-coding inserts or appliques which can be included in or on the betting chips to provide value information, serial number information, and any other desired information.

FIGS. 2 and 3 further show that the preferred presentation unit includes insurance bet detection zones 130 which have associated insurance bet sensors 131. The insurance bet sensors can be of various types and constructions as explained above in connection with the general betting detection zones 120 and bet sensors 121. The insurance bet detection zones 130 are used by players to place an insurance bet during play of the card game blackjack. An insurance bet is placed as desired by the players upon the occurrence of the dealer receiving an ace as the dealer's upcard. If the dealer's down card is a ten-count card, then the dealer has blackjack and the player placing an insurance bet does not lose his original bet or insurance bet. If the dealer's down card does not make blackjack, then the insurance bet is lost to the dealer and play continues in the normal fashion.

Dealer Controls and Dealing Shoe

Live card game system 60 also preferably includes a plurality of dealer controls which are advantageously provided in the form of a simulated dealing shoe 80. The dealer controls can alternatively be provided in the presentation unit or in other different forms which do not necessarily require the simulated dealing shoe and other features which are included therewith.

Figure 5:
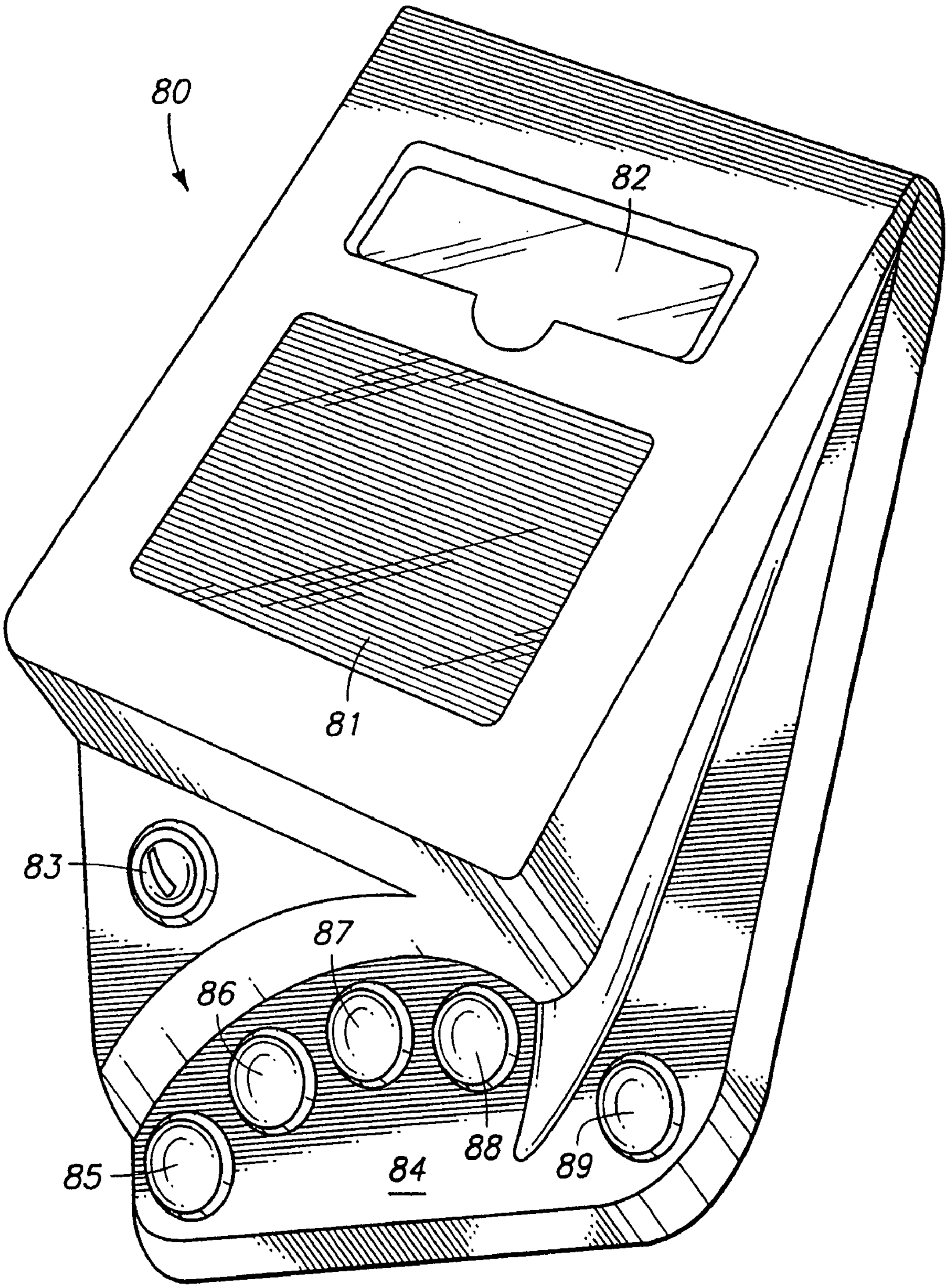
FIG. 5 is a perspective view of a preferred dealing shoe module forming a part of the preferred system of FIG. 1.

Dealing shoe 80 is shown in greater detail in FIG. 5. The dealing shoe has a dealing shoe case 84 which forms the outer surface of the dealing shoe. The dealing shoe case is connected to and covers a base plate (not shown) which serves as a structural frame to which case 84 is connected and upon which other internal components are mounted.

Case 84 has a first display opening or window which allows a first dealing shoe display 81 to be presented for viewing. The dealing shoe also advantageously includes a second display opening or window which allows a second dealing shoe display 82 to be presented for viewing. In the preferred construction the first and second displays 81 and 82 are provided by a single liquid crystal panel display. The display has two different portions or sections which are changeable and operated to provide different images through the display windows. The first display image typically shows a simulated stack of cards similar to what appears in viewing a traditional card stack contained in a manual dealing shoe long used in dealing blackjack. The first display image can also be varied to allow presentation of programming options which are available in setting up the system and customizing operational parameters to the desired settings for a particular casino or cardroom in which the system is being used.

The second shoe display 82 has a second display image which is advantageously used to provide a depiction of the back decorative side of a traditional playing card. This can be used along with some attractive presentation of the casino's name or other desirable image. The second shoe display image can also be moved or otherwise varied during the period of dealing to give the impression of movement and thus simulate cards being dealt from the shoe to add a touch of additional realism. Other display images are also clearly possible and can vary from casino to casino as management desires.

The dealer controls on the dealing shoe 80 also preferably include a key operated switch 83 which is used to control basic operation of the system and for placing the unit into a programming mode. The key operated switch can provide two levels of access authorization which restricts access by dealers to programming, or additional security requirements can be provided in the software which restricts programming changes to management personnel.

Programming may be input in several different modes consistent with the invention. In one form the programming can be provided using a touch screen display used as display 81 with varying options presented thereon and the programming personnel can set various operational and rules parameters, such as: the shuffle mode, number of decks of cards used in the virtual card stack, options with regard to the portion of the stack which is used before the stack is cut, limits on the amounts which can be bet at a particular table, whether splits are accepted for play and to what degree, options concerning doubling down plays, whether the dealer hits or stands on soft 17, and other rules can be made variable dependent upon the particular form of the system programming used in the system. It is alternatively, and more preferable to simply use the control keys 85-89 instead of a touch screen display in some forms of the invention to allow various menu options to be displayed and programming options to be selected using the control keys. Still further it is possible to attach an auxiliary keyboard (not shown) to the dealing shoe through a keyboard connection port 186 (see FIG. 24). The auxiliary keyboard can then be used to more easily program the system, or be used in maintenance and diagnostic functions.

The dealing shoe also includes a plurality of dealer operational controls provided in the form of dealer control sensors 85-89. Dealer control sensors 85-89 are advantageously electrical touch keys. The dealer control sensors are used by the dealer to indicate that desired control functions should take place or further proceed. For example, sensor 85 can be used to implement a player's decision to split his two similar cards and play them as two separate or split hands. Sensor 86 can be used to implement a player's decision to double down. Sensor 87 can be used to implement a player's decision to stand on the cards already dealt or assigned to that player. Sensor 88 can be used to "hit" a player by dealing him another card. Sensor 89 can be used to command shuffling and dealing of a new hand to the participants. In addition to or lieu of the above assignments, other functions can be attributed to other keys or input sensors of various types. In particular, it is planned that the above touch keys can be assigned to additional functions, such as in changeable soft key assignments during the programming or setup of the system.

Dealer control touch keys 85-89 can be selected from a wide variety of commercially available touch keys used to provide electrical control signals. Alternatively, the dealer control sensors can be provided in another form which are touch sensors, or other types of sensors which allow the dealer to indicate control commands being made or implemented by the dealer. The use of dealer control keys is designed with the object of minimizing most or all direct player input to the system. Instead, the players are required to provide the dealer with traditional hand gesture signals and/or oral instructions and then the dealer implements these instructions using the touch keys or other dealer control sensors.

Electronics and Control Processor

The card game system 60 also includes suitable data and control processing subsystem 90. Control and data processor 90 is largely contained within a main control module 92 supported beneath the table top 53 in casing 91 (FIG. 3). Alternatively, the control module can be at some other suitable location. Other portions of the data and control processing subsystem may reside in part or totally within the dealing shoe 80 or presentation unit 100, as convenient in a particular construction of the electronics and related components.

Figure 23:
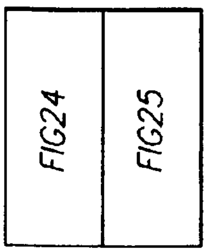
FIGS. 23-25 are schematic diagrams showing a preferred electronic system forming part of the system of FIG. 1.
Figure 24:
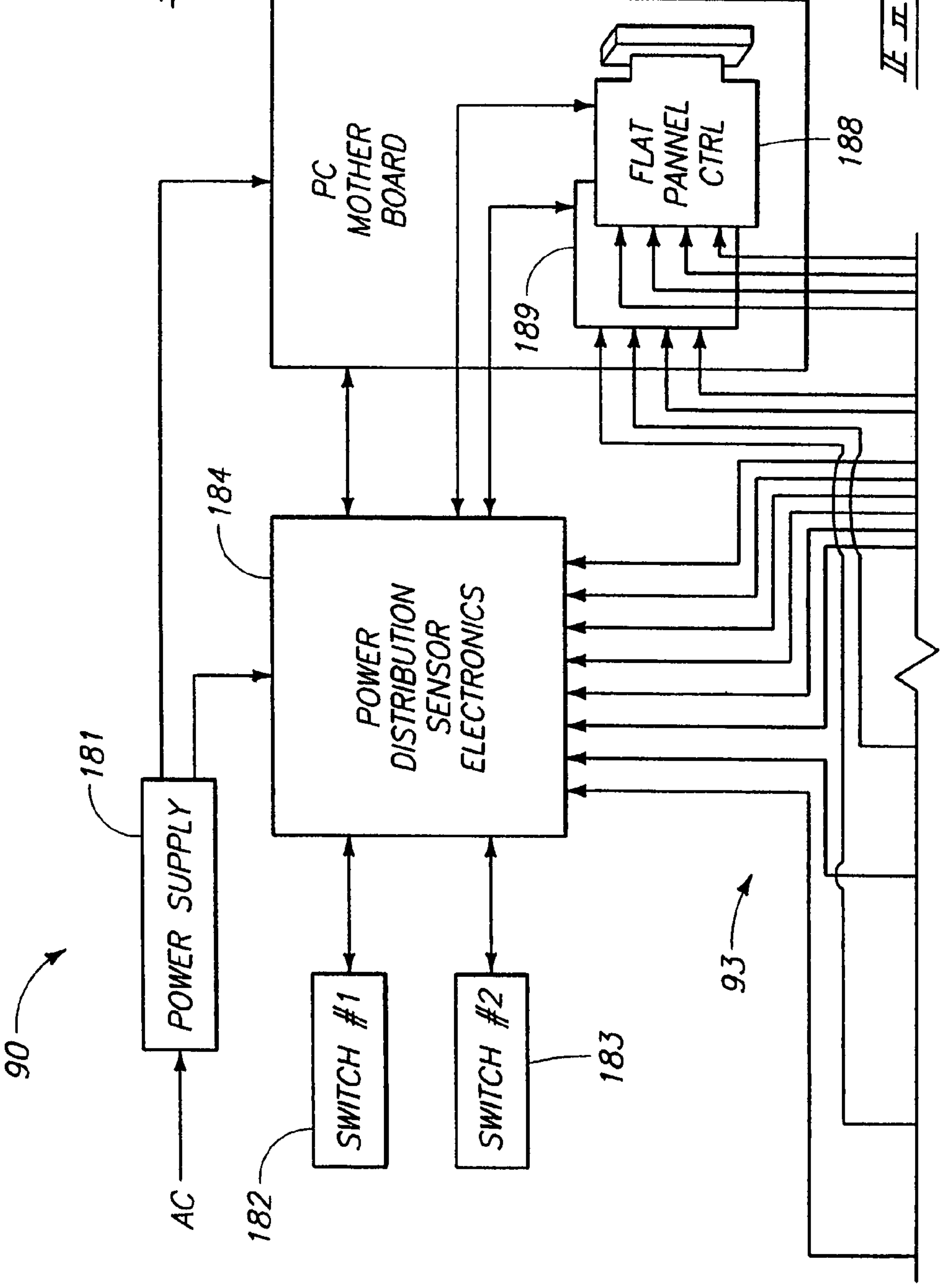
Figure 25:
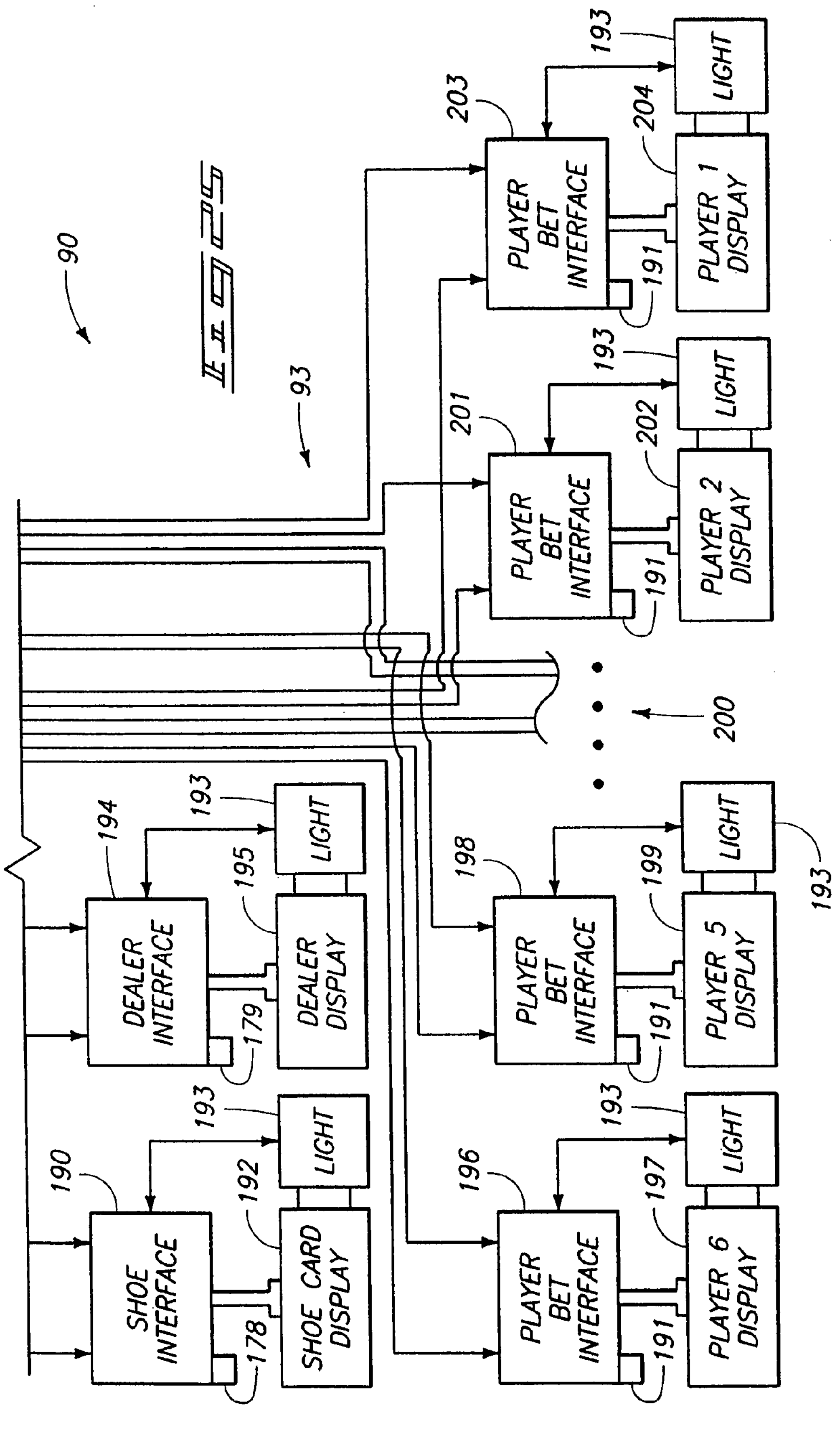

FIGS. 23-25 show the electronics and related components used in a preferred form of the invention. The control and data processing subsystem 90 includes a suitable power supply 181 for converting alternating current from the power main as controlled by main power switch 96 (FIG. 3). The power supply transforms the alternating line current to a suitable voltage and to a direct current supply. Power is supplied to a power distribution and sensor electronics control circuit 184. Control circuit 184 can be one of several commercially available power switching and control circuits provided in the form of a circuit board which is detachable, and plugs into a board receptacle of a computer mother board 185 or an expansion slot board receptacle.

Power control circuit 184 is connected to a first mode control switch 182 and a second mode control switch 183. The first and second mode control switches are operated by the key control 83 (FIG. 5) contained on dealer control shoe 80. The first switch controls powering up the system once current is supplied to the power supply. The second switch controls activation of the programming mode of operation.

FIG. 24 also shows a controller mother board 185 which includes a central microprocessor (not shown) and related components well-known in the industry as computers using Intel brand Pentium microprocessors and related memory (not specifically shown). A variety of different configurations and types of memory devices can be connected to the mother board as is well-known in the art. Of particular interest is the inclusion of two flat panel display control boards 188 and 189 connected in expansion slots of mother board 185. Display control boards 188 and 189 are each capable of controlling the images displayed and other operational parameters of the video displays used in system 60. More specifically, the display control boards are connected to player bet interfaces circuits 196, 198, 201 and 203 which show four of the six player stations (two are omitted for purposes of illustration brevity but are similarly connected). Additionally, the display control board 189 is shown connected to the dealing shoe interface circuit 190 and the dealer interface 194. This arrangement allows the display control boards to provide necessary image display data to the electronic driver circuits 197, 199, 202 and 204 used to drive the six player displays 103 of FIG. 2. This arrangement also allows the display control boards to provide necessary image display data to the display electronic drive circuits 192 and 195 associated with the dealing shoe displays 81 and 82 (FIG. 5) and the dealer display 102 (FIG. 2), respectively. The display electronic drive circuits just described have associated backlight power supplies 193.

The mother board 185 also includes a serial port 187 which allows stored data to be downloaded from the mother board to a central casino computer or other additional storage device. This allows card game action data to be analyzed in various ways using added detail, or by providing integration with data from multiple tables so that cheating schemes can be identified and eliminated. It also allows monitoring of dealer performance and accuracy on a routine basis. Player performance and/or skill can be tracked at one table or as a compilation from gaming at multiple tables. Additionally, player hand analysis can be performed.

FIG. 24 further shows a keyboard connection port 186 which can be used to connect a larger format keyboard (not shown) to the system to facilitate programming and servicing of the system.

FIG. 25 further shows a number of sensor interface connections 191 which indicate schematically connection of both the player bet sensors 121 and insurance bet sensors 131. With regard to shoe interface 190 there is a control key interface 179 which is used to interact with the control keys 85-89 (FIG. 5). Dealer interface circuit 194 has an associated interface 179 should any touch screen or other desired capability be provided with respect to dealer display 102.

Optional Player Identification

Although the preferred system shown does not hove features illustrated for receiving automated player identification information, such can alternatively be provided. Card readers such as used with credit cards, or other identification code reading devices (not shown) can be added in the presentation unit to allow or require player identification in connection with play of the card game and associated recording of game action by the controller 90. Such a user identification interface can be implemented in the form of a variety of magnetic card readers commercially available for reading a user-specific identification information. The user-specific information can be provided on specially constructed magnetic cards issued by a casino, or magnetically coded credit cards or debit cards frequently used with national credit organizations such as VISA, MASTERCARD, AMERICAN EXPRESS, or banks and other institutions.

Alternatively, it is possible to use so-called smart cards to provide added processing or data storage functions in addition to mere identification data. For example, the user identification could include coding for available credit amounts purchased from a casino. As further example, the identification card or other user-specific instrument may include specially coded data indicating security information such as would allow accessing or identifying stored security information which must be confirmed by the user after scanning the user identification card through a card reader. Such security information might include such things as file access numbers which allow the central processor 90 to access a stored security clearance code which the user must indicate using input options provided on displays 103 using touch screen displays.

Another alternative with regard to player identification having particular attraction is employed with regard to use of coded betting chips 164 described above. Each player can carry a transponder card which can be read and written to by the sensor 121. Upon arrival at the table, the player presents the transponder card to sensor 121 and the player is logged in. Thereafter bets can be charged from and winnings can be applied to the transponder according to the wishes of a casino customer. Alternatively, the player identification card could be used merely to identify the player and all betting could be accomplished using betting chips 164.

A still further possibility is to have participant identification using a fingerprint image, eye blood vessel image reader, or other suitable biological information to confirm identity of the user. Still further it is possible to provide such participant identification information by having the dealer manually code in the information in response to the player indicating his or her code name or real name. Such additional identification could also be used to confirm credit use of a smart card or transponder.

Alternative Presentation Unit Features

It should also be understood that presentation unit 100 can alternatively be provided with suitable display cowlings or covers (not shown) which can be used to shield display of card images from viewing by anyone other than the player. Such an alternative construction may be desired in systems designed for card games different from blackjack, where some or all of the player or dealer cards are not presented for viewing by other participants or onlookers. Such display covers or cowlings can be in various shapes and configurations as needed to prevent viewing access. It may alternatively be acceptable to use a player controlled switch which allows the display to be momentarily viewed and then turned off. The display can be shielded using a cover or merely by using the player's hands. Still further it is possible to use a touch screen display that would be controlled by touch to turn on and turn off. Similar shielding can be used to prevent others from viewing the display.

Alternative Embodiment Table Game System With Integrated Video Playing Card Displays It should still further be understood that although a retrofit game system is preferred, it may in some situations be desirable to use displays which are mounted in an integrated fashion to the gaming table. Such displays may be provided adjacent to the betting sensors 121 and 131 in a configuration similar to that described above. Alternatively, the systems can have either touch screen display for added player or dealer input convenience, or other sensors which allow input of player or dealer decisions and options.

Preferred Dealer Display Images

Figure 6:
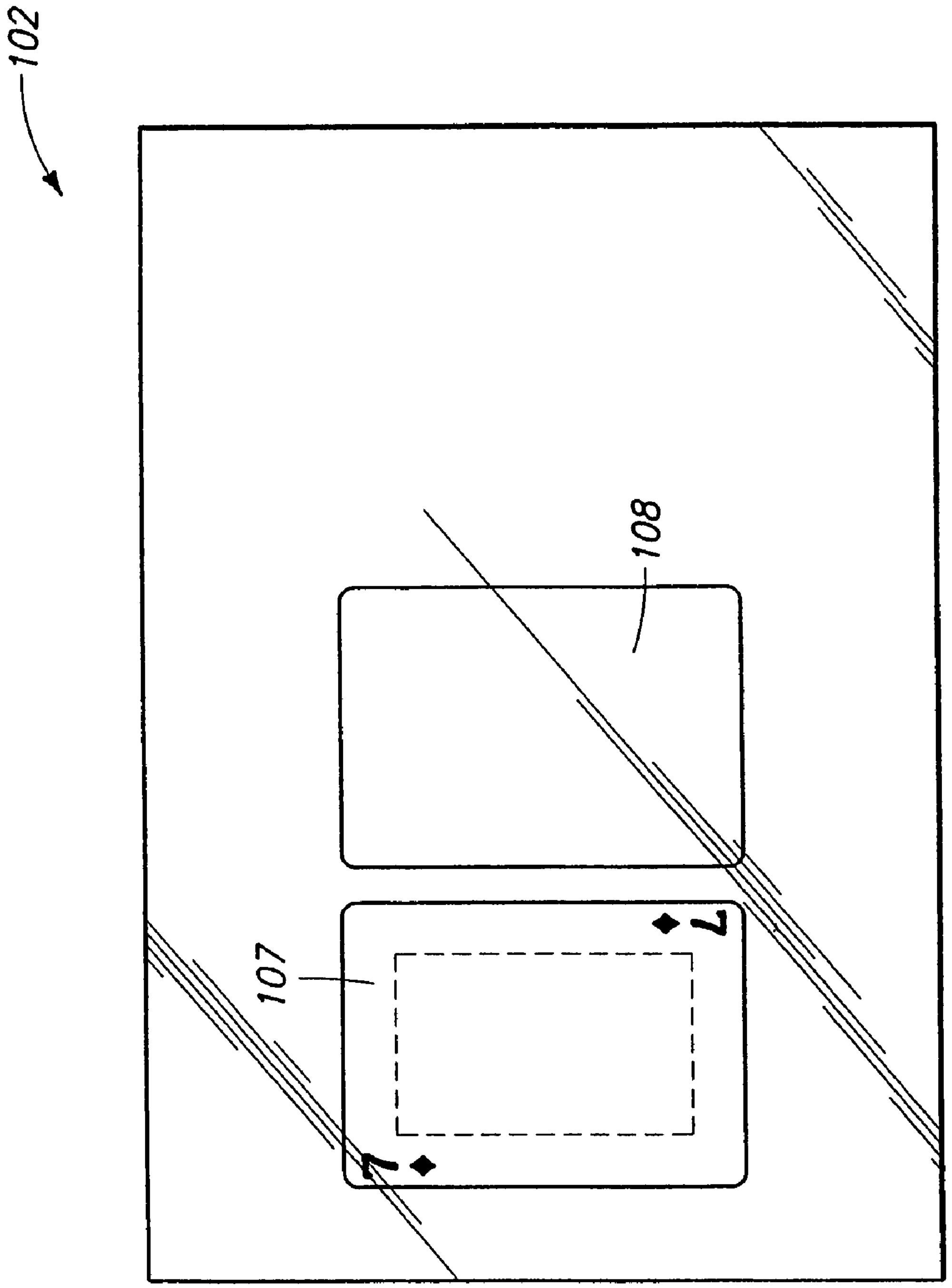
FIG. 6 is an enlarged top view showing in isolation a dealer display which forms port of the preferred presentation unit shown in FIG. 4.

FIG. 6 shows a preferred display image which can be displayed by the dealer display 102. Various features of the preferred display and related operational information will now be described.

FIG. 6 shows the dealer display 102 in greater detail. A typical dealer display image is portrayed. In this image there are two virtual playing cards represented by two virtual playing card images 107 and 108. Card 107 is the dealer's upcard and card 108 is the dealer's down card or hole card. The upcard is faceup and the hole card is facedown. The image of FIG. 6 depicts the dealer's card hand after the initial dealing of two cards to each participant. This is prior to the dealer playing out his hand. When the dealer plays out his hand, then the hole card will be shown faceup and the dealer will receive additional cards according to the casino's rules of play for the dealer. The dealer display image will change and show the cards either side-by-side if space allows, or overlapping if the dealer's hand has sufficient number of cards so as to require overlapping.

During play of the dealer's hand, the dealer will typically hit on his hand if the hand count is 16 or less and stand if it is 17 or more. A preferred option in setup of the system is to select according to casino procedures whether to hit or stand when the dealer has a soft 17 (ace and one or more cards which together total 17 when the ace is counted as 11).

Additional information can also be displayed on the dealer display 102 as may be desired by the casino or as provided by the manufacturer of the system. At the current time the dealer display is planned to display the card hand of the dealer and other information is presented on the player displays 103 as will be explained below in greater detail.

Preferred Player Display Images

FIGS. 7-22 shows preferred display images which can be displayed by the player displays 102. Various features of the preferred display images and related operational information will now be described.

Figure 7:
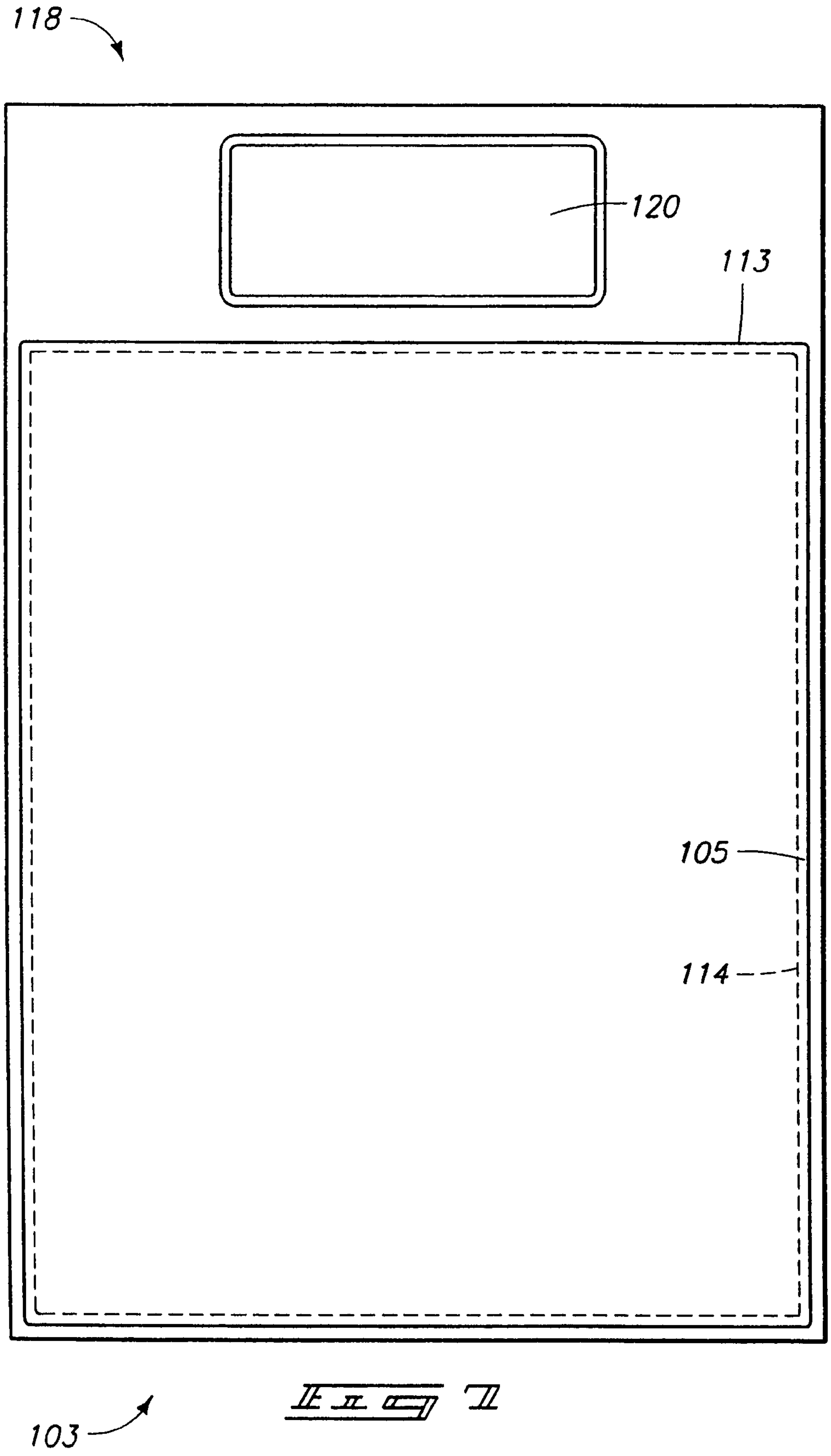
FIGS. 7-22 are enlarged top views showing portions of a single player station with a display which forms part of the preferred presentation unit shown in FIG. 4. Each of FIGS. 7-22 show a different stage in a sequence of display images as a hand of cards is played.

FIG. 7 shows principal parts of a preferred player station 118. Station 118 includes the betting chip detection zone 120. Not pictured in FIGS. 7-22 are the added feature of the insurance bet detection zones 130 which are shown in FIG. 2.

The player station also includes a player station display 103 which includes a display border zone 105 which is part of the changeable display face and can vary from one display image to the next. The border zone lies within an outer display perimeter line 113 and an inner border zone boundary 114. The inner border zone boundary 114 is shown in dashed line to indicate it's position but it is not highlighted in this view and other views except when the border zone is turned on as an indication of whether the player's hand has won or lost. This is preferably done by two different mechanisms to clearly indicate to the live participants at the table the outcome of that player's hand. The outcome indicating zone is also used to indicate with certainty whether the hand has been won or lost in a manner which can be recorded by any monitoring camera used above or near the gaming table. When the player has won, the border zone 105 is highlighted in green or other suitable color. The border zone is also flashed on and off so that a black and white camera can also clearly identify the outcome as a win.

When the player has lost, the border zone 105 is highlighted in red or other suitable color. The border zone is maintained red and is not flashed on and off in distinction to the flashing used to indicate a winning hand. The constantly highlighted border zone is identifiable by a black and white camera because of this constant highlighting.

When the hand results in a push (tie) neither the dealer nor the player win, and the border zone 105 is not highlighted or can be dashed or otherwise distinguished. This too can be easily discerned from a black and white or color camera monitoring the table from above. The absence of the border zone from being either flashing or being on constantly provides certain indication that a tie outcome has occurred.

FIG. 7 shows the player station when no bet has been placed and nothing is being displayed. Alternatively, there can be some attract mode advertising of the casino or game in anticipation of the next game or the arrival of customers.

Figure 8:
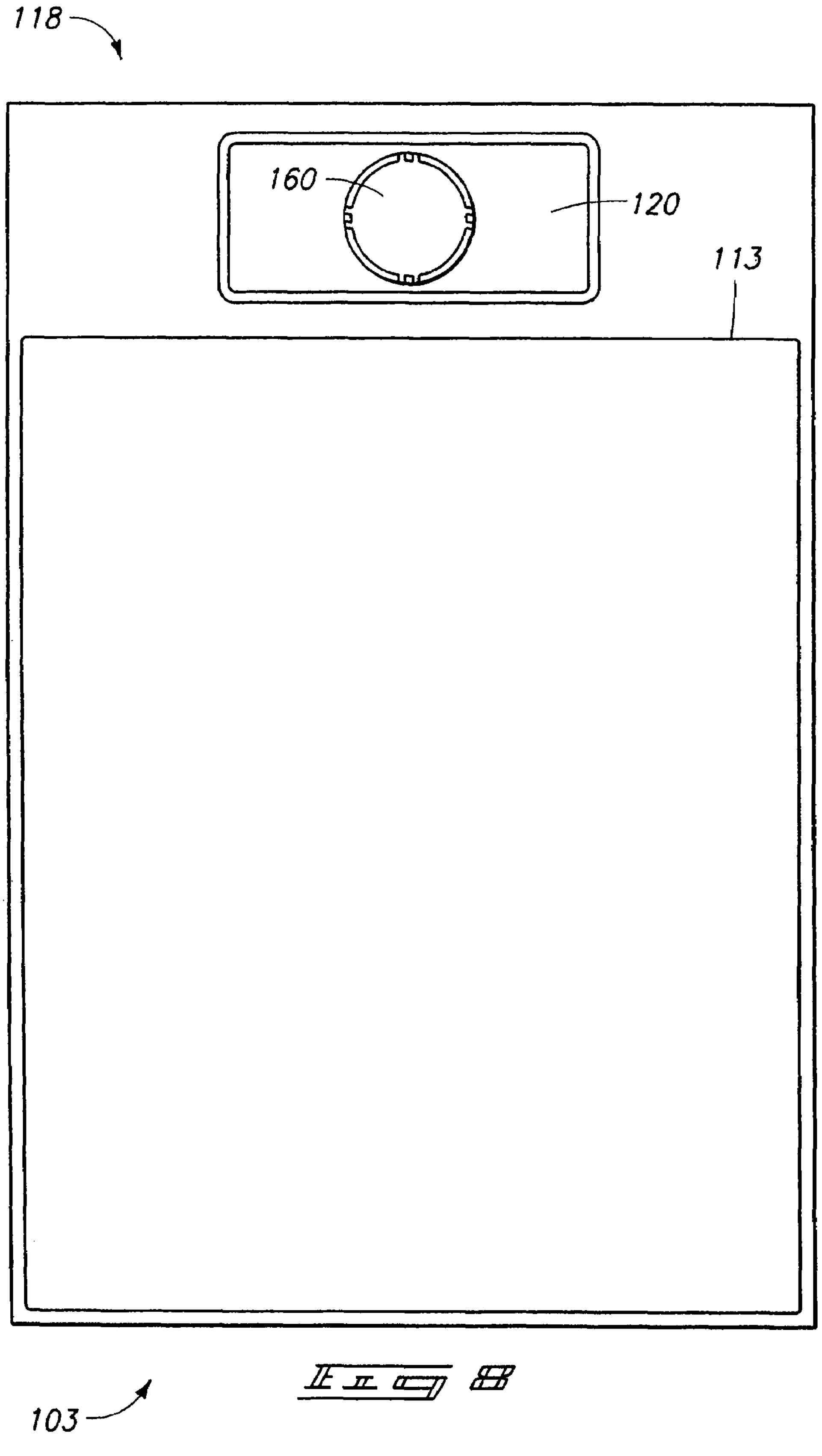

FIG. 8 shows player station 118 after a customer has placed a betting chip 160 into betting chip detection zone 120. The presence of the chip blocks part of the casino room light and serves to provide an indication of the bet being in place. This is interpreted by the controller as a player is present. There can alternatively be more overt login procedures for each player which can be accomplished by either the dealer or player either with or without added player identification subsystems.

FIG. 8 shows the player display 103 as being blank since the game has not become active. This condition applies when one player may have placed his bet and the dealer is awaiting similar action by one or more other players before beginning the next card hand.

Figure 9:
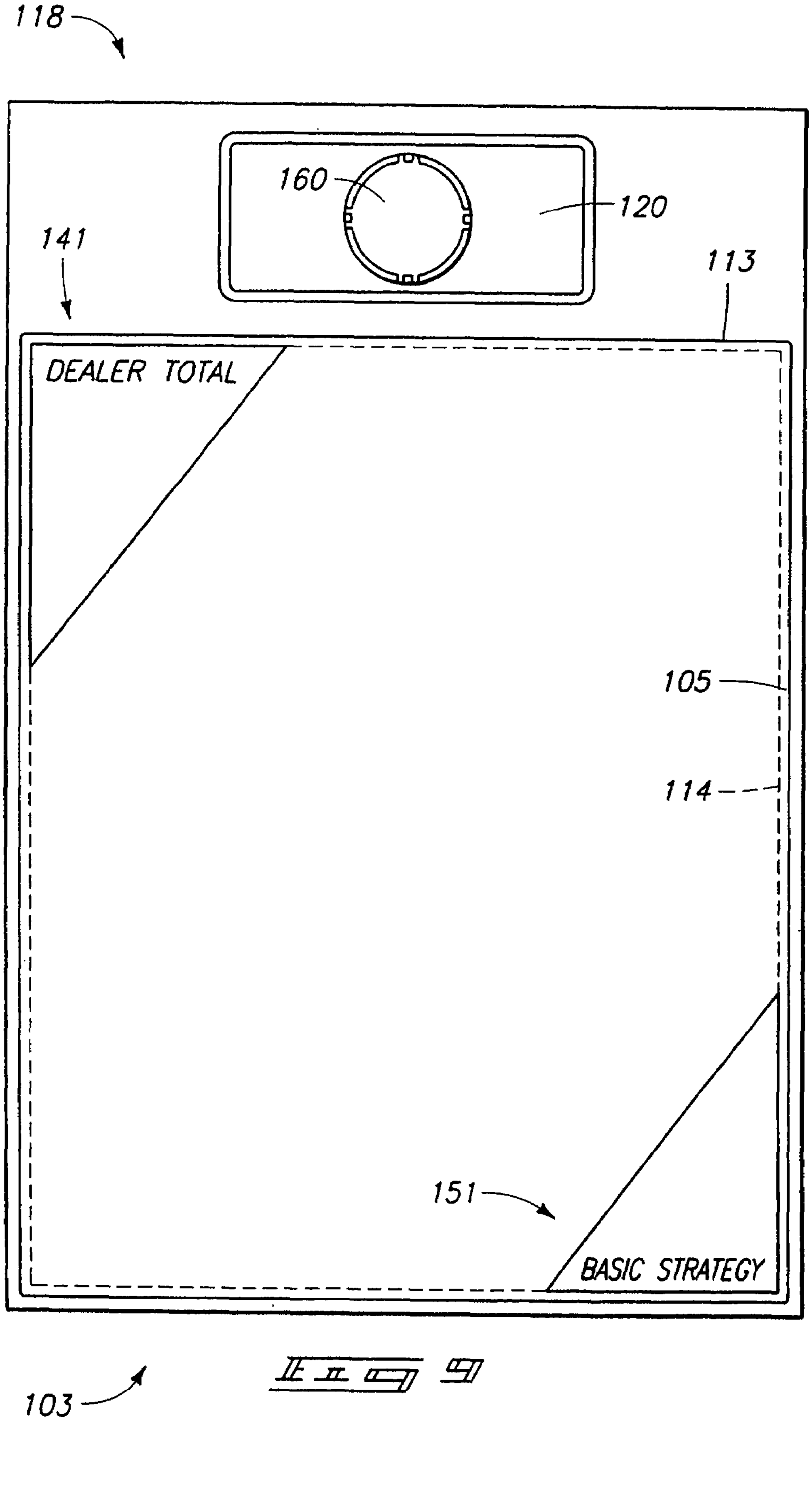

FIG. 9 shows the player station with display 103 activated in part. The upper left corner includes a secondary display section 141. As shown, secondary display section 141 is used to indicate the content of the dealer's hand at any particular time. This is done with a background triangle for appearance and easy viewing. There is also a display subtitle "DEALER TOTAL". Since no cards have been dealt as of the time associated with FIG. 9, there is no indication of the dealer's hand.

FIG. 9 also shows a tertiary display section 151 which is advantageously used for several different functions as will be explained more fully below. FIG. 9 does show a display subtitle "BASIC STRATEGY" and a background triangle.

Since no cards have been dealt as of the time associated with FIG. 9, there is no basic strategy information presented in section 151.

Figure 10:
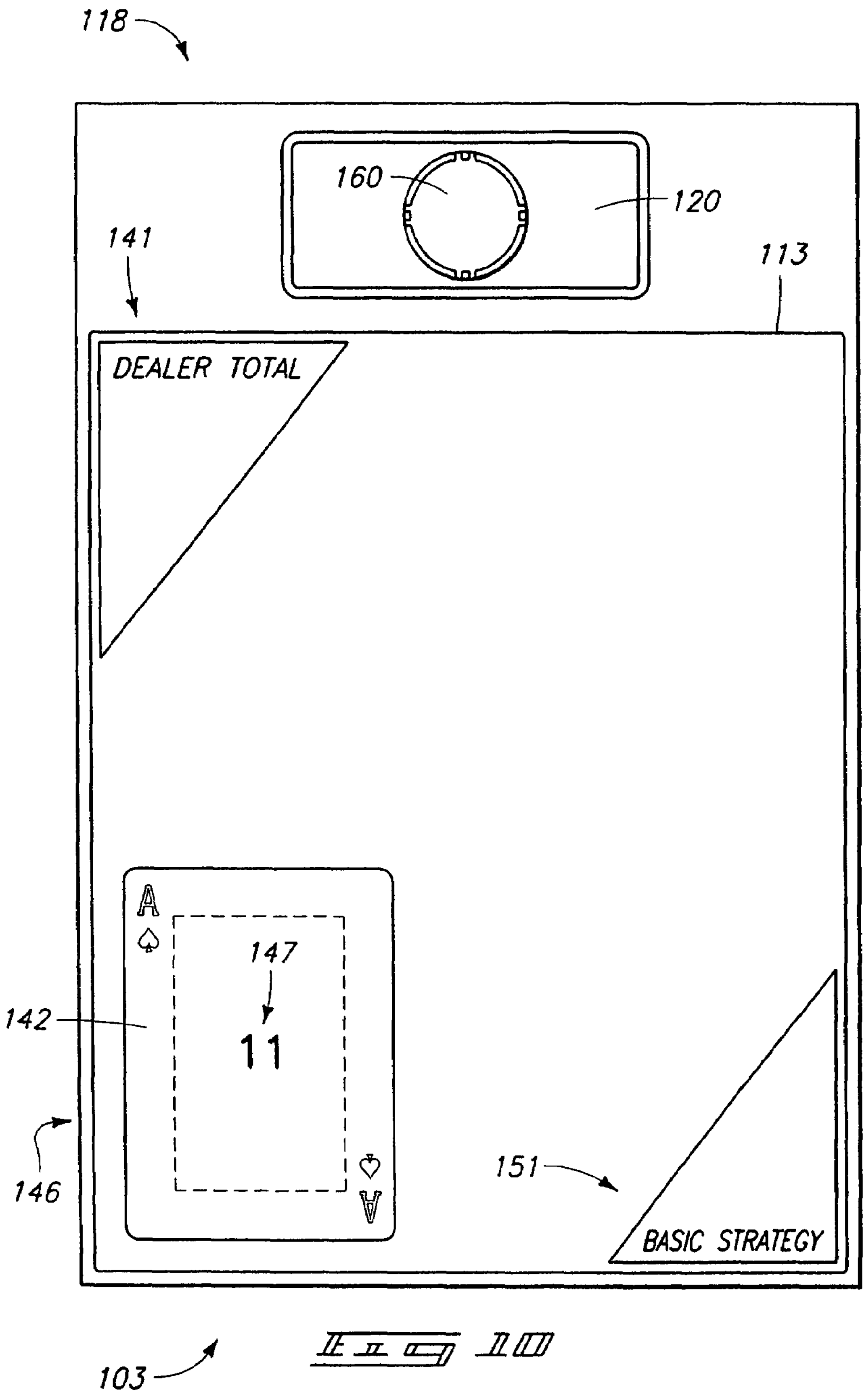

FIG. 10 is similar to FIG. 9 except that the player has been dealt one virtual card, the ace of spades. This is shown faceup in the lower left-hand corner. The area displaying the player's hand is herein termed the primary display section 146. The virtual card image displayed in section 146 can be very realistic in the manner of paper or plastic playing cards, or it can be of various other styles.

FIG. 10 also shows a hand count total numeral 147 which represents the count of the player's card hand at any particular time. This is done to help the player and eliminate or greatly reduce the risk for mistakes about the count of the hand.

At the time the player receives the ace shown in FIG. 10, the dealer has not received any card and there is no basic strategy displayed because the player has not received his second card.

Figure 11:
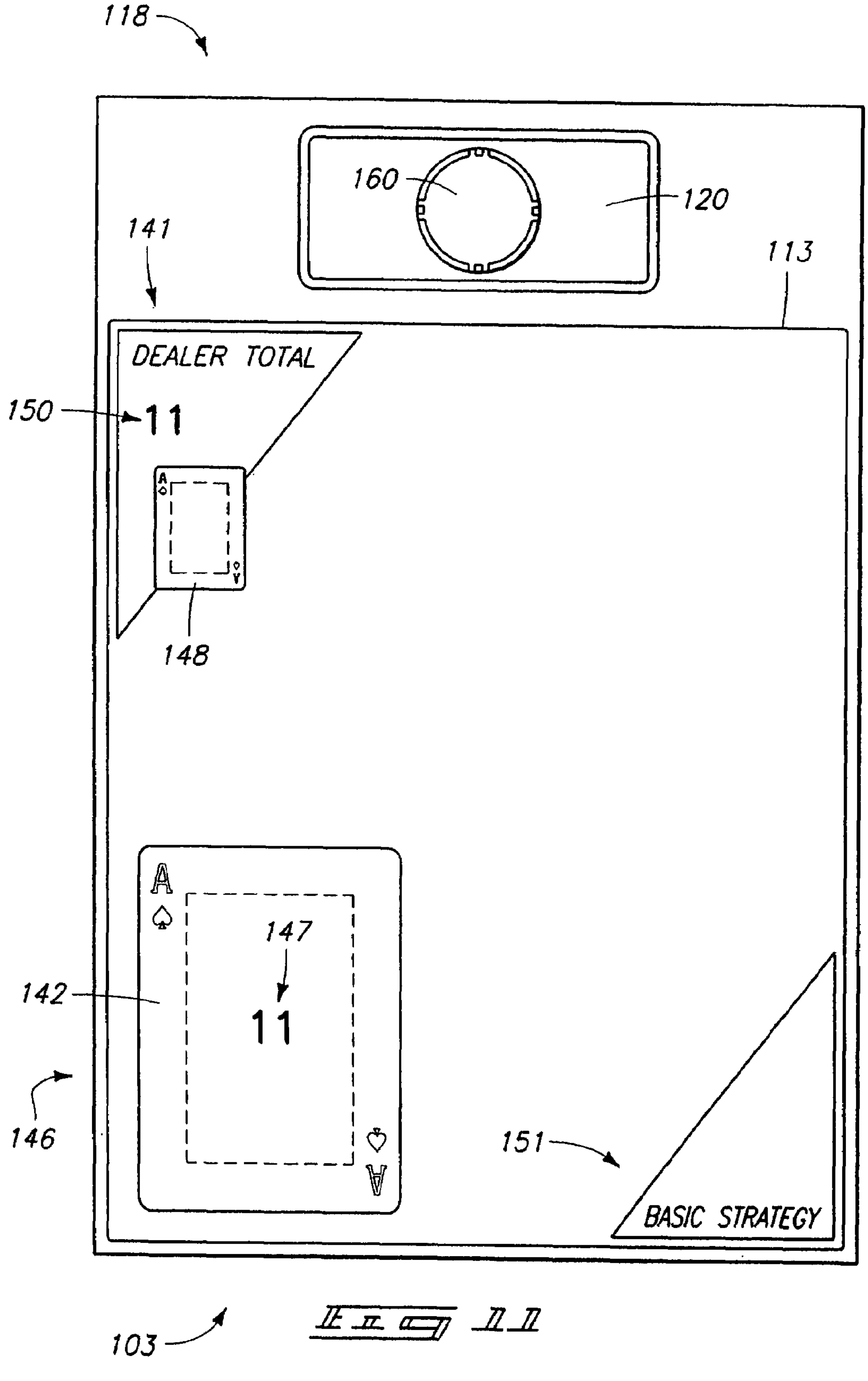
Figure 12:
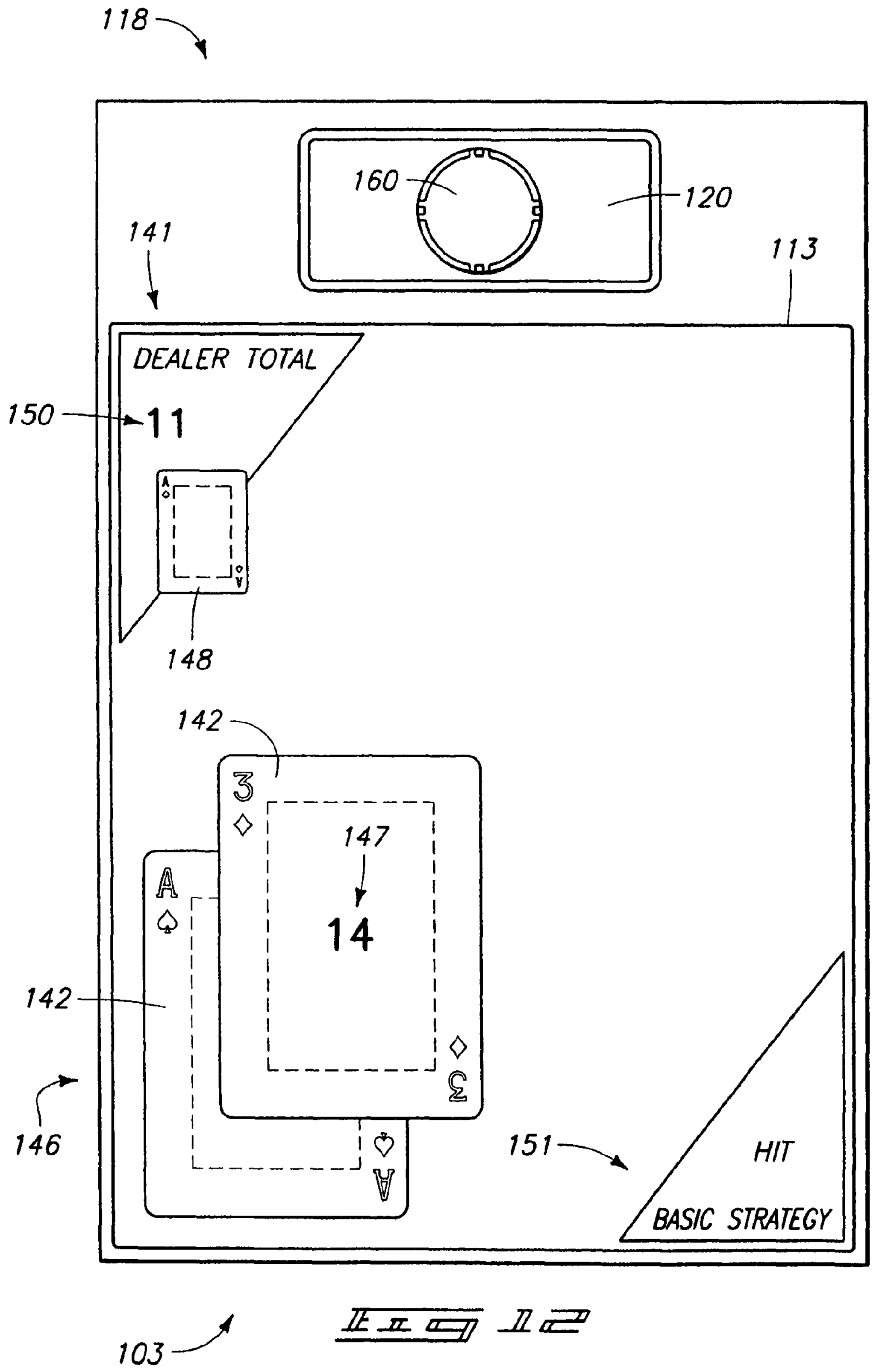
Figure 13:
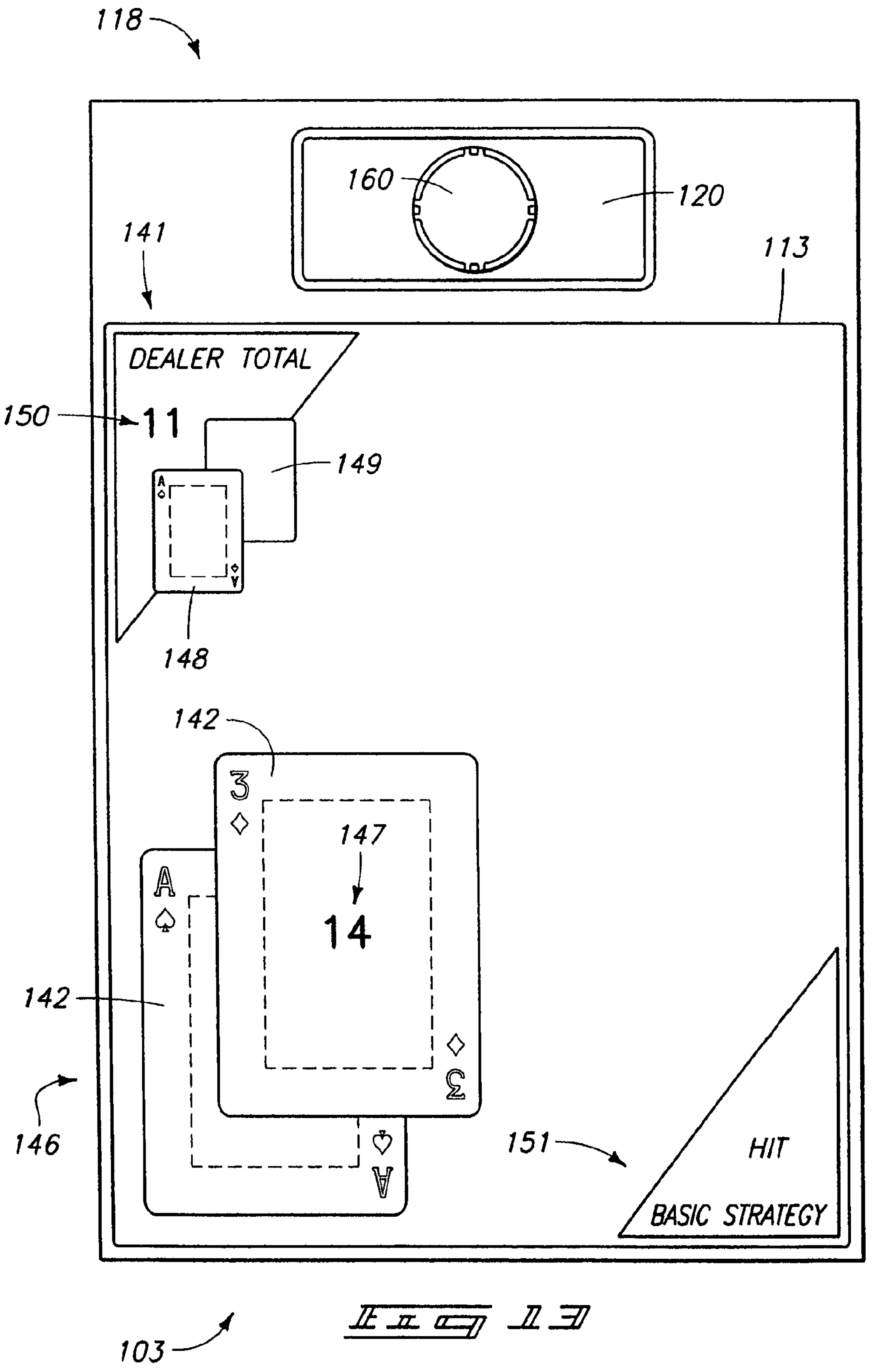

FIG. 11 shows the player display after the dealer has received his first card which is the secondary display dealer upcard 148. The secondary display 141 shows the ace and gives a dealer hand count numeral 150. In this case the dealer hand count is 11. There is still no basic strategy displayed at the tertiary display 151 because the player has not received his second card in the image of FIG. 11. FIG. 12 shows play advanced by the player having been dealt his second virtual card which is a three of diamonds. The primary player display section shows the card image 142 in an overlapping relationship to the first card. The player hand count numeral 147 has been revised to the new count which is 14. A suggested basic strategy note is displayed at tertiary display section 151 which reads, "HIT". This indicates that basic strategy is to receive another virtual card from the stack. FIG. 13 shows the player display after the dealer has received his second card provided in the initial dealing. The second dealer card 149 is the hole card and is shown facedown and beneath the dealer upcard 148. The dealer hand count remains at 11 because the value of hole card 149 is not indicated until all players have played out their hands. The exception to this rule can occur when the dealer's hand count is twenty one and the dealer has a blackjack. In the situation shown in FIG. 13, there is the possibility that the dealer has a blackjack hand and thus players will typically be given an opportunity to place an insurance bet. This is done by placing a betting chip or chips into zone 130 (FIG. 2) and the hand is played as explained above with regard to insurance.

Figure 14:
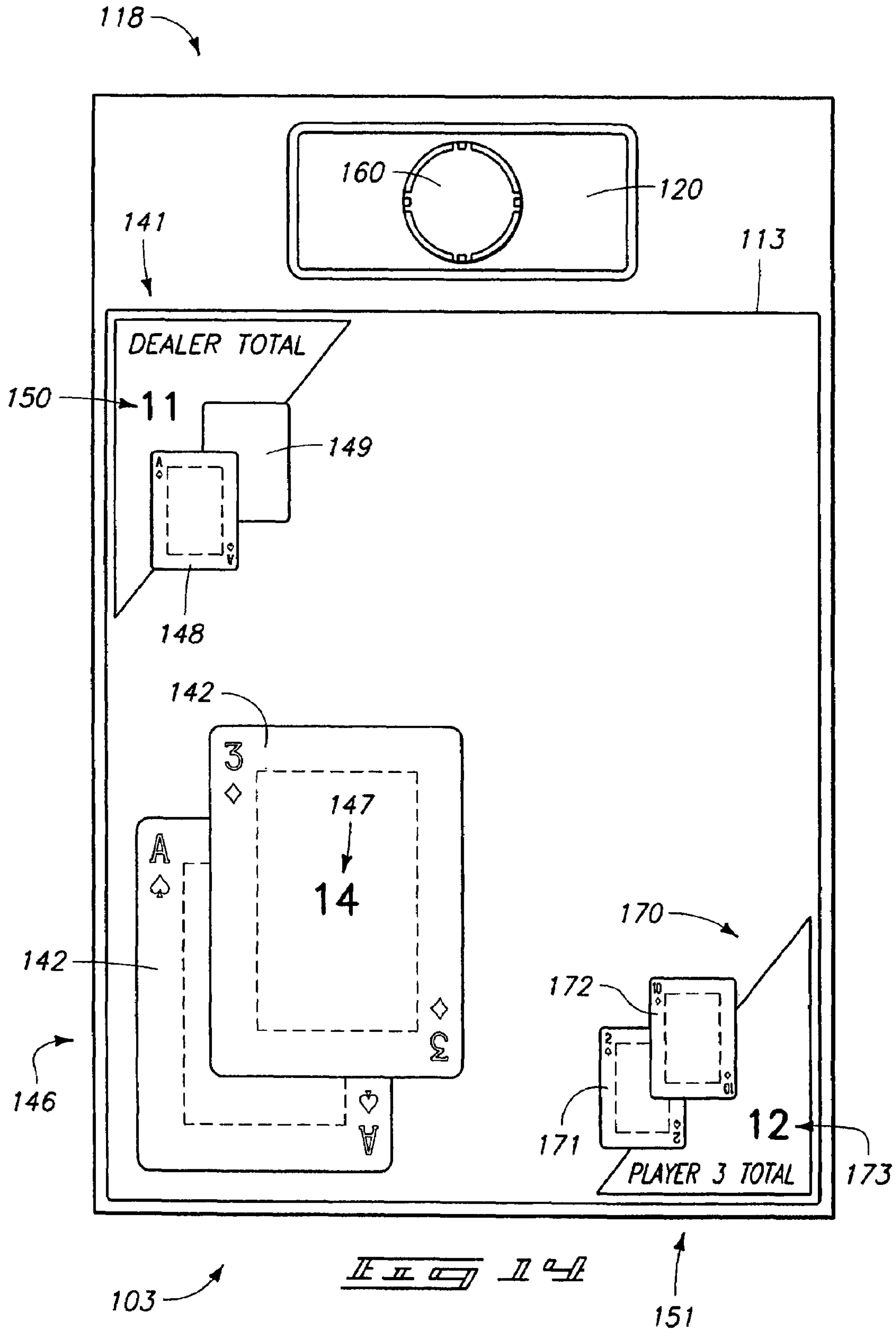

FIG. 14 shows further progress of the hand and a changed player display image. In the image of FIG. 14, the tertiary display section has been changed to have a subtitle which reads "PLAYER 3 TOTAL". This indicates that instead of basic strategy information, the tertiary display is now showing how player 3 is playing out his hand. This progresses as the various active players play out each hand until the current player is up. The active player display 170 shows the active player card images 171, 172. Also shown is the active player hand count numeral 173.

Figure 15:
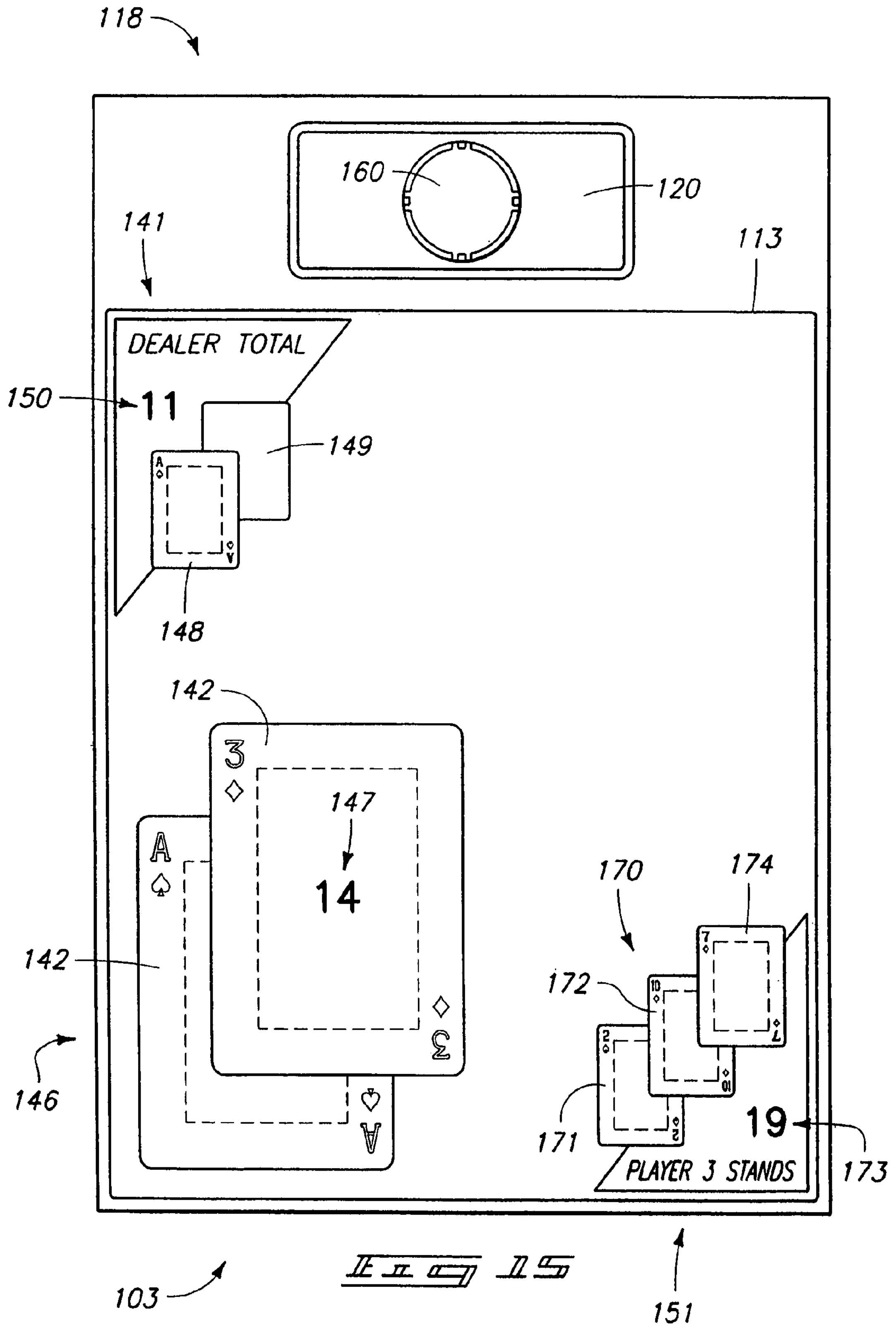

FIG. 15 shows the active player display 170 changed to reflect a third active player card image 174. The hand count 173 has been revised to reflect the third card dealt to player 3. Also indicated is the decision by player 3 to stand.

Figure 16:
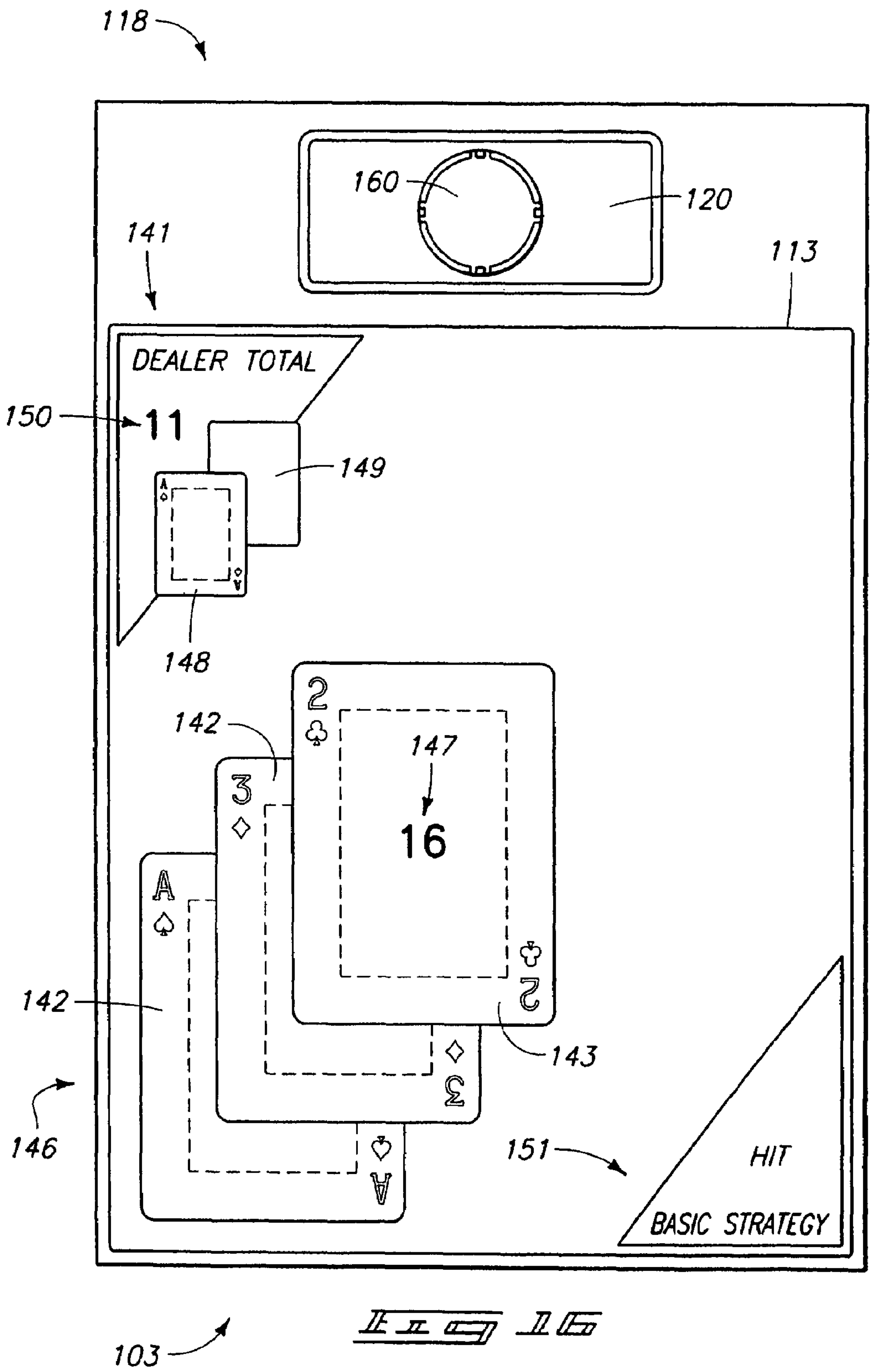

FIG. 16 shows the player display 103 after the current player has come up as the active player and has elected to receive a third player card 143. The hand count numeral 147 has been revised to reflect the new count of 16. The basic strategy has returned to the tertiary display 151 and is suggesting to the player that he should be hit to receive another card. Although basic strategy has been suggested, there is no limitation on how the player decides and he indicates such to the dealer and the dealer operates the dealer controls 85-89 to implement the player's decision.

Figure 17:
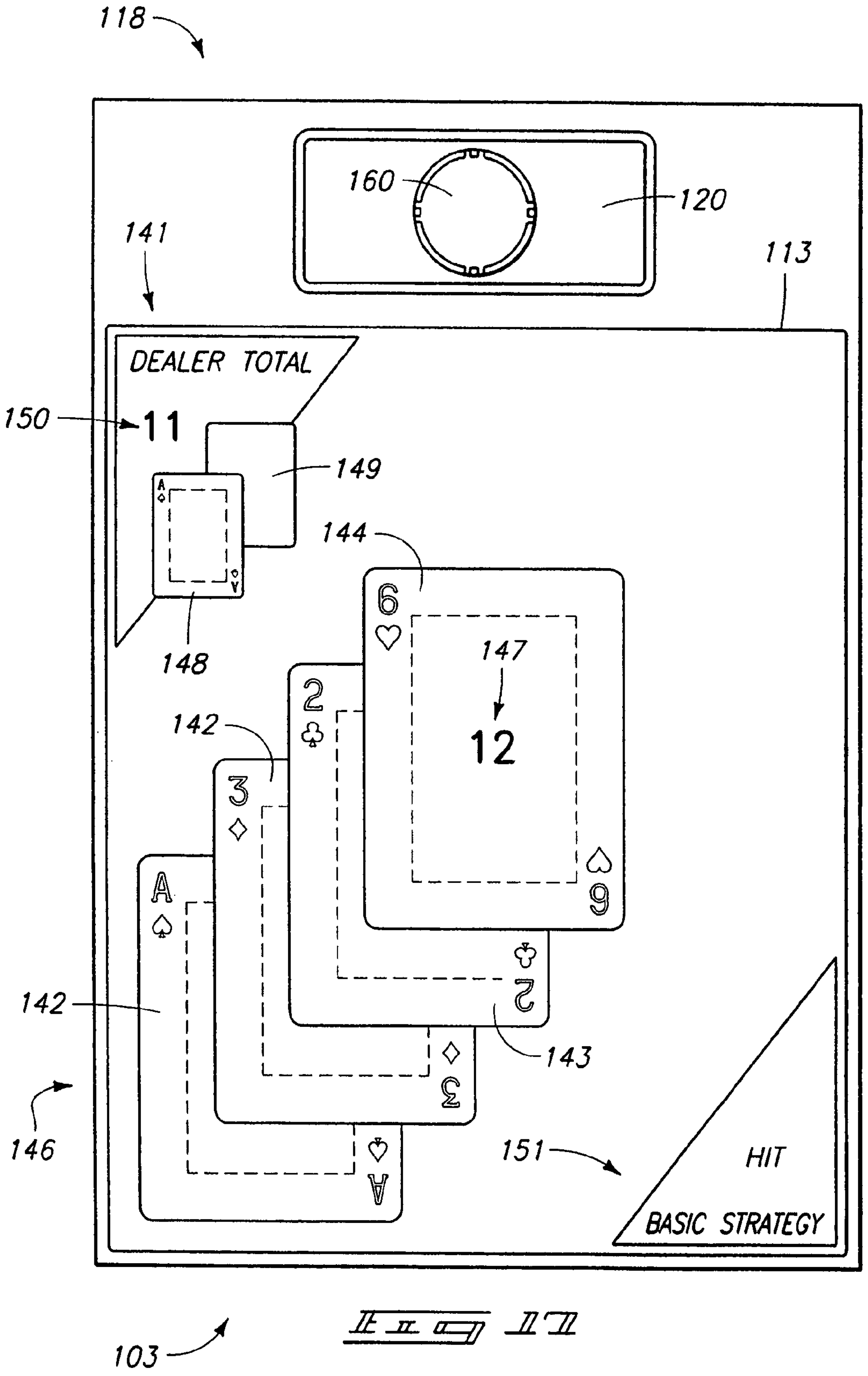

FIG. 17 shows the player display after the player has elected to have another card dealt. The fourth player card 144 results in a changed hand count of 12 because the valuation of the ace is necessarily changed from 111 to 1 because otherwise the player is over 21 and has lost. The basic strategy display again suggests a hit because of the low hand count.

Figure 18:
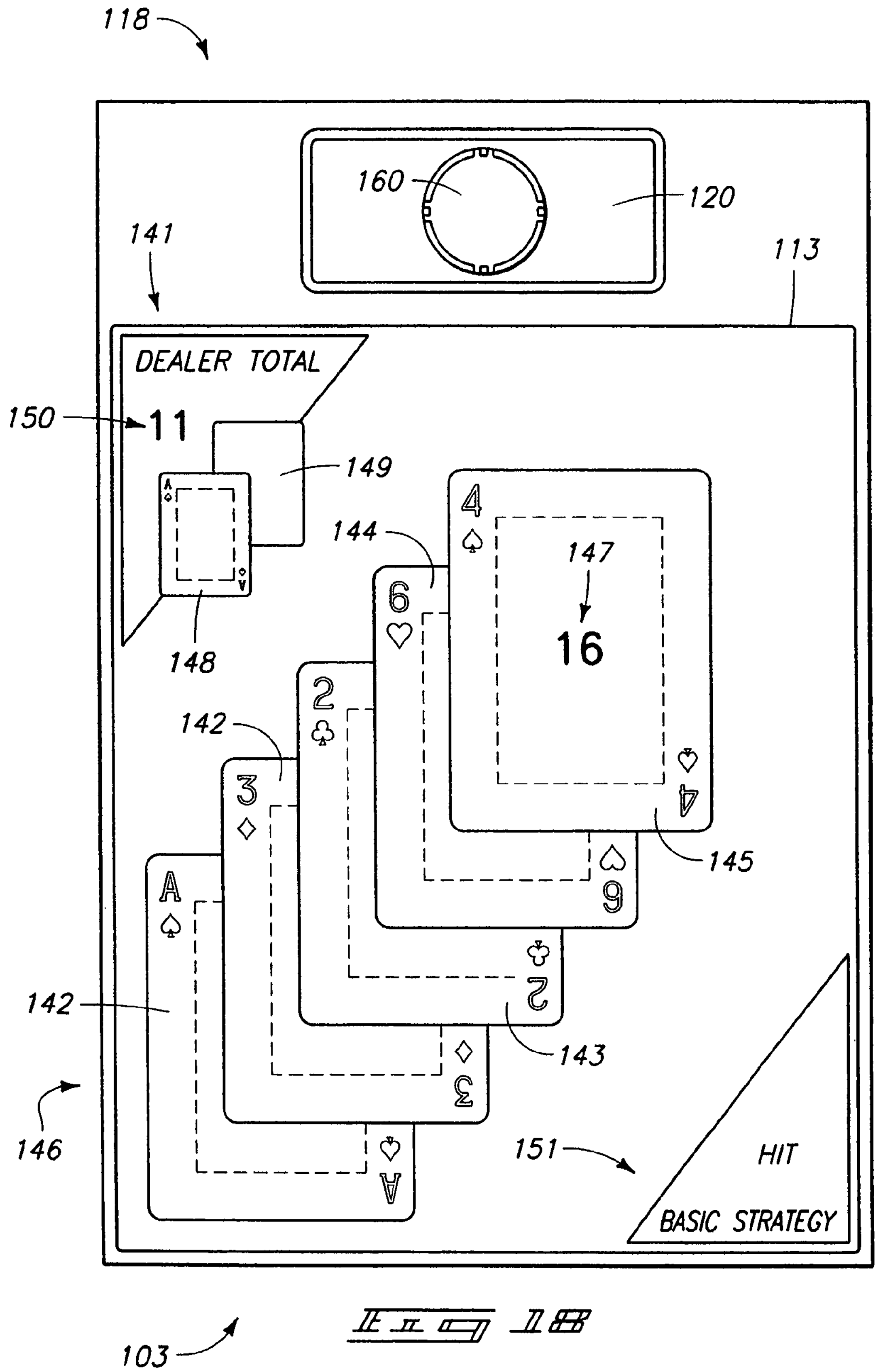

FIG. 18 shows a fifth player card 145 which revises the hand count to 16 and the basic strategy is again to hit.

Figure 19:
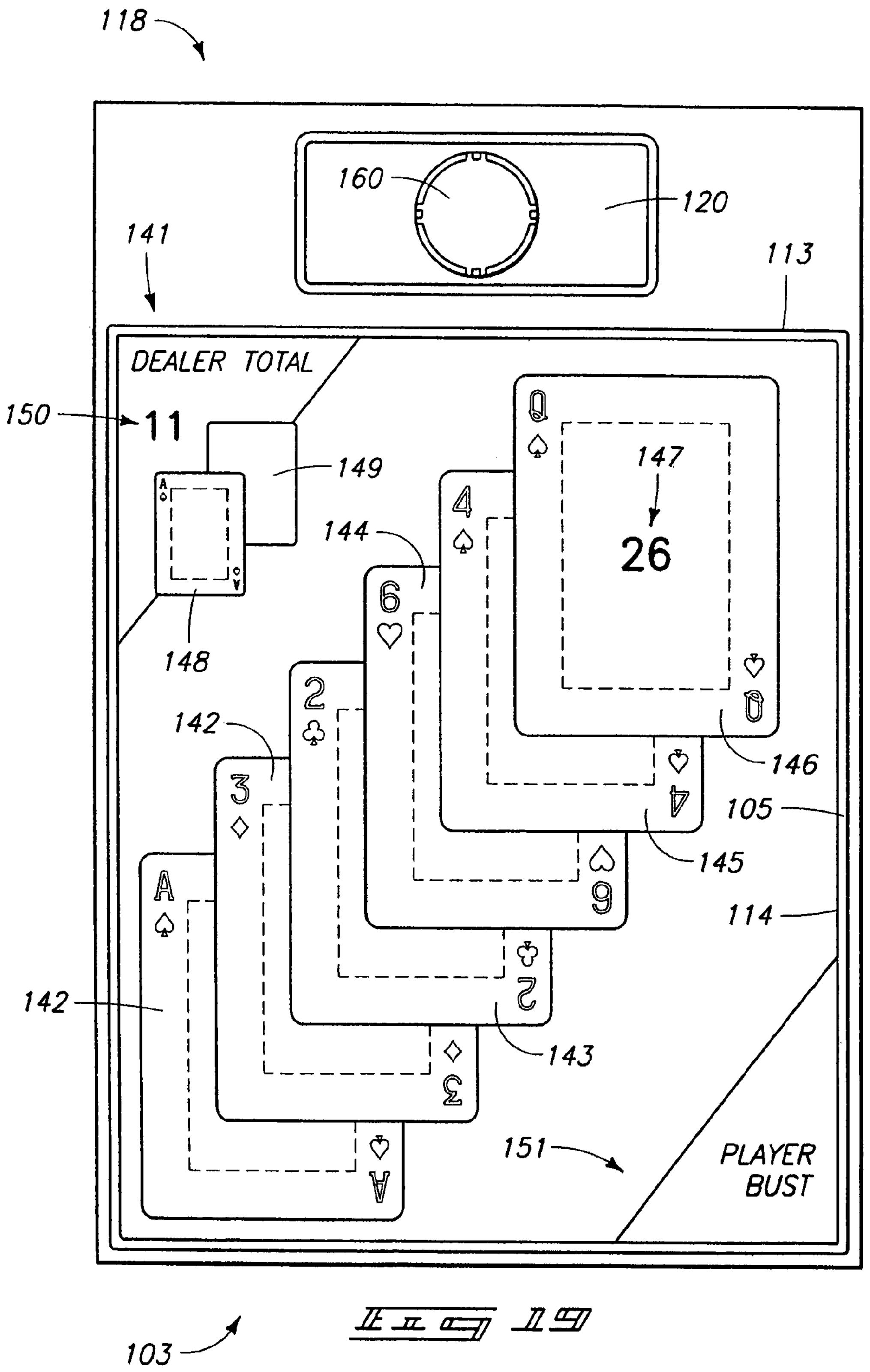

FIG. 19 shows a sixth player card 146 which is counted with the other player cards to reach a hand count of 26 which is a bust. The tertiary display shows that the player has busted. The border zone 105 is shown highlighted and maintained in an on condition to show a bust and loss for easy dealer, pit and camera detection from above the table.

Figure 20:
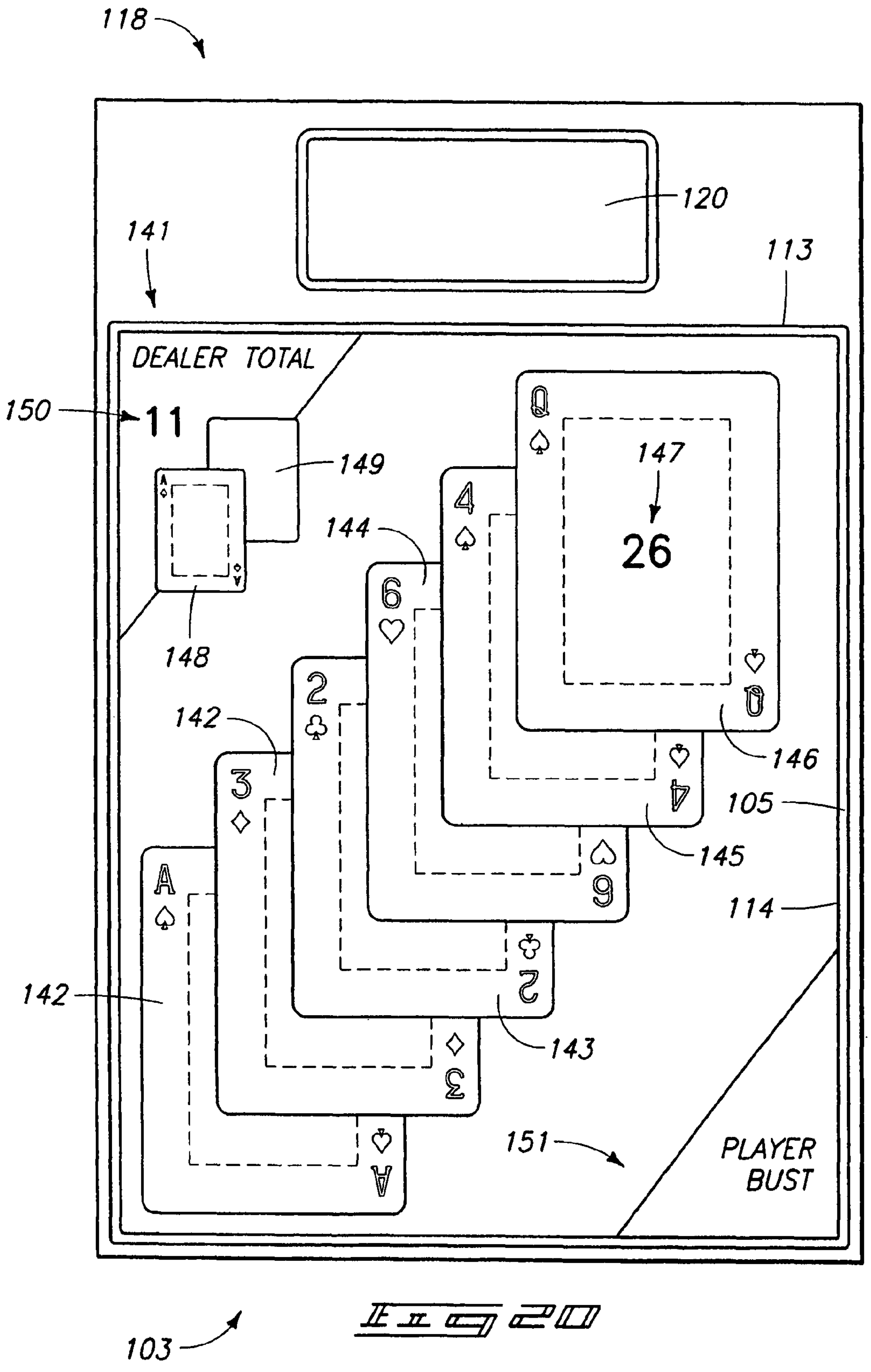

FIG. 20 is similar to FIG. 19 except the player has lost the betting chip 160 due to collection by the dealer.

Figure 21:
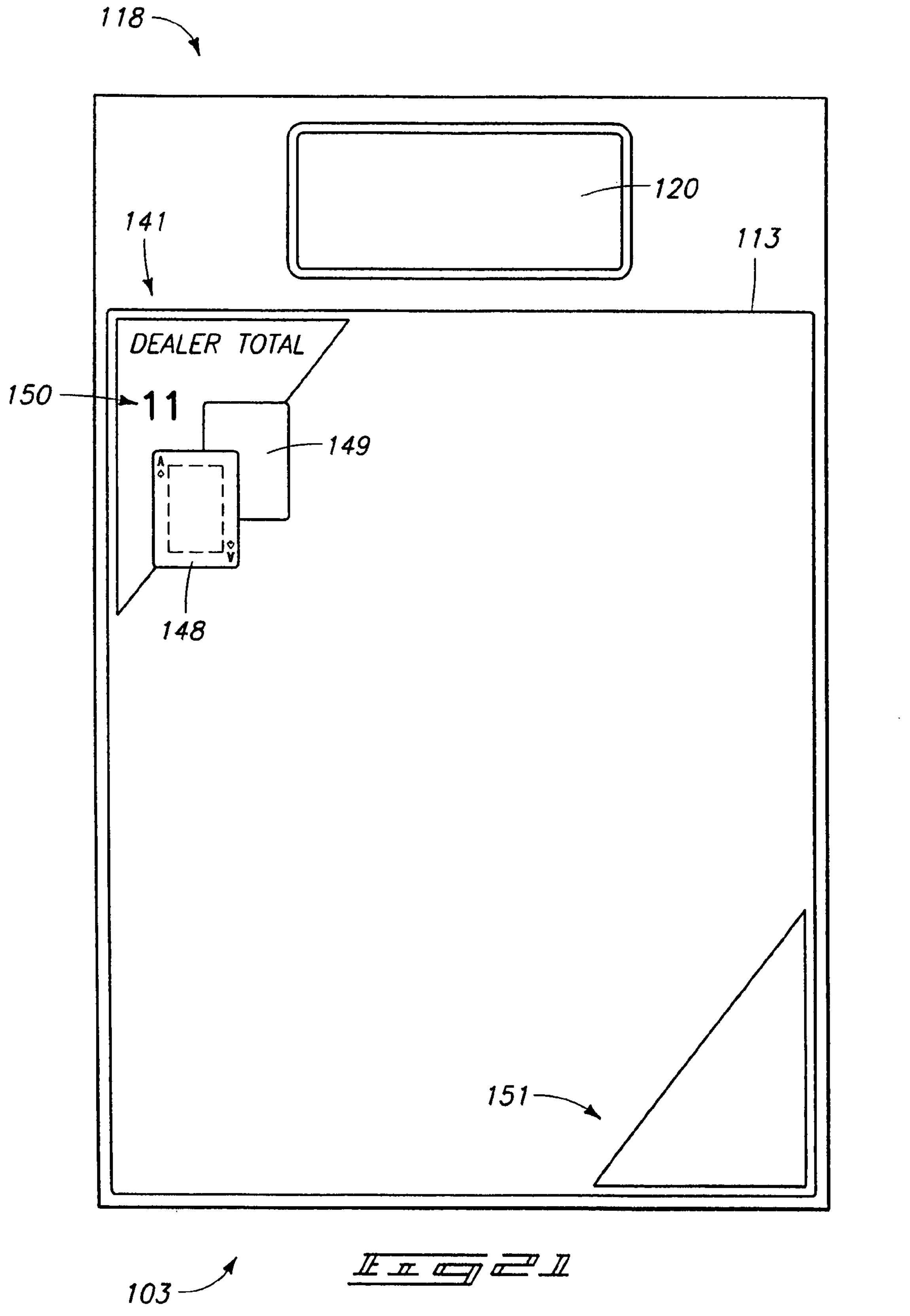

FIG. 21 shows the losing player's display has been cleared with regard to the primary display section and the tertiary display section due to the loss. If other players have yet to play out, then the tertiary display 151 will show the active player hand as previously illustrated in FIG. 14. FIG. 21 indicates an image when there is no other player playing out his hand and prior to the dealer having played out the dealer's hand.

Figure 22:
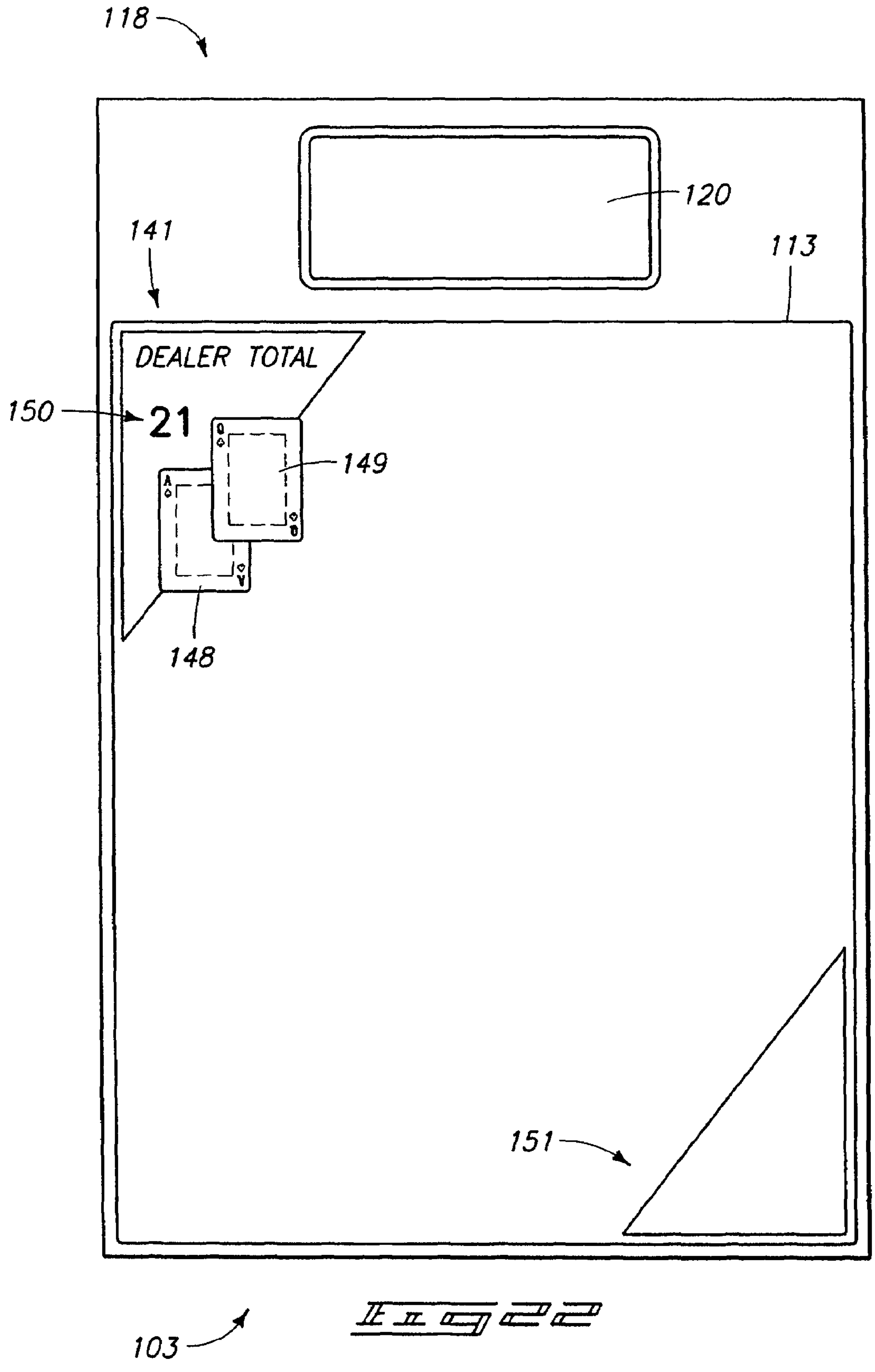

FIG. 22 shows the dealer's hand as being a 21 and thus the dealer is a winner. This ends the current hand of cards and similar processes are repeated.

Description of Control Software Flow Charts

The game processor controller 90 includes software which is used in the operation of the card game system 60. It should initially be understood that the particular software used will vary dependent upon the card game being played. The system described herein is being used for playing blackjack and so specific description in that context is provided. However, other games can be played and there will necessarily be modifications to the software and program routines to accomplish these changed games, or such may be required in connection with playing the wide variety of blackjack games played in casinos and cardrooms everywhere.

The game processor includes operational modules for performing a number of data processing functions in connection with the preferred blackjack card games. One key function is tallying the card array which forms the stack of virtual cards. Other key functions include: tallying the player hand counts; generating random number selections or listings; selecting virtual cards within a stack or selecting virtual cards which are to be distributed from the stack; monitoring a set of house rules or options to apply the correct rules during play of the game; monitoring player hand counts and cards dealt; providing basic strategy suggestions for use by the player in response to various different hands; and, communicating the various data processing sets and files between system components to achieve successful operation. Other functions and variations of the above are also indicated elsewhere in this document.

Figure 26:
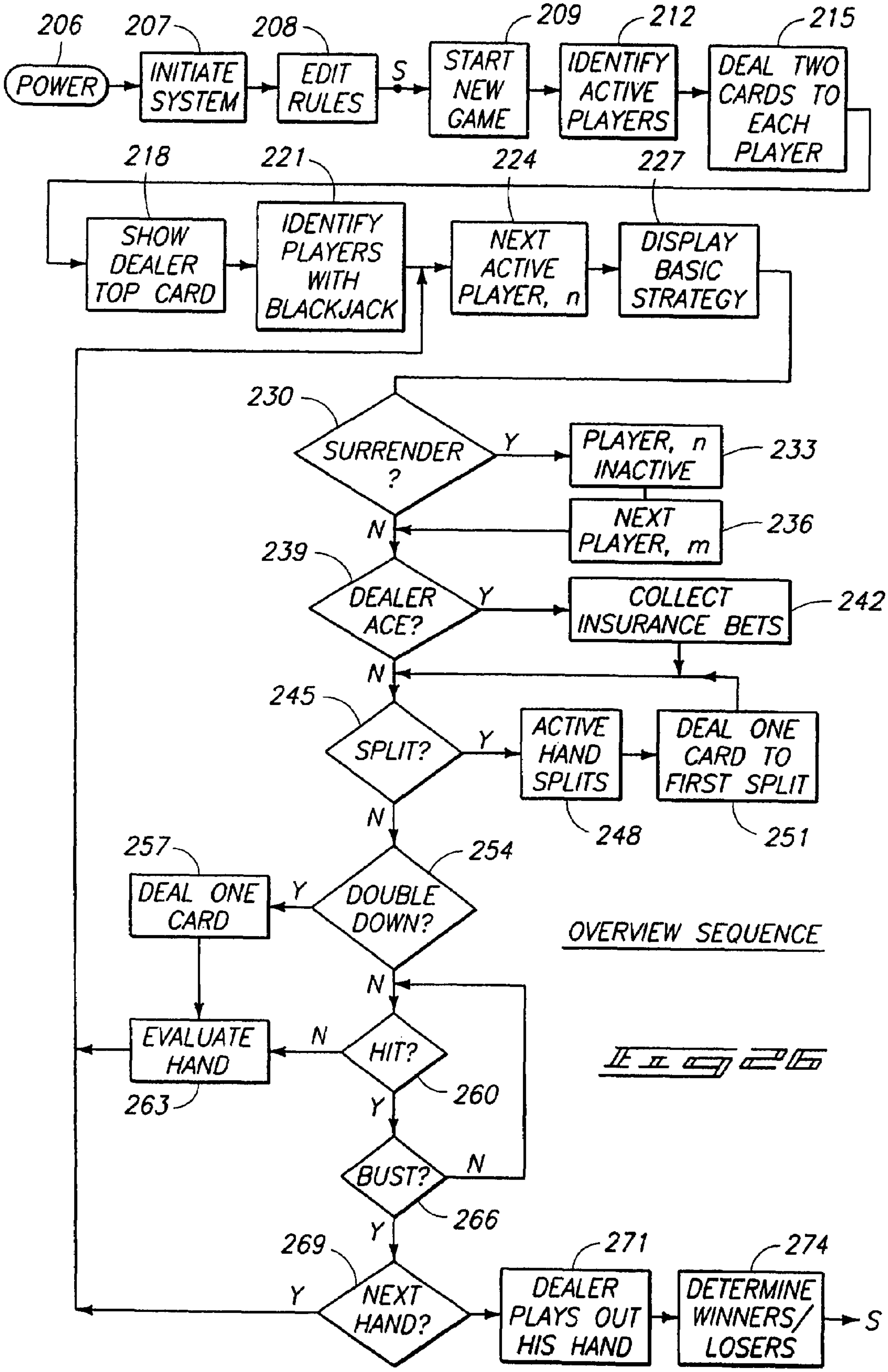
FIGS. 26-37 are operational flow diagrams showing significant steps in the logical processes employed for data processing functions carried out by the preferred system of FIG. 1.

FIG. 26 shows an overview of game processor logic flow in the form of a block diagram. Power is applied at step 206 and the system goes into an initiation sequence using programming contained in a programmable read only memory forming part of mother board 185. Step 208 is provided to indicate possible editing of game rules if a properly authorized user indicates programming should occur in the manners described above.

After any desired editing of the game rules in step 208, the dealer initiates a new game by control command S, such as by pushing the deal control key switch 89 (FIG. 5). This leads to step 212 wherein the game processor performs by identifying who is participating in the game from the available player stations, and includes the dealer by default.

Step 215 involves dealing the two initial cards played in blackjack to the participating players and to the dealer. Such dealing involves generating random numbers which are used in selecting from the available cards contained in the set of cards defined to be the card stack. It further involves displaying the cards which have been dealt upon the displays in the manner and with the appearance described above, or some other suitable manner and appearance. Additional description of the two card dealing operation will be described below in connection with FIG. 28.

FIG. 26 also shows a step 218 which involves showing or displaying the dealer's top or upcard on the dealer display and in the secondary sections of the player displays. This block also represents not displaying the dealer's down or hole card.

The next step illustrated in FIG. 26 is a step of identifying players having a blackjack hand after the dealing of the two initial cards to each participating player station and to the dealer station (all participants). The following step 224 includes considering the next active player and analyzing the hand which is held by such player. After the analyzing the hand, there is a process of applying the basic strategy rules to the analyzed player hand to perform a deriving of basic strategy suggestion. This basic strategy suggestion is then implemented by displaying the basic strategy as step 227, such as in a manner explained above in connection with the player display descriptions.

FIG. 26 also shows some alternative playing options which are considered in the course of the data processing functions. Step 230 provides a surrender option which may be made available to the player by presenting some indication of surrendering, or by merely allowing the player to orally or otherwise indicate he or she is surrendering after the initial two cards have been dealt and as an initial play decision associated with the hand the player has received versus the knowledge the player has of what the dealer has been dealt. One possible playing rule in this regard might be to allow the player to surrender, in which case the player would lose at that point one-half of his bet. This might be done in case the dealer appeared to have a blackjack hand and the player did not have a blackjack hand and did not believe he was likely to achieve a winning hand by receiving one or more hit cards.

If surrender occurs then step 233 occurs which involves deactivating the surrendering player. The process can then be continued with regard to additional players who would either opt for surrendering or not surrendering.

FIG. 26 also shows a step 239 which involves analyzing to determine if the dealer has been dealt an ace as his upcard. If so, then the game can advantageously perform by presenting the players with a notice, such as by displaying a message concerning insurance on the player or dealer displays. Although such a message is not shown in the figures, a simple flashing "INSURANCE?" might be used on either or both displays and then waiting sufficient time for the player to place their insurance bets upon the insurance bet detection zones 130. The game processor can then perform by detecting the presence of any insurance bets and logging such information into the game files being created in the game processor memory. If the dealer does not have a blackjack hand, then the step 242 of collecting the insurance bets can be performed by the dealer.

FIG. 26 further shows a step 245 which entails considering whether any player desires to split his or her hand. The split option typically occurs when the player has received two cards of similar kind, such as two kings or two aces. The player in particular may want to split on two aces since each has a relatively high probability of getting a ten-count card to make blackjacks. This is in comparison to valuing each of the aces as either 1 or 11 and further playing the cards as a single hand. Step 248 represents implementing the active split hands and dealing an additional card to the split hand to provide two cards. The first split hand is then played out and play continues on to the second or subsequent split hand of the same player.

FIG. 26 further includes a step 254 which performs by considering whether any players want to make a double down play. If so, then they indicate such to the dealer who depresses control key 86 (FIG. 5) and step 257 occurs which involves dealing the additional double down card to that player. The system then performs by evaluating the player's hand in step 263.

If a player does not elect to double down, but instead proceeds to either stand or be hit, then step 260 is performed and such an election is made and the player performs by communicating such to the dealer. The dealer follows through by depressing either the stand or hit control keys 87 and 88, respectively. If another or hit card is dealt, then step 266 is performed and the game processor performs by analyzing the player's hand to determine whether the player has busted. If not, then the player is given another opportunity to obtain a hit card and the process repeats until the player elects to stand. In the last case the processor performs in step 263 by evaluating the final hand count and hand composition and then proceeds to address the additional participating players. If the player busts, then step 269 is performed in which case the dealer proceeds to the next available participating player or proceeds to step 271.

In step 271 the process continues by playing out the dealer's hand. This may involve hitting or standing in a manner similar to play by the players as explained above.

Step 274 is performed by determining which players have won or lost, and then such information is displayed on the displays 103, or 102, such as described hereinabove.

Figure 27:
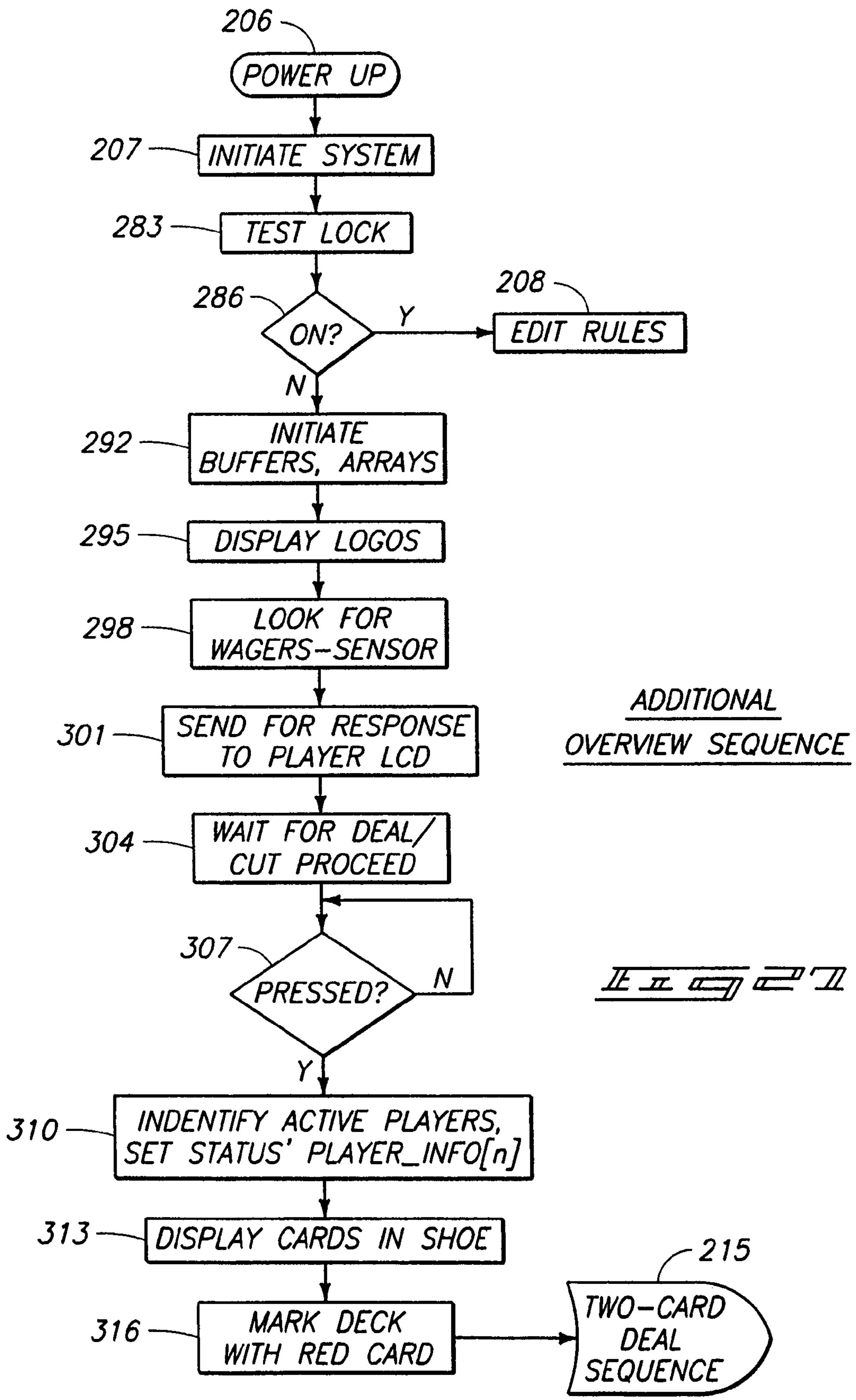

FIG. 27 shows additional detail not depicted in FIG. 26 in the form of a main loop routine to further clarify processes used leading up to the dealing of the initial two cards. Steps 206 and 207 are as explained above. Step 283 involves testing for the edit rules security lock having been opened by the appropriate code key. If so, then the edit rules subroutine 208 is performed. If not, then various buffers and arrays are prepared for normal operation in an initiating step 292. This will involve loading programming from read only memory or other programming source to set up the game processor for operation.

Step 295 involves displaying any casino names or logos or otherwise displaying an attraction display image, such as upon the player displays 102, dealer-display 103, or shoe displays 81 or 82. Thereafter, the game processor performs in step 298 by looking for any wagers as indicated by sensors 121. Step 301 represents initiating the active player stations and querying for a response that the player display has been activated.

The sequence shown in FIG. 27 then performs by waiting for the dealer to proceed by depressing the deal command key 89. If not pressed then the waiting process is continued. If pressed, then step 307 is passed. Thereafter step 310 is performed in which case the participating players are set and any additional information is loaded in preparation for dealing.

Step 313 indicates that the shoe display 81 is performing a displaying operation and step 316 indicates the marking or highlighting of the cut card and performance of the cutting operation as further explained now.

Prior to the dealing step, the processes according to this invention can also include a cutting step which can be performed either by the dealer or by a player. In one form of the invention the cutting is performed by displaying a simulated card stack on the first shoe display 81 and then having the player perform a touching of display. In this process the display 81 is a touch screen display and the touching step causes a location in the stack to be selected as the cut position. The cut card can then be specially displayed, such as by using a highlighting color. Such a process can also involve progressively moving the cut card as virtual cards are dealt.

An alternative cutting operation can be performed similar to the cutting just described but it is instead performed by the dealer touching display 81 rather than the player. This can be done in response to the dealer's judgment, or more preferably, the dealer can undertake such action in response to instructions from one of the players.

A still further alternative approach in performing a stack cutting operation is to have a selected player perform by instructing the dealer. The dealer in this alternative would be empowered to move a virtual cut card as it appears on the display. For example, during the cutting operation the stack image display 81 would function by displaying and highlighting a cut card. The dealer could then perform by moving or repositioning the cut card position within the stack by using one or more of the dealer control keys 85-89 which would become soft keys assigned to this repositioning function. The player performing the cutting judgment would then act by instructing the dealer as to the desired position of the cut card and the dealer would perform this repositioning as displayed on the display. The repositioning could be affected by adjusting the cut card position as needed in response to the instructions given by the player who is empowered with the cutting operation. After the cutting position is resolved, then the stack order is changed to reverse the two sections of the stack which are divided by the cutting position.

In preferred methods according to the invention there is also a house or dealer cut card placing action which is advantageously made. This is made after the stack cutting operation discussed above. In this operation the dealer or other representative of the casino moves the cut card indicator to a position which is set by casino policy to be within a defined range. For example the cut card position might be midway in the stack. In such situation cards would be played until the cut card position is achieved and then the stack would be reshuffled.

Figure 28:
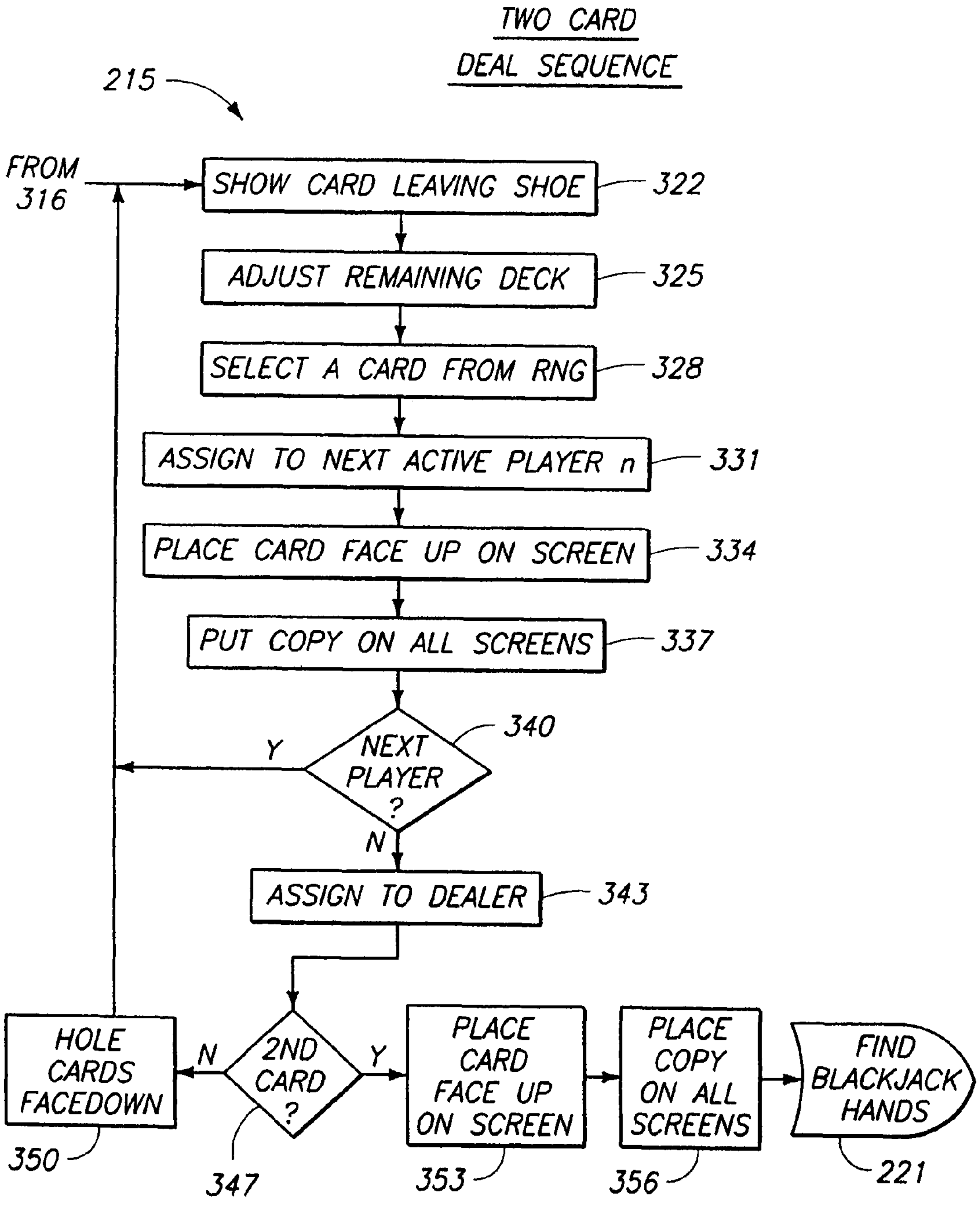

After the above steps are performed, then the two initial card dealing sequence is performed. This processing if further illustrated in FIG. 28. Step 322 of FIG. 28 illustrates the moving card routine advantageously performed by the second shoe display 82 in order to add realism to the game. Such a step includes indicating motion of playing card images after the dealer has commanded that dealing begin using touch key 89. This can advantageously be performed using the second shoe display 82. The motion indicating step can by done by shifting the apparent card back face image downwardly within the second shoe display and thus visually indicating that the dealing process is being performed. This can be of added realistic effect and aid the players in easily recognizing the action of the blackjack or other card game being played.

Step 322 is followed by adjusting the simulated stock display in the first shoe display 81 by shifting the position of the cut card and moving it closer to the second display.

FIG. 28 also shows step 328 which involves selecting a card from the stack using the random number generator. The shuffling processes used in the system can be performed in three preferred processes. In a first shuffling process, herein called traditional shuffling, the random number generator is used to create an assigned order to all cards of the stack prior to dealing any card to any participant in the game. This is akin to the manner in which paper or plastic playing cards are handled, since the decks comprising the stack are shuffled and reshuffled the desired number of times to reorder the stack. Once the shuffling is completed, then any desired cutting of the deck is performed and the stack is placed into a dealing shoe. Once placed into a dealing shoe the order of the cards is fixed and no reordering occurs.

Another form of shuffling is made available using system 60 which cannot reasonably be performed in playing card games using paper or plastic physical playing cards. This shuffling process is herein termed continuous random shuffle. In this shuffling process the order of distribution of cards from the stack is not predetermined before the hand is played. Instead the random number generator operates on the fly as needed when the game requires a card to be token from the stack. The position from the stack is varied to produce the random distribution of potentially any card at any time. The entire set of virtual cards which make up the stack is maintained at all times, without removing cards which may already have been dealt in the some playing hand. This maintaining a set of all available cards in the stack achieves truer randomness than by reducing the stack set for removed cards. In any particular card assignment, the player can receive any of the possible cards. This procedure may be desirable in play of certain games or may be more attractive to the casino or players for objective or subjective reasons which become important.

Another shuffling or card assignment process which is contemplated by this invention is herein termed random balance shuffling. In random balance shuffling the set of available cards in the virtual stock is reduced by the assignment of prior cards dealt in the hand. For example, where the first card dealt is an ace of spades, and the stack is defined by the casino to be only one deck, then no other player in that hand can receive the ace of spades. In most casinos blackjack is played using stacks where there are multiple decks, for example six decks. In such situations, then there clearly would be additional aces of spades which might be dealt. However, the frequency of selecting the ace of spades after one or more other aces of spades have been already dealt in that hand does diminish. This should be contrasted to the continuous random shuffle wherein the expected statistical frequency does not change as cards are dealt.

Step 328 schematically represents the selection of the next card whether this is done on the fly using continuous random shuffle, or random balance shuffle. Alternatively, the selection process can be done with pre-ordering using the traditional shuffle.

The traditional shuffle does have a significant disadvantage which blackjack players may have noticed or experienced. This disadvantage is demonstrated by the situation where one player either stands or hits in a nonconventional manner, either by mistake or intent. Other players at the table often notice this apparent error, and as a result the next player or dealer would receive a different card than if the prior player had played his hand in a conventional manner. In some cases, the difference in cards can affect some or all who receive cards thereafter. In some cases, players become irate because of the realization that this mistaken choice by another player has cost the other players their bets and the wins which they otherwise would have enjoyed. This type of situation can be very upsetting and sometimes even leads to fights among the players. By utilizing the continuous random shuffle or the random balance shuffle procedures which can be accomplished with this system, there is no pre-ordering of the stack and no particular card can be said to have switched from one player to the next. In each of these procedures the random number generator goes through a selection process immediately prior to distribution of each card and thus the decisions of one player are not fairly attributable to some derogatory effect on other players.

The card selected by the above-described processes is then assigned to the next dealt card required and to the participant, whether player or dealer. Once assigned, then step 334 effects the displaying of the card on the player's display if it is a card assigned to a player. The preferred game system also effects displaying a copy of the player's card on all screens when appropriate as explained above in connection with the preferred player display images. The game then involves assessing whether the next action is with a player or dealer in step 340. This process repeats until all players have received their first card. Then a virtual card is assigned to the dealer in step 343. The first card to the dealer is dealt as a face-down card and is often referred to as the hole card. Step 350 indicates that the hole card of the dealer is dealt and displayed facedown. The process explained above repeats again for the active players and dealer until step 347 indicates that a second card has been received by the dealer.

After both initial cards are received by all participants, then the cards are assured in faceup condition in step 353 except for the dealer's hole card and copies of the cards are placed on other player's displays as previously indicated. Alternatively, initial cards may be dealt in a face-up condition. Thereafter process 221 proceeds to determine the players with blackjack hands.

Figure 29:
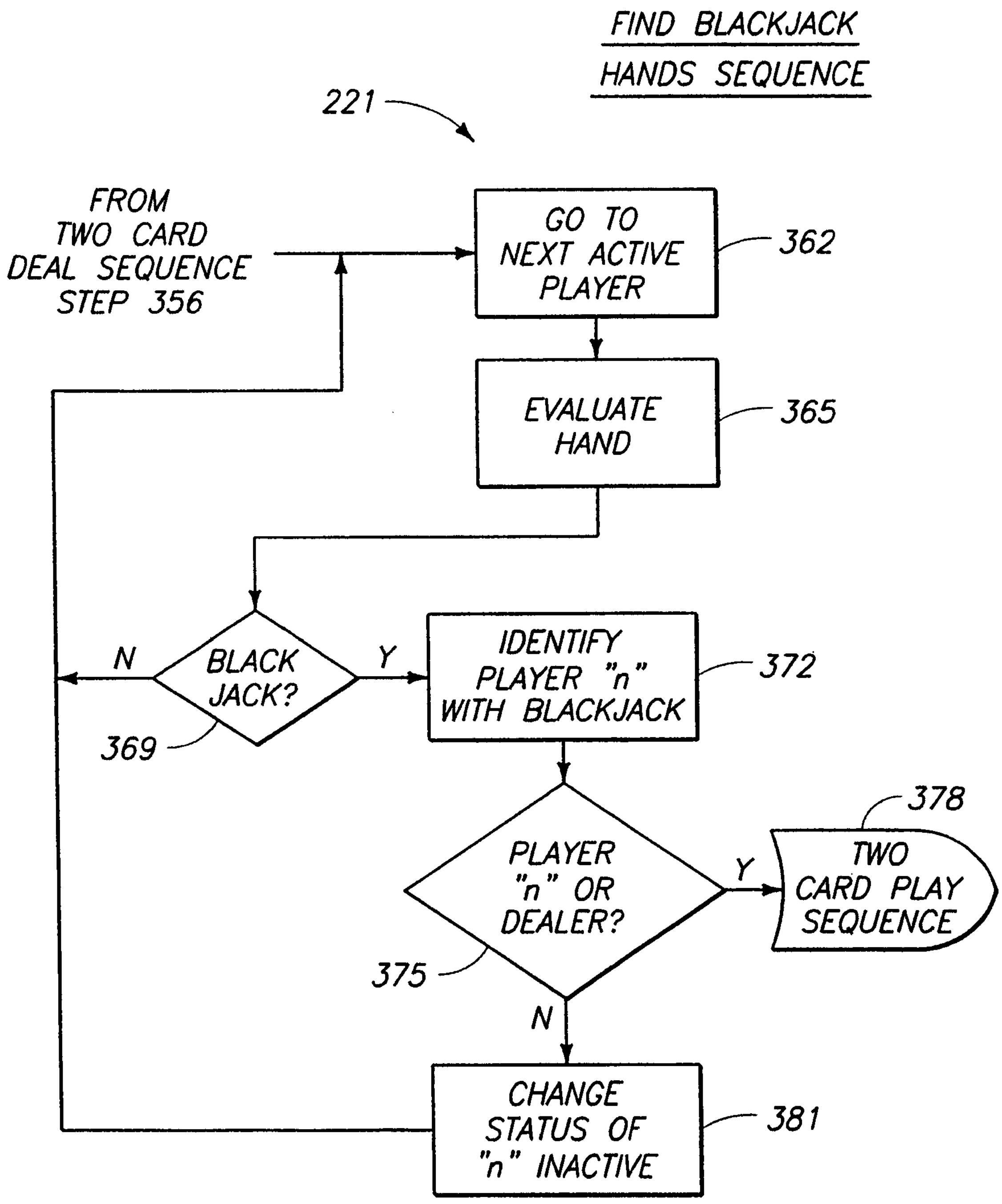

FIG. 29 details the process, shown abbreviated as step 221 in FIG. 26, for determining players with blackjack hands. Step 362 involves going on to the next active player for consideration. Step 365 is evaluating the player's hand. Step 369 is a deciding whether a blackjack hand is present. Step 369 leads to repeating steps 362 and 365 for another player if no blackjack hand is present. If a blackjack hand is present, then the process branches to step 372 wherein the program functions by identifying the player or players with a blackjack hand by player number "n". Step 375 performs, a decision whether the player, more properly participant, is a player or the dealer. If the answer is yes indicating it is the dealer, then the game is over and the two card play sequence is then repeated in another hand. If the blackjack hand is not for the dealer, then the player's status is changed by step 381 to changing the status to inactive with regard to additional play of the hand.

Figure 30:
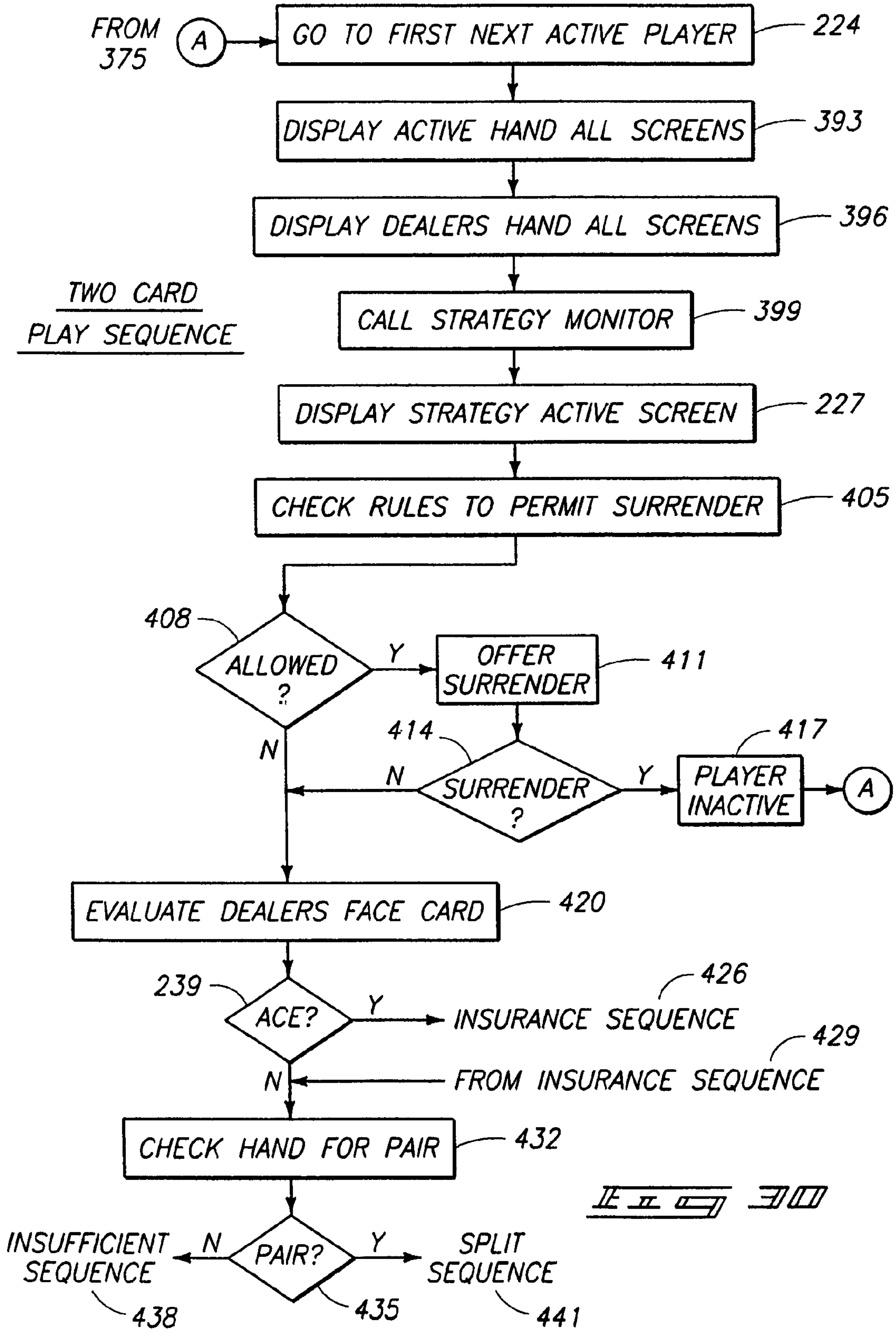

FIG. 30 details a two card play sequence 387 which is shown in abbreviated form in FIG. 26. Step 224 includes going to the next active player. Thereafter the processor performs in step 393 by displaying the active hand on all player displays, in the tertiary part of the display as explained above. Step 396 involves displaying the dealer's hand to all displays. Step 399 involves calling up the strategy analysis monitor and performing such strategy analysis to provide a basic strategy note to be displayed to the active player. The step 227 of displaying the basic strategy on the active player's display is then included, thereby rendering helpful advice to the player.

FIG. 30 then shows more complete steps in assessing surrender. Step 405 involves checking the game rules to see if the casino allows surrender as a play option. If yes, then decision step 408 proceeds to branch to an instructing step for allowing surrender by a player or players in step 411. Step 414 indicates the player's individual decisions whether to surrender. If decision 414 is yes, then that player is rendered into inactive status by an inactivating step 417. This process is repeated via connection A for other players. If surrender is not selected, then step 420 provides for evaluating the dealer's upcard. If the dealer's upcard is an ace, then decision step 239 branches to an insurance sequence detailed in FIG. 31. Return occurs in returning from insurance sequence at step 429.

If there is no dealer ace as upcard, then the game processor performs by assessing whether the player's hand has a pair in steps 432 and 435. If no pair exists, then the process continues by proceeding on with the consideration of whether the player wants to double down as shown in step 254 of FIG. 26. If there is a pair, then a split sequence branch step 441 is performed as detailed in FIG. 32.

Figure 31:
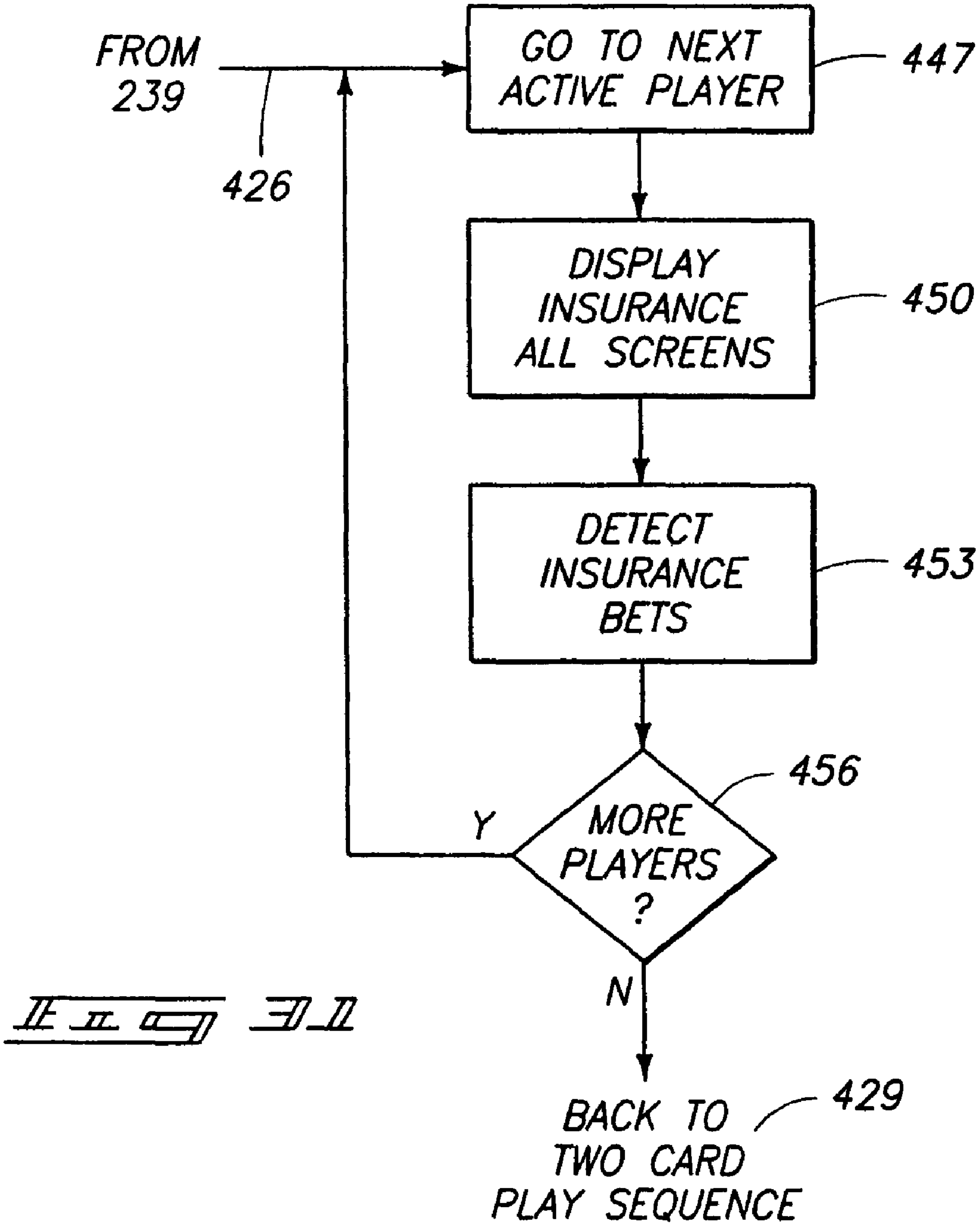

The insurance sequence shown in FIG. 31 branches from decision step 239 of FIG. 30 and advances to step 447 which involves going to the next active player. The possibility for taking insurance is publicized by notifying the players using a displaying step 450 which notes such on all displays 102 and 103. Step 453 then involves detecting whether insurance bets have been made. This is repeated by deciding in step 456 whether additional active players have taken insurance bets and the logical loop is again cycled until there are no more players and the process returns via branch 429 to the two card play sequence shown in FIG. 30.

Figure 32:
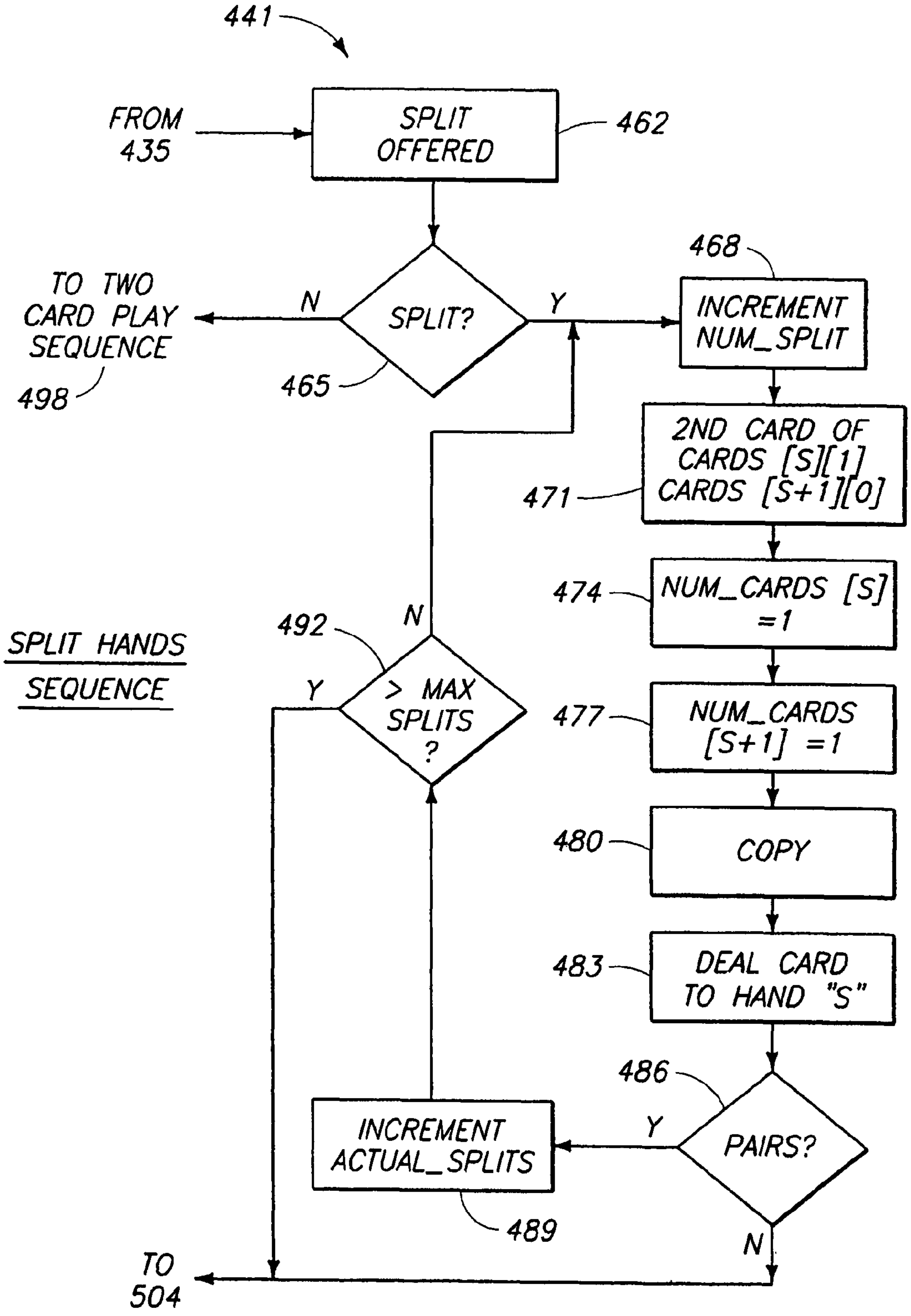

FIG. 32 details the split hands process sequence 441 from step 435 of FIG. 30. This first involves offering a player with a pair the option to split the hand in step 462. The player then decides whether to split his hand at step 465 and this is implemented by the dealer depressing key 85 to indicate the hand should be split by the game processor. If the hand is not split, then processing goes on to the additional two card play sequence of FIG. 33 at step 504. If the player elects to split by accepting the split offer, then step 468 is processed and a split counter is incremented. Thereafter in step 471 the processor processes data to split the original hand containing the pairs into two hands. Step 474 performs by identifying that each of the split hands has only one card. Step 477 performs by instructing that an additional card should be dealt. Step 480 performs by copying the instruction to deal cards to the split hands. Step 483 involves dealing the additional cards. Step 486 performs by deciding whether 868 there are additional split opportunities which have developed from the newly dealt cards. If so, then step 489 performs by incrementing the split counter. Decision step 492 compares the split counter to make sure the maximum allowable splits programmed by the casino rules has not been exceeded. If not, then recycling through step 468 and the splitting function repeats. If there are no further split options from decision step 486, then processing continues on to step 504 of FIG. 33.

Figure 33:
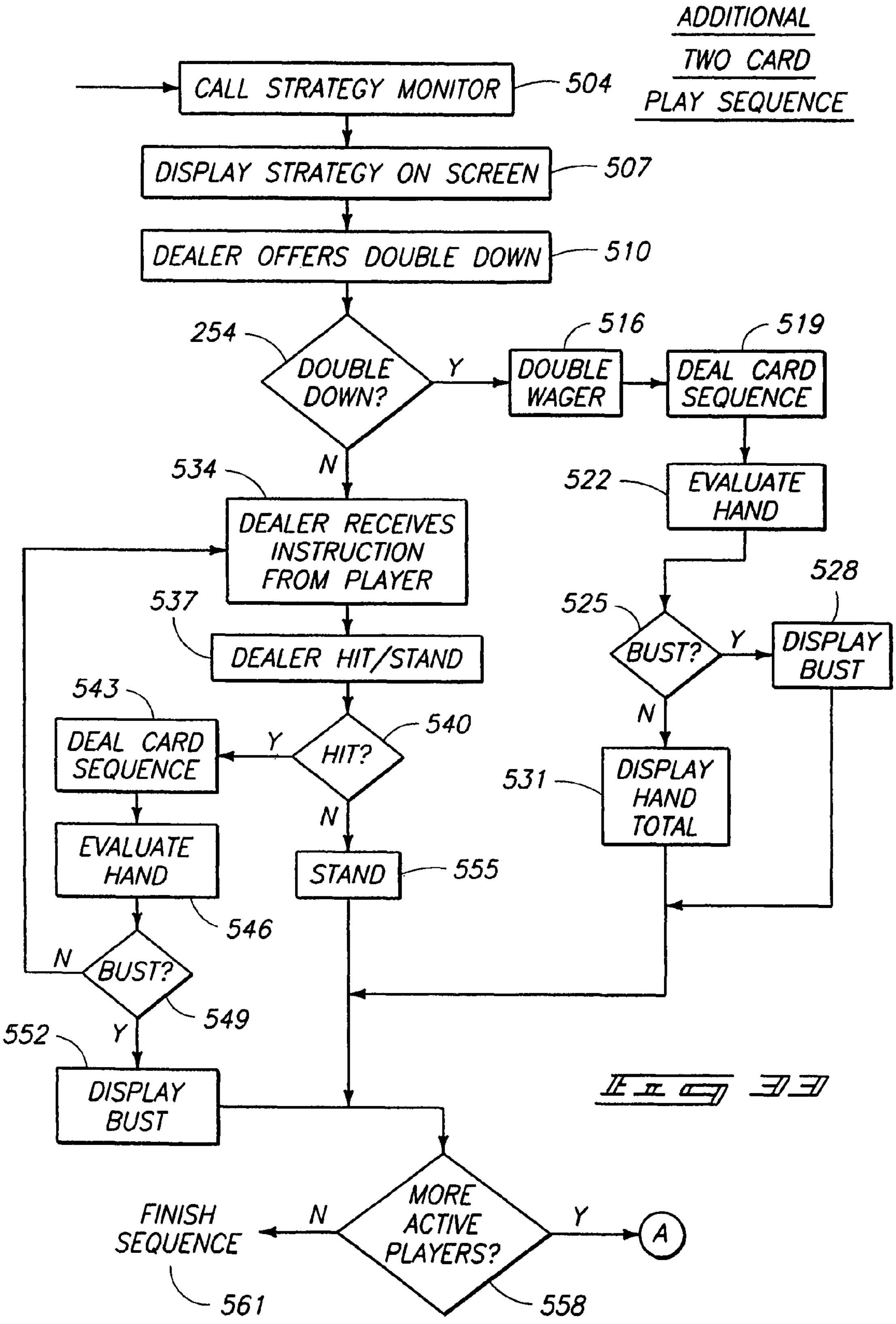

FIG. 33 shows an additional two card play sequence which includes a step 504 which involves calling the strategy monitor to apply the strategy rules to the player's hand after the splitting or insurance subroutines have been completed. The next step 507 involves displaying the suggested strategy. Thereafter, the players place an additional bet to "double down" in step 510. Decision step 254 responds to a yes with a doubling of the wager in the processor at step 516. Step 519 is dealing of the additional single double down card. Step 522 involves evaluating the player's hand after the double down card has been assigned. Decision step 525 involves determining whether the resultant player hand has busted. If yes, then step 528 involves displaying the bust outcome. If no, then a revised hand total results and this is performed by communicating or displaying the new hand total in step 531.

FIG. 33 also shows that if the player does not double down in decision step 254, then step 534 results. Thereafter the action is for the player to proceed by indicating whether he or she wants to be hit with another card or stand. If the decision in step 540 is to hit, then dealing of another card occurs as shown in step 543. The player's hand is then acted upon by the game processor performing an evaluating step 546 to proceed on with a decision step 549 whether the hand has busted. If not, then the hit/stand option is again considered by the player and the portion of the sequence is repeated until either there is a bust or a stand decision. If there is a bust, then step 552 involves displaying the bust as described above. If the decision is to stand as represented by standing step 555, then processing continues on to step 558 looking for more active players. If there are more active players, then circle A leads back to step 224 at the top of FIG. 30 for additional cycling of the processes discussed.

Figure 36:
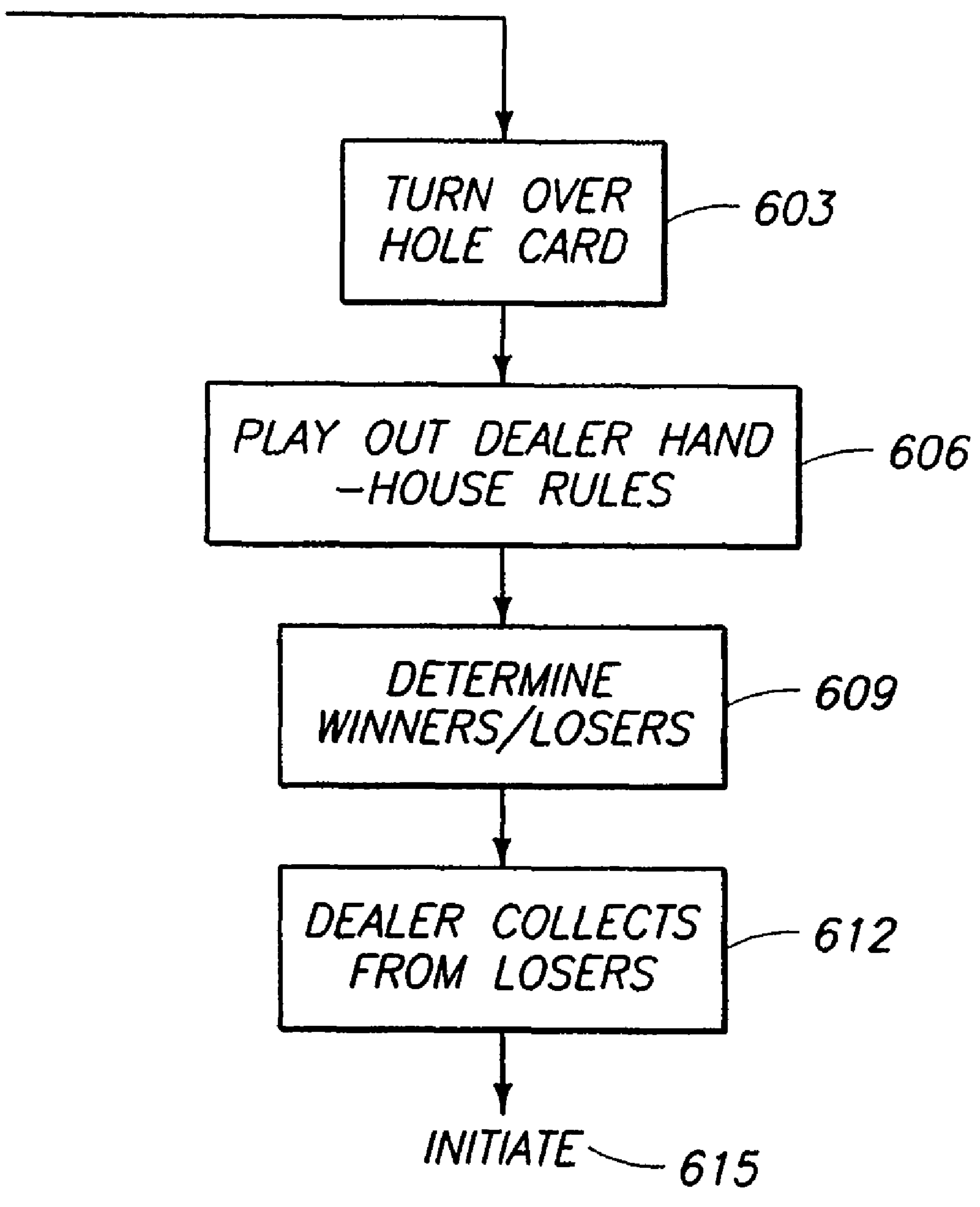

If there are no additional active players, then step 561 proceeds on to a finish sequence shown in FIG. 36.

Figure 34:
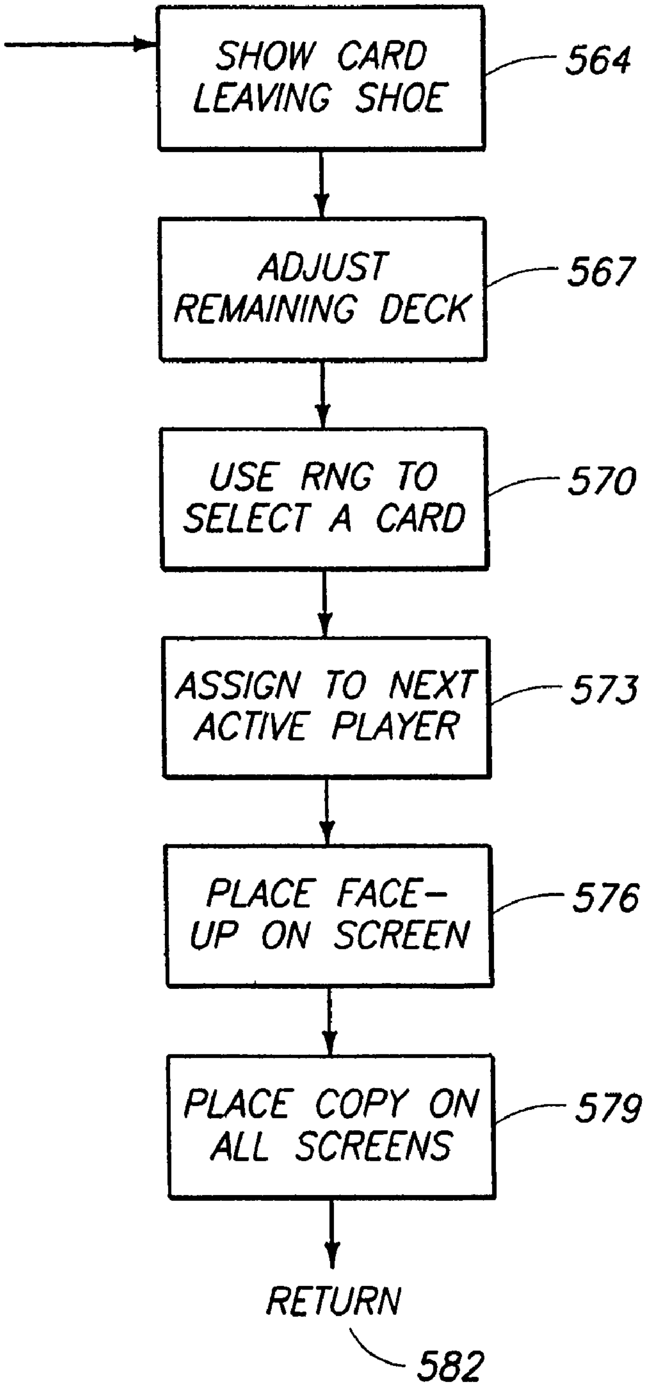

FIG. 34 details a deal card subroutine used in the overall process at a number of steps discussed above, such at FIG. 33, step 543. The deal card sequence starts with step 564 which involves the simulated moving of a card from the dealing shoe using the second display 82 and suitable image processing techniques to suggest movement. Step 567 involves adjusting the first shoe display 81 to show repositioning of the cut card and any other desired adjustments in the image. Step 570 involves using the random number generator and selecting a virtual card from the stack as discussed more fully above. Step 573 involves assigning the selected card to the appropriate player. Step 576 involves displaying the assigned card faceup on the display screen for the player. Step 579 involves copying the assigned and displayed card onto other displays as needed for the tertiary display section explained above. Step 582 represents return to other points in the processing after the deal card subroutine has been completed.

Figure 35:
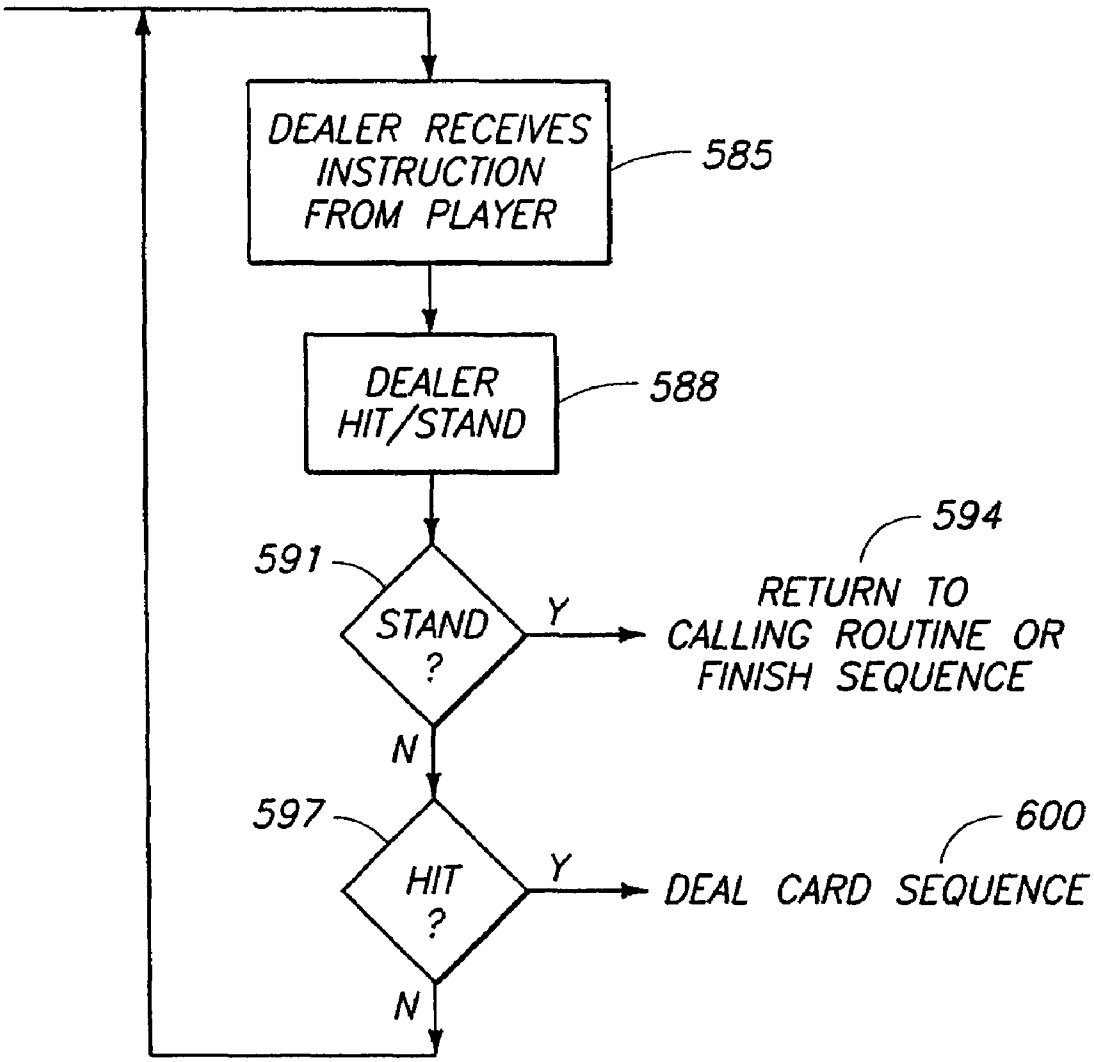

FIG. 35 further details a play out sequence. This is illustrated in more abbreviated form at FIG. 26, steps 260 and 266. The play out sequence subroutine includes step 585 which involves the player instructing the dealer with regard to whether the dealer should command hit or stand, such as implemented by control keys 88 and 87, respectively. Step 591 shows decision branching when the player has decided to stand. In this case the step 594 is pursued which either returns the program to the calling routine from whence it branched to the play out sequence, or step 594 involves proceeding on to the finish sequence routine covered in FIG. 36, which will be further explained below. If the player does not decide to stand, then decision step 597 is implemented with regard to a hit. A decision to hit passes the processing onto the deal card sequence subroutine via step 600 as discussed above in connection with FIG. 34.

FIG. 36 shows a finish sequence which starts with step 603 which involves turning over the dealer's hole card and displaying this information to the players. Step 606 involves playing out the dealer's hand according to house rules. This step is detailed further by the content of FIG. 37. FIG. 36 shows step 609 which involves determining the winners and losers. Step 612 involves collecting from losers and paying winners. Step 615 is followed by another game which is indicated by initiate step 615.

Figure 37:
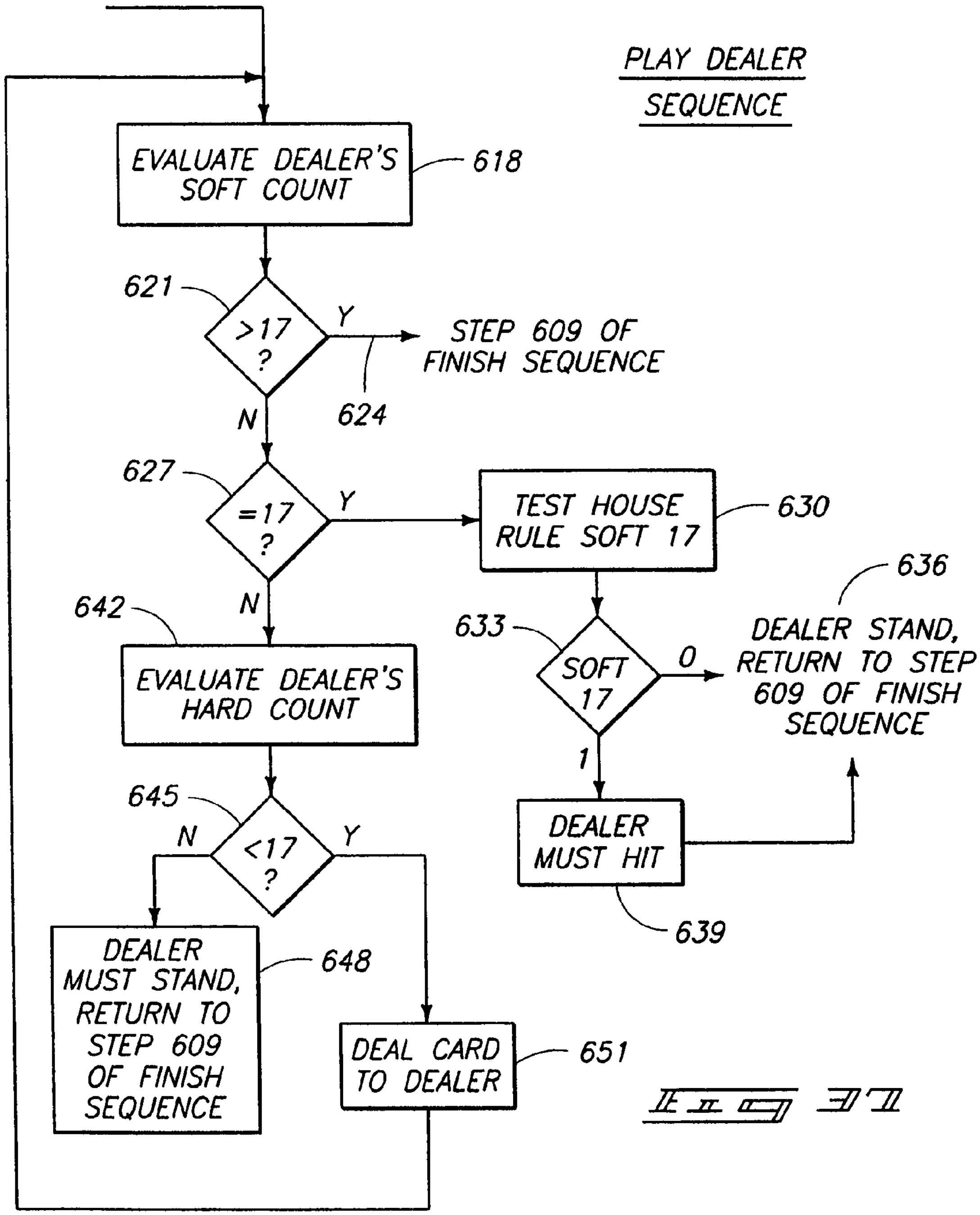

FIG. 37 details the playing out of the dealer's hand which is shown in abbreviated form at step 606 of FIG. 36. Step 618 involves evaluating the dealer's hand count as a soft count, in which case any aces held are valued at 11 rather than at a value of 1. This is followed by step 621 which compares the soft hand count to whether it is greater than the value 17. If greater than 17 then the step 624 proceeds to step 609 of FIG. 36. If the dealer's soft hand count is equal to a value of 17, then decision step 627 branches to step 630 which involves considering the house rule on soft 17 dealer hand counts. This is a variable house rule option in system 60. Decision step 633 can result in either the dealer standing on a soft 17 as depicted by step 636. This leads back to step 609 of FIG. 36. Alternatively, the other soft 17 rule leads to the dealer hitting his hand at step 639. That in turn leads back to step 609 of the finish sequence.

FIG. 37 also shows a branch from decision step 627 toward evaluating step 642 indicating the situation where the dealer's soft hand count is less than the value 17. Evaluation step 642 considers the dealer's hand and determines the hard dealer hand count with the ace valued at 11. Decision step 645 branches on the basis of whether the hard dealer hand count is less than the value 17. If less than 17, then the dealer receives another card as illustrated by step 651. If the dealer's hard hand count is 17 or greater, then the dealer stands and step 648 leads back to step 609 of the finish sequence.

Alternative Embodiment Gaming System

FIGS. 40-46 show an alternative preferred gaming system according to the invention. The alternative gaming system is in most respects similar to the gaming systems and variations shown and described above in connection with FIGS. 1-39. Similar features are numbered with the same reference numerals and description will not be repeated. Alternative or varying aspects of the alternative gaming system will now be described.

The presentation unit 100 advantageously includes ambient light sensors 132 (FIG. 43) which allow the system to sense ambient light to which the system is exposed during operation. This allows the betting chip detectors 121 and insurance bet detectors 131 to more appropriately determine whether a chip 164 (FIG. 40) has been placed over the detectors. The detectors or sensors 121, 131 and 132 are advantageously optical detectors in the embodiment illustrated. Alternative detectors are also possible.

Figure 40:
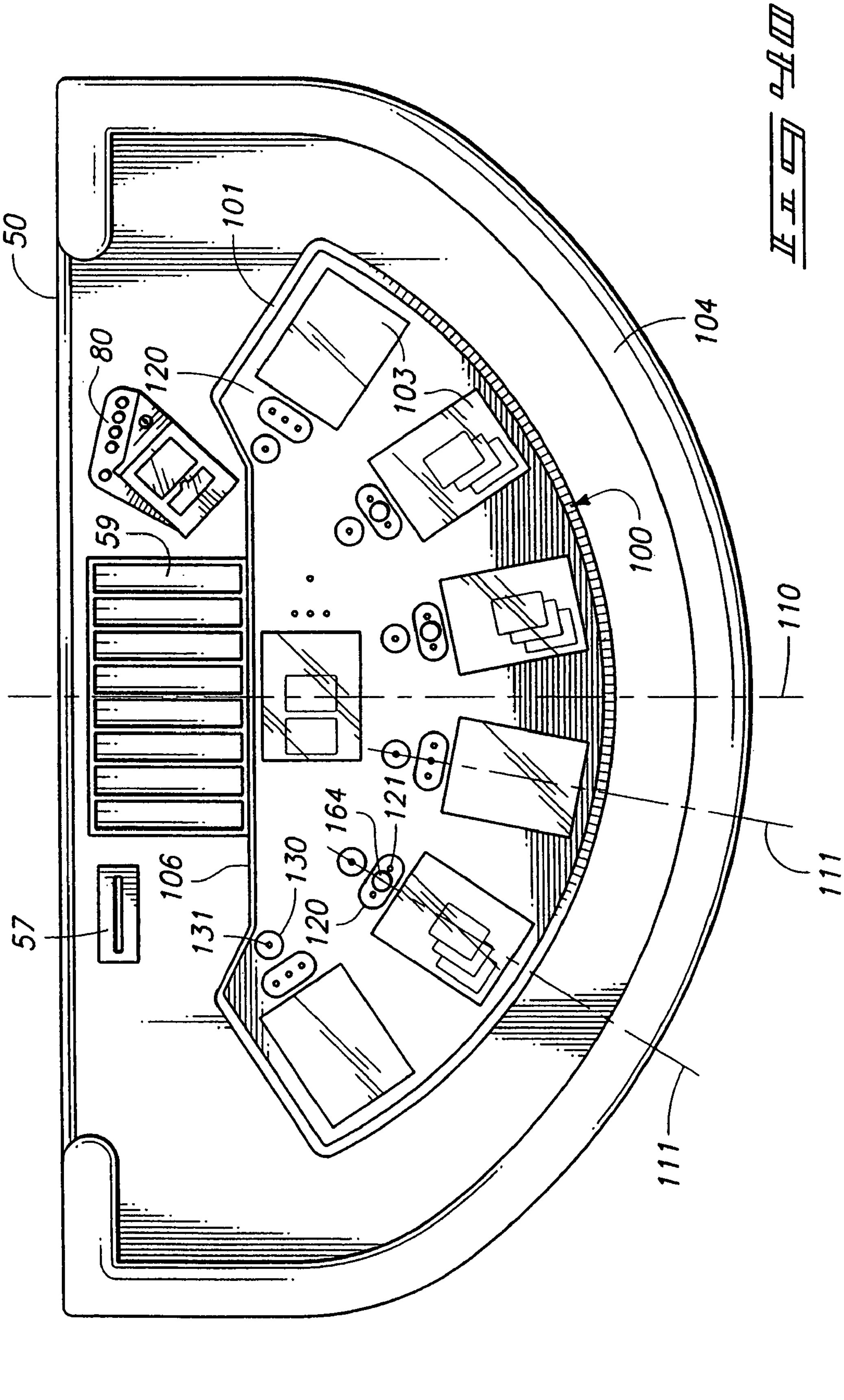
FIG. 40 is top or plan view of a further preferred gaming system according to the invention.
Figure 46:
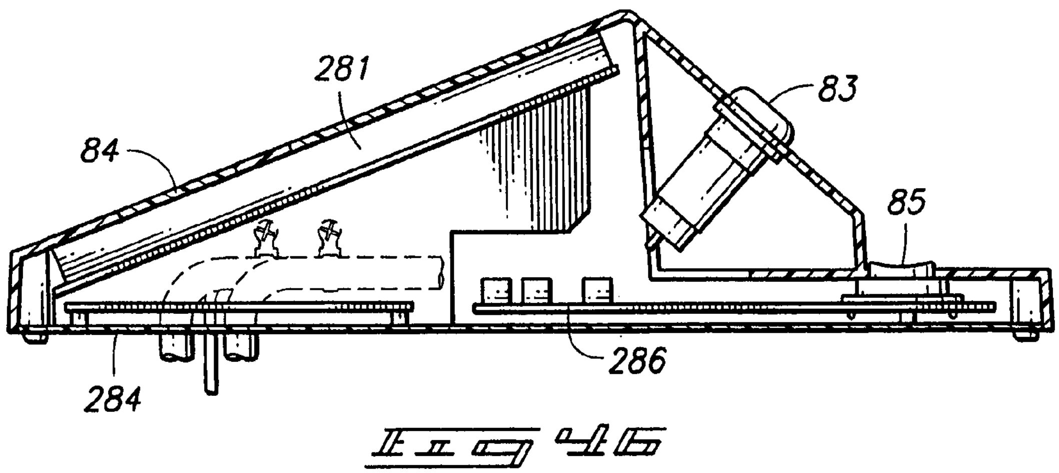
FIG. 46 is a sectional view taken along line 46-46 of FIG. 45.

FIG. 40 shows the dealer control module incorporated in the form of a simulated dealing shoe 80 similar to the dealing shoe 80 shown and described above. The dealing shoe of FIG. 40 is shown in larger illustration in FIGS. 45 and 46. The dealing shoe has first and second display portions 81 and 82 which are provided using a single display 281 (FIG. 46). The case 84 advantageously includes metallic base plate 284 and a plastic case top 285. This construction is preferred to help dissipate static or stray electricity which may come into contact with the dealing shoe. It also provides a ground plane which can be used by electrical components 286 used to power, communicate and/or control the display 281 and dealer control keys 83 and 85-89.

Figure 41:
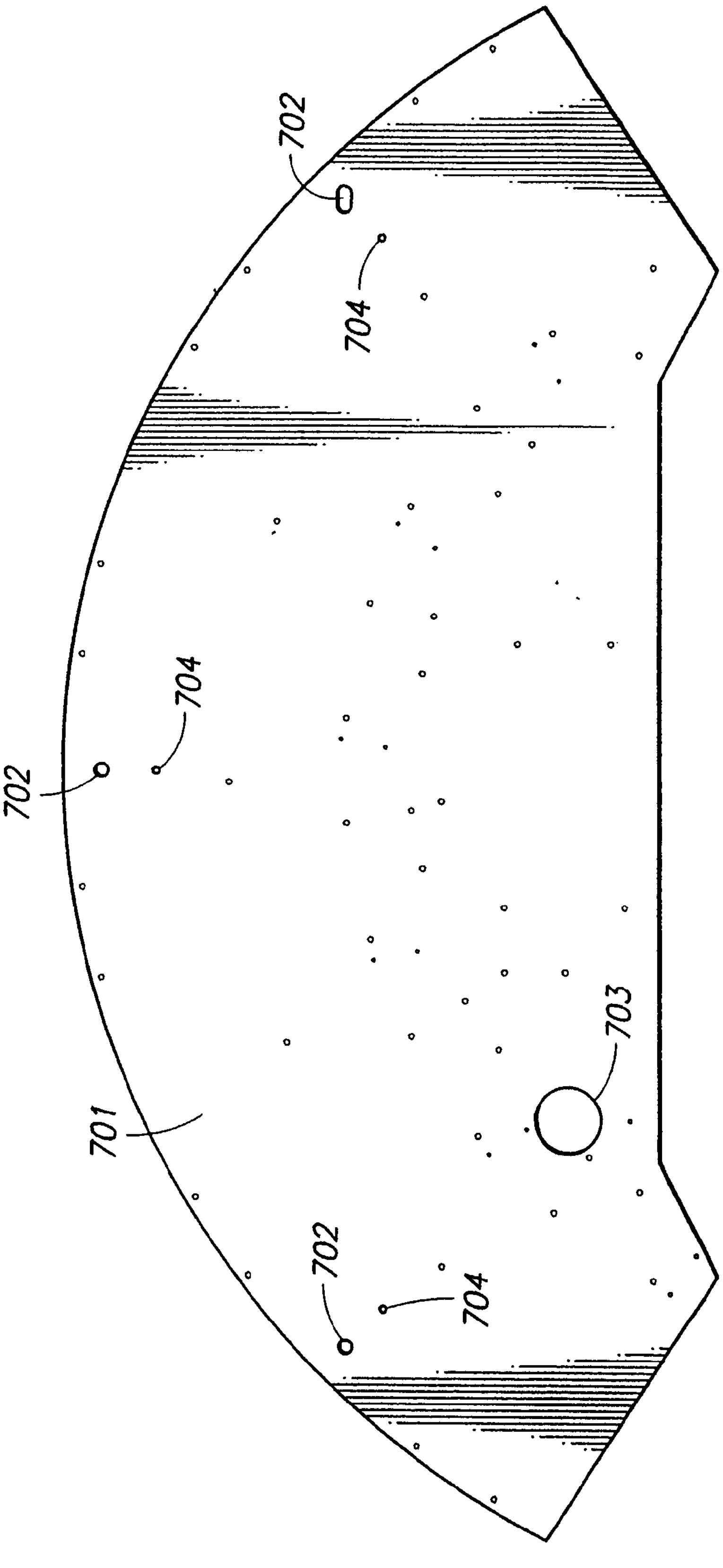
FIG. 41 is a top view of a portion of the gaming system pictured in FIG. 40.
Figure 27:
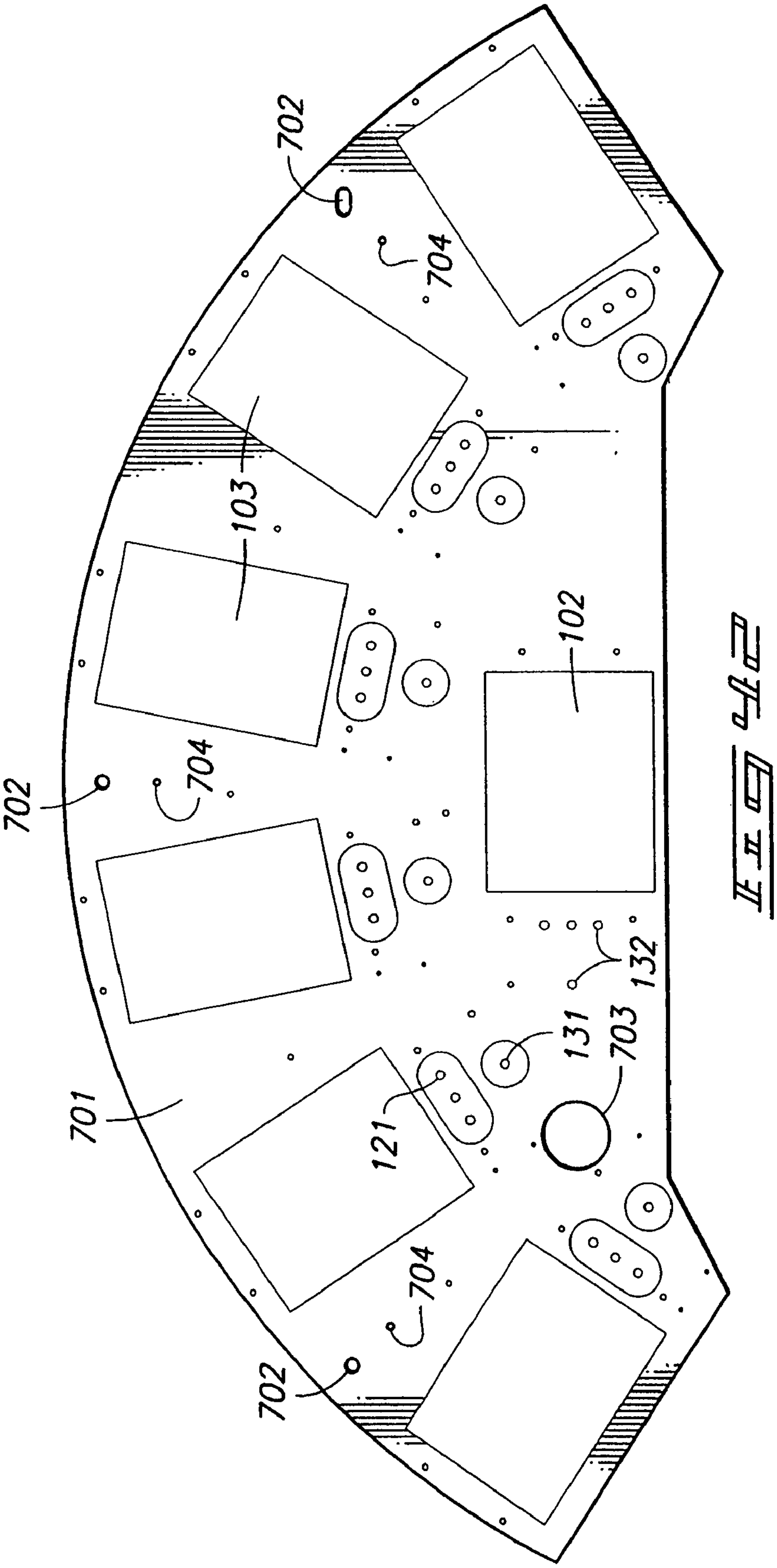
Figure 6I:
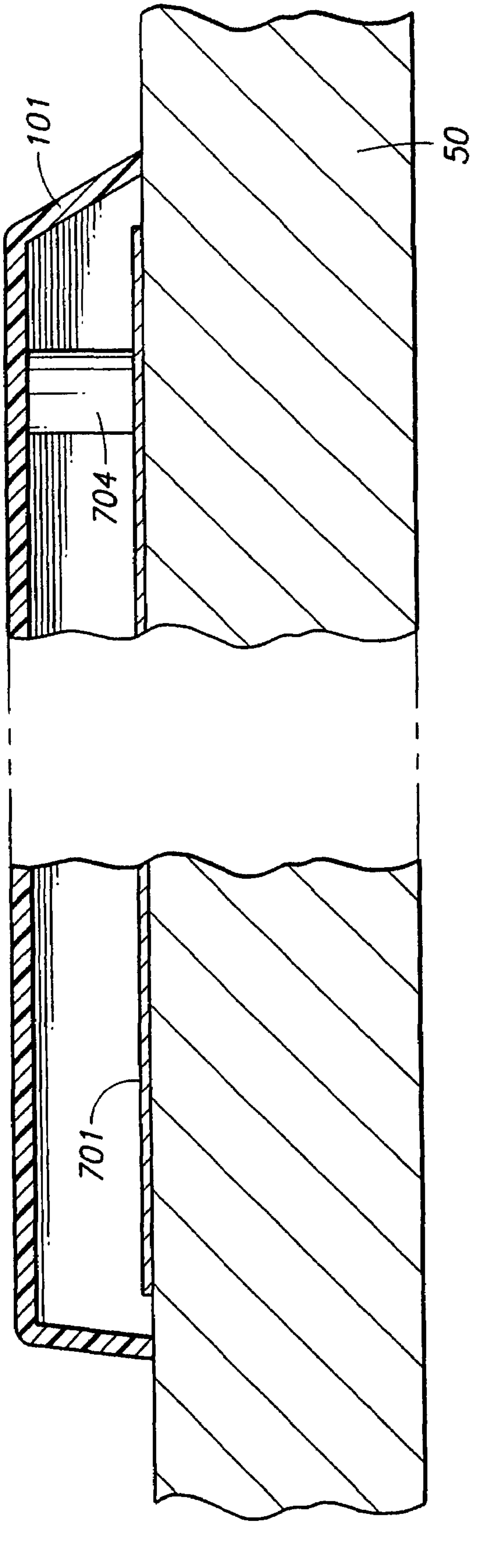
Figure 45:
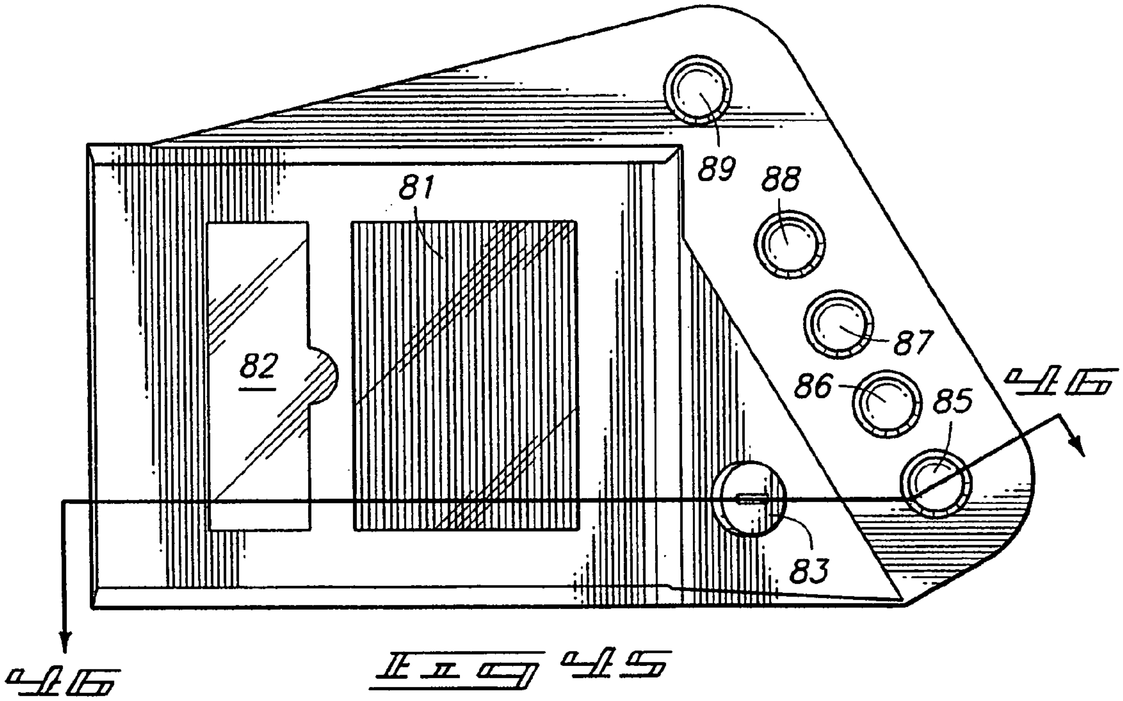
FIG. 45 is a top or plan view in isolation of an alternative dealing shoe and control unit forming part of the system of FIG. 40.

FIG. 41 shows a presentation unit base plate 701 which is provided with a number of mounting holes and features which allow various connections to be made. These connections include connection of various wiring cables and other components to the base plate 701. Noteworthy are mounting holes 702 which allow the base plate to be secured to a gaming table 50 (FIG. 40). Also noteworthy is cable opening 703 which is used to allow wiring cables to be connected to a control module, such as module 92 mounted beneath the gaming table. The gaming table can accordingly be drilled or otherwise provided with a corresponding opening that allows the cabling to extend through the table top. A plurality of standoffs 704 are provided to support the overlying presentation unit cover 101 to be held in supported relationship over the base plate 701. The base plate 701 is preferably made of a metallic or other electrically conductive sheet to facilitate grounding of various electrical components thereto and to help dissipate static or other stray electricity which may encounter the presentation unit. The electrical ruggedness of the presentation unit 100 and other parts of the system is in some cases tested by regulatory authorities to make sure operation is not affected by stray electrical discharges. Shocks are applied to the case using a suitable test voltage supply (not shown) which may involve electrical discharges of approximately 25,000 volts. The overlying cover 101 is advantageously made from a transparent acrylic material which is relatively non-conductive to minimize the effects of such electrical discharges. The conductive base plate 701 tends to conduct any stray electricity to a ground terminal (not shown) to further reduce possible derogatory effects.

FIG. 42 shows base plate 701 fitted with several participant displays 102 and 103 as described above. The displays may be mounted in raised positions upon the base plate to allow cabling (not shown) to pass between the displays and base plate. FIG. 42 further shows the bet and insurance detectors 121 and 131. Ambient light detectors are also shown mounted upon the base plate.

FIG. 44 further illustrates that the cover 101 can advantageously be made from a continuous or substantially continuous sheet of transparent material, such as transparent acrylic. This allows the displays 102 and 103 to beam their images therethrough and allows optical detectors 121, 131 and 132 to perceive light levels adjacent thereto. The remaining portions cover 101 are advantageously made opaque to hide the other internal components. The surface of the cover can be treated using spray coatings or by direct surface treatment to provide a matte or semi-matte finish to minimize reflection and improve participant visibility of displays 102 and 103.

Description of Alternative Control Software Flow Charts

FIGS. 47-51 diagrammatically illustrate another form of preferred programming and related processes used in the operation of the alternative embodiment of FIGS. 40-51. Many of the processing steps are the some or have analogous control processes as those described above. The following outline explains the diagrams of FIGS. 47-51 in greater detail. Computer file names are generally shown italicized using a preferred or suitable file name.

1. Main Loop

Figure 47:
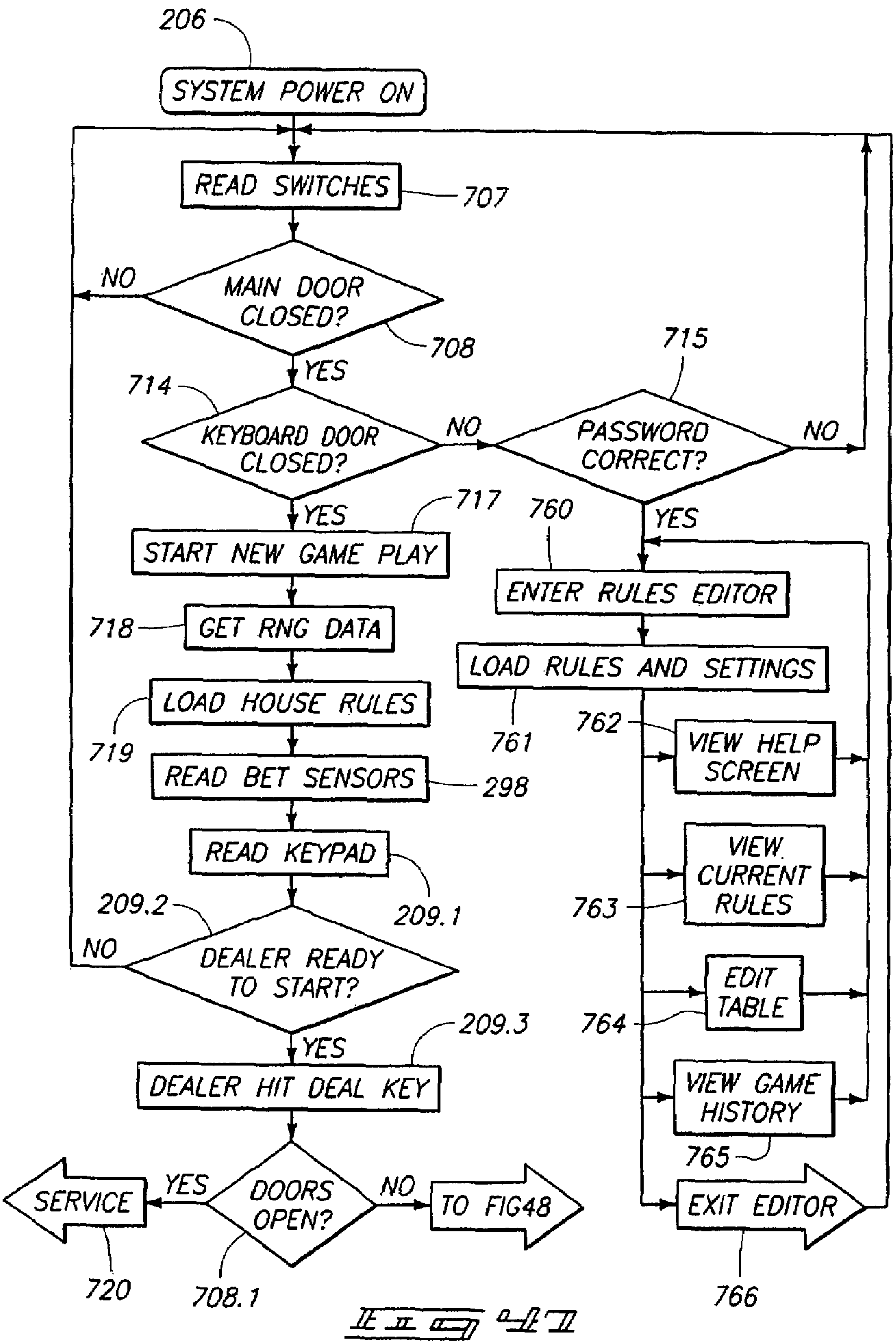
FIG. 47 is a first flow diagram showing a portion of a main operational flow scheme which is employed in the gaming system of FIG. 40.
Figure 48:
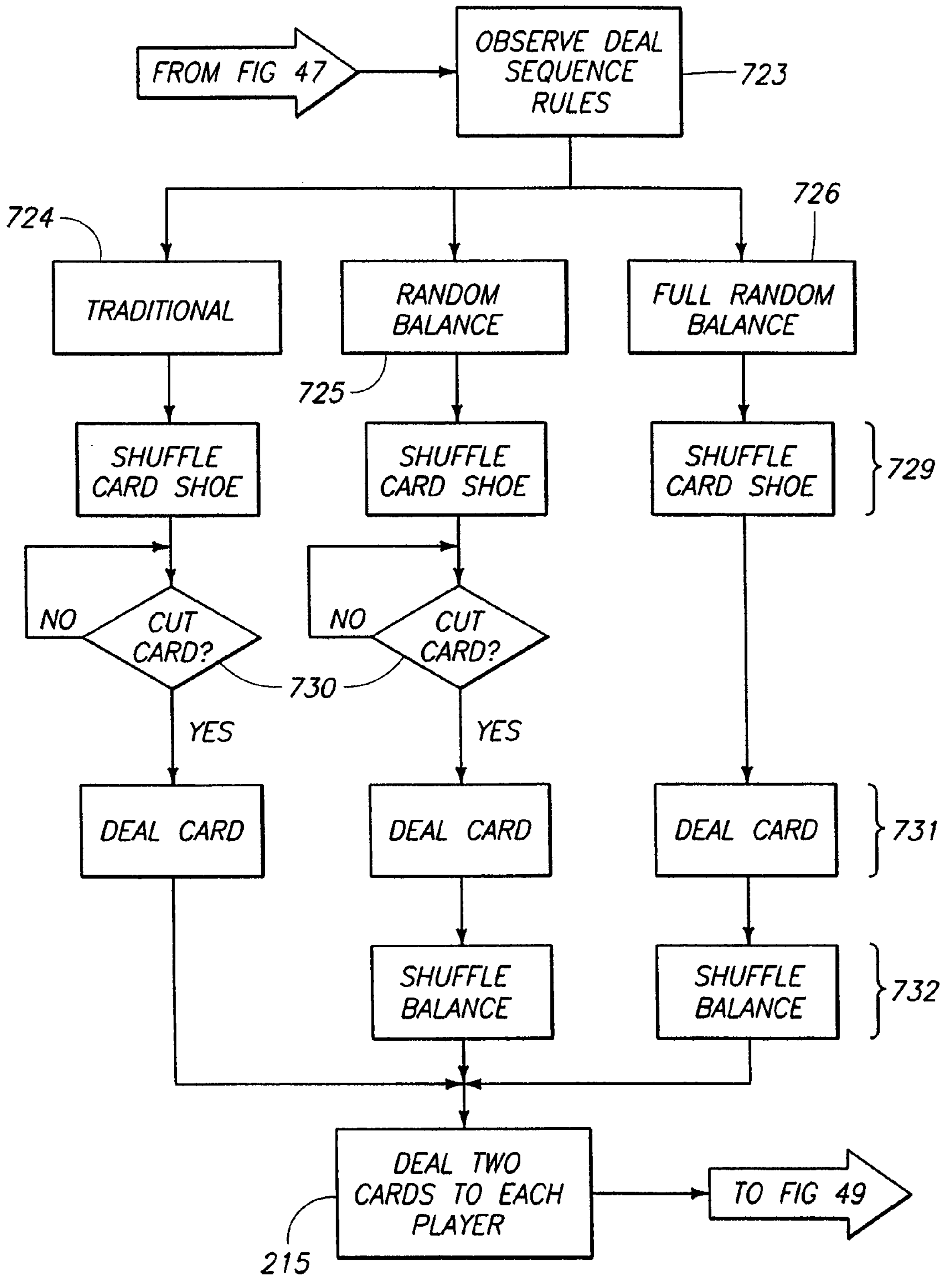
FIG. 48 is a second flow diagram showing another portion of the main operational flow scheme which is employed in the gaming system of FIG. 40.

FIGS. 47-49 illustrate diagrammatically the main logic loop employed by the game system. Particular aspects will now be further explained.

1.1 System Initializes 1.1.1 Initialize Sound Card, init_sound( ) (Not Illustrated)

Call init_sound( ) to load *.wav sound files into the sound resources buffer. The sound card hardware is also initialized for volume and tonal adjustments. System further reads condition of switches (not illustrated) which sense and checks for secured conditions of access doors forming part of the processing module enclosure, similar to enclosure 91. As implemented, the enclosure includes a main door 95 (FIG. 3) which condition is checked in step 708. There is also a separate keyboard port door (not illustrated) which is checked in step 714. If the keyboard port door is unsecured, then the system checks for rules editing. Each door is secured with a key lock and associated sensors (not shown) which allow the control system to determine the condition of each.

1.1.2 Rules Editor, pit_boss_ed( ).

Step 715 entails checking to see if the key switch 83 is activated to enter the rules editor and whether the password required by the system has been provided for security reasons.

The house rules are recalled or modified with a call to file pit_boss_ed( ). The following parameters may be adjusted:

number of splits allowed RULE_splits
how face cards are treated as a pair, RULE_face
the number of decks to be used, RULE_decks
sequence for dealing cards, RULE_deal
dealer's play on soft 17, RULE_soft
conditions affecting double down, RULE_double
surrender or not, RULE_surrender
placement of the hole card, RULE_hole The rules editor is discussed in greater detail in following outline section on the RULES EDITOR. If the dealer or pit boss have not elected to enter the rules editor, then the system starts a new game at step 717.

1.1.3 Random Number Generator (RNG) Seed Data, get_seed_data( )

This initialization step is illustrated at step 718 of FIG. 47. There are multiple numbers that are stored which hold the terminal state of the random number generator. These numbers are retrieved in a call to get_seed_data( ) which reads the data from disk. This provides for non-repetitive operation of the random number generator needed to prevent patterns from being discernable.

1.1.4 Game Process Tables, clear_the_deck( ), hand_in( ), make_card_tray( )

Information about the players and the cards that are dealt are contained in memory tables which are first cleared out before a new game. A call to clear_the_deck( ), to hand_in( ), and make_card_tray( ) achieve this function of the initialization. The casino or other house rules and settings are represented in steps 719 which can also be approached through the rules editor.

1.1.5 Graphics Files, transfer( )

The initialization process also advantageously includes loading many graphics images that are displayed during game-play are facilitated by a graphics engine which is initialized with a call to transfer( ).

1.2 Display House Logo, send( )

The house logo graphics is sent to the respective LCD displays.

1.3 Wait for Dealer to Press Deal Key, shoe( )

Step 298 determines the presence of a wager over the bet sensors 121 and indicates an interested player. When the dealer presses the deal key on the shoe, all wager sensors which detect a wager will communicate the information back to the rules program. Player positions 1-6 which have wagers over the sensor will be counted as active players. The system reads the keypad on control 80 in step 209.1 and make a decision in steps 209.2 and 209.3 indicating when the dealer presses the deal key 85. Virtual cards will then be dealt according to the deal sequence selected in the rules editor. In step 708.1 the system again checks the security of the controller doors and chooses between a service mode condition 720 or continued operation carrying onto the top of FIG. 48.

The top of FIG. 48 shows step 723 which loads information indicating whether the shuffler rule is traditional shuffle 724, random balance shuffle 725, or full random balance shuffle 726. Shuffling occurs according to the shuffler rule in steps 729. Cut card procedures 730 are used in the traditional and random balance shuffle rules. In such cut card procedure the display 81 preferably shows the stack with a cut point highlighted in an alternative color. The dealer controls the cut card position as specified by the player who is entitled to cut the deck. The display then shows the stack displaced laterally and the stack parts are reversed in a display graphics which simulates the physical cutting of a card stack.

1.4 Deal Two Cards, two_card_deal( )

Step 215 represents the operation of dealing or assigning the initial two cards of blackjack to each participant. Beginning with the first active player to the dealer's left hand, cards will be dealt one at a time until all players have received a card. The dealer then receives his first card, which may be face up or face down, depending on the house rules selection. The sequence is repeated until all active players hold two cards. One of the dealer's cards will be face down. A call to two_card_deal( ) accomplished this. In the preferred implementation of this action the speed of dealing is subject to adjustment of a speed parameter implemented when the rules are loaded. Thus the action can be relatively fast or slower as may be appreciated by different groups of participants.

1.5 Find BlackJack Hands, find_bj_hands( )

After the initial two cards are dealt, a search can be made for all hands that may hold blackjack. A status table can be updated with this information. The find blackjack hands sequence is illustrated in FIG. 29 and the description is not herein repeated.

1.6 Insurance Sequence, insure_seq( )

If the dealer's face card is an ACE, insurance is offered at this time. This is represented in FIG. 49 by step 239. Wagers placed over the insurance sensor will be read and recorded in step 453. A security step of checking doors open 708.1 is advantageously included thereafter. Following the security check, the dealer control key pad is checked in step 735 to see if the dealer has controlled to instruct further progress of the game by depressing the deal key 85 in step 736. Collection of the insurance bets is shown in step 737.

1.7 Dealer Holds BlackJack find_bj_hands( )

If the dealer does hold BJ as determined by step 738, the finish sequence 739 is entered wherein all active hands are compared to the dealer's. Any hand which also holds blackjack (BJ) is determined to be a PUSH. All others are NO WIN, 1.8 Play Hands Sequence, two_card_play_seq( )

Figure 50:
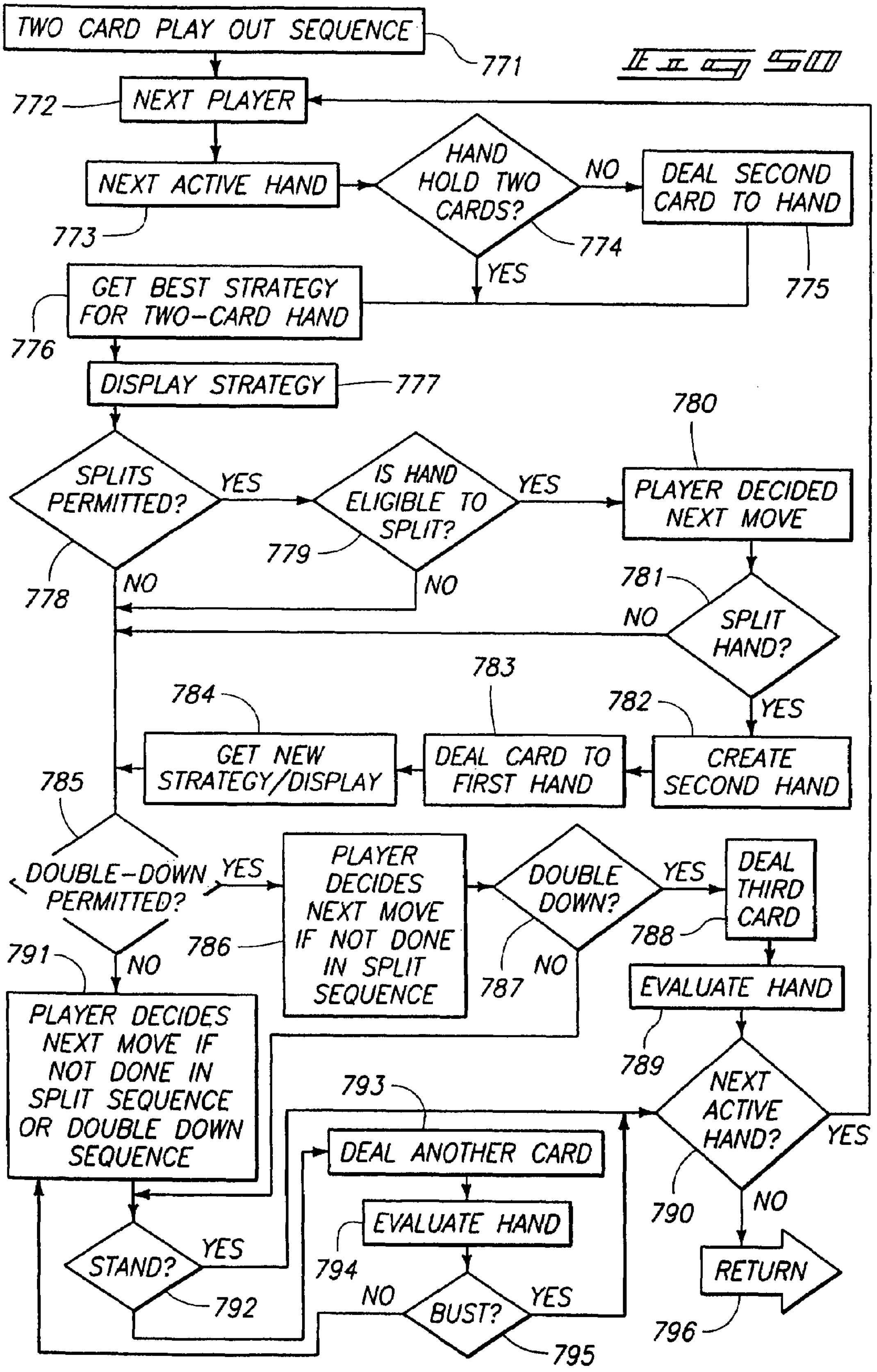
FIG. 50 is a fourth flow diagram showing a two card play sequence portion used in the operational flow scheme employed in the gaming system of FIG. 40.

FIGS. 49 and 50 show a preferred two card play out sequence. In the event the dealer does not have blackjack, normal play is resumed at step 740 and the next player decides his or her move. This is implemented by a reading step 741 which reads the conditions of the dealer control keys 83 and 85-89.

A call to two_card_play_seq( ) begins the cycle through which all active hands are played out as assessed by step 747. This has a beginning with the first active hand to the dealer's left. Additional hands are recognized in step 748. Through this cycle split hands are created from pairs of like cards, depending upon house rules. Double down is a choice a player may have, depending on house rules. A player may hit or stand as they like. These options are generally shown at step 746 of FIG. 49.

FIG. 50 shows at step 772 consideration of the next active player to allow play out of this sequence. Step 773 considers the next hand and decision block 774 branches achieve dealing of both cards via step 775. A suggested best strategy is produced as represented by step 776. The strategy is displayed at step 777. The call to strategy( ), step 776, returns a message code which becomes displayed as the most appropriate strategy with respect to applicable house rules and hand content. Strategies are calculated upon the dealer's face card and the hard/soft count of the active hand. A recommended strategy will preferably be displayed on the active player's lower right screen.

Splits are permitted or not permitted as the rules define. If permitted, then step 779 determines whether the hand is eligible for splitting by have a pair. The player is presented with the decision in step 780 and the input response is represented by step 781. If split then the system creates the second hand in step 782 and deals a first card to the first of the split hands in step 783. Reconsideration and revised strategy information is made and then displayed as illustrated by step 784.

FIG. 50 also shows the possible action of allowing a player to double-down are represented by step 785 and subsequent steps. This is covered in greater detail below.

1.9 Play Dealer Sequence, play_dlr_seq( )

When all active player hands are played out, a call to play_dlr_seq( ) will begin the cycle through which the dealer draws cards until a hard count of 17 is reached. Whether he hits on a soft-17 is set in the rules table.

1.10 Finish Sequence, finish_seq( )

The final win/lose determination is made here against the hard/soft counts of each active hand at shown at step 739 with respect to the dealer's. A call to finish_seq( ) performs this process.

1.11 Cut Card Reached, shuffle_tray( ).

There will always be enough cards in the deck to complete a game after the cut-card is located. When a game has completed and the cut card was located during play, a reshuffling will be done with a call to shuffle_tray( ). This is illustrated at steps 730-732.

1.12 Update Game Records, write_game_data( ), up_deck_ rec( )

When the game is finished, vital information about the game will be written to a disk file and stored. A call to up_deck_rec( ) writes the data. The state of the RNG is written to a separate file for future recall within the function write_game_data( ).

This is represented by step 751 of FIG. 49.

2. Random Number Generator 2.1 RNG Engines

Step 718 can be performed by two RNG's which are employed in the production of random numbers. The first generator is an ANSII standard function that is resident with the compiler. It is a pseudorandom generator which yields 32-bit integers. The second generator comes from George Marsaglia at Florida State University math department, and is known as The Mother of All Random Number Generators, or "Mother" for short. It returns 64-bit random numbers.

The 32-bit generator is provided a chaotically produced seed in order to return a randomly generated seed for "Mother." The second seed is fed once to "Mother" and from that time onward the generator is always running on a set of numbers saved from game to game.

2.2 Seeding

A primary seed is obtained with a call to init_seed( ) when the software is initially powered up. Here, a 32-bit unsigned number is allowed to increment through a modulo-32-bit cycle until a key is pressed. The state of this variable, a_seed, is sent to the 32-bit RNG as a seed, and a random number is produced, b_seed. The variable, b_seed, is sent to "Mother," from which a dual ten element array is constructed. The array contains state data for which new random numbers are generated. The array contents are different with each new number.

2.3 Saving the State of the RNG

Following each game, the dual ten-element arrays are saved in a file write_game_data along with the initial seed value. When a new game is initializing, the file is read and the array values are reinstated into Mother. The RNG then proceeds as if it had never been shut down.

3. Card Tray

A serial card tray is built at the start of each new game series as illustrated by step 723. The tray size is determined by the number of decks specified in the house rules settings. To fill the tray, a call is first made to make_card_tray( ). Within this function the RNG is queried for new cards, the conditions being that acceptable card numbers cannot be 0 or any number greater than 52. Also, a card number (1-52) may be used only up to the number of decks that are allowed. For example, if 12 decks are used, the card number 13 may be used only 12 times while filling the array.

4. Shuffle Mechanism shuffle_tray( )

4.1 Deal Sequences

Three schemes are used for shuffling cards, depending on house rules setting variable RULE_deal.

4.2 Traditional

This scheme is illustrated by step 724 and emulates a randomly filled card tray which is continually shuffled until the deal/cut key is pressed by the dealer. After the key is pressed, cards are drawn sequentially through the tray. The tray is not shuffled again until the cut card is located. The mechanism for shuffling swaps randomly selected pairs of cards from the tray. The process continues until the deal/cut key is pressed. A recorded sound file of shuffling cards is played through the speakers while the cards are shuffled.

4.3 Random Balance

This scheme is shown by step 725. The card tray is filled once, as with the traditional scheme, but with a random balance shuffling scheme all cards following the drawn card are shuffled every time a card is drawn. Cards are drawn sequentially through the tray, however with each drawing the balance of cards is shuffled by swapping randomly selected cards. While a player waits to decide his next move, the deck is shuffled. A shuffle sound file is played while he decides.

4.4 Full Random Balance

This scheme is shown by step 726. The card tray is filled once, as with the traditional scheme, but with a full random balance shuffling scheme the entire tray is shuffled every time a card is drawn. Cards are drawn randomly from the tray. While a player waits to decide his next move, the deck is shuffled. A shuffle sound file is played while he decides. This scheme precludes the need for a cut card.

5. Deal Sequences card_select( )

5.1 Traditional

Cards are drawn from the card tray sequentially through the deck as illustrated by steps 731. An index, card_tray_indx, is incremented for each card drawn from the tray, card_tray [card_tray_indx]. When the cut card is encountered the tray will be shuffled at the close of the current game.

5.2 Random Balance

Cards are drawn from the card tray sequentially through the deck. An index, card_tray_indx, is incremented for each card drawn from the tray, card_tray[card_tray_indx]. When the cut card is encountered the tray will be shuffled at the close of the current game. The balance of cards following the currently selected card are shuffled while a player waits to decide his next move.

5.3 Full Random Balance

Cards are drawn randomly from the domain of cards in the card tray. With each card that is drawn, the entire tray of cards is shuffled.

6. Play Hands Sequence two_card_play_seq( )

6.1 Overview

The two card play out sequence is shown starting at step 771 of FIG. 50 in greater detail. Beginning with the first active player to the dealer's left, each player is processed by step 772 by active hand numbers 773. For each active player there will be at least one active hand, referred to as the base_hand. Should a hand split at step 781, the number of active hands per player could number as many splits as are allowed plus one. For example, if three splits are permitted by house rules, up to four hands could be played out by one active player. All hands are played in order, starting with the leftmost hand from the dealer. A call to two_card_play_seq( ) begins the sequence.

6.2 Data Structures

Status information about the players and their hands are contained in a structure:

p_info[player].status[hand_num]

The record of cards dealt to each hand is contained in:

P_info[player].card[hand_num]

Both hard and soft count is held for each hand in:

P_info[player].count[type][hand_num]

See section 12.0 for a detailed description of the data structure.

6.3 Sequence

For each active hand, the sequence begins with two cards having been dealt to the base hand as indicated by steps 774 and 775. The hand is evaluated at step 776 and the most appropriate strategy is returned following a call to strategy( ). The strategy is calculated against the dealer's face-up card and the player's soft and hard count. The rules table is consulted before a strategy is finally returned. Thus, if a hand holds a pair and a split would otherwise be recommended, a maximum allowed split count of zero would preclude the recommended strategy of splitting. Hit or stand might be recommended instead. The strategy is sent to the player's screen and displayed graphically. Through the course of play, the player may choose to split his hand, double-down, hit, or stand. If the hand holds only one card, the result of a split, a second card is automatically dealt.

6.4 Split Hands split_seq( )

If the hand holds a pair of like cards and the player has not exceeded the allowable limit of splits, then a split sequence is entered at step 778 with a call to split_seq( ). In this sequence the player may choose to split his hand step, double-down at step 787, hit or stand at step 792. This general decision is also represented at steps 747 and 746 of FIG. 49. Following his decision, the hand is re-evaluated at step 794 and a new strategy is formulated and displayed. The call to the splits function returns with information about his decision. If double-down is not chosen at step 787, the sequence will branch around the double-down option, offered next.

6.5 Double Down double_down( )

If the hand satisfies the restrictions for a double-down and the player chooses to double-down, a call to double_down( ) will enter that sequence. A third card is automatically dealt the hand at step 788, the hand is evaluated at step 789, and the sequence terminates at step 790. The next active hand is then played out starting bock at step 772.

6.6 Hit/Stand Loop Within two_card_play( )

Provided the hand is active, it has not busted as determined at step 795, and double-down was not chosen, a loop is entered at step 791 that allows the player to accept hits or to stand at step 792. The loop is terminated when the hand either busts or the player chooses to stand. Following each hit, a call is made to deal_card_seq( ) wherein a card is drawn from the tray. Next, a call to evaluate( ) computes both hard and soft count for the hand. The count and card type are sent to the active player's display. For every decision, a new strategy is formulated and displayed until the hand terminates.

6.7 Exit from Loop

The sequence of playing out active hands terminates when the last active hand has been played out at step 796. A message signaling the terminus is sent to the graphics module with a call to send( ). Control returns to the main( ) function.

7. Split Sequence split_seq( )

7.1 Entry Test

When the split sequence is entered at step 778 with a call to split_seq( ), a test determines whether a hand may be split. A pair of like cards must first be acknowledged. House rules govern the pairing of face cards. If all face cards are equal to 10, (RULE_face=0) then any pair of face cards is considered a pair. Conversely, if only like face cards are a pair (RULE_face=1), then, for example, only two Jacks or two Queens can enable a split. A second test 779 examines the number of splits already active. If the count does not exceed house limits, as set in RULE_splits, then the player may choose to split his hand. A final test is that variable repeat is 1; a choice not to split resets it. His choices at this point are split, double-down, hit, stand. If split is chosen, then the sequence is entered according to the following test for splits.

The Boolean test for splits is:

$$SPLIT=(E\cdot I\cdot B)\cdot(\overline{A}+A\cdot D)\cdot(K+\overline{C}+J)\cdot(\overline{G}+G\cdot H))$$

where:

| | | |
|---|---|---|
| A | RULE__face = 1 | ; like face cards only |
| B | Card One Value = Card Two Value | ; the pair has equal face value |
| C | if(card__one__val == 1 | ; first card is an ACE |
| D | Card One Type = Card Two Type | ; the pair has equal type |
| E | num__splits < RULE__splits | ; the hand may split again |
| G | RULE__splt__10 = 0 | ; pairs of 10's may NOT split |
| H | Card One is not 10 | ; |
| I | if(card__cnt == 2 | ; hand holds two cards |
| J | if[player]].num__splits == 0 | ; hand can not have split |
| K | !RULE__splt__ACES | ; split only one pair of ACES |

7.2 Sequence

The split count for the player is first incremented, p_info [player].num_splits. The top card is moved to the dealer's left. A new card is dealt to the card on the left. This pair remains hand 0, while the single card on the right becomes hand 1. A new strategy for hand 0 is formulated and returned to the calling function, two_card_play_seq( ). The hand is played out in two_card_play_seq( ), and when the next hand becomes active, hand 1, a second card is dealt. If this hand also holds a pair, the split sequence is entered again.

Hand 1 is dealt a second card at step 783 and the hand is thereafter played out. This process continues until further splits are prevented and all hands are played out.

7.3 Algorithm $S$=split_num, $N$=hand_num(of the hand that is splitting), $X=S-N-1$ The algorithm for creating new hand is:

[hand_num][card_pos]: for($i$=0;$i$<$x$;$i$++){[$s-i$][0]=[$s-(i+1)$][0]}

Always: [N+1][0]=[N][1]; new hand, card 0 receives old hand card 1

Level H0,S0: In the example above, hand 0 holds a pair, A1,A2. No splits have formed yet, so S=0. N (hand #)=0, and the variable X=S−N−1; X=−1. Card 0 of the pair is A1, card 1 is A2.

Level H0,H1,S1: The pair A1,A2 is split, A1 receiving new card A3, and A2 moving to the right to form H1. Split becomes S1, N=0 (hand0 is splitting), and X=1−0−1=0. The algorithm loop:

for($i$=0;$i$<$X$;$i$++)moves card[$S-(i+1)$][0]->card[$S-i$][0]; since $X$=0, no action is taken.

For each split, card[N][1]->card[N+1][0], so, card[H0][1]->card[H1][0]; card A2 becomes H1C0, and card A1 remains in hand 0 as card 0;

Level H0,H1,H2,H3,S3: The pair A2,A4 has been split so that four hands (H0-H3) are formed. As this occurred, S=3, N=2, X=S−N−1=0. Note that since hand 2 is splitting again, N=2. Now the loop is taken:

for(i=0;i<X;i++) moves card[S−(i+1)][0]->card[S−i][0]; Since X=0, this loop is not taken. Only the mandatory exchange to the new hand is executed: For each split, card[N][1]->card[N+1][0], so, card[H2][1]->card[H3][0]; card A2 becomes H2C0, and card A1 remains in hand 0 as card 0. Card A3 remains as card 0 of hand 1, and card A4 become new card0 of hand 3. Even though card A5 was dealt to hand 2, no more splits are possible since the maximum is reached.

The process continues in this fashion.

8. Double Down Action 8.1 Overview

With a call to double_down( ) from two_card_play( ), is represented by step 785 which determines whether such a play is permitted under the rules of play. A player decision to double down is first qualified by step 786 and then implemented in step 787. The option to double-down is granted by permission where house rules govern the qualifying hand. The common qualifier is that the hand hold only two cards. When permission is granted, the player's motion to double-down is received by the dealer and step 788 results in issuing a third card. The hand is evaluated at step 789 and flow proceeds to the next active hand at step 790. If the hand was previously split, house rules may prevent a double-down. The governing rules are summarized below.

8.2 Any Two-Card Hand

If the card count for the current active hand is two permission is granted.

8.3 Hard Two-Card Hand Without Aces

If the hand holds two cards, and neither card is an ace, permission is granted.

8.4 9, 10, 11 Hands

If the hand holds two cards and the hard/soft count is 9, 10, or 11, permission is granted.

8.5 10,11 Hands

If the hand holds two cards and the hard/soft count is 10 or 11, permission is granted.

8.6 11 Hand Only

If the hand holds two cards and the hard/soft count is 11, permission is granted.

8.7 Return from Function

The function is passed not only player/hand data, but previous decision codes made in two_card_play( ) as well. For example, if the hand had previously split and the new hand wished to double-down, that decision is passed from split_seq( ) back to two_card_play( ), and on into double_down( ) at step 785. If permission is granted in double_down( ), then a third card is dealt. After action is taken in double_down( ), the decision code is passed back to the calling function, two_card_play. If a double-down was taken, the hand terminates in two_card_play( ). Otherwise, the hand is played out.

9. Play Dealer Sequence play_dlr_seq( )

Figure 51:
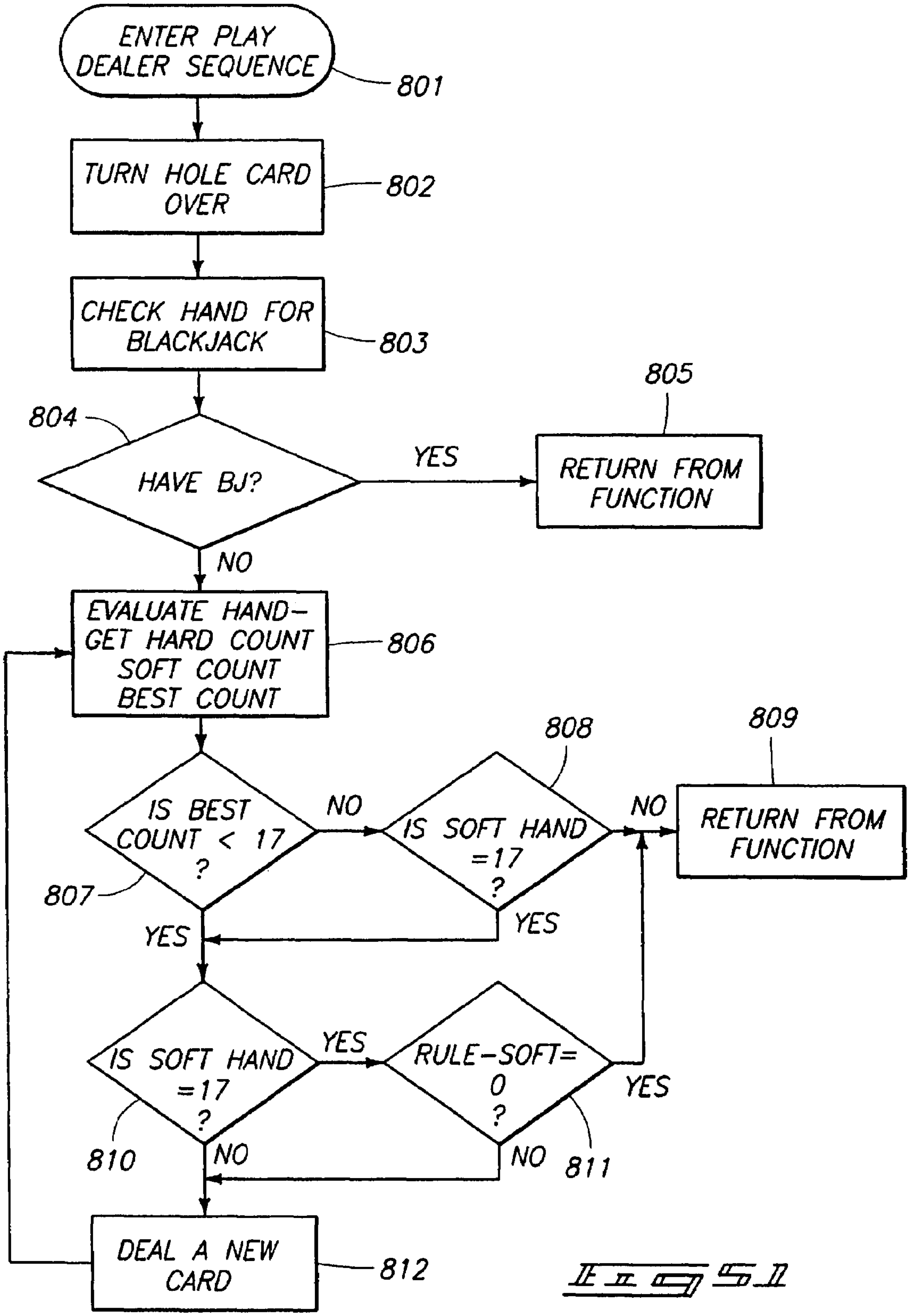
FIG. 51 is a fifth flow diagram showing a dealer play sequence portion used in the operational flow scheme employed in the gaming system of FIG. 40.

This sequence is illustrated by FIG. 51 starting at step 801. The hold card is turned over in step 802.

9.1 Dealer Has BlackJack

If the dealer has a blackjack as checked by step 803, then there is no need to continue and step 804 branches action to 805 and the game is returned to scan winners step 750 of FIG. 49. The dealer's status with a blackjack causes the game to proceeds to the finish sequence shown by steps 750, recording game data in step 751 and preparing for the next game in step 752.

9.2 Evaluate Dealer Hand

A call to evaluate( ) the dealer hand at step 806 determines both hard and soft count for the dealer's two-card hand. Further decisions are based upon this evaluation which is accomplished as illustrated by steps 807,808,809,810, and 811.

9.3 Hard Count Greater Than 16

If the dealer's hard count exceeds 16 he must stand. If the hard count is less than 16, a play loop is entered.

9.4 Play Out Loop

The loop exits when the hard count exceeds 16. If the dealer's hand holds a soft 17, house rules stored in variable RULE_soft determine whether he hits or stands. If he stands on a soft 17, the loop exits and the sequence terminates. If he hits on a soft 17, a card is dealt at step 812 and the hand is re-evaluated by step 806.

If the hand is not soft, cards will be dealt until the hard count exceeds 16, at which point the loop exits at step 809. Play proceeds to the finish sequence 749 et seq.

10. Find Blackjack Hands find_bj_hands( )

Following the two-card-deal sequence, a call to find_bj_hands( ) examines each active hand for the presence of an ace and a 10 or a face card. Any player that holds a BJ receives a status code "BJ" for that hand. This status is different than an ACTIVE status which is necessary for processing through the two-card-deal sequence.

11. Finish Sequence finish_seq( )

11.1 Hole Card hole_card( )

The first step in this sequence is to reveal the dealer's hole card with a call to hole_card( ) at step 802. If RULE_hole is either first or second settings, then the hole card will be turned over. If, however, both cards are placed face up (HOLE_card=2), then no action is taken.

11.2 Scan Players scan_players( )

A call to scan_players( ) starts the process of translating active hands into final score determinations at step 739. If the hand status is BUSTED, the final score is BUSTED. If the hand did not bust, the hand's best count is compared to the dealer's best hand. If the dealer's is better, the hand is NO WIN. If the hand beats the dealer's, it is WIN. If the hand ties the dealer's, the score is a PUSH. If the hand is a BJ and the dealer's is not, the player receives BJ; if the dealer also has BJ, the hand is a PUSH.

11.3 Display Score

The final determination is sent to the graphics engine which displays the appropriate border and WIN/LOSE graphic for the hand.

12. Strategy Table 12.1 Considerations

Before an appropriate strategy can be formulated, several factors must be considered. They are listed below, and each pertains to the player and his current hand information:

- card count; how many cards have been dealt to the current hand
- number of splits; how many times has the player split his hand
- card one value; what is the value of the first card in the hand
- card two value; what is the value of the second card in the hand
- dealer's face card value 12.2 Table 1: Ordinary Hands that are not Pairs Nor Hold an Ace $$T1=[(C1\neq 1)\cdot(C2\neq 1)+(\text{CARDcnt}>2)]\cdot[(C1\neq C2)+(\text{NUMsplits}+1>\text{RULEsplits})]+[(C1=1)\cdot(C2=1)\cdot(\text{NUMsplits}+1>\text{RULEsplits})+(\text{CARDcnt}>2)]$$

In order to locate a strategy here, several conditions must be true:

a. Card One must not equal Card Two, unless no more splits are permitted or if card count is >2 b. Neither Card One nor Card Two may be an ACE unless the card count is more than two. First, the better count of the hard/soft hands is computed. The column is found by subtracting 4 from the hand count: COL=COUNT−4. Second, the row is found by subtracting one from the dealer's face card: ROW=dlrFACE−1. Then, table 1 is indexed and the proper code is retrieved. See the tables below.

12.3 Table 2: Two Card Hands that Hold an ACE $$T2=(\text{CARDcnt}<3)\cdot[(C1\neq C2)\cdot[(C1=1)+(C2=1)]$$

Go here if the card count is two, and one of the cards is an ACE but not both. The column index is taken from the card that is not an ACE. The index=COL=card val-2. If the request for a strategy originates within the HIT/STAND loop of two_card_play_seq( ), and the strategy is found to be 2 (double-down), the strategy will be modified to HIT. The row index is found by subtracting one from the dealer's face card: ROW=dlrFACE−1.

12.4 Table 3: Two Card Hands That Qualify as a Pair $$T3=(\text{CARDcnt}<3)\cdot[(C1=C2)\cdot(\text{NUMsplits}<\text{RULEsplits})]$$

For this table to be used, the card count must equal two, the two cards must be like values (determined by house rule RULE_face_cards), and additional splits must be permitted. The column index is calculated by subtracting 1 from the value of one of the cards: COL=val−1. The row is found by subtracting one from the dealer's face card: ROW=dlrFACE−1.

12.5 Strategy Table Codes

The cells of the tables hold codes that indicate decision moves. The codes are: H=hit, S=stand, D=double, P=split

TABLE 1

Default Table
PLAYER (across top)

| D | P: 4 | 5 | 6 | 7 | 8 | 9 | 10 | 11 | 12 | 13 | 14 | 15 | 16 | 17 | 18 | 19 | 20 | 21 |
|---|---|---|---|---|---|---|---|---|---|---|---|---|---|---|---|---|---|---|
| A | H | H | H | H | H | H | H | H | H | H | H | H | H | S | S | S | S | S |
| 2 | H | H | H | H | H | H | D | D | H | S | S | S | S | S | S | S | S | S |
| 3 | H | H | H | H | H | D | D | D | H | S | S | S | S | S | S | S | S | S |
| 4 | H | H | H | H | H | D | D | D | S | S | S | S | S | S | S | S | S | S |
| 5 | H | H | H | H | H | D | D | D | S | S | S | S | S | S | S | S | S | S |
| 6 | H | H | H | H | H | D | D | D | S | S | S | S | S | S | S | S | S | S |
| 7 | H | H | H | H | H | H | D | D | H | H | H | H | H | S | S | S | S | S |
| 8 | H | H | H | H | H | H | D | D | H | H | H | H | H | S | S | S | S | S |
| 9 | H | H | H | H | H | H | D | D | H | H | H | H | H | S | S | S | S | S |
| 10 | H | H | H | H | H | H | H | D | H | H | H | H | H | S | S | S | S | S |

TABLE 2

ACE-Hand Table
PLAYER (across top)

| D | P: A, 2 | A, 3 | A, 4 | A, 5 | A, 6 | A, 7 | A, 8 | A, 9 | A, 10 |
|---|---|---|---|---|---|---|---|---|---|
| A | H | H | H | H | H | H | S | S | S |
| 2 | H | H | H | H | H | S | S | S | S |
| 3 | H | H | H | H | D | D | S | S | S |
| 4 | H | H | D | D | D | D | S | S | S |
| 5 | D | D | D | D | D | D | S | S | S |
| 6 | D | D | D | D | D | D | S | S | S |
| 7 | H | H | H | H | H | S | S | S | S |
| 8 | H | H | H | H | H | S | S | S | S |
| 9 | H | H | H | H | H | H | S | S | S |
| 10 | H | H | H | H | H | H | S | S | S |

TABLE 3

Splits Table
PLAYER (across top)

| D | P: A, A | 2, 2 | 3, 3 | 4, 4 | 5, 5 | 6, 6 | 7, 7 | 8, 8 | 9, 9 | 10, 10 |
|---|---|---|---|---|---|---|---|---|---|---|
| A | P | H | H | H | H | H | H | P | S | S |
| 2 | P | H | H | H | D | H | P | P | P | S |
| 3 | P | H | H | H | D | P | P | P | P | S |
| 4 | P | P | P | H | D | P | P | P | P | S |
| 5 | P | P | P | H | D | P | P | P | P | S |
| 6 | P | P | P | H | D | P | P | P | P | S |
| 7 | P | P | P | H | D | H | P | P | S | S |
| 8 | P | H | H | H | D | H | H | P | P | S |
| 9 | P | H | H | H | D | H | H | P | P | S |
| 10 | P | H | H | H | H | H | H | P | S | S |

13. Player Hand Information

Information about each player position and each active hand is maintained in a structure p_info[player].

13.1 Structure: p_info[player]

The typedef below shows the structure of p_info:

```
typedef struct
{
int card[RULE__splits][MAX__HAND]; // sequence of played cards
int num__splits;    // # times hand split < RULE__splits
int num__cards[RULE__splits];    // # cards in each split
int count[3][MAX__HAND];    // hand count[0] hard,[1] soft, [3]best
int status[RULE__splits];
// 0=no player, 1=active, 2=bust 3= card dealt face down 4=two cards
face down, 5=blackjack
} hand__info;
```

13.2 Sub-Level: card[RULE_splits][MAX_HAND]

The two fields are indexed by variables: card[hand_num][card_hold]. This sub-level contains a record of all the cards dealt to a [player]'s hands. The number of hands is limited by RULE_splits, as set in the house rules.

A particular hand is pointed to by hand_num. For each hand, a maximum of MAX_HAND cards may be dealt to that hand, currently set at 11. A discrete card is indexed by card_num. For example, p_info[3].card[0][5]=4 says that player 3's base hand(0) holds an ACE(4) in card position 5.

13.3 Sub-Level: num_splits

This is a simple integer that indicates how many times [player]'s hand has split.

13.4 Sub-Level: num_cards[RULE_splits]

This array holds the quantity of cards that has been dealt to each hand of an active player. The number of hands is limited by RULE_split, and indexed by num_cards[hand_num]. For example, P_info[2].num_cards[2]=0

Indicates that player 2's hand #2 holds no cards.

13.5 Sub-Level: count[COUNT_TYPE][RULE_splits]

A [player]'s hand can have a soft count and a hard count if ACEs are present. The indices into [COUNT_TYPE] are: 0=HARD, 1=SOFT, 2=BEST (the better of HARD or SOFT). The field [RULE_splits] is indexed by [hand_num] which points to a specific hand. For example:

P_info[5].count[1][0]=17

This indicates that player 5's base hand (0) holds a soft 17.

13.6 Sub-Level: status[RULE_splits]

Every player position 1-6 (where 0 is the dealer) has at least one hand assigned by default, hand 0 (the base hand.) As a game progresses every hand is assigned a status which is used to identify decisions for which choices may be possible. Discrete hands are indexed by status[hand_num]. The status codes are listed:

INACTIVE 0
BUST 1
ACTIVE 2
SPLIT_DONE 3
BLACKJACK 5
SURRENDER 6

13.7 Score Card

Final WIN/LOSE determination is registered in the array: score_card[MAX_PLAYERS][MAX_SPLITS+1]

The first field [MAX_PLAYERS] is indexed by player, and points to a discrete player. The second field, [MAX_SPLITS+1], is indexed by hand_num, and points to a discrete hand. For each active hand, a score code is ultimately assigned, listed below:

IN_ACTIVE 2
DEALER_HAND 3
BJ 4
LOSE 5
WIN 6
PUSH 7
BUSTED 10

14. Card Calculation Card_calc( )

14.1 Hard Count

Any card may have an absolute face value from 1 to 10. Aces count as 1, and face cards are 10. Since there are four of every type in a deck, the range of card types progress in groups of four, beginning with ACES, which are 1-4. All ACES return a value of 1 when the argument ace_num>1. This yields a hard count.

14.2 Soft Count

When a soft count is desired, the first ACE counts as 11. The argument ace_num must be 1 in order for the function to return a value of 11 when the card type is 1-4. After a second ACE is encountered in card[hand_num][card_hold] the ACE count increments and subsequent calls to card_calc( ) will return a value of 1 for an ACE.

14.3 Card Type card_type( )

When house rules (RULE_face=1) require that pairs of face cards be of similar type, a call to card_type( ) will return a character that corresponds with the card type. For example, a queen is 'Q' and a 10 is 'T'.

Record of Game Data 15.1 Game State Data write_game_data( ), get_seed_data( ), get_rules_data( )

State information about the last played game is written/read from/to a ram-disk file, GAME_SET.DAT. The function that reads the file is get_seed_data( ) and get_rules_data( ). When a game session concludes, the file is written by a call to write_game data( ). Three categories of data is written to this file 1. Initial seed value; once obtained, it should never change unless the file is corrupted
2. RNG (Mother) state tables; two ten-element arrays of unsigned 32-bit numbers hold the terminal state of the RNG from the last access of a number
3. House Rules; the last revision or update to the house rules are kept on file.

15.1.1 Write Game Data write_game_data( )

Writes all the data to the file GAME_SET.DAT.

15.1.2 Get Seed Data get_seed_data( )

This function is called while initializing a new game. If the file GAME_SET.DAT cannot be opened or located, the user is prompted to provide a new start-up seed by pressing a keyboard key. After the seed is obtained it will be subsequently written back to this file. When present, a new seed is unnecessary, and the function proceeds to retrieve the internal state data for the dual ten-element arrays used within the RNG "Mother." The arrays mother1[10] and mother2[10] are filled with the same numbers they held before the machine was shut down the lost time.

15.1.3 Get House Rules get_rules_data( )

All of the house rules settings are stored in the file GAME_SET.DAT at the conclusion of a game session. To facilitate the pit-boss in reinstating these rules, they are read from file into the game settings and become the default rules. They may be altered in the rules editor (see pit_boss_ed( )). The parameter TABLE=0 from the above listing refers to which of the five tables were used as the basis for setting the current rules.

15.2 Game Hand History game_his( )

At the conclusion of every game, information pertaining to the hands that were actively played is updated in the file GAME_OVER.DAT. An example is printed below:

15.2.1 Version

The version of source code rules-21.cis found at the beginning. A short list of house rules governing the game are listed after GAME CHAR:. The number of games used to compile the data is given as well as the RNG used to select cards. The date upon which the game was played is printed.

15.2.2 Player/Card Data

Under GAME LOG, some total values are listed. Cards Dealt refers to the quantity of cards dealt to active hands, including the dealer's. Cards Rejected is a count of all the cards that did not qualify for the initial filling of the card tray. Cards Accessed is the sum of the two quantities above.

15.2.3 Card Histogram

The four arrays under CARD DEAL LOG: DISPLAY BY QTY DEALT indicate the distribution frequency of cards by card type, where type is a number from 1 to 52. This is repeated again, by percent usage.

15.2.4 Card Tray Data

The card tray from which cards are selected is built into an array whose is length is the number of decks times 52 cards. The first 52 cards of this initial tray are printed as "Card Tray Init." Throughout game play the card tray is shuffled, and the final state of this tray is printed for comparison as "Card Tray Final."

15.2.5 Card Troy Index

If either Traditional or Random Balance access to the card tray is used, an index is incremented with each access. The final state of the index is printed.

15.2.6 Player Hand Data

The sequence of cards dealt to each player is printed by card type.

16. RULES EDITOR pit_boss_ed( )

16.1 Pit Boss Ed 16.1.1 Initialize Rule Tables init_house_rules( )

This is the entry function into the module PIT_BOSS.C. Its first task is to initialize the house rules with a call to init_house_rules( ). House rules are either read from disk or they are generated from default table A.

16.1.2 Make the Exec Screen

The executive screen is built with a call to mak_exec_scrn ( ). This becomes the pit-boss's graphical entry point to the game session. The list of items presented allows him to inspect the current default rules settings or make changes to any of five pre-set tables. This choice will vector to the functions set_table( ) and edit_table( ) where changes to any of the tables is possible. He may also to choose to dump data files to an I/O port or make adjustments to physical settings, such as speed or light sensor readings. If a brief review of instructions and overview of the software is necessary, he may call up an on-line document from item Read More About The Instructions. When he is ready to commence with the game session he selects EXIT Screen Now. This restores the default graphics mode and frees up any allocated memory. The editor exits and the rules portion of the game is entered.

16.2 Init House Rules

If the file GAME_SET.DAT can be found and read, all of the house rules will be read into the structure rule_save (below.) The table pointer, tab_indx, is set to point at the last table used to set the rules. If the file cannot be found the default settings are taken from Table A with the equate of variable: tab_indx=TAB_A.

```
struct
  {
int num__splits;  // this sets MAX__SPLITS, must be <= 3
int dbl__splt;    // permission to split on double-down
int splt__10      // permission to split pairs of 10's
int splt__ACES    // 0 = no play out on split ACES; 1=play out hands
int face__cards;  // 0 = loose, 1 = strict
int num__decks;   // up to 12 allowed
int deal__seq;    // TRAD = 0; RAN__BAL = 1; FULL__RAN__BAL = 2
int soft__17;     // STAND__17 = 0; HIT__17 = 1
int double__down; // 2__CARD = 0; HARD = 1; 9__10__11 = 2;
10__11 = 2 11__ONLY = 4
int surrender;    // YES__SURR = 0; NO__SURR = 1
int hole__card;   // HOLE__FIRST =0; HOLE__SECOND = 1;
BOTH__UP = 2
     int game__table;      // points to table last used to define rules
     } r__table;
```

When the source of the rules has been identified the next task is to build a screen with graphics tools and then plug in the rule settings. A call to set_table( ) builds all but the settings portion of the screen. Before they are filled in, a working image of the screen is saved in buf_all_B[tab_indx] where tab_indx points to one of five tables that will be used to complete the settings column. In a field that is 640×480 pixels square, the buff_all_X images are advantageous arrayed from 50,50 to 590,425.

Next, an image of the complete screen is desired. This will be saved in the buffer buf_all_C[tab_indx]. At this time both of the above image are identical. The whole screen image is defined in an array from 0,0 to 640,480.

When the current house rules are to be inspected a specialized screen will be built from current settings.

The image is saved in a buffer buf_save_rules and when recalled will always display the current settings. A call to make_save_screen( ) will achieve this. Since there are five rules tables plus another current default table, a six-element array holds information regarding the initialization of these tables. A '1' indicates the table is done; '0' means it has not been built. Here, table_done[5]=1 completes the current rules table, and the program returns to pit_boss_ed( ).

16.3 Set Table Set_table( )

Use this function to construct a specific table A-E. The working interior is a space defined by an array between 50,50 and 590,425. The screen title is RULES TABLE X, where 'X' is a letter A-E. Three columns are headed with labels:

RULE TYPE DEFAULT SELECTED

The RULE TYPE column is filled in with the set of parameters for the house rules. For the DEFAULT settings that correspond with the indicated table A-E, a pair of tables, rule_table_opt[ ], rule_table_opt[ ] in pit_tab.h are indexed to fill text buffers buf_opt[0-7] with the correct default value. The option buffers are then written respectively beside each RULE TYPE parameter beneath DEFAULT.

For each RULE TYPE parameter an image box is created for the purpose of scrolling the list with a reverse-video box enclosing each item. These image buffers are buf_rule_A-G.

When the screen is built with two completed columns and three column headers, the screen image is saved in an image buffer, buf_all_A, which has no selected options under SELECTED. It is defined by an array between 50,50 and 590,425.

The two images, buf_all_A and buf_all_B hold identical information now. As the table's selected option column begins to fill up, buf_all_B will hold a running memory of the changes, whereas buf_all_A will remain empty beneath that column.

16.4 Edit Table edit_table( )

The purpose of this function is to complete the building of a table[tab_indx] by filling in the SELECTED column with either default values, or values saved in game_set.dat for this particular table. If default values are to be used, the function set def_rules (i.e. def_splits( )) will find the default values in tables rule_table_opt[ ], rule_table_opt[ ] and write them beneath the header SELECTED. When done, the working image is saved to image buffer buff_all_B[tab_indx]. Several hot keys are listed below the screen in order to save/revise the working screen. Key F1 allows the table to be edited. F2 accepts the current settings, and F3 restores any default settings that were changed. The screen exits upon the pressing of F2, after which the entire screen image is saved in buffer buf_all_C[tab_indx]. If the table requires editing, F1 will effect a call to edit_item( ) where items in the parameter list can now be changed.

16.5 Edit Item edit_item( )

16.5.1

A new set of hot keys are listed below the working screen in order to edit the screen. The up/down arrows will scroll the RULES column items by highlighting the selected item. A right-arrow key or a CR will cause that item to be opened for editing. If at any time the operator is satisfied with the settings, F2 will accept the screen and permit further choices. Following any change, the updated screen will be written to image buffer buf_all_B[tab_indx]. Prior to exiting the screen, the entire screen is saved to image buffer buf_all_C[tab_indx].

16.5.2

When a rule parameter in the RULES column is highlighted and waiting for action, control is passed to function go_edit( ) which serves key recognition and follow-through action upon edit_item( ). When the up/down arrow keys are pressed, an array which holds the eight items is either advanced or decremented in order to comply with the arrow. The counter up_it is always incrementing, and modulo-8 division provides a remainder which is used by the switch to index into the correct item. When the up-key is pressed, a small array up_it_next[which_ed] revalues the pointer, up_it to the prior element.

16.5.3

If the ESC key or the right arrow key are pressed, the highlighted item is to be edited. A return from go_edit( ) will enable the calling of the editing function for that discrete item. For example, to edit item NUMBER OF DECKS a call is made to ed_decks( ).

16.6 Edit Splits ed_splits( )

The number of splits allowed is set here. A dialogue box is first displayed in the SELECT column. Text "Type the number of splits:" is displayed. A conio.h function getch( ) is used to retrieve the typed character, which is done as soon as a character is typed (not entered.) A limit of 3 is imposed, and if the character '4' is typed, '3' will displayed. The choice above is stored into the rules structure rule_table[tab_indx].num_splits, where tab_indx points to one of the five tables A-E. The function returns to ed_item( ) where the rest of the column is redisplayed and the image buffer buf_all_B is updated for this table.

16.7 Edit Face Cards ed_face( )

Next, "Type face Split Options: (0) Loose, All Equal to 10 (1) strict, Pairs of like Face Only" is displayed. See Splits, sec. 7, for details about these options. When the user types a character '0' or '1' it is read and the full text selection is displayed. If an out-of-bounds character is typed, the default value for this table is used. This choice is stored into the rules structure rule_table[tab_indx].face_cards, where tab_indx points to one of the five tables A-E. The function returns to ed_item( ) where the rest of the column is redisplayed and the image buffer buf_all_B is updated for this table.

16.8 Edit Double-Down on Split ed_dbl_splt( )

This rule pertains to a split hand and the option of accepting "double-down" upon that hand. Where "(0) No" is selected, a d-down may not be played on a hand that has split. Text "Double-Down On Split Hand? (0)No (1)Yes" is displayed in the box. A single typed character completes the selection. If an out-of-bounds character is typed, the default value for this table is used. The choice is saved in rule_table[tab_indx].dbl_splt, where tab_indx points to one of the five tables A-E. The function returns to ed_item( ) where the rest of the column is redisplayed and the image buffer buf_all_B is updated for this table.

16.9 Edit Split 10 Pairs ed_splt__10( )

This rule pertains to a split hand and the option of splitting a pair of 10's. Here, house rule RULE_face applies (see sec. 16.7, above). A dialogue box is written with the text "Split '10' Value Hands? (0)No (1)Yes "A single typed character completes the selection. If an out-of-bounds character is typed, the default value for this table is used. The choice is saved in rule_table[tab_indx].splt__10, where tab_indx points to one of the five tables A-E. The function returns to ed_item( ) where the rest of the column is redisplayed and the image buffer buf_all_B is updated for this table.

16.10 Edit Split Aces ed_splt_ACES( )

This rule pertains to a split hand and the option of splitting a pair of ACEs. A dialogue box is written with the text "Play Out Split ACES? (0)No (1)Yes". If "(1)Yes" is selected, a pair of ACEs may be split and each new hand played out as normal. However, if "(0) No" is selected, then each ACE automatically becomes the first card of new hand H0 and H1, respectively, and a second card is dealt to each hand. Both hands are required to stand, and play proceeds to the next active player. A dialogue box is written with the text "Play Out Split ACES? (0)No (1)Yes", and a single typed character completes the selection. If an out-of-bounds character is typed, the default value for this table is used. The choice is saved in rule_table[tab_indx].splt_ACES, where tab_indx points to one of the five tables A-E. The function returns to ed_item( ) where the rest of the column is redisplayed and the image buffer buf_all_B is updated for this table.

16.11 Edit Decks ed_decks( )

Here the parameter that sets the number of decks in use is offered for edit. First, a dialogue box is displayed. Text "Number of Decks: (12MAX) (TYPE 2digits, or ENTER 1 digit)" is displayed. If a single digit quantity is used, the character must be entered. If a two-digit number is used, the entry is accepted upon typing the second digit. If an out-of-bounds character is typed, the default value for this table is used. Next, the full text selection is displayed The choice is saved in rule_table[tab_indx].num_decks, where tab_indx points to one of the five tables A-E. The function returns to ed_item( ) where the rest of the column is redisplayed and the image buffer buf_all_B is updated for this table.

16.12 Edit Deal Sequence ed_deal( )

Three options are offered for dealing cards: traditional, random balance, full random balance. First, the dialogue box is displayed.Text "Type Deal Sequence: (0) Traditional (1) Random Balance (2) Full Random Balance" is displayed in the box. A single typed character completes the selection. If an out-of-bounds character is typed, the default value for this table is used. The choice is saved in rule_table[tab_indx].deal_seq, where tab_indx points to one of the five tables A-E. The function returns to ed_item( ) where the rest of the column is redisplayed and the image buffer buf_all_B is updated for this table.

16.13 Edit Soft 17 ed_soft( )

When the dealer's hand is played out, his soft count may equal 17 if an ACE is present. House rules may permit a hit, or they may enforce a stand. The two choices are offered here. First, the dialogue box is built.

The text is displayed: "Type Dealer Soft 17: (0) Stand (1) Hit". A single typed character completes the selection. If an out-of-bounds character is typed, the default value for this table is used. Next, the full text selection is displayed. The choice is saved in rule_table[tab_indx].soft__17, where tab_indx points to one of the five tables A-E. The function returns to ed_item( ) where the rest of the column is redisplayed and the image buffer buf_all_B is updated for this table.

16.14 Edit Double Down Options ed_doub( )

This selection determines what restrictions apply to hands that wish to double-down.

2 Card Hands; any hand holding just two cards

Hard 2-Card Hands; the hand must have only two cards and neither can be an ACE 9, 10, 11 Hands; the hand count is nine, ten, or eleven 10,11 Hands; the hand count is ten or eleven 11 Hands only; the hand count must equal eleven Text is displayed: "Type Double Down Option: (0) 2 Card Hands (1) Hard 2-Card Hands (2) 9, 10, 11 Hands (3)10,11 Hands (4) 11 Hands Only". A single typed character completes the selection. If an out-of-bounds character is typed, the default value for this table is used. Next, the full text selection is displayed. The choice is saved in rule_table[tab_indx].double_down where tab_indx points to one of the five tables A-E. The function returns to ed_item( ) where the rest of the column is redisplayed and the image buffer buf_all_B is updated for this table.

16.15 Edit Surrender Options ed_surr( )

The choices here are binary. The house either permits or does not permit a surrender. The dialogue box is built. Text is displayed in the box: "Type Surrender Option: (0) None (1) Allowed". A single typed character completes the selection. If an out-of-bounds character is typed, the default value for this table is used. Next, the full text selection is displayed. The choice is saved in rule_table[tab_indx].surrender, where tab_indx points to one of the five tables A-E. The function returns to ed_item( ) where the rest of the column is redisplayed and the image buffer buf_all_B is updated for this table.

16.16 Edit Hole Card ed_hole( )

The dealer's hole card may appear first, second, or not at all. These choices are offered in this selection. First, the dialogue box is created. The text is displayed: "Type Hole Card Option: (0) Hole Card First (1) Hole Card Second (2) Both Cards Up". A single typed character completes the selection. If an out-of-bounds character is typed, the default value for this table is used. Next, the full text selection is displayed. The choice is saved in rule_table[tab_indx].hole_card, where tab_indx points to one of the five tables A-E. The function returns to ed_item( ) where the rest of the column is redisplayed and the image buffer buf_all_B is updated for this table.

16.17 Default Options def_splits . . . def_hole( )

These functions serve to initialize the rules structure rule_table[tab_indx].xxx_yyy with selections that originate either from a saved list of values located in file game_set.dat, or from tables located in file pit_tab.h. The variable source indicates which file is to be accessed. When source =1 and the table has not been initialized, consult file game_set.dat. If the table is initialized, use the recently entered values from rule_table[tab_indx]. When source =0 and the table is uninitialized, the default tables are used.

| SOURCE | TAB DONE | RETRIEVE FROM |
|---|---|---|
| 0 | 0 | Table: rule__table__dat (from pit__tab.h) |
| 0 | 1 | rule__table[tab__indx].xxxx (edited values) |
| 1 | X | File: saved values (from game__set.dat) |

16.18 Make the Save Screen make_save_scrn( )

The purpose of this function is to prepare an edited table's image for presentation when the user wishes to view all current house rules settings. For example, if table E was lost edited and accepted with keystroke F2, and the pit boss wished to see the rules currently in effect, he would choose "View Current Rules Table" from the executive menu. The screen heading "CURRENT HOUSE RULES" is displayed with all of the selections he made in table E. Until he edits another table, this will be the default list of house rules every time a new game session is commenced.

First, two portions of the table image are saved, as shown above. The full screen area is cleared and a new screen is created with the two image above placed within. After text headings and command lines are added, the entire image is saved to image buffer buff_save_rules.

16.19 Show Current Rules show_current_rules( )

When current rules settings that are in effect are to be viewed, this function which is called only from pit_boss_ed ( ) will display the image that has been saved in buf_save_rules. See sec. 15.14 for more information.

16.20 Free Memory free_mem( )

When graphics image are saved, large blocks of memory must be allocated. After the rules editor has been accessed and the game begins, the allocated is no longer needed. This function frees it up for other resources.

17. Compilation and Files

The following indicates compilation and files 17.1 Compiler

Watcom C/C++, Version 11

17.2 Source Files rules__21.c pit_boss.c transfer.c send.c bit_bit.c game_comm.c 17.3 Include Files 21_cnst.h pit_tab.h 21_type.h rules.h pit_boss.h 21_cnst.h 21_type.h rules.h cardsnd.h rule_tab.h sys_cnst.h grf_type.h grf_inc.h grf_prot.h sys_type.h sys_gibl.h sys_inc.h sys_prot.h 17.4 Libraries cardsend.lib fg32.lib fg32dpmi.lib 17.5 Files Necessary to Operate Game 17.5.1 game_his.dat This file holds records of the ten most recent games, including player win/lose status and card usage data.

17.5.2 game_set.dat

Start-up settings for the next game session are stored in this file, including the original seed for the RNG.

17.5.4 dos4GW.exe

An executable file that serves to access protected mode memory.

17.5.5 cardlib.snd

Several recorded sounds are stored in this file for use by the sound blaster card. Specifically, the sounds of shuffled cards and cards being dealt are saved here.

17.5.6 21play.exe

An executable file that runs the game.

18. Communications Module game_comm( )

18.1 General Description

This module performs a polled retrieval of serial data from a specified port, and transmits serial data via the same port. The port is connected to the game hardware interface PCB where the following information is collected and assembled into a ten-field data string:

Shoe switches (hit, stand, d-down, deal/cut, split)

Lock status

System status

Sensor data, up to 14 optical bet sensors

The port is operated at 19.2K baud without flow control. If the host returns an ACK the bet sensor will remain idle. If the host returns a NAK, the bet sensor will retransmit the data.

18.2 Received data string 18.2.1 Field One: Keypad Data

The first white-space deliniated field contains keypad data from the shoe. Valid keys are 1-16, where an active key sends a '1'. A string will be sent every time a valid key is pushed.

18.2.2 Field Two through Eight: Bet Sensor Data for Players 1 to 7, respectively. Each of the seven fields is coded as follows:

0=no insurance bet, no game bet

1=no insurance bet, game bet in place

2=insurance bet in place, no game bet

3=insurance bet in place, game bet in place

A new record will be sent every time a bet has changed.

18.2.3 Field Nine: System Status and Lock Data

Bit assignment for field 9.

```
tx_dat.a.switches = 0;
if (!RA4)        // Pit Boss game modify switch active
  tx_dat.a.switches += 1;
if (!RD0)        // Pit Boss power off switch active
  tx_dat.a.switches += 2;
if (RD1)    // Door interlock 2 - True - Inner door is open
  tx_dat.a.switches += 4;
if (RD2)    // Door interlock 1 - True - Outer door is open
  tx_dat.a.switches += 8;
if (RC5)    // Spare
  tx_dat.a.switches += 0x10;
if (Hz60)   // 1=60Hz 0=50Hz
  tx_dat.a.switches += 0x20;
if (sense_0_ok)   // True sensor 3,2 is above minimum value
  tx_dat.a.switches += 0x40;
if (sense_1_ok)   // True sensor 3,3 is above minimum value
  tx_dat.a.switches += 0x80;
```

Sensors 132 (above coded as 3,2 and 3,3) are ambient light sensors. Sense_0_ok and sense_1_ok will be set if minimum light levels were measured on these respective sensors during the bet light detection process. It is the responsibility of the host as to accept the reliability of the individual player bet sensors if there is a problem with either the ambient light sensors.

18.2.4 Field Ten: Check Sum

A simple 8-bit checksum over the first nine fields with no carry is computed and transmitted.

18.3 Received Data Structure

Incoming data is organized within game_com( ) into the following structure:

```
Struct bim{
        Byte keypad;
        Byte bet_status[7];
```

-continued

```
        Byte switches;
        Byte check_sum };
Union{
        Struct bim a;
        Byte packet[10];
        }; tx_dat;
```

For example, when shoe data is inspected the location tx_dat.a.keypad is examined.

18.4 Game_Comm game_com( )

When needed, calls to game_comm( ) are made from the rules module rules_21.c. Before the function is called, the port is initialized in a call to a Greenleaf CommLib function:

PortOpenGreenleafFast(COM2,19200L,'N',8,1)

The function game_comm( ) first looks to see if new data is in the received buffer of the serial port. If the buffer is not empty, the volume of data must exceed 20 bytes before the buffer is read. Next, a NAK is sent to the PCB for a retransmit of data. Then, a "c" is sent in order to calibrate the bet sensor. Finally, a function serial_parse( ) is called.

18.5 Serial Parse Serial_parse( )

The purpose of this function is to fill the data structure tx_dat.a.xxx with the received string. The string is first read into buffer rx_data. The data fields are parsed into tx_dat.a.xxx. The checksum is computed against the nine fields and is compared against the received checksum in field ten. If the two don't match, a NAK is sent requesting a retransmission of the data. If the transmission is valid, a ACK is sent instead.

18.6 Receive Data Rcv_data( )

This function works to retrieve each character in the transmission by calling a Greenleaf CommLib function ReadChar (port) Until a carriage return is found, the data is read into array rx_data[ ].

18.7 Send Data Send_data( )

This function serves to assemble a message string for transmission to the UART on the communications PCB. A Greenleaf CommLib function WriteString(port) handles the physical layer task of transmitting the data.

On power up (or any time the bet system is not responding) the Host will send a "c" to the bet sensor to calibrate the bet optics. The bet sensor will respond with an "ACK" if minimum light levels are present on all sensors. A "NAK" will be sent if those levels have not been attained. The following is the diagnostic output from the bet sensor when the following single character are sent from the host.

Ascii Character "d"

This display shows the raw analog data the 16 possible bet light sensors for one AC line cycle.

Values can range from 0 to 255.

```
aval00=141    // bet player 1
aval01=0      // insurance player 1
aval02=0      "
aval03=0      "
aval10=0      "
aval11=0      "
aval12=0      "
aval13=0      "
aval20=0      "
aval21=0      "
aval22=0      "
aval23=0      "
```

-continued

| | |
|---|---|
| aval30=0 | // bet player 7 |
| aval31=0 | // insurance player 7 |
| aval32=0 | // ambient light sensor 0 |
| aval33=152 | // ambient light sensor 1 |

Ascii Character "f"

This display shows the raw analog data the 16 possible bet light sensors for one to six AC line cycles. Values can range from 0 to 255 and 1 to 6 line cycles. The format is a-d val/line cycles.

The brighter the light aval00=140/1 aval01=1/6 aval02=0/6 aval03=0/6 aval10=0/6 aval11=0/6 aval12=0/6 aval13=0/6 aval20=0/6 aval21=0/6 aval22=0/6 aval23=0/6 aval30=1/6 aval31=0/6 aval32=0/6 aval33=151/1

Power Failure Recovery

Any interruption to the computer/hardware power supply that is sufficient in causing the computer to reset automatically result in the game rebooting into a replay mode. No user intervention is required to assist the replay mechanism. The game will immediately enter the replay mode and all data from the previous game that was interrupted will be recalled from non-volatile CMOS memory and fed into the (1) decision making engine, and the (2) card selection engine. The game will play automatically up to the player and card at which the power was lost.

When a new game is played vital data about the game is entered into holding buffers. With every state change in the game the buffers are written to NV-RAM, thus preserving the recent history of game state changes. A few of the important state changes that are necessary to replay the game are:

a) Active Players; when a game is replayed, only the active positions from the lost game are again active b) Shoe Decisions; all decisions that result in stand, double-down, hit, split actions originate in shoe switches, and are recorded serially as the game advances c) Card Selection; every card that is dealt to either a player or the dealer is drawn from an electronic card tray that is randomly filled during the shuffle/cut sequence. When a card is drawn, its number is recorded serially in a buffer d) Insurance Players; when a dealer shows an ACE, an insurance sequence is entered and any player who places an insurance bet is recorded in a buffer which is later saved to NV-RAM. This information is used during replay to accurately replay the insurance bet.

The active window during which the above data is recorded begins when the first card is dealt and ends after the dealer has played out his hand. If the power drops during the dealer's playout sequence, his cards will be restored to the point at which power went down. In any replay, after the last decision which was saved from the previous game is executed, all new cards will be drawn from a new card tray.

Further Alternative Embodiment Using Slot Symbols

Figure 52:
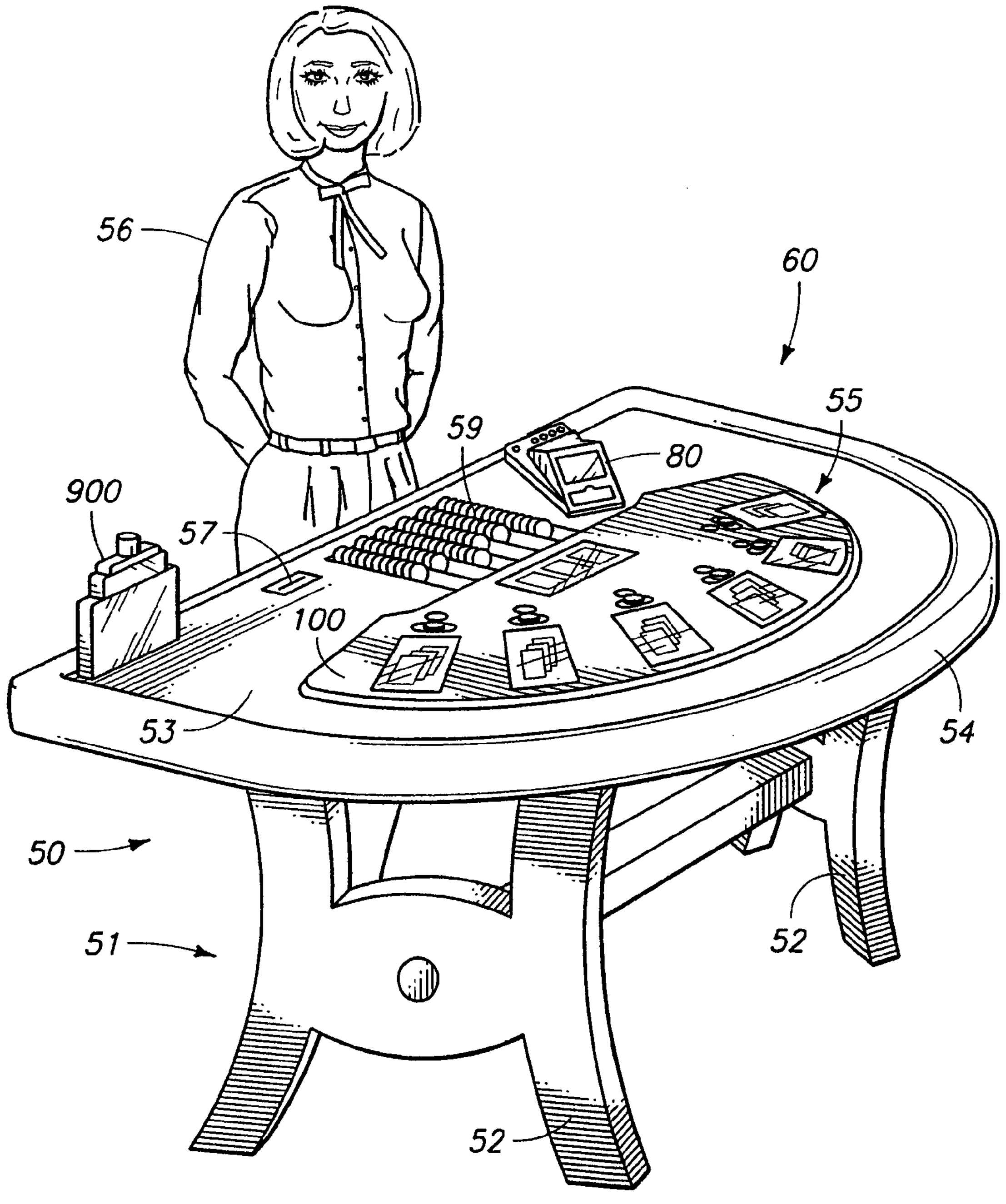
FIG. 52 is a perspective view of a further alternative embodiment game system according to the invention.
Figure 53:
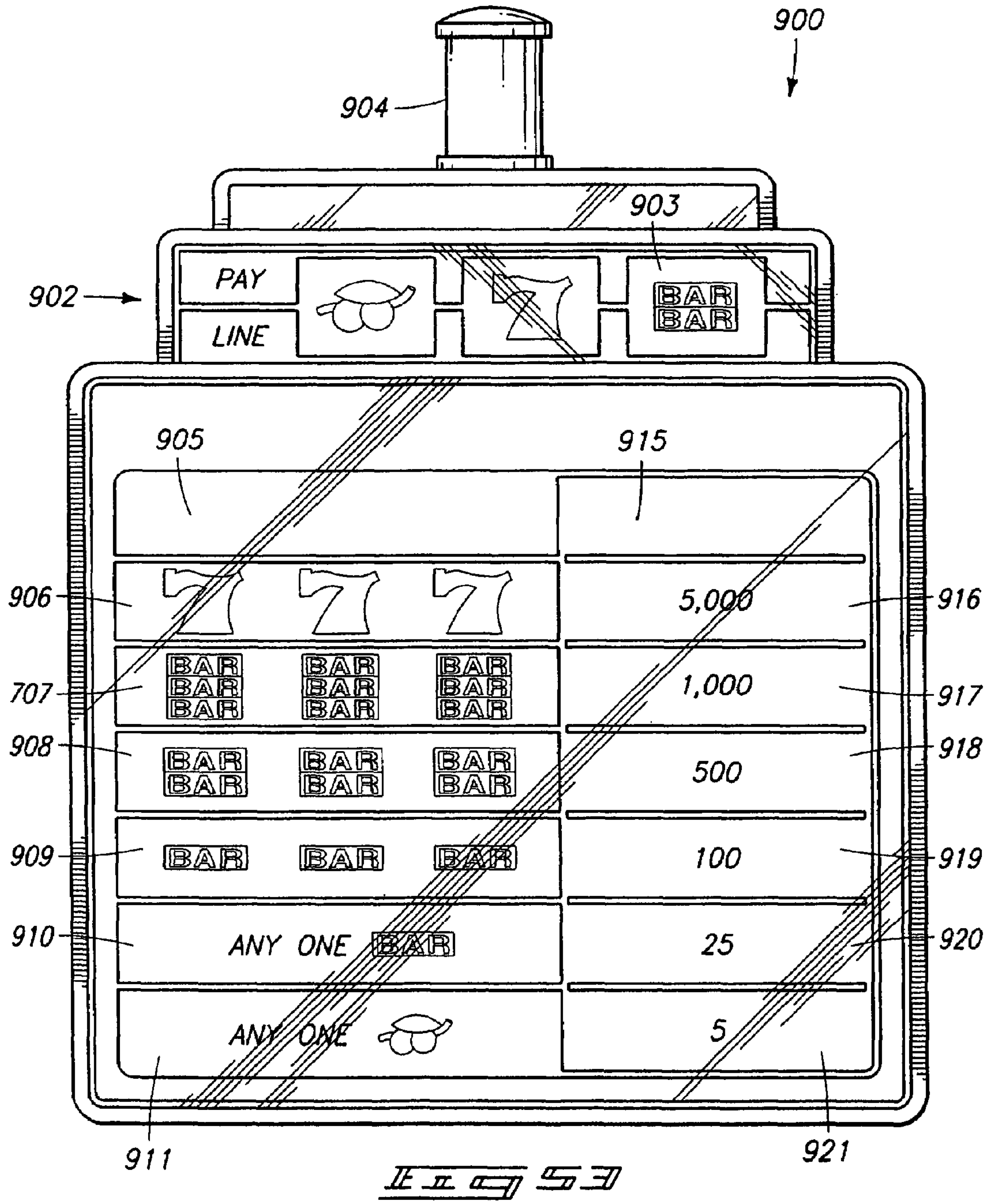
FIG. 53 is an enlarged front elevational view showing an ancillarty display portion forming a part of the system of FIG. 52.
Figure 54:
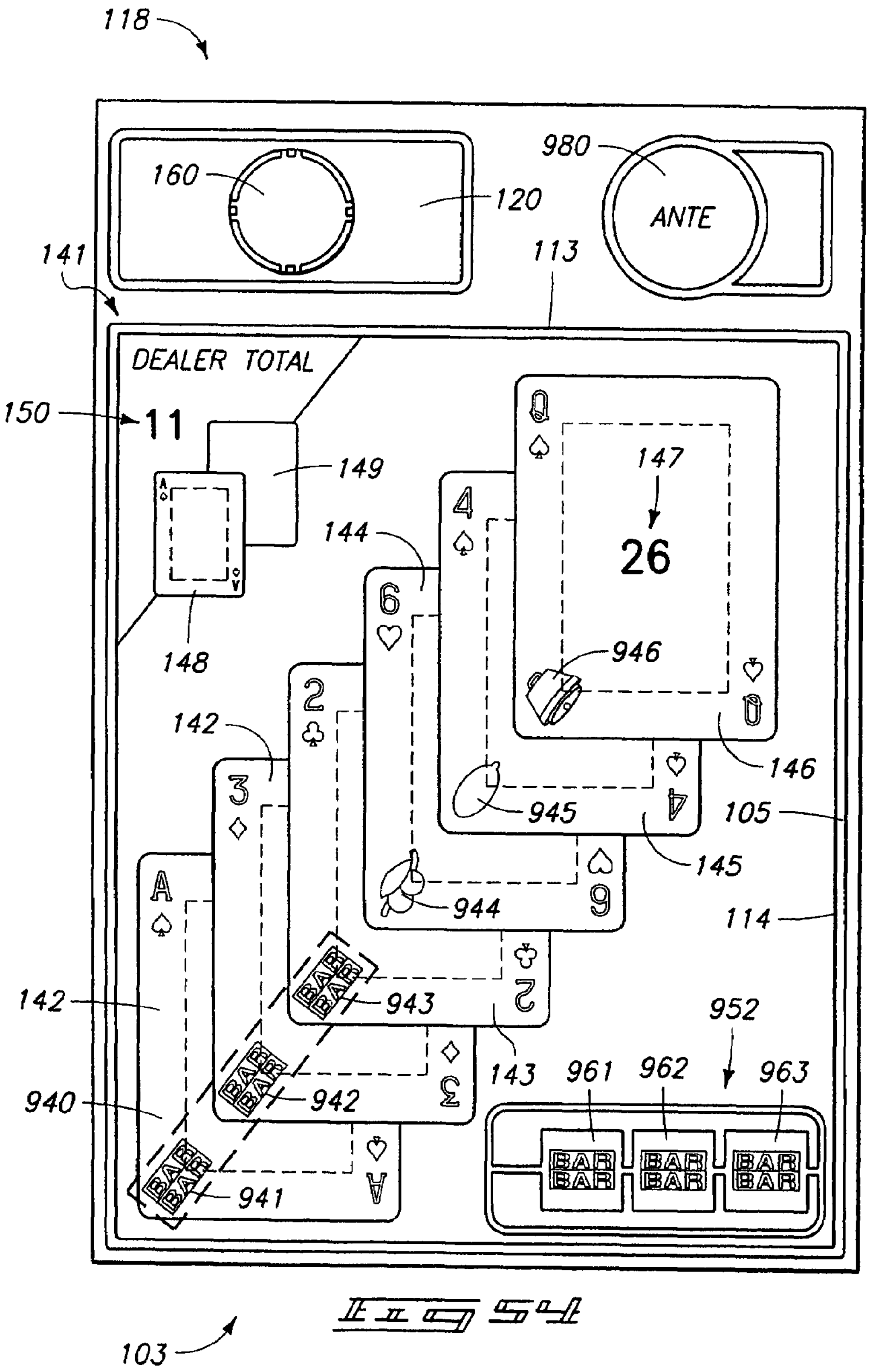
FIG. 54 is an enlarged top view showing portions of a single player station with a display which forms part of the preferred presentation unit shown in FIG. 52.

FIGS. 52-54 show a still further preferred embodiment gaming system according to this invention. The system shown in these Figs. is substantially the same as the system of FIGS. 40-51, and very similar to the systems of FIGS. 1-40, and can include most or all of the various options discussed with regard to all embodiments described herein. Additional features of the system of FIGS. 52-54 will now be described.

The system of FIG. 52 also has a set of slot symbols which can be associated with the virtual playing cards dealt to the participants. FIG. 52 shows a slot symbol secondary display 900 which facilitates the play of cord games have the added slot symbols and related features.

FIG. 53 shows the slot symbol secondary display 900 in greater detail. Display 900 has a pay line display 902 which includes at least one, and preferably a plurality of slot symbol positions 903. The slot symbol positions can be assumed by slot symbols chosen from a total set of slot symbols. The slot symbols can the some as a variety of know slot machine symbols used in a variety of know slot machines of the known constructions. One advantage to the current invention is that the total set of slot symbols can be very large and is not limited by the number of physical stops existing on traditional reel slot machines. In theory there is no definite limit to the number of slot symbols which can be employed. More practically, the participants interested in using the system of FIG. 52 will likely prefer a total set of slot symbols which is large enough to allow a wide degree of flexibility in determining odds, while also allowing the regular players to have a full working knowledge of the symbols which are available. FIG. 53 shows some of the more common slot symbols which as suitable for use. These include the symbols "7" shown in window 906; the symbol "triple BAR" shown in window 907; the symbol "double BAR" shown in window 908; the symbol "single BAR" shown in windows 909 and 910; and the symbol "cherry" shown in window 911. There is also a blank window 905 which is used to depict the possibility of have a changeable display contained therein wherein a varying symbol or symbol combination can be presented.

FIG. 53 also shows a second column of windows 915-921 which are used to state the payoff for a given symbol or symbol group which may be received and for which a jackpot will be awarded. Window 915 is blank and is used to indicate a changeable display which may alternatively, or coordinately change with the symbol or symbols presented in changeable payoff display 905. Windows 916-921 represent more traditional payoff schedule information showing what jackpot or jackpots will be awarded to a player or other participant for receiving a given slot symbol or group of slot symbols. In the system of FIGS. 52-54, the system is configured to ordinarily consider three slot symbols, as indicated by the three windows 903 on the pay line display 902.

FIG. 54 shows a typical preferred player display 118 having most of the same features as discussed elsewhere herein. Similar numbers are used to indicate similar parts and features. One difference is the ante bet detector 980 which optically or otherwise detects the placement of a betting chip thereon to indicate optional participation of a player in the slot symbol secondary game aspect of this system. The ante bet detector can also be able to detect the value of the ante chip or chips placed thereon in alternative configurations, such as discussed above in connection with other betting chip detectors. The ante can also be paid from an electronic account, or paid in fashions suitable to the players and casino.

FIG. 54 further shows the slot symbols are displayed in one or more of the virtual cards 142-146 by displaying slot symbols 941-946 near the lower left corner of each virtual card. In the configuration shown, only the first three virtual cards received are considered as the slot symbol group for determining the award of any jackpots. The symbols 944-946 can be displayed, or alternatively, they can be suppressed from the display.

The slot symbols considered from the first three player cords are depicted as three of the same "double BAR" slot symbols. This is typically a symbol group for which a jackpot would be awarded, as suggested in the payoff schedule at windows 908 and 918 wherein it is indicated that such a combination of slot symbols would result in a payoff of 500 times the ante bet.

The player display shown in FIG. 54 further shows a primary pay line display 952 having display windows sections 963 which depict the slot symbols associated with the players first three cards dealt, namely, 142-144 which were associated with slot symbols 941-943, respectively.

Additional Operation and Methods

Additional aspects of the novel methods and operation of system 60 are now further described. The methods are for playing a live card game involving a plurality of live participants. The live participants including at least one player and at least one dealer. The live participants attend the card game personally about a gaming table.

In one aspect the methods include providing at least one presentation unit which is supported by the gaming table and has a viewing face which is available for viewing by the participants attending the game about the gaming table. The providing step occurs by constructing or having constructed a gaming table with system, such as system 60, retrofit or otherwise installed thereon.

In another aspect the methods include displaying a plurality of changeable participant display images from at least one participant video display which forms a part of the at least one presentation unit. The plurality of participant video displays can be provided in the form of discreet displays are shown herein, or part of a large display if practical in terms of positioning about the gaming table. The displaying step involves providing participant display images which include playing card images indicating virtual playing cards dealt or otherwise assigned to the live participants.

The methods further advantageously include processing data using at least one game processor. The processing of data is advantageously used to perform a number of data processing functions as have been described herein. Of particular interest are the data processing steps which provide the following steps or functions. In one aspect such involves providing game rules which at least partially administer play of the card game. In another aspect such involves defining a stack of virtual playing cards having one or more decks of virtual playing cards included therein for use in playing the card game. Such decks can be conventional decks, abbreviated decks, or decks of unusual composition depending upon the card game being played.

The preferred data processing function further includes shuffling the stack of virtual playing cards to produce a stack sequence which determines the order of virtual playing cards dealt or otherwise assigned to the participants. The stack sequence referred to can be done in a single time frame, such as by using the traditional shuffle discussed above. Alternatively, such shuffling can be done on an intermittent basis to perform the continuous random shuffle, random balance shuffle or other shuffling routines on the fly as cards need to be dealt or otherwise assigned in play of the card game.

The data processing functions can further include dealing virtual playing cards to participants from the stack according to the game rules.

The data processing functions further advantageously include instructing the participant video displays to display at least playing card images indicating virtual playing cards assigned to the participants, said virtual playing cards assigned to the participant forming the participant's card hand. The instructing step relative to participant video displays can also include presentation of additional information as detailed above.

The methods of this invention further involve controlling play of the cord game using at least one dealer control, such as dealer control keys 85-89. The dealer control keys act as dealer control sensors which are controllably activated by the dealer to control action of the card game. This control action includes at least dealing of virtual playing cards to the participants. The description given above further details other control actions of the dealer's operation of the system.

The novel methods can further include recording game action for the card game being played to enable subsequent analysis or replay. This can be done using the mother board memory described above or by recording the data on a remote memory device (not shown), such as connected through serial port 187. The analysis will likely be performed at some other location on a different data processing unit so that operation of the gaming table is not impeded.

Additional methods according to the invention can include reversing the action of a game to remove or back-up one or more steps performed in playing the game. This is indicated at step 743 of FIG. 49 and requires authorization from a pit boss using a key as read in step 742. The game can thus be backed up and resumed at a prior play. Security is assured by performing the doors open step 744 which can suspend play at step 745 if the security doors are open or allow the player to decide his next move as shown in step 746.

The novel methods can also include replaying one or more sequence steps of the game to show a participant the action which has transpired.

Methods according to the invention may further include displaying a simulated stack image, such as at first dealing shoe display 81. This displaying can be further enhanced by display of a cut card image, and moving or adjusting the cut card image to simulate playing of the stack.

Methods according to the invention can further include sensing placement of betting chips by a player, such as at betting chip detection zones 120 using sensors 121. This is advantageously done for purposes of indicating participation in the card game.

Another method according to the invention can include sensing placement of betting chips by a player for purposes of indicating an insurance bet being placed in the card game, such as at insurance bet detection zones 130 using sensors 131.

The methods involving sensing the betting chips can be enhanced by using betting chips which are encoded to allow determination of the value of the betting chips. Such methods can further include sensing the value of chips placed by the players.

As explained above in the preferred methods the decisions of the players are effected by communicating instructions from the players to the dealer. These indicate playing decisions being made by the player in carrying out play of the card game. The dealer then implements the player's decision using dealer controls which perform by controlling the data processing and other functions of the card game system.

The methods according to this invention can use shuffling processes which are performed in a manner which reorders the stock after each card is dealt from the deck. The continuous random shuffling and random balance shuffling described above perform this function. The shuffling function can also be effected using a shuffling process which reorders the stock after each card is dealt from the deck, the reordering being performed after excluding any cards which have been dealt and are currently in the hand of a participant. This latter shuffling is performed by the random balance shuffling.

The gaming system of FIGS. 52-54 is additionally novel in its operation and methods by including the steps of associating slot symbols, such as symbols 941-946 with virtual playing cards dealt or otherwise assigned to the participants. All or some of the virtual cards may be enhanced by associating one or more slot symbols thereto. The associated slot symbols can be associated automatically with all cards or only the virtual playing cards for those players who have wagered an optional ante bet, such as by placement of a better chip at ante chip detector 980. The association of symbols with the virtual playing cards can be qualified by the ante bet, or it can occur for all cards and the slot symbols can be selectively displayed depending on game rules or optional participation by placement of an ante bet.

The association of slot symbols is preferably a separate process in the game software apart from the random number assignment of virtual cards in the stock of virtual cards. This preferably independent process causes the variable association possibilities to be very large. This is important in providing a large number of possible odds. Since the slot symbol set can be defined to include multiple copies of the same symbols the different probabilities of symbols or groups of symbols can essentially be tailored to achieve large frequencies of winning slot symbols or combinations of symbols, or very low frequencies of winning symbols or combinations of symbols. These can be held constant or varied over time or with different machines or different versions of games played on each machine.

The novel methods involving the system of FIGS. 52-54 further preferably include displaying the slot symbol or symbols. This can be done on the player displays, or upon all participant displays. This is preferably done using the pay line display section 952 at player pay line display windows or frames 961-963. It is also alternatively or additionally possible to display the slot symbol or symbols upon the secondary pay line display 902 of slot symbol display unit 900. Other alternative manners and modes of display can also be used.

The preferred methods for using the system of FIGS. 52-54 also include awarding jackpots to players or other participants who receive a winning slot symbol or combinations of slot symbols which make up a winning symbol group.

The slot jackpot aspect of the system of FIGS. 52-54 is also important in that it adds an additional dimension to the play of the blackjack or other virtual card game. For example, a player may have two slot symbols received in association with the first two virtual blackjack cards dealt to that player. If these two virtual cards are a winning slot combination, then this may affect the players decision making relative to receiving additional cards. In one instance the player may go for a bigger jackpot on the slot symbols while possibly risking loss of the blackjack hand. The slot jackpot awards can be made completely independent of the virtual card hand, or the slot awards can be made conditional upon not busting or other game parameter. The added nuances provided in playing the dual aspect of this game may prove to be of particular attraction to some people who particularly enjoy complex gaming phenomenon.

The numerous methods according to this invention preferably involve digital data processing functions and processes. This allows high speed, accuracy and clarity of display images. Alternative Embodiment Slot Machine Game System and Methods FIGS. 55-70 illustrate a further embodiment gaming system according to this invention. The gaming system of these Figs. is similar to the other alternative gaming systems described herein with certain modifications and enhancements which will now be described in greater detail. The structural and data processing components included in this gaming system includes a presentation unit 1100, a data processing and controller section (not shown) similar to game processor section 90 described above. The gaming system of FIGS. 55-74 also includes a dealer control module 1300 which is constructed the some or very similar to dealer control 80 described hereinabove. The presentation unit 1100, game processor, and dealer control module 1300 are the some or essentially the same as the gaming systems described hereinabove and such prior description will not be repeated for the sake of economy.

Figure 55:
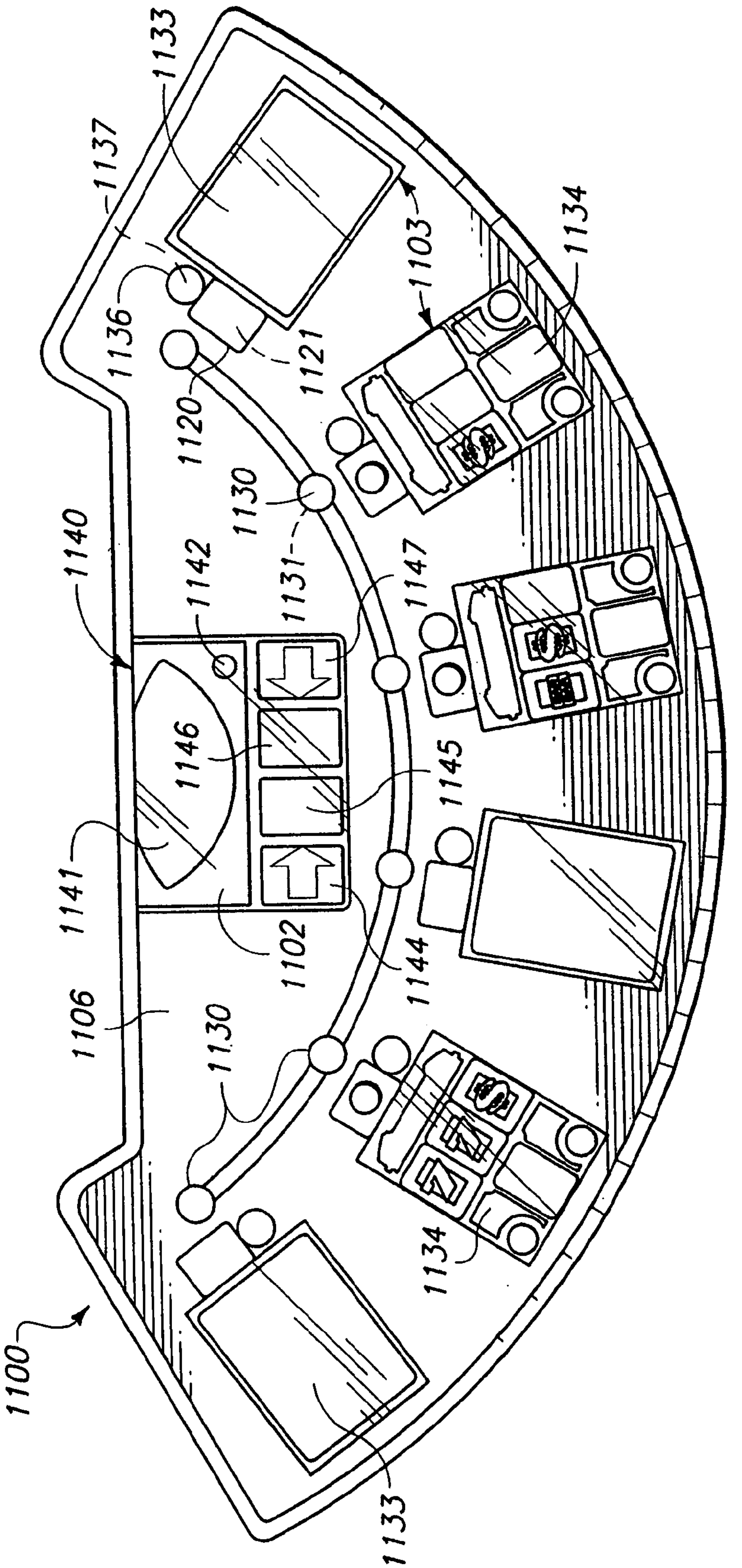
FIG. 55 is a top view showing an alternative presentation unit according to the inventions shown in isolation.

Presentation unit 1100, shown best in FIG. 55, includes a dealer display 1102 and six player displays 1103. The displays can be a single display or plural displays as is preferred in the illustrated construction. In on alternative construction (not shown), one or more of the dealer and player displays may alternatively be provided by a projection type display wherein known projector television, holographic or other suitable display technology is used to provide the images described herein. The desired display technology is preferably encased in a cover 1106 to prevent tampering by unscrupulous dealers or players.

The player displays 1103 have associated player display images 1133 and 1134. FIG. 55 shows an attract mode display image 1133 which is merely shown in outline but is detailed in FIG. 56. FIG. 55 also shows a player participating display image 1134 which will be discussed in greater detail below.

The player displays 1103 form part of associated player stations which also include a betting zone 1120 having associated betting sensors 1121 for detecting betting chips placed thereon to indicate participation by a player in the game. The player stations further include additional wager zones 1136 which detect additional wager chips placed therein using additional wager sensors 1137. The manner in which additional wager zones 1136 and sensor 1137 are used is further detailed below.

The player stations also preferably include bonus symbol betting zones 1130 which have associated bonus symbol betting sensors 1131. The bonus symbol betting sensors detect presence of a gaming chip placed therein to assure and allow recording that a player has elected to hove a bonus symbol assigned to that player in response to placement of a bonus symbol ante bet by the players electing to do so.

FIGS. 55 and 73 show that the dealer station has a dealer display 1102 which has several different active display areas 1141, 1142, and 1144-1147. The first display area 1141 is used to present various messages to both players and the dealer.

FIG. 73 shows one message directed to players. FIG. 74 shows another message directed to the dealer.

FIG. 73 shows that the dealer display 1102 can further include a second display area 1142. The second dealer display area 1142 can advantageously be used to prompt the dealer when dealing is the next appropriate step in the play of the game.

The dealer display also preferably includes card symbol display areas 1144-1147. In typical operation, these display areas are used to display dealer symbol display images such as 1345 shown in FIG. 73. Symbols or card symbols can be displayed in any of the areas 1144-1147. These display areas can also be used to display common card and bonus card legends as shown in display areas 1144 and 1147 of FIG. 74. A preferred manner of presentation and utilization is further discussed below in connection with operation and methods for the gaming system.

Figure 71:
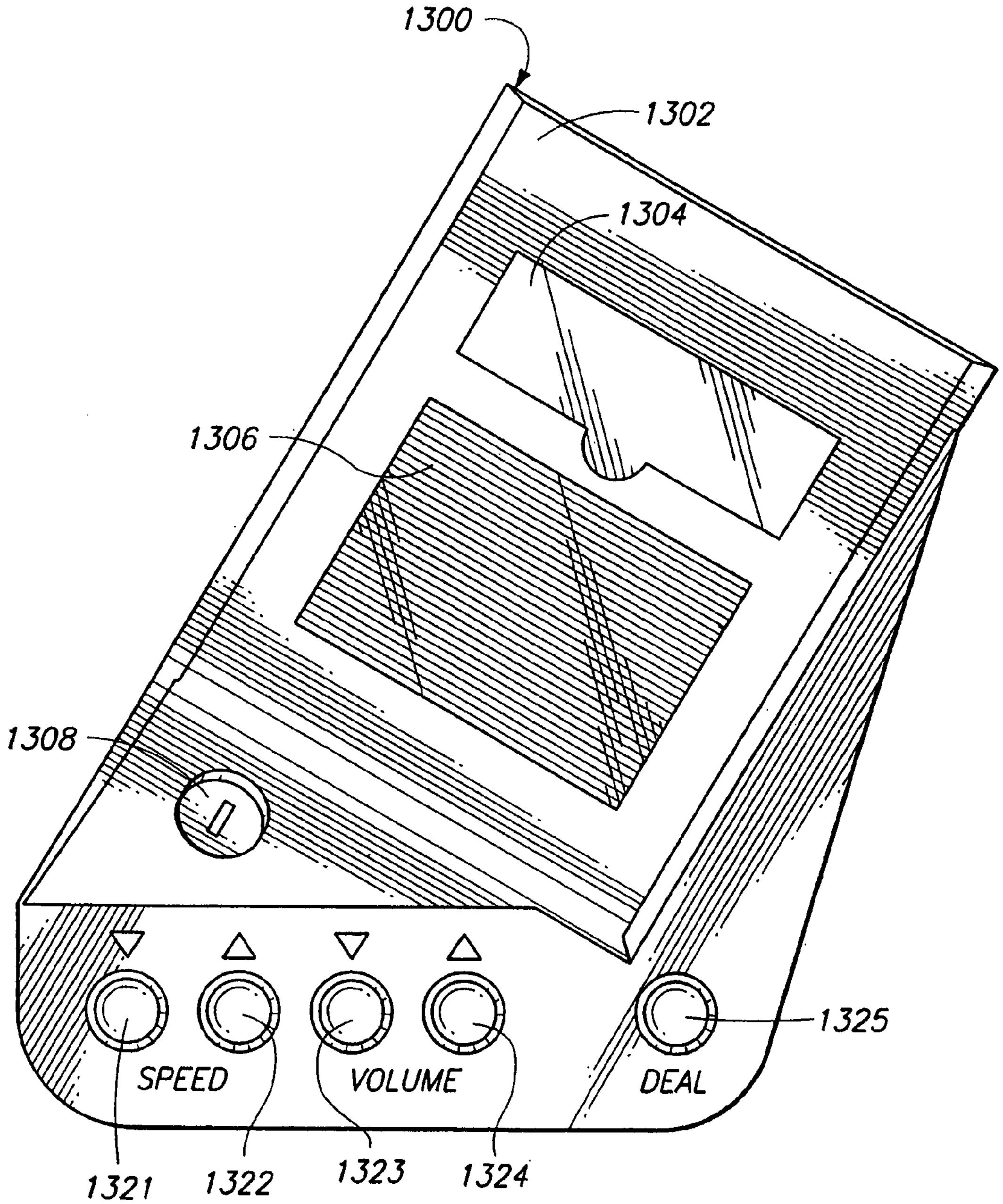
FIG. 71 is a top view showing a dealing control module used with the presentation unit of FIG. 55.

The gaming system also preferably includes a dealer control module 1300 illustrated in FIG. 71. Control module 1300 is the same or very similar to dealer control module 80. It includes dealer module display or displays 1304 and 1306 which appear through openings in case 1302. A control key switch 1308 is provided as explain above. Speed of play adjustment key switches 1321 and 1322 are included to allow the dealer to change the speed of game play. Audio messages can be provided and the volume of such audio messages can be changed using volume adjustment keys 1323 and 1324. Dealer control 1300 also includes a dealer control key 1325 which can be described as a deal key switch to control basic operational progress of the game.

Figure 56:
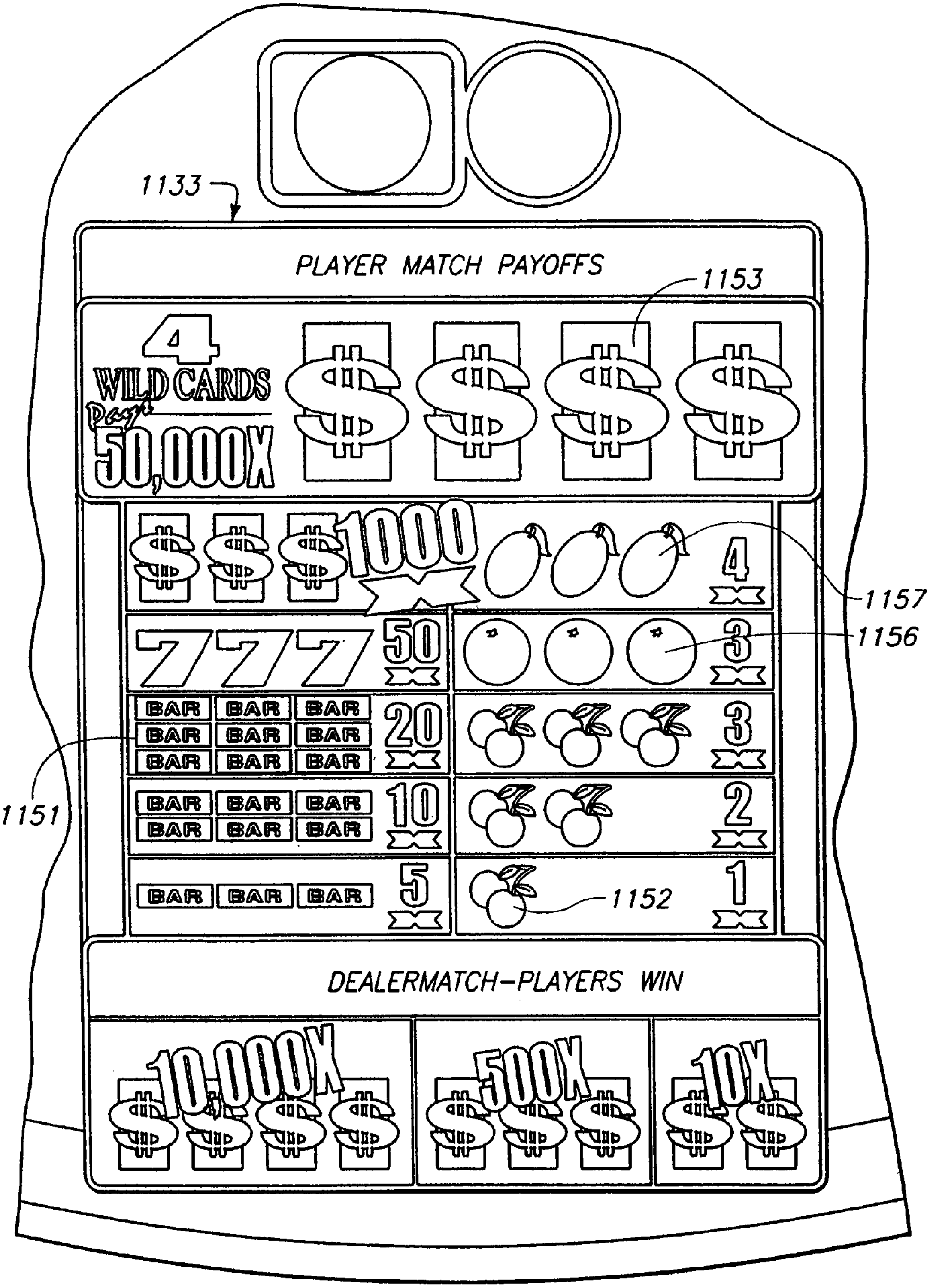
FIG. 56 is an enlarged top view showing one display image used to attract potential players to the presentation unit of FIG. 55.

FIG. 56 shows a preferred attract mode player display image 1133. In this preferred display image information can be presented showing the payoff schedule or other rules of play applicable to a particular game system. FIG. 56 shows wild card symbols 1153 which can be used to match any other symbol. According to one preferred manner of play a player who receives four wild cord symbols assigned to the player's assigned symbol subset receives a payoff of 50,000 times the players wager. Three such wild card symbols received by a player provides a player payoff of 1000 times the wager. Similar information is presented in FIG. 56 with regard to additional slot-type symbols such as the illustrated triple bar symbol 1151, cherry symbol 1152, orange symbol 1156, plum symbol 1157, numeral seven symbol and other desired symbols as illustrated or otherwise known or created for use in the gaming systems of this invention.

Figure 57:
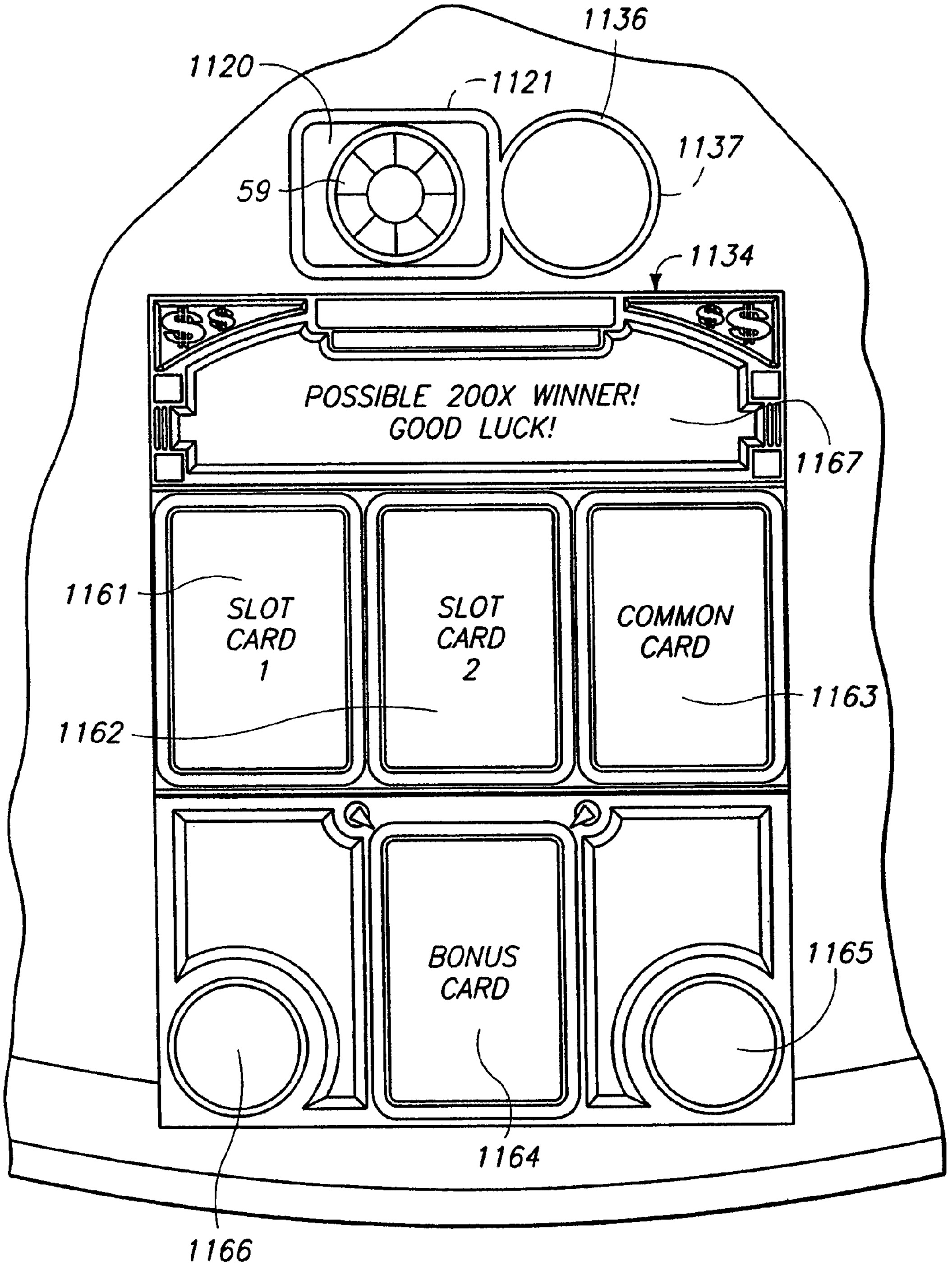
FIG. 57 is an enlarged top view showing a portion of the presentation unit of FIG. 55.

FIG. 57 shows another player display image 1134 and adjacent player station features at an initial stage of play. The attract mode image 1133 of FIG. 56 is preferably automatically eliminated and replaced by the image of FIG. 57 when a player places a betting chip 59 into the betting chip zone 1120 as detected by sensor 1121. The image of FIG. 57 has a first participation display zone 1167 which can be used to display a variety of messages to the players as will be indicated in subsequent FIGS. 58-67.

The preferred player display participation images 1134 have slot card display areas 1161-1164 for displaying first, second, third and fourth symbol display images according to varying possible rules of play. In one preferred manner of play, the three display areas 1161-1163 form a pay line display of three symbols which form the equivalent of a traditional slot machine. In such preferred embodiment, the fourth symbol display area and associated image are used to display an optional fourth symbol card or symbol purchased by a player for an additional bonus symbol ante. The bonus symbol ante is preferably detected by the bonus bet sensor 1131 when a typical betting chip is placed within bonus chip detection zone 1130 (see FIG. 55).

Figure 58:
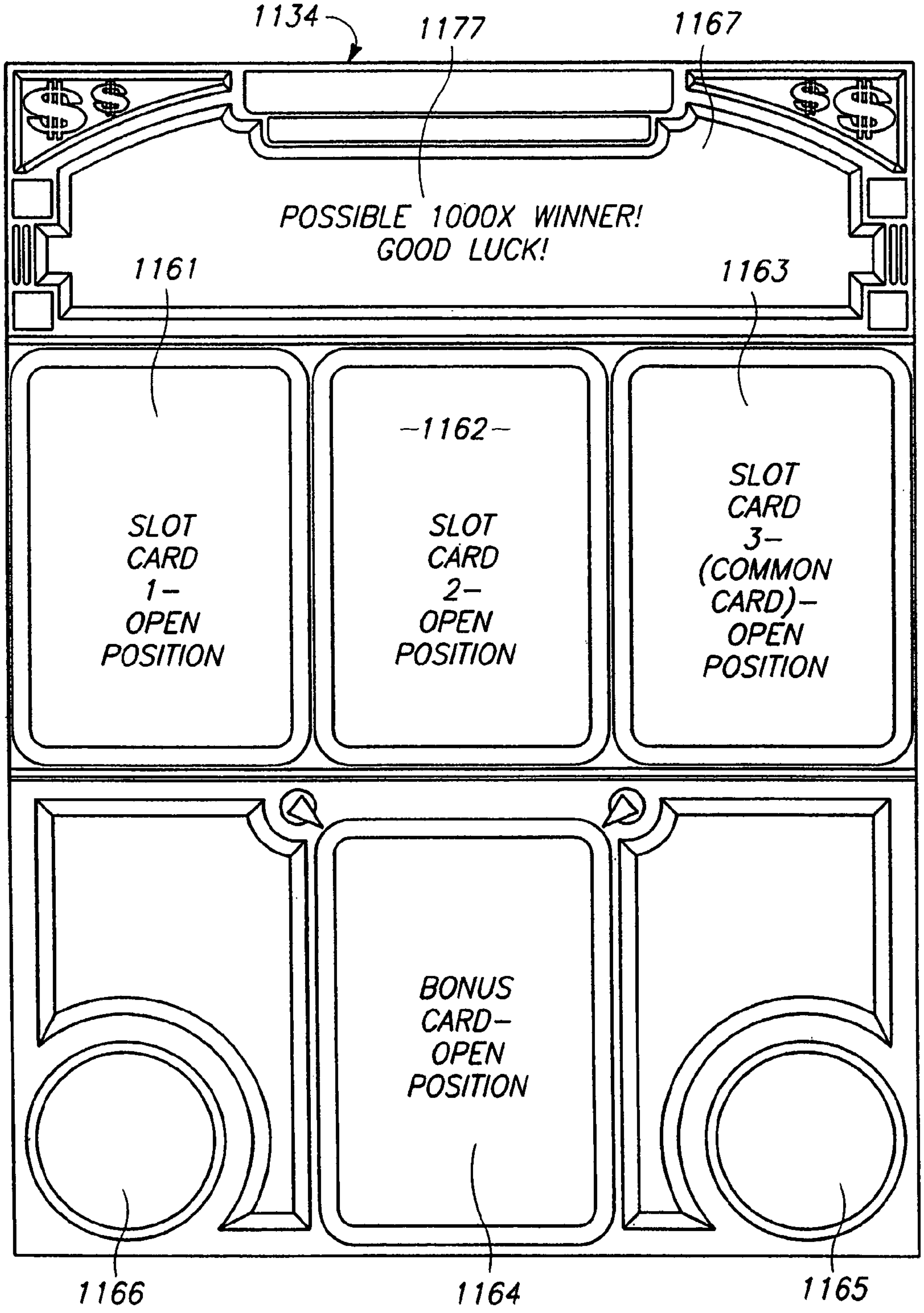
FIG. 58 is an enlarged top view showing a portion of the player station shown in FIG. 57 in the same stage of game play.

The player display image shown in FIG. 51 is shown enlarged and at initial play stage in FIG. 58. In this stage of game play, the player symbol display areas 1161-1164 have open display image areas indicating that no card or symbol has been assigned. The upper display area 1167 has a message 1177 has an introductory meaning indicating the potential winnings and wishing the player good luck. The lower portions of the display are also advantageously provided with lower display indicators 1165 and 1166 which are used routinely to indicate whether the player has won or lost a particular play of the game or to prompt the players into making decisions.

Figure 59:
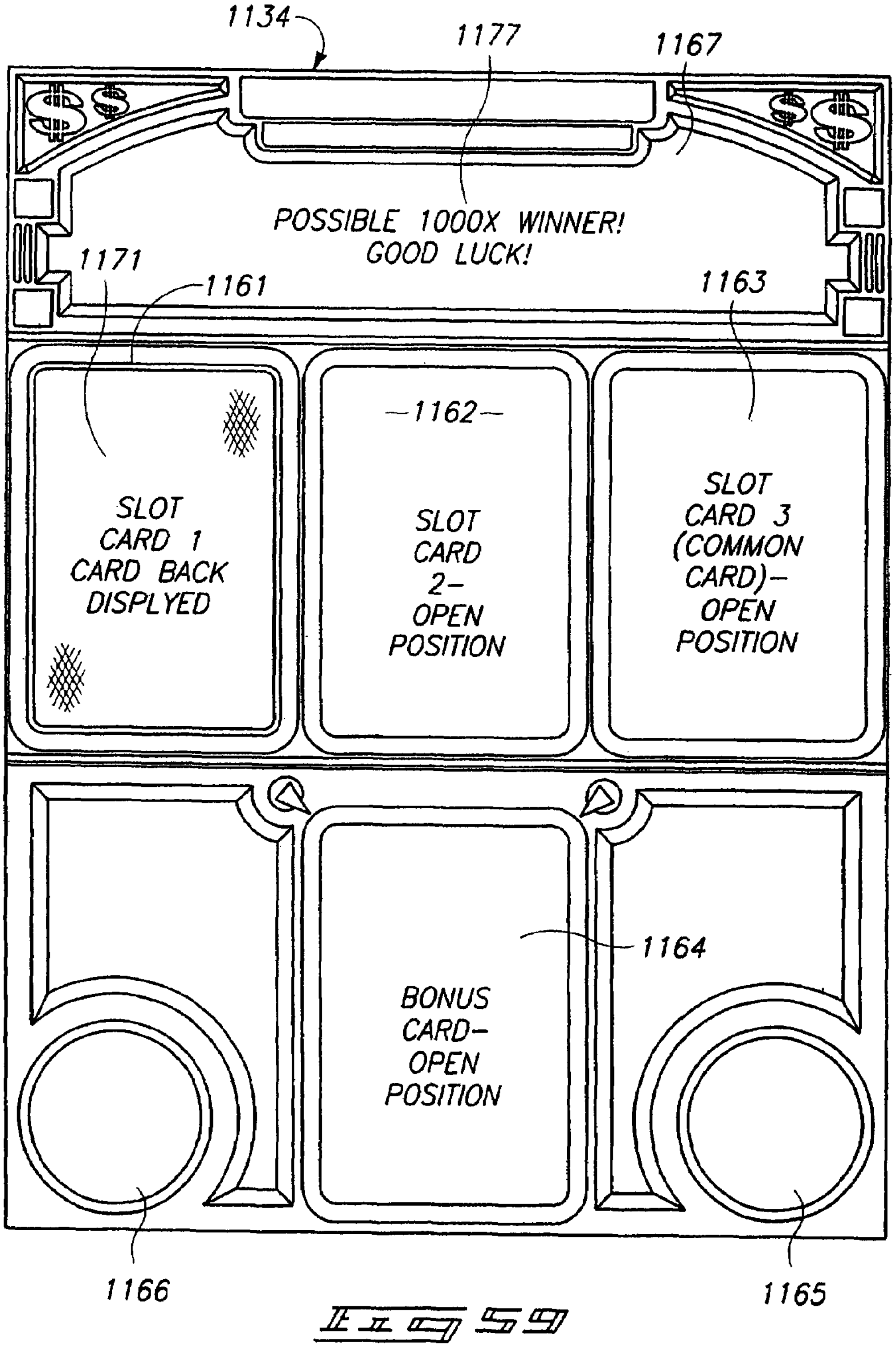
FIG. 59 is an enlarged top view similar to FIG. 58 in a stage of game play thereafter. One symbol card has been assigned and the card back is displayed.

FIG. 59 shows a next stage of play after FIG. 58. The dealer has checked manually to see that all participants have placed there wagers in zones 1120 and assured that play should begin. The dealer then depresses the deal key 1325. A first slot card image is displayed in display area 1161 with the image 1171 advantageously composed to simulate the back face of a symbol playing card. This provides a desired analogy to virtual cards which present and are assigned virtual symbols from a defined set of virtual symbols variously determined by the rules of the particular game system and its associated programming. FIG. 59 also shows that the symbol display areas 1162-1164 remain open and without either a card back image or a card face or other symbol image.

Figure 60:
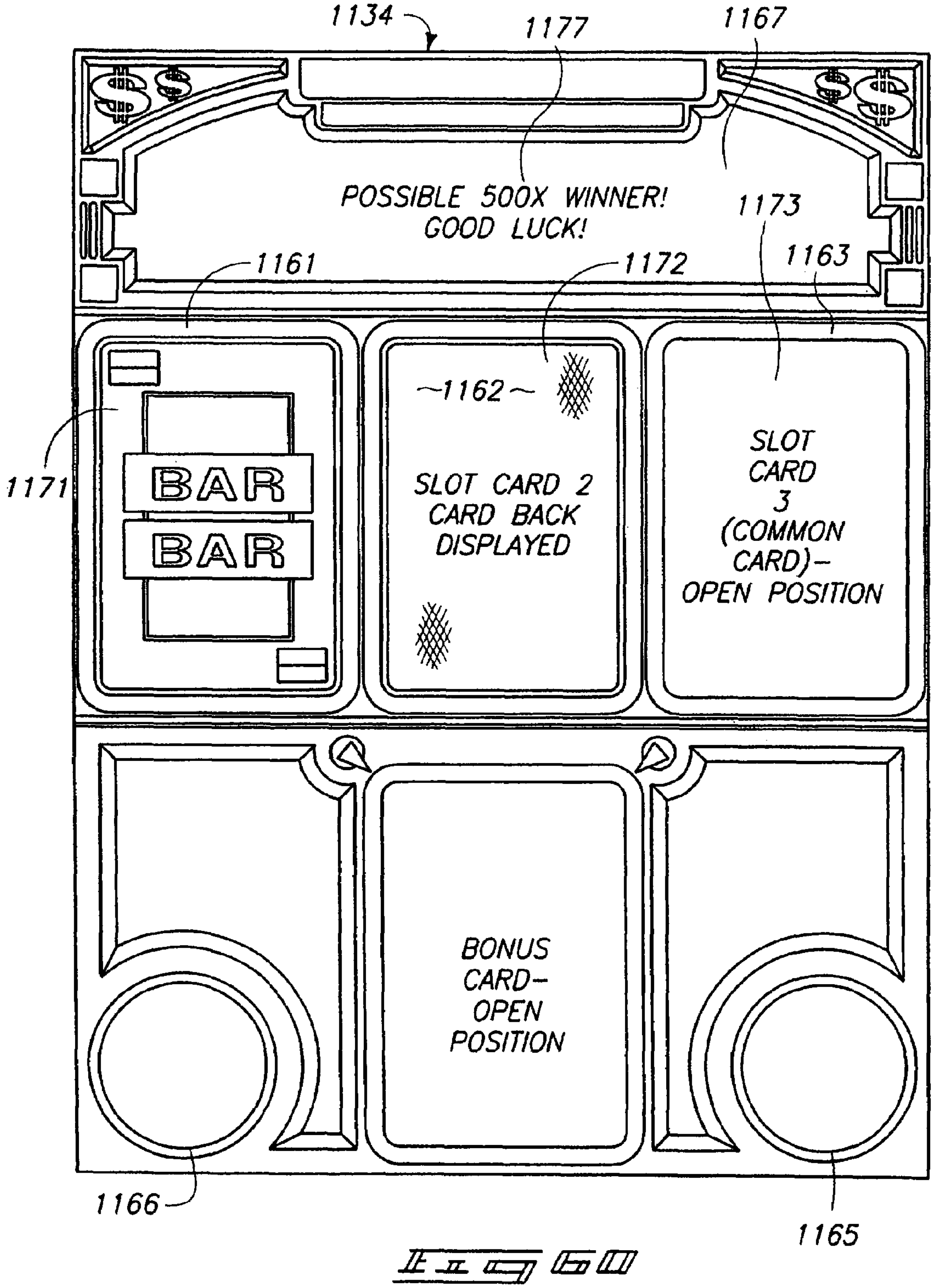
FIG. 60 is an enlarged top view similar to FIG. 59 in a stage of game play thereafter. The displayed image includes the back of a second assigned symbol card. The first symbol card image is as if the symbol card has been turned over to reveal the image of the assigned symbol.

FIG. 60 shows a still further stage of game play wherein the first symbol display area 1161 has been modified to provide a display image 1171 which shows a double bar symbol in a preferred presentation simulating a card symbol face. The second symbol display area 1162 has been modified to provide an image 1172 which simulates the back face of a symbol card. Symbol display areas 1163 and 1164 are still open and without either a card back image or a card face or other symbol image.

Figure 61:
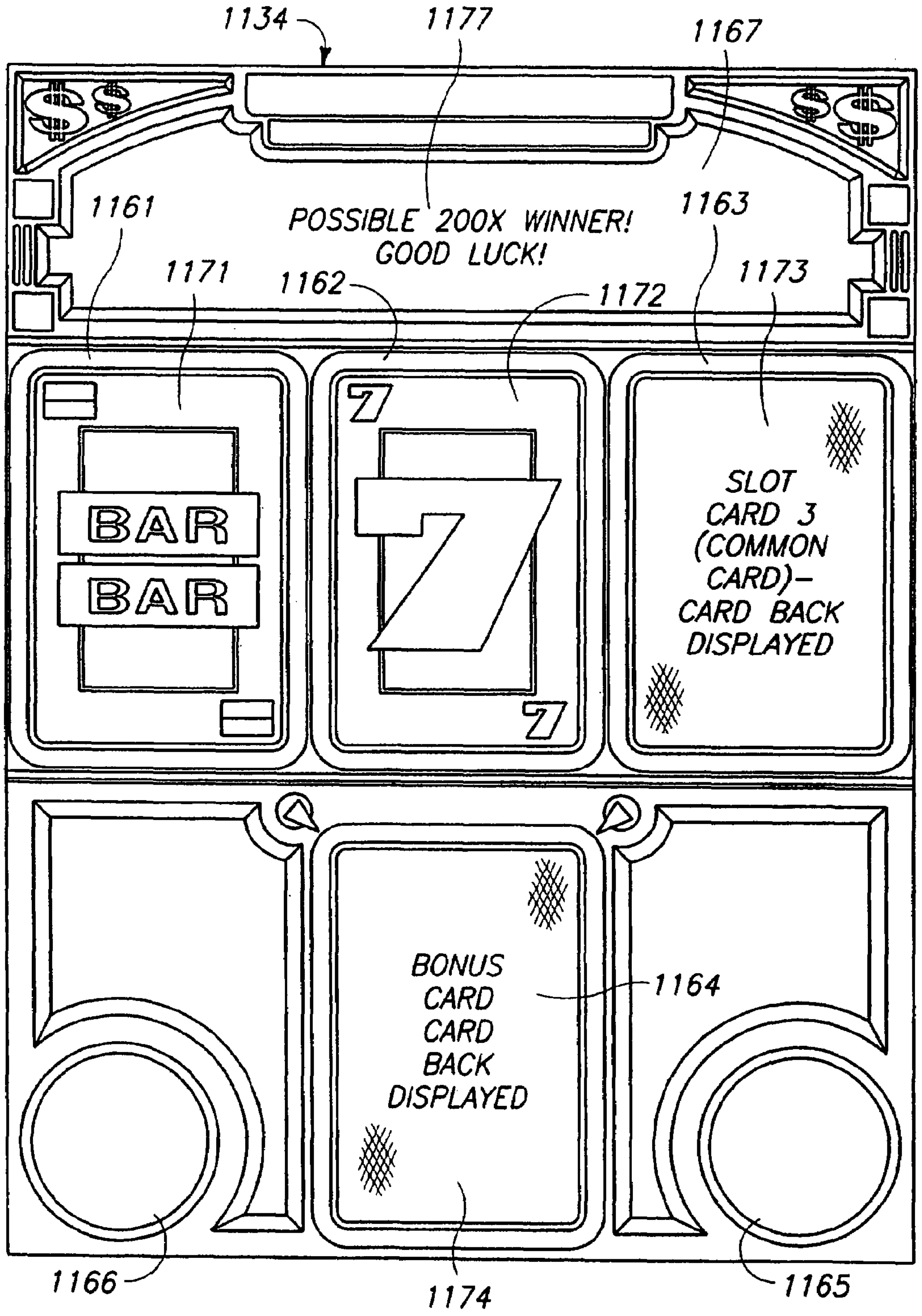
FIG. 61 is an enlarged top view similar to FIG. 60 with the second symbol card image as if the symbol card has been turned over to reveal the symbol image.

FIG. 61 shows a further stage of game play subsequent to the stage illustrated in FIG. 60. In FIG. 61 the second symbol card image 1172 shows the virtual symbol assigned to this player. The third and fourth symbol display areas 1163 and 1164 have been altered to show simulated card back faces. At this stage of play, the player has received two virtual symbols displayed and the pay line can be reviewed to see if any matches have occurred in the typical fashion known in connection with slot machines. FIG. 61 shows two displayed symbol images 1171 and 1172 which do not match according to the rules of the game. The upper display area 1167 has been modified to show a message with reduced potential best hand odds. Such odds are associated with the player receiving wild cards in the slot card 3 and bonus card positions.

The stage of play illustrate by FIG. 61 can advantageously be provided by automatic programming operation in response to the dealer's initial control of the game by depressing key 1325. Such preferred automatic dealing and display of the symbols for the first two virtual symbols assigned to each player and the dealer then stops to allow potential doubling of the player's wager as is shown in FIG. 62.

Figure 62:
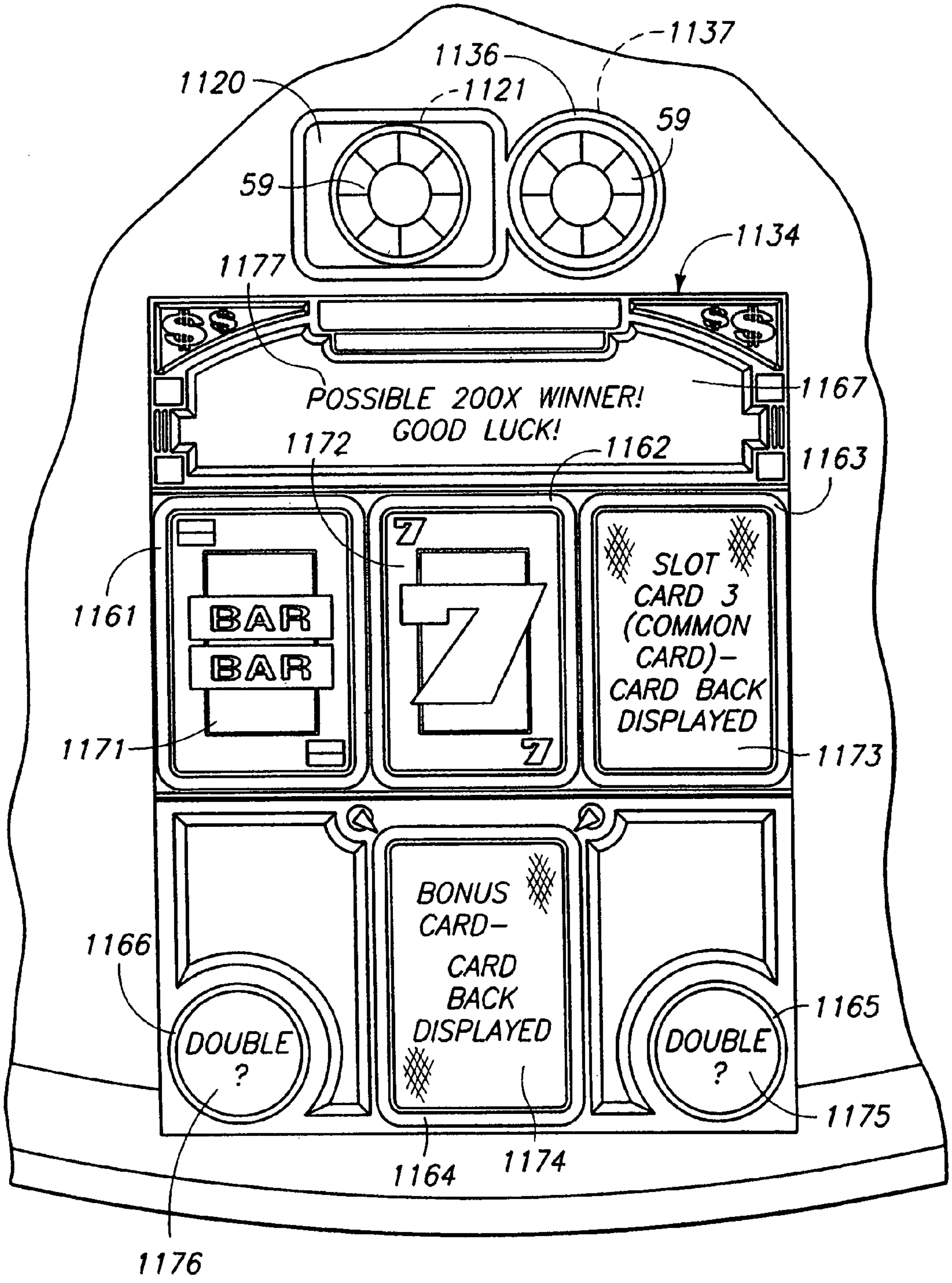
FIG. 62 is an enlarged top view showing game play subsequent to FIG. 61. A third symbol card image is included showing the card back. Also shown is a fourth of bonus symbol card image, also showing the card back.

FIG. 62 shows a still further stage of game play subsequent to the stage illustrated in FIG. 61. At this stage the dealer has called for potential additional wagers. This can be implemented by prompting the player using display areas 1165 and 1166 to display the message "double ?" which in the preferred rules of play are queries asking the player if he or she would like to double down or double the original wager. Although the practicalities suggest using a doubling wager as the only possibility, it may alternatively be possible to have different values for the additional wager amount depending on the rules of play and programming of the game system.

FIG. 62 further shows that this particular player has chosen to place a double down additional betting chip 59 into the additional wager zone 1136 so that the additional wager is detected and signaled to the game processor using the sensor 1137.

Figure 63:
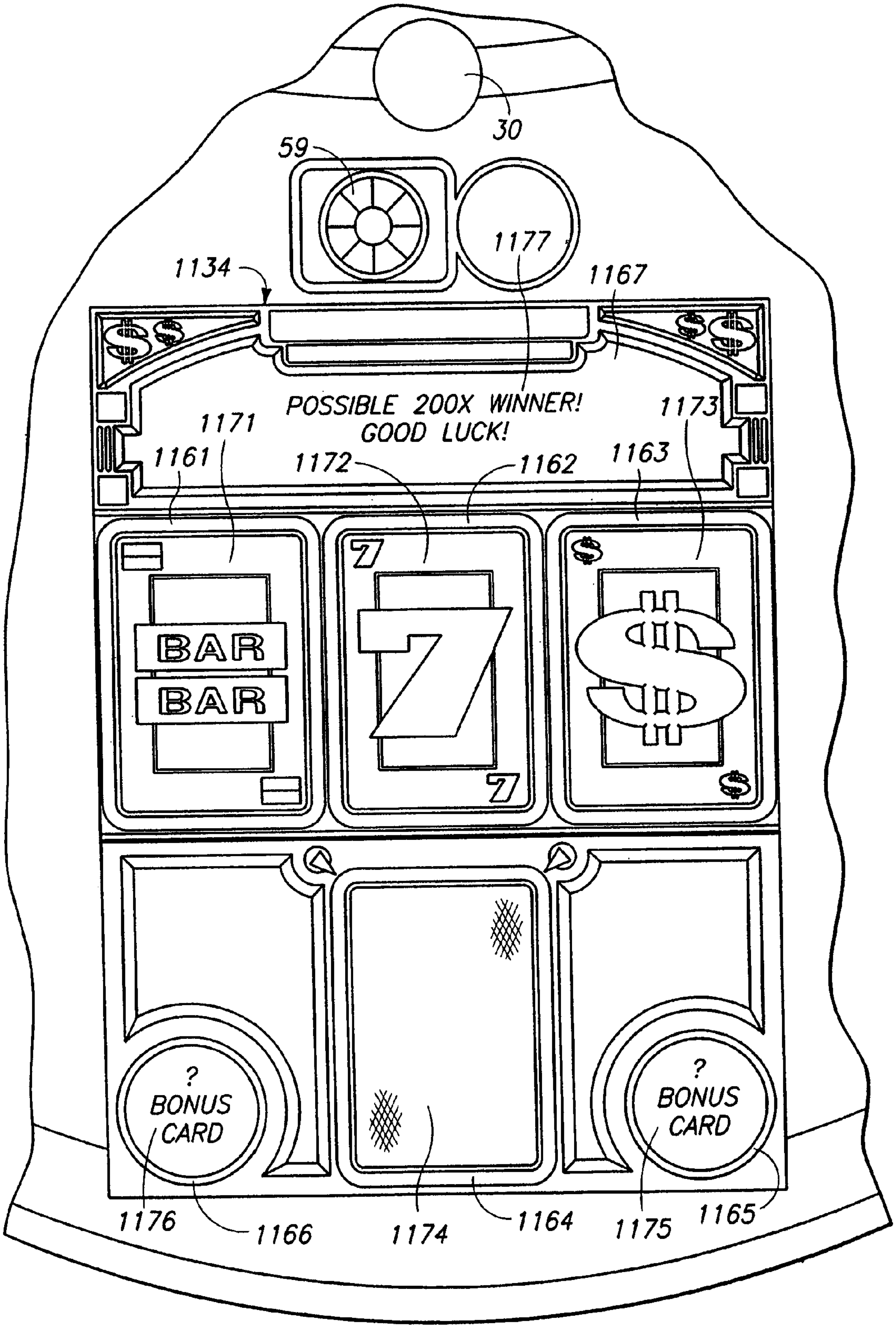
FIG. 63 is an enlarged top view of the player station shown in FIG. 62 in a subsequent stage of game play. The third symbol card image has been changed to depict the face of the card and show the associated symbol.

FIG. 63 shows a subsequent stage of play after the stage illustrated in FIG. 62. The dealer has called and checked visually to make sure that all players have placed any desired double down wagers. The dealer then proceeds to depress the deal key 1325 to progress the game to the next stage or stages. This is illustrated in FIG. 63 by the display of a third virtual symbol image 1173 in the third symbol display area 1163. As illustrated, the wild card symbol in the form of a dollar sign has been assigned to this player. The lower display areas 1165 and 1166 have been altered to query whether the player wants to place an optional bonus bet to receive a bonus card or symbol. This can be done at bonus symbol detection zone 1130.

Figure 64:
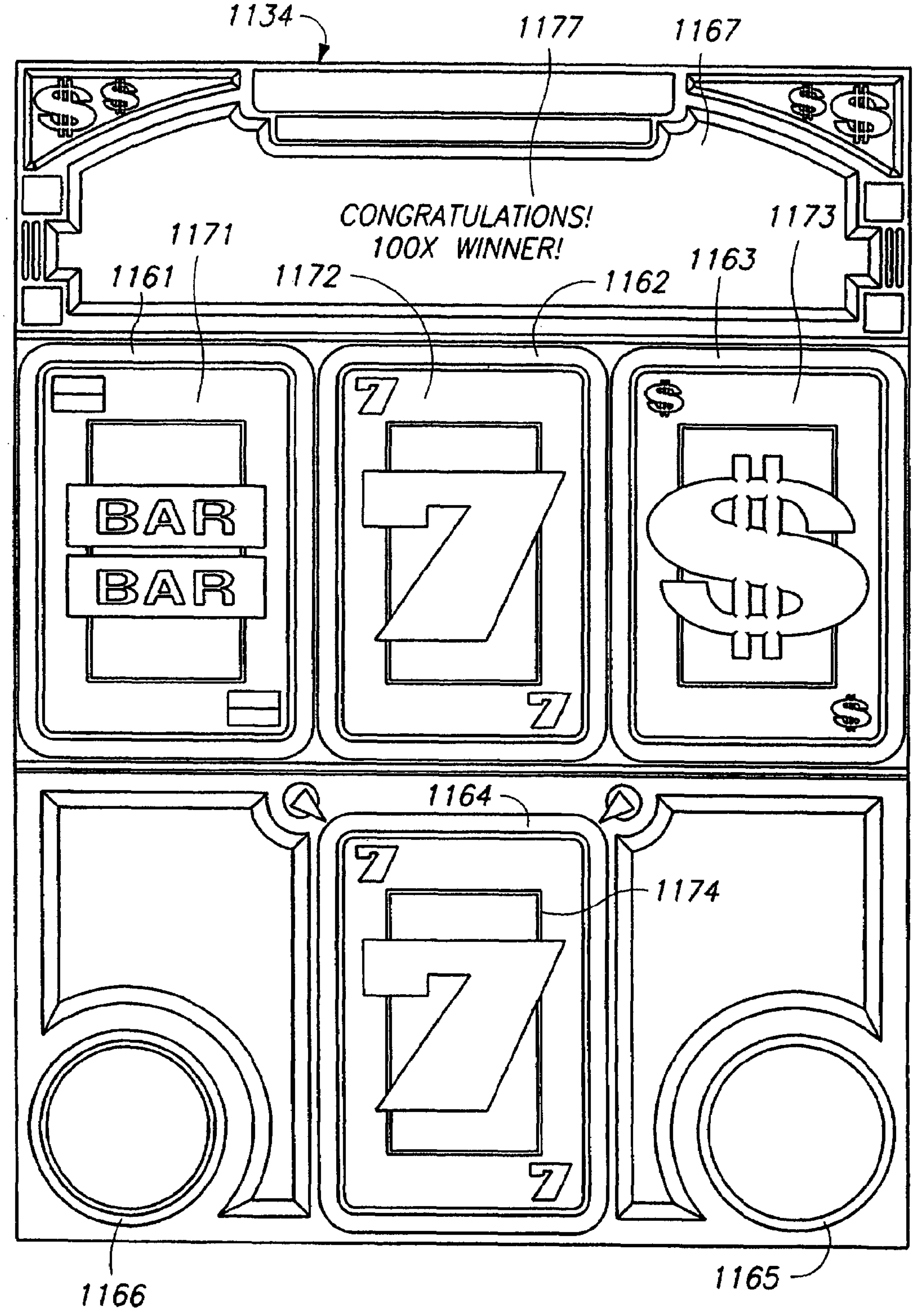
FIG. 64 is an enlarged top view of the player station shown in FIG. 63 in a subsequent stage of game play. The player display depicts a fourth symbol card image or bonus card which has been assigned to the player.
Figure 65:
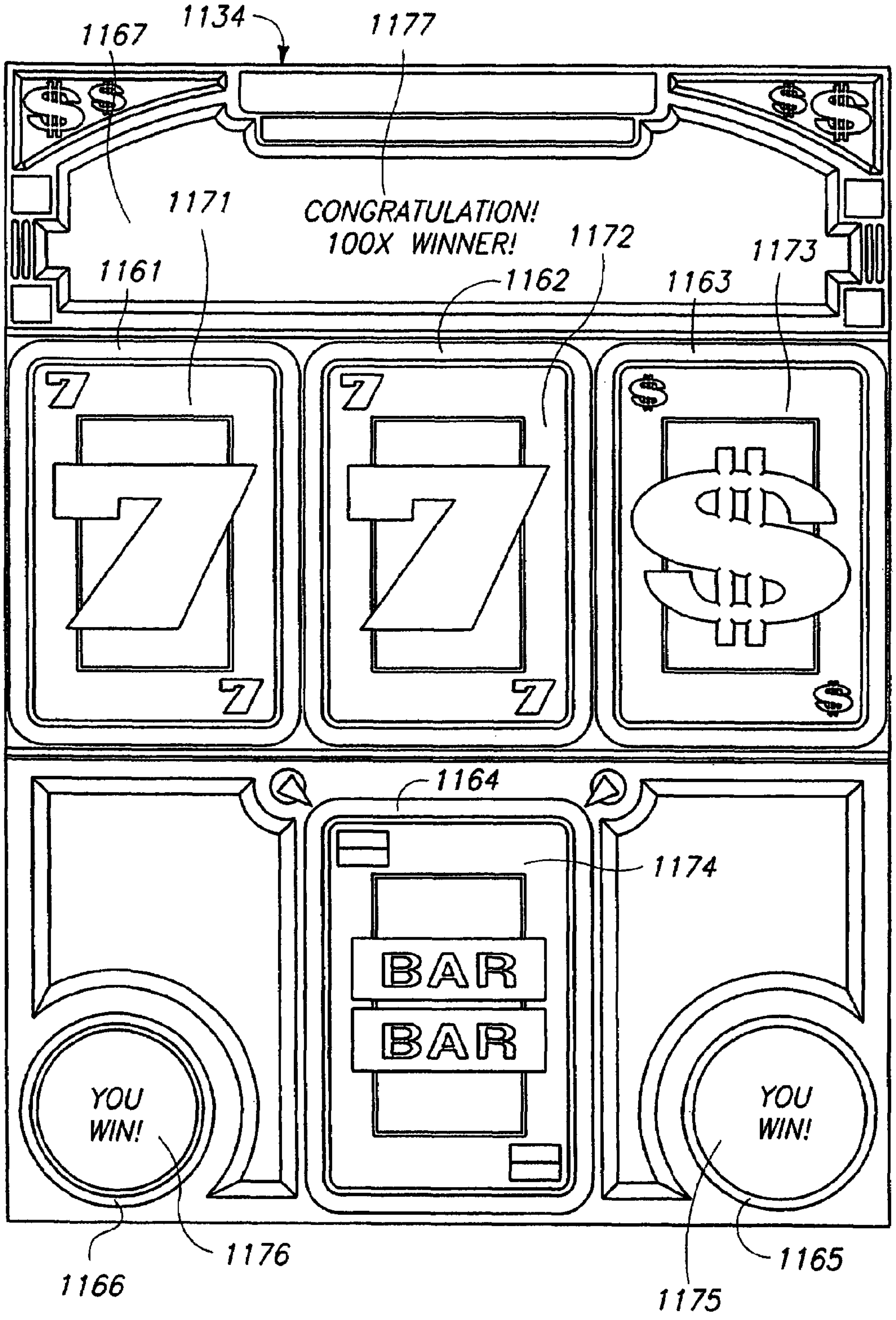
FIG. 65 is an enlarged top view of the player station display similar to FIG. 64 at a subsequent stage of game play. The image shows transposition of the bonus card symbol into the payline display because such a transposition awards the player a larger winning payoff.

FIG. 64 shows a stage of play subsequent to that shown in FIG. 63. The dealer has again assured each player the possibility of placing the optional bonus bet. In the situation illustrated in FIG. 64 the bonus symbol has been assigned and is a numeral seven symbol. This matches with the similar symbol in image 1172 and the wild card symbol 1173. Thus the player is a winner when the assigned participant symbol subset is reordered as shown in FIG. 65. The displays 1165 and 1166 can be provided with win notification images 1175 and 1176 as shown in FIG. 65. The pay line display formed by display areas 1161-1163 show the sevens and wild card in alignment for easy player recognition.

Figure 66:
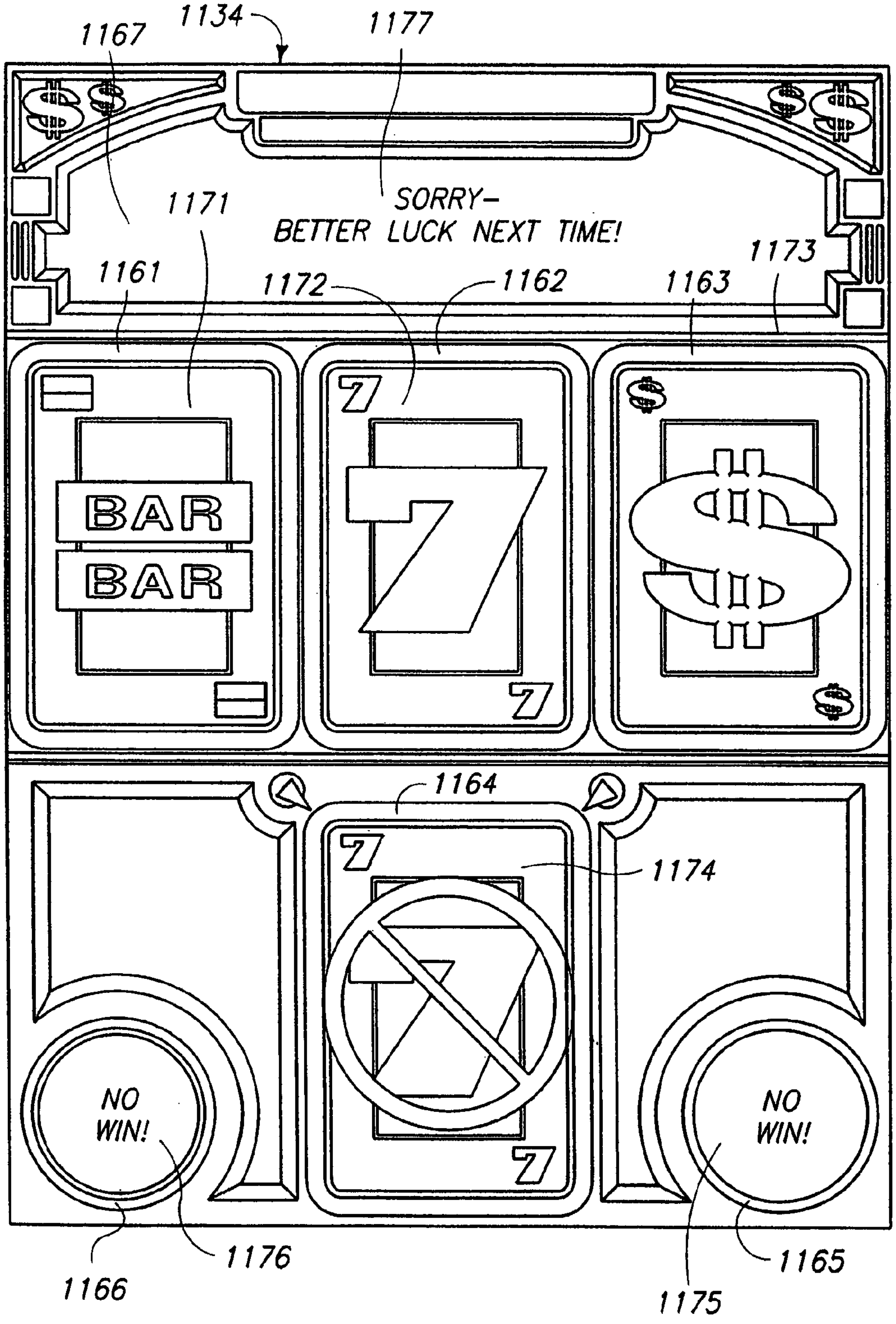
FIG. 66 is an enlarged top view of an alternative player display in lieu of the display shown in FIG. 65. The display shown in FIG. 66 illustrates how a player station display would look if the player did not place a bonus card ante.

FIG. 66 shows an alternative player display image wherein the player has not placed a bonus wager and the bonus card display 1174 is modified to have a circle-bar overlay image indicating that no bonus card symbol has been assigned for consideration in the player's symbol subset. The lower displays indicate that this player has not win a payoff because of the player's subset does not compare favorably with a predefined payoff list programmed into the rules of the game system controller. The payoff list can include various programming techniques to define the winning groups of symbols and the associated payoff amounts.

Figure 67:
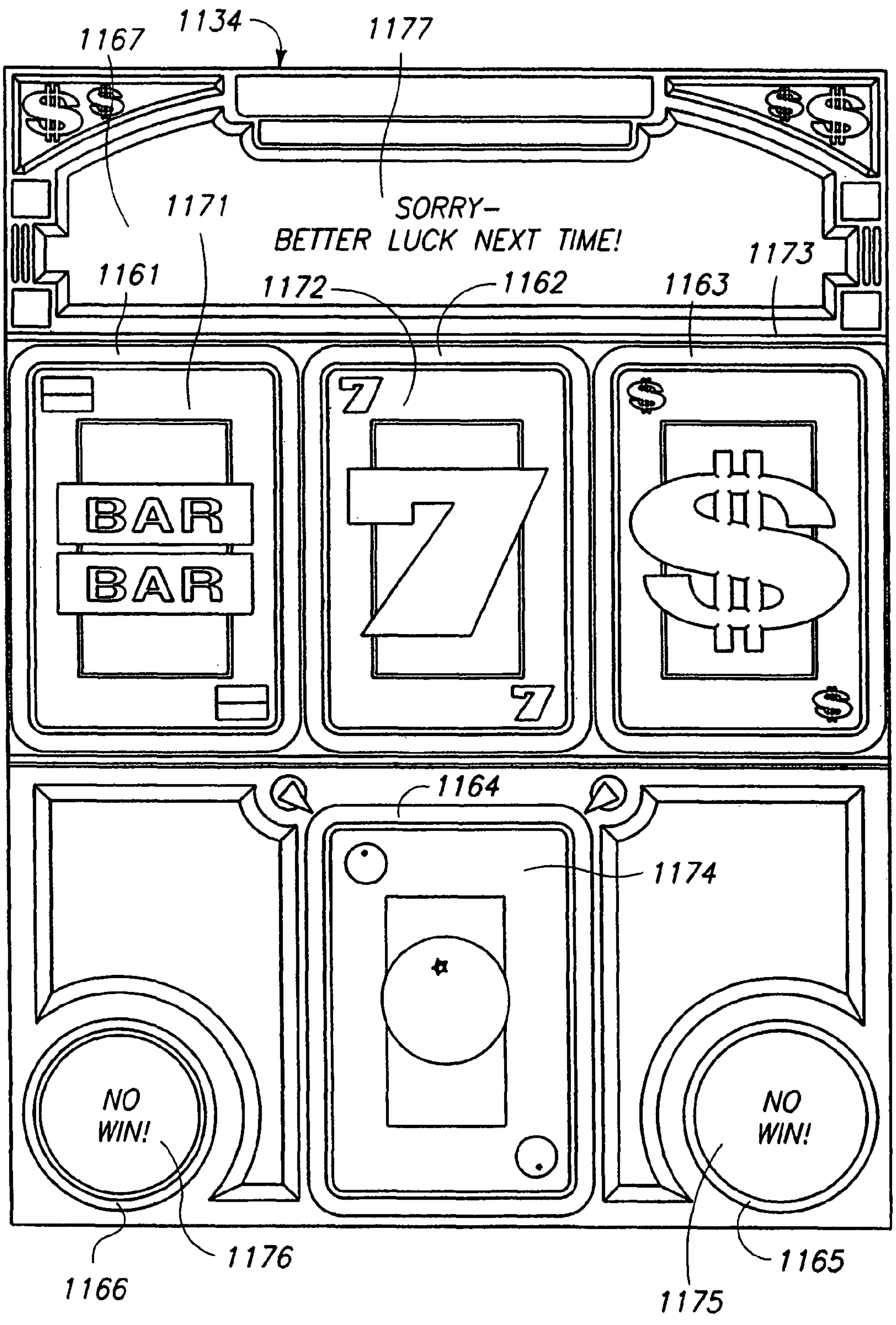
FIG. 67 is another enlarged top view of a further alternative player display in lieu of the displays shown in FIGS. 65 and 66. In this alternative the bonus card has a symbol which does not lead to a payoff and the associated display messages are illustrated.

FIG. 67 shows a still further alternative player display wherein the player has elected to place a bonus wager, but the virtual bonus card symbol is an orange symbol. The resulting player virtual symbol subset assigned to this participant is not a winning group of symbols and the displays at both top and bottom contain messages 1175-1177 indicating such.

Figure 72:
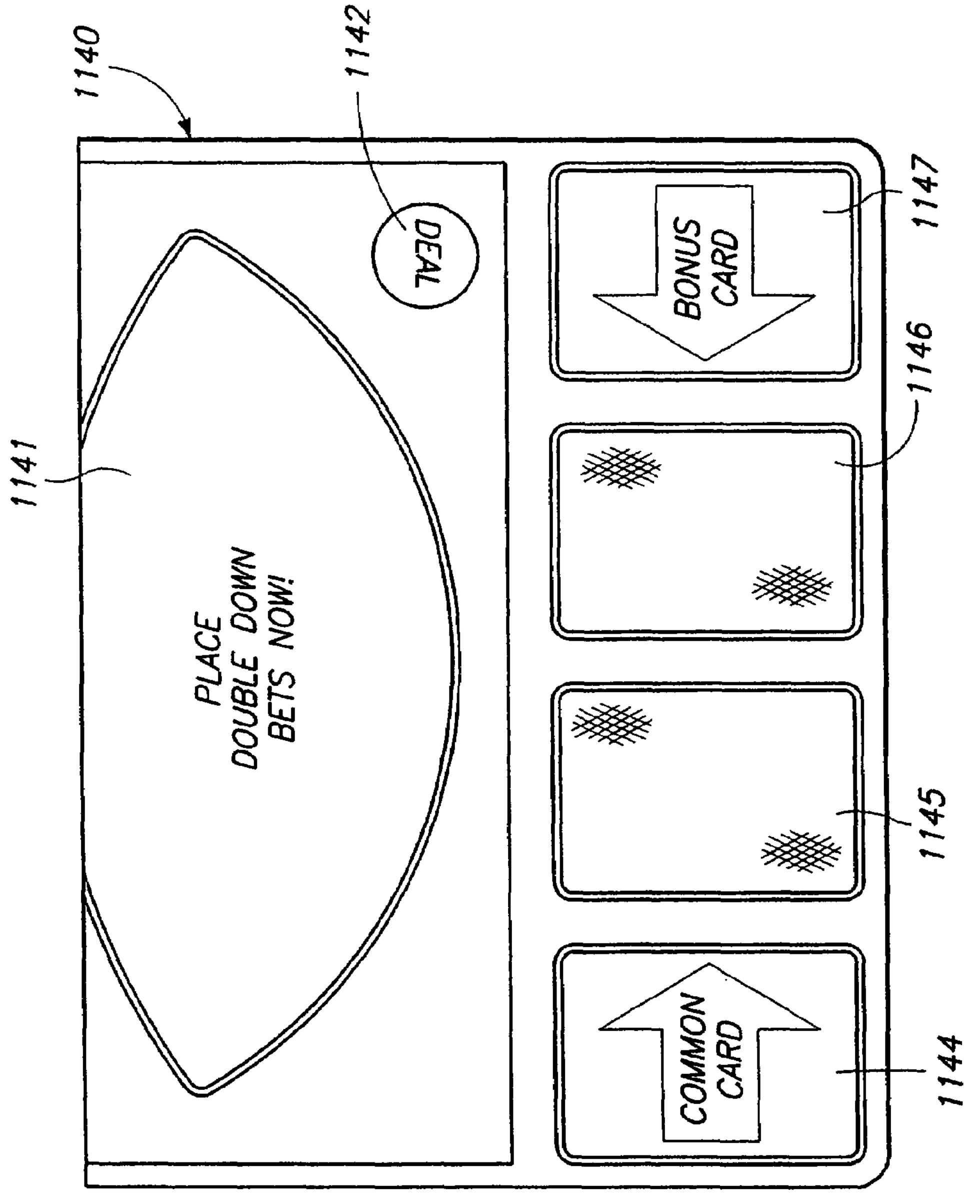
FIG. 72 is an enlarged top view showing the dealer display portion of the presentation unit of FIG. 55. The dealer display is shown displaying a first dealer display image.
Figure 76:
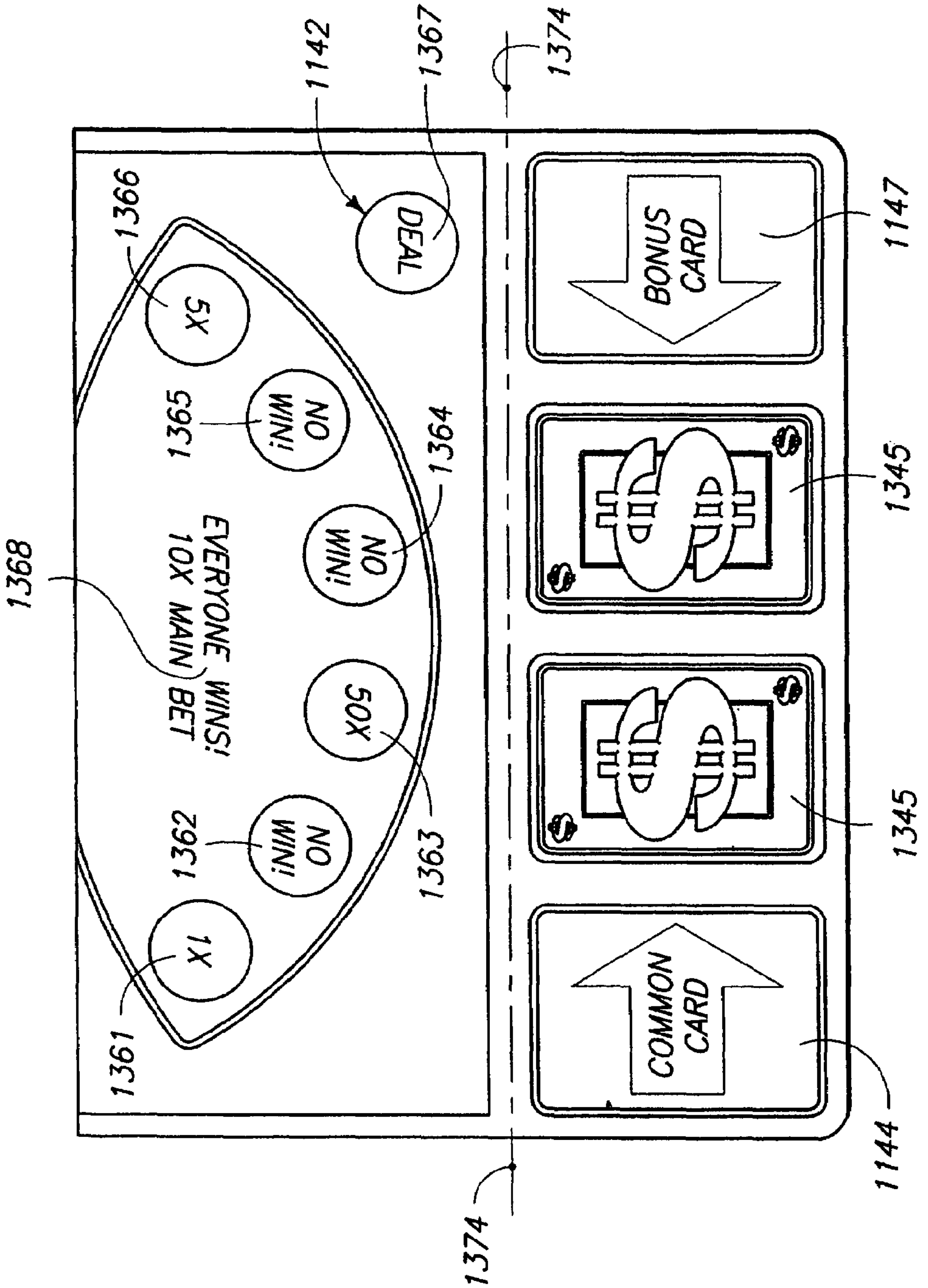

FIG. 72 shows the dealer display 1140 at the stage of play corresponding to the prompt of the participating player to decide whether to place an additional or "double down" wager. The deal display area 1142 indicates that dealer action is required to resume play of the game. The symbol subset assigned to the dealer as a participant in the game has not been revealed as indicated by the card back images in display areas 1145 and 1146.

According to one preferred method of playing the game system the first virtual symbol assigned to the dealer is displayed as image 1345 of FIG. 73. This symbol can advantageously be a common card which is shared by the dealer and all players as the virtual symbol assigned to each player's subset. In the play illustrated by FIG. 73, the common or shared symbol is a wild card symbol and this is included in each participants symbol subset. FIGS. 65-67 show this shared or common symbol card as the third displayed symbol image 1173.

FIG. 74 shows a further stage of game play wherein the dealer's second assigned virtual symbol is also a wild card symbol in the form of a dollar sign image 1345. This illustrates a further rule of play which can be included. The payoff list provides for payoffs to each player if the dealer has 2 or more wild cards assigned as the dealer's virtual symbol subset. If the dealer receives two wild cards, then the dealer is provided with added virtual symbol assignments which are displayed in display areas 1144 and 1147. This continues until the dealer is assigned a symbol card which is not a wild card. FIG. 56 indicates a payoff list which includes both winning groups associated with player virtual symbol subset assignments and dealer virtual symbol subset assignments. These rules are illustrative and can easily be modified by changing the number of different virtual symbols and the frequency that each symbol exists in the total set of available symbols from which the virtual symbols are assigned to the participant players and dealer. Since the programming can be varied in almost limitless ways with different winning groups for player winning groups and dealer winning groups, the statistical performance of the game systems can be finely tailored to achieve a large number of low payoff amounts at a high frequency while also offering very high jackpot amounts for winning symbol combinations which appear very infrequently.

FIG. 74 shows the dealer display with an end of game image shown in the upper portion of the display. Each player has a representative circle 1361-1366 which instructs the dealer what payoff is needed in view of the play of that particular round of the game. Message area 1368 can also be used to indicate that the dealer pays every player ten times their wagers because the dealer symbol subset in that round of play included a winning group of two wild card symbols. The winnings associated with the player symbol subsets and dealer symbol subsets are in one form of the invention independent. This allows all players to effectively have excitement over the player's subset and the dealer's subset in each round of play. This enhances play and excitement of the game.

Figures 68, 69:
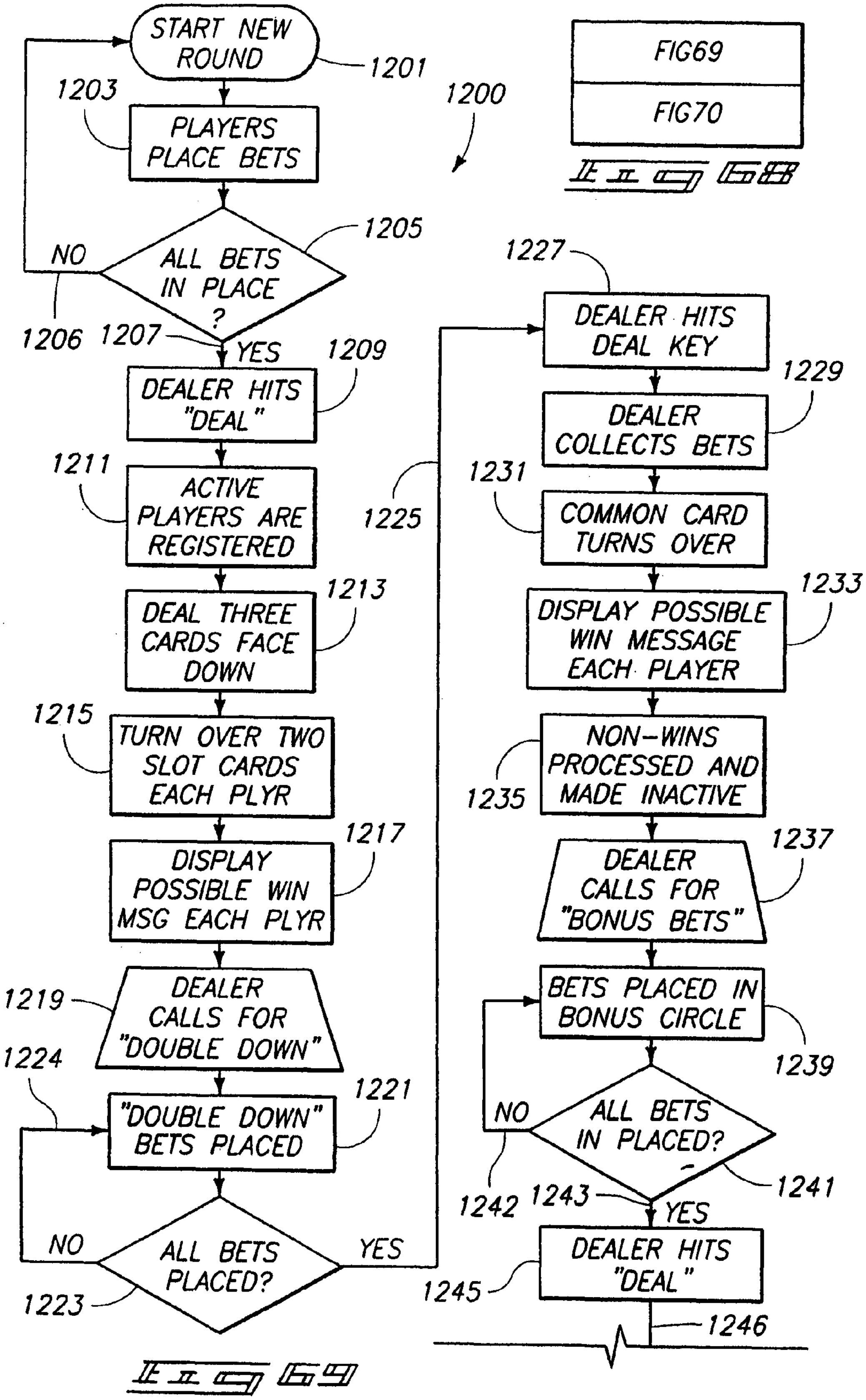
FIG. 68 is a schematic legend view showing the relationship between FIGS. 69 and 70.
FIGS. 69 and 70 are schematic block diagrams showing the logical sequence which the game controller and game play progresses during the process of playing the game.
Figure 70:
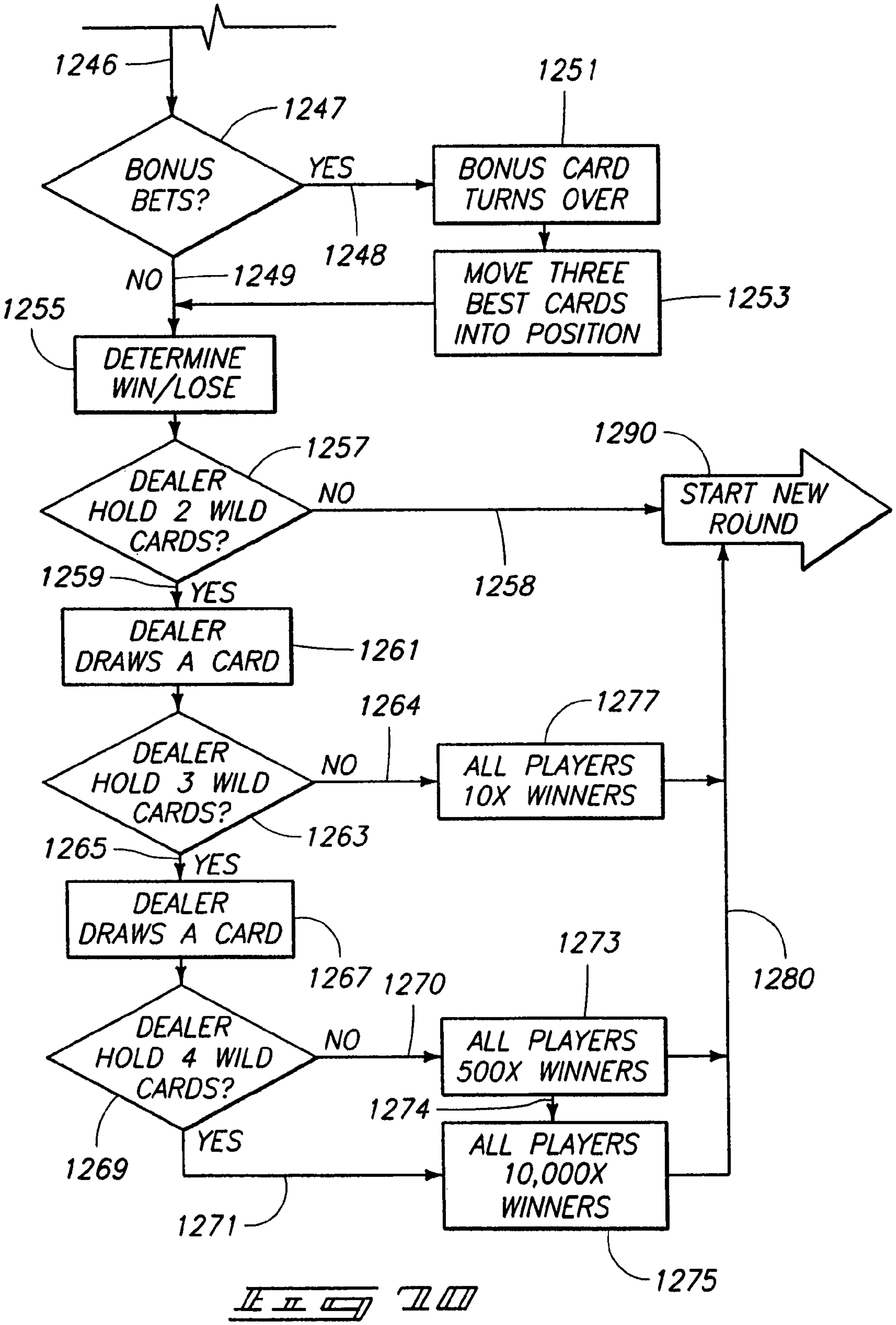

FIGS. 68-70 additionally illustrate the preferred operation and programming of the game system. The start of a new round of play is shown in block 1201. Players are prompted to place their bets by either or both the dealer and/or the one or more of the displays of the presentation unit 1100. At stage 1203 the players perform by placing their wagers, such as at betting zones 1120. Block 1205 indicates the check by the dealer for all bets being in place. If not then the program recycles to 1201 until the dealer hits the deal key as shown in block 1209. The active players are registered into the game record at stage 1211 to record play of the game. The game controller then proceeds to deal or assign the three virtual symbol or symbol cards to each player. Block 1215 illustrates the display of the virtual symbol images to each player. This can be done simultaneously to speed play of the game and improve performance to the casino.

FIG. 69 further shows block 1217 which indicates that the players receive a displayed message indicating the possible win, such as at message line 1177 (FIG. 58). Block 1219 illustrates the call by the dealer for any additional wagers. Any player places their additional wager as represented in block 1221. The dealer checks to determine if all bets are placed at block 1223. If all bets are placed then the game process continues along path 1225 and the dealer depresses the deal key as represented at block 1227. If not, then it recycles by path 1224 to allow completion of the additional wagering.

Block 1229 indicates that the dealer collects the bets at this stage of play. The common card is then displayed at block 1231. Any appropriate message is displayed at block 1233. The non-winning subsets are processed at block 1235 and these player positions are rendered inactive. Players can then continue optionally by placing the bonus symbol wagers as represented by the dealer's call in block 1237 and placement of the bonus bets in block 1239. The dealer checks to see if all bets are placed. If not, then the process proceeds by path 1242 to allow completion of betting. If completed, then path 1243 is pursued and the dealer depresses the deal key to resume play of the game.

Path 1246 continues the process to FIG. 70. Block 1247 indicates a game processor step which checks to see if any bonus bets have been placed. If so, then path 1248 is pursued and the assigned bonus card is displayed as represented by block 1251. The pay line cards are then reordered as represented by block 1253. Path 1249 represents the path to determination of whether there are winning groups. This is done by comparing the pre-determined payoff list or schedule with the subsets of symbols assigned to the dealer and players.

Block 1257 indicates the game processor check to see if the dealer subset contains two wild cards. If not then path 1258 is followed and a new game round is initiated. If there are two dealer wild cards, then path 1259 is pursued and the dealer is assigned another symbol card at block 1261. A similar analysis concerning the dealer's possible assignment of a third wild card is represented at block 1263 with associate process paths 1264 for a no answer and 1265 for a yes answer. If the answer is yes then the dealer draws a fourth symbol card at block 1267. Block 1269 represents a comparison to see if the dealer subset has been assigned four wild cards. Blocks 1277, 1273 and 1275 illustrate payoffs to all participating players if the dealer has received the indicated number of wild cards. Path 1280 proceeds from these dealer winning group situations to the start of another round of play.

Methods according to the invention can include playing a live game involving wagering by a plurality of live participants, said live participants including at least one player and at least one dealer, said participants being live persons who personally attend the game at a live game location, comprising:

displaying a plurality of changeable participant display images from at least one participant display;

processing data using at least one game processor to perform at least the following functions:

- providing game rules which at least partially administer play of the card game;
- defining a set of virtual symbols for use in playing the game;
- assigning virtual symbols from the set of virtual symbols to the dealer and at least one player to provide assigned participant symbol subsets thereto;
- instructing the participant displays to display symbol images indicating the virtual symbols assigned to the participant symbol subsets;
- comparing the participant symbol subsets to a pre-defined payoff list which indicates whether an assigned participant symbol subset is a winning group;

displaying participant symbols assigned to the participants using the at least one participant display;

controlling play of the game using at least one dealer control operated by the at least one dealer;

awarding payoffs to players who receive a winning symbol group.

Methods according to the invention can further include recording game action to enable subsequent analysis or replay.

Methods according to the invention can further include reversing game action to delete the effects of one or more actions taken in playing the game.

Methods according to the invention can additionally include sensing betting chips.

Methods according to the invention can include displaying at least two virtual symbols assigned to said at least one player in the participant symbol subset;

providing said at least one player an opportunity to view said at least two virtual symbols;

determining whether said at least one player has placed an additional wager;

after said determining, displaying at least one additional virtual symbol assigned to said at least one player.

Additional methods according to the invention can include displaying images of the participant symbol subset assigned to said at least one player;

providing said at least one player an opportunity to view said images of the participant symbol subset assigned to said at least one player;

determining whether said at least one player has placed a bonus symbol ante;

providing a bonus symbol to the participant symbol subset for a player who has placed a bonus symbol ante;

redefining the participant symbol subset for a player who has placed a bonus symbol ante if said bonus symbol provides an improved payoff.

Still further methods according to the invention can include comparing the participant symbol subset of both said at least one player and said at least one dealer.

Additional slot machine methods according to the invention can include methods for playing a slot machine game involving wagering by at least one participant, comprising:

displaying a plurality of changeable participant display images from at least one participant display;

defining a set of virtual symbols for use in playing the game;

assigning virtual symbols from the set of virtual symbols to the at least one participant to define an assigned participant symbol subset;

instructing the participant display to display symbol images indicating the virtual symbols assigned to the participant symbol subsets;

displaying images of the participant symbol subset assigned to said at least one participant;

providing said at least one player an opportunity to view said images of the participant symbol subset assigned to said at least one participant;

determining whether said at least one participant has placed a bonus symbol ante;

providing a bonus symbol to the participant symbol subset for a player who has placed a bonus symbol ante;

comparing the participant symbol subsets to a pre-defined payoff list which indicates whether an assigned participant symbol subset is a winning group;

redefining the participant symbol subset for a participant who has placed a bonus symbol ante if said bonus symbol provides an improved payoff;

awarding payoffs to participants who receive a winning symbol group.A method for playing a slot machine game involving wagering by at least one participant, comprising:

displaying a plurality of changeable participant display images from at least one participant display;

defining a set of virtual symbols for use in playing the game;

assigning virtual symbols from the set of virtual symbols to the at least one participant to define an assigned participant symbol subset;

instructing the participant display to display symbol images indicating the virtual symbols assigned to the participant symbol subsets;

displaying at least two virtual symbols assigned to said at least one participant in the participant symbol subset;

providing said at least one participant with an opportunity to view said at least two virtual symbols;

determining whether said at least one participant has placed an additional wager;

after said determining, displaying at least one additional virtual symbol assigned to said at least one participant.

comparing the participant symbol subsets to a pre-defined payoff list which indicates whether an assigned participant symbol subset is a winning group;

awarding payoffs to participants who receive a winning symbol group.

Additional aspects of the novel methods for playing a live game involve wagering by a plurality of live participants, said live participants including at least one player and at least one dealer, said participants being live persons who personally attend the game at a live game location, comprising:

displaying a plurality of changeable participant display images from at least one participant display;

defining a set of virtual symbols for use in playing the game;

assigning virtual symbols from the set of virtual symbols to the dealer and at least one player to provide assigned participant symbol subsets thereto, at least one of the virtual symbols assigned being shared between at least one dealer and at least one player;

instructing the participant displays to display symbol images indicating the virtual symbols assigned to the participant symbol subsets;

comparing the participant symbol subsets to a pre-defined payoff list which indicates whether an assigned participant symbol subset is a winning group;

displaying participant symbols assigned to the participants using the at least one participant display;

controlling play of the game using at least one dealer control operated by the at least one dealer;

awarding payoffs to players who receive a winning symbol group.

Further Aspects and Features

The above description has set out various features and aspects of the inventions and the preferred embodiments thereof. Such aspects and features may further be defined according to the following which may individually or in various combinations of the recited features help to define the inventions in accordance herewith.

A system for playing a game involving wagering by at least one player playing with a dealer, said dealer and said at least one player being live persons forming a playing group of participants who attend and participate in the game about the system at a live game location, comprising a plurality of virtual symbols defining a virtual symbol set, a plurality of said participants being assigned a plurality of virtual symbols during play of the game in the form of assigned participant symbol subsets, a plurality of participant displays which provide a plurality of changeable participant display images, the plurality of participant display images including virtual symbol images which are displayed by the plurality of participant displays to indicate the nature of the virtual symbols assigned to the participants during play of the game, at least one game processor for processing data to perform functions which include providing game rules which at least partially administer play of the game, assigning virtual symbols from the virtual symbol set to the participants, instructing the participant video displays to display virtual symbol images depending upon the virtual symbols assigned to the participants, said plurality of participant symbol subsets being compared against a predefined payoff list which indicates whether an assigned participant symbol subset is a winning group, and at least one dealer control which is activated by the live dealer to control action of the game, whereby said at least one player may receive a payoff in response to a winning group being assigned to the at least one player.

A system wherein said live game location is within a single room.

A system wherein said live game location is about a gaming table.

A system wherein said live game location is about a gaming table, and said plurality of participant displays is contained within a presentation unit which is supported by said gaming table.

A system wherein said at least one game processor additionally performs the function of recording game action for the game being played to enable subsequent analysis or replay.

A system wherein said at least one dealer control includes a plurality of dealer controls.

A system wherein said at least one dealer control includes a plurality of dealer control sensors which are provided in a simulated dealing shoe.

A system wherein said at least one dealer control includes a plurality of dealer control sensors which are provided in a simulated dealing shoe having at least one dealing shoe display for displaying visual images to the participants.

A system and further comprising at least one chip sensor for detecting betting chips placed by said at least one player.

A system further comprising at least one chip sensor for detecting betting chips placed by said at least one player, said at least one chip sensor being capable of reading the value of the betting chips as a result of the betting chips including an electronically programmed identification circuit.

A system wherein said at least one participant displays provide participant display images which include information indicating potential payoff to said at least one player.

A system wherein the system includes a presentation unit which is a retrofit unit supported upon an upper surface of a gaming table.

A system further comprising at least one participant identification reader for reading identification of at least one participant.

A system and further comprising at least one participant identification reader for reading identification of at least one participant using a sensor which detects biological information detected from a body of the participant.

A system wherein the dealer has a dealer display which is assigned symbols which are assigned in common with said at least one player.

A system and further comprising a bonus chip detector for detecting placement of a bonus chip by said at least one player to selectively indicate the player would like to qualify for having a bonus symbol added to the assigned participant symbol subset.

A system and further comprising an additional wager chip detector for detecting placement of an added wager chip by said at least one player to selectively increase the amount being wagered.

A system, further comprising a bonus chip detector for detecting placement of a bonus chip by said at least one player to selectively indicate the player would like to qualify for having a bonus symbol added to the assigned participant symbol subset, an additional wager chip detector for detecting placement of an added wager chip by said at least one player to selectively increase the amount being wagered.

A system wherein the at least one game processor is capable of being adjusted to vary the symbols contained in the virtual symbol set whereby the odds for obtaining one or more of the winning groups is affected.

A system wherein the payoff list includes both a player payoff list which has at least one winning group associated with participant symbol subsets assigned to said at least one player, and a dealer payoff list which has at least one winning group associated with participant symbol subsets assigned to said dealer.

A system wherein the payoff list includes both a player payoff list which has at least one winning group associated with participant symbol subsets assigned to said at least one player, and a dealer payoff list which has at least one winning group associated with participant symbol subsets assigned to said dealer.

A system wherein the payoff list includes both a player payoff list which has at least one winning group associated with participant symbol subsets assigned to said at least one player, and a dealer payoff list which has at least one winning group associated with participant symbol subsets assigned to said dealer; and wherein a winning group associated with said dealer payoff list leads to payoffs to plural players.

A slot machine system for playing a game involving wagering by at least one player playing with a dealer, said dealer and said at least one player being live persons forming a playing group of participants who attend and participate in the game about the system at a live game location, the system including slot symbol displays that show images representative of virtual symbols assigned to the dealer and said at least one player in the form of assigned participant symbol subsets, said assigned participant symbol subsets including assigned virtual symbols which are shared in a common assignment with at least one other participant.

A slot machine system wherein said assigned virtual symbols which are shared in a common assignment, are shared in common with the dealer.

A slot machine system wherein said assigned virtual symbols which are shared in a common assignment, are shared in common with the dealer and another player.

A slot machine system wherein said assigned virtual symbols which are shared in a common assignment, are shared in common with another player.

A slot machine system wherein said live game location is about a gaming table, and said slot symbol displays are contained within a presentation unit which is supported by said gaming table.

A slot machine system and further comprising a game processor which performs a function of recording game action to enable subsequent analysis or replay.

A slot machine system and further comprising at least one dealer control which is activated by the live dealer to control action of the game.

A slot machine system wherein said at least one dealer control includes a plurality of dealer control sensors which are provided in a simulated dealing shoe having at least one dealing shoe display for displaying visual images to the participants.

A slot machine system and further comprising at least one chip sensor for detecting betting chips placed by said at least one player.

A slot machine system and further comprising at least one chip sensor for detecting betting chips placed by said at least one player; said at least one chip sensor being capable of reading the value of the betting chips as a result of the betting chips including an electronically programmed identification circuit.

A slot machine system and further comprising a bonus chip detector for detecting placement of a bonus chip by said at least one player to selectively indicate the player would like to receive a bonus symbol added to the assigned participant symbol subset.

A slot machine system and further comprising a bonus chip detector for detecting placement of a bonus chip by said at least one player to selectively indicate the player would like to receive a bonus symbol added to the assigned participant symbol subset, said bonus symbol being shared in a common assignment with at least one other participant.

A slot machine system for playing a game involving wagering by a plurality of participants the system including slot symbol displays that show images representative of virtual symbols assigned to said plurality of participants in the form of assigned participant symbol subsets, said assigned participant symbol subsets including assigned virtual symbols which are shared in a common assignment with at least one other participant.

A slot machine system wherein said assigned virtual symbols which are shared in a common assignment, are shared in common with a dealer.

A slot machine system wherein said assigned virtual symbols which are shared in a common assignment, are shared in common with a player.

A slot machine system wherein said live game location is about a gaming table, and said slot symbol displays are contained within a presentation unit which is supported by said gaming table.

A slot machine system and further comprising a game processor which performs a function of recording game action to enable subsequent analysis or replay.

A slot machine system and further comprising at least one dealer control which is activated by a live dealer to control action of the game.

A slot machine system wherein said at least one dealer control includes a plurality of dealer control sensors which are provided in a simulated dealing shoe having at least one dealing shoe display for displaying visual images to the participants.

A slot machine system and further comprising at least one chip sensor for detecting betting chips placed by said at least one participant.

A slot machine system and further comprising at least one chip sensor for detecting betting chips placed by said at least one participant; said at least one chip sensor being capable of reading the value of the betting chips as a result of the betting chips including an electronically programmed identification circuit.

A slot machine system and further comprising a bonus chip detector for detecting placement of a bonus chip by said at least one player to selectively indicate the player would like to receive a bonus symbol added to the assigned participant symbol subset.

A slot machine system and further comprising a bonus chip detector for detecting placement of a bonus chip by said at least one player to selectively indicate the player would like to receive a bonus symbol added to the assigned participant symbol subset, said bonus symbol being shared in a common assignment with at least one other participant.

A slot machine system for playing a game involving wagering by at least one player, including slot symbol displays that show images representative of virtual symbols assigned to said at least one player in the form of assigned participant symbol subsets, said assigned participant symbol subsets including at least one virtual symbol which is assigned to said at least one player on a selective basis dependent upon whether the at least one player has placed a bonus symbol ante.

A slot machine system wherein said assigned participant symbol subsets include assigned virtual symbols which are shared in a common assignment with at least one other participant.

A slot machine system for playing a game involving wagering by at least one player, including slot symbol displays that show images representative of at least three virtual symbols assigned to said at least one player in the form of assigned participant symbol subsets, said at least three virtual symbols being assigned in at least two stages to allow an additional wager to be placed prior to display of remaining virtual symbols contained in the assigned participant symbol subsets to the at least one player.

A slot machine system further comprising an additional wager chip sensor for detecting whether an additional wager has been placed.

A system for playing a game involving wagering by at least one player playing with a dealer, said dealer and said at least one player being live persons forming a playing group of participants who attend and participate in the game about the system at a live game location, comprising a plurality of virtual symbols defining a virtual symbol set, a plurality of said participants being assigned a plurality of virtual symbols during play of the game in the form of assigned participant symbol subsets, a plurality of participant displays which provide a plurality of changeable participant display images, the plurality of participant display images including virtual symbol images which are displayed by the plurality of participant displays, at least one game processor for processing data to perform functions which include providing game rules which at least partially administer play of the game, assigning virtual symbols from the virtual symbol set to the participants, instructing the participant video displays to display virtual symbol images depending upon the virtual symbols assigned to the participants, at least one dealer control which is activated by the live dealer to control action of the game, a presentation unit which mounts said plurality of participant displays, said presentation unit having a changeable presentation unit cover which can be replaced to change games for which the game system is being used, and wherein the at least one game processor is capable of being reprogrammed to change games for which the game system is being used.

A system for playing a game involving wagering by at least one player playing with a dealer, said dealer and said at least one player being live persons forming a playing group of participants who attend and participate in the game about the system at a live game location, comprising a plurality of participant displays which provide a plurality of changeable participant display images, at least one game processor for processing data to perform functions which include providing game rules which at least partially administer play of the game, and instructing the participant displays to display images, at least one dealer control which is activated by the live dealer to control action of the game, a presentation unit which mounts said plurality of participant displays, said presentation unit having a changeable presentation unit cover which can be replaced to change games for which the game system is being used, and wherein the at least one game processor is capable of being reprogrammed to change games for which the game system is being used.

A method for playing a live game involving wagering by a plurality of live participants, said live participants including at least one player and at least one dealer, said participants being live persons who personally attend the game at a live game location, comprising displaying a plurality of changeable participant display images from at least one participant display, processing data using at least one game processor to perform at least the following functions: providing game rules which at least partially administer play of the card game, defining a set of virtual symbols for use in playing the game, assigning virtual symbols from the set of virtual symbols to the dealer and at least one player to provide assigned participant symbol subsets thereto, instructing the participant displays to display symbol images indicating the virtual symbols assigned to the participant symbol subsets, comparing the participant symbol subsets to a pre-defined payoff list which indicates whether an assigned participant symbol subset is a winning group; displaying participant symbols assigned to the participants using the at least one participant display, controlling play of the game using at least one dealer control operated by the at least one dealer, awarding payoffs to players who receive a winning symbol group.

A method further including recording game action to enable subsequent analysis or replay.

A method and further including reversing game action to delete the effects of one or more actions taken in playing the game.

A method further including sensing betting chips.

A method further including sensing betting chips for purposes of indicating an additional wager.

A method and further including displaying at least two virtual symbols assigned to said at least one player in the participant symbol subset, providing said at least one player an opportunity to view said at least two virtual symbols, determining whether said at least one player has placed an additional wager, after said determining, displaying at least one additional virtual symbol assigned to said at least one player A method further including displaying images of the participant symbol subset assigned to said at least one player, providing said at least one player an opportunity to view said images of the participant symbol subset assigned to said at least one player, determining whether said at least one player has placed a bonus symbol ante, providing a bonus symbol to the participant symbol subset for a player who has placed a bonus symbol ante, redefining the participant symbol subset for a player who has placed a bonus symbol ante if said bonus symbol provides an improved payoff.

A method further including sensing the value of chips placed by the players.

A method wherein said comparing includes comparing the participant symbol subset of said at least one player.

A method wherein said comparing includes comparing the participant symbol subset of said at least one dealer.

A method wherein said comparing includes comparing the participant symbol subset of said at least one dealer, and said awarding payoffs to players is supplemented by awarding all participating players an added payoff if the participant symbol subset of said at least one dealer is a winning group.

A method wherein said comparing includes comparing the participant symbol subset of both said at least one player and said at least one dealer.

A method for playing a slot machine game involving wagering by at least one participant, comprising displaying a plurality of changeable participant display images from at least one participant display, defining a set of virtual symbols for use in playing the game, assigning virtual symbols from the set of virtual symbols to the at least one participant to define an assigned participant symbol subset, instructing the participant display to display symbol images indicating the virtual symbols assigned to the participant symbol subsets, displaying images of the participant symbol subset assigned to said at least one participant, providing said at least one player an opportunity to view said images of the participant symbol subset assigned to said at least one participant, determining whether said at least one participant has placed a bonus symbol ante, providing a bonus symbol to the participant symbol subset for a player who has placed a bonus symbol ante, comparing the participant symbol subsets to a pre-defined payoff list which indicates whether an assigned participant symbol subset is a winning group, redefining the participant symbol subset for a participant who has placed a bonus symbol ante if said bonus symbol provides an improved payoff, awarding payoffs to participants who receive a winning symbol group.

A method for playing a slot machine game involving wagering by at least one participant, comprising displaying a plurality of changeable participant display images from at least one participant display, defining a set of virtual symbols for use in playing the game, assigning virtual symbols from the set of virtual symbols to the at least one participant to define an assigned participant symbol subset, instructing the participant display to display symbol images indicating the virtual symbols assigned to the participant symbol subsets, displaying at least two virtual symbols assigned to said at least one participant in the participant symbol subset, providing said at least one participant with an opportunity to view said at least two virtual symbols, determining whether said at least one participant has placed an additional wager, after said determining, displaying at least one additional virtual symbol assigned to said at least one participant, comparing the participant symbol subsets to a pre-defined payoff list which indicates whether an assigned participant symbol subset is a winning group, and awarding payoffs to participants who receive a winning symbol group.

A method for playing a live game involving wagering by a plurality of live participants, said live participants including at least one player and at least one dealer, said participants being live persons who personally attend the game at a live game location, comprising displaying a plurality of changeable participant display images from at least one participant display, defining a set of virtual symbols for use in playing the game, assigning virtual symbols from the set of virtual symbols to the dealer and at least one player to provide assigned participant symbol subsets thereto, at least one of the virtual symbols assigned being shared between at least one dealer and at least one player, instructing the participant displays to display symbol images indicating the virtual symbols assigned to the participant symbol subsets, comparing the participant symbol subsets to a pre-defined payoff list which indicates whether an assigned participant symbol subset is a winning group, displaying participant symbols assigned to the participants using the at least one participant display, controlling play of the game using at least one dealer control operated by the at least one dealer, and awarding payoffs to players who receive a winning symbol group.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. A system forming a slot machine game having the ability to allow multiple participants to personally and simultaneously attend the slot machine game system thereabout, comprising:

plural participant video displays provided on an approximately planar game table and providing changeable visual data to at least one playing participant;

slot symbols displayed on said plural participant video displays which vary during play of the slot machine game to include winning slot symbol groups and losing slot symbol groups;

a single central game processor connected to the participant video displays for controlling said participant video displays to display said slot symbols assigned to playing participants; and wherein said slot symbols assigned to playing participants comprise separate participant symbol subsets, each participant symbol subset having a slot symbol group that the single central game processor can vary independently from participant symbol subsets assigned to other participants and wherein the slot symbols are associated with virtual playing cards displayed on the plural participant video displays in a virtual card game that is controlled by the single central processor and played simultaneously with the slot machine game.

2. A system according to claim 1, further comprising a pay line display for the slot symbols for a participant which is responsive to commands from the single central game processor.

3. A system according to claim 1, wherein the single central game processor for processing data to further perform by indicating when a participant receives a payoff in response to receiving a winning slot symbol group.

4. A system according to claim 1, further comprising a pay line display for displaying any participant slot symbols, responsive to commands from the game processor, the pay line display being a part of single central participant video display.

5. A system according to claim 1, wherein the single central game processor additionally performs by recording game action to enable subsequent analysis or replay.

6. A system according to claim 1, further comprising one or more participant identification readers coupled to the single central game processor.

7. A system according to claim 1, further comprising one or more participant identification readers coupled to the single central game processor, wherein the one or more participant identification readers include a capability for reading coded data indicating security information from the identification card.

8. A system according to claim 1, further comprising one or more participant identification readers coupled to the single central game processor, wherein the one or more participant identification readers include a capability for reading a smart card to determine an available credit amount regarding credit purchased from a casino associated with the gaming table.

9. A system according to claim 1, further comprising at least one chip sensor for detecting betting chips placed by the at least one live player, each betting chip including a transponder and wherein the at least one chip sensor is capable of reading said transponder.

10. A system according to claim 1, wherein the at least one participant video display provides participant display images which include a border portion of the display which indicates outcome of the slot machine game for the participant.

11. A system according to claim 1, and further comprising at least one participant identification reader for reading identification of at least one participant using a sensor which detects biological information from a body of the participant.

12. A system forming a slot machine game having the ability to allow multiple participants to personally and simultaneously attend the slot machine game system thereabout, comprising:

at least one central display for displaying information pertinent to play of the slot machine game;

plural participant video displays provided on an approximately planar game table and arranged in a arrangement about the central display providing changeable visual data to at least one playing participant;

slot symbols displayed on said plural participant video displays which vary during play of the slot machine game to include winning slot symbol groups and losing slot symbol groups;

a single central game processor connected to the participant video displays and at least one central display for controlling images therefrom; and wherein said slot symbols assigned to playing participants comprise separate participant symbol subsets, each participant symbol subset having a slot symbol group that the single central game processor can vary independently from participant symbol subsets assigned to other participants and wherein the slot symbols are associated with virtual playing cards displayed on the plural participant video displays in a virtual card game that is controlled by the single central processor and played simultaneously with the slot machine game.

13. A system according to claim 12, further comprising a pay line display for the slot symbols for a participant which is responsive to commands from the single central game processor.

14. A system according to claim 12, wherein the single central game processor for processing data to further perform by indicating when a participant receives a payoff in response to receiving a winning slot symbol group.

15. A system according to claim 12, wherein the single central game processor additionally performs by recording game action to enable subsequent analysis or replay.

16. A system according to claim 12, further comprising one or more participant identification readers coupled to the single central game processor.

17. A system according to claim 12, further comprising one or more participant identification readers coupled to the single central game processor, wherein the one or more participant identification readers include a capability for reading a magnetic code.

18. A system according to claim 12, wherein the at least one participant video display provides participant display images which include a border portion of the display which indicates outcome of the slot machine game.

19. A system according to claim 12, wherein the at least one participant video display provides participant display images which include a border portion of the display which indicates outcome of the slot machine game for the respective player and the participant video display is positioned to allow an overhead camera to record a state of the display.

20. A system according to claim 12, and further comprising at least one participant identification reader for reading identification of at least one participant using a sensor which detects biological information from a body of the participant.

* * * * *